(12) United States Patent
Bian et al.

(10) Patent No.: US 12,517,622 B2
(45) Date of Patent: Jan. 6, 2026

(54) INTER-INTERFACE CONVERSION METHOD, DEVICE, AND SYSTEM

(71) Applicant: Huawei Technologies Co., Ltd., Shenzhen (CN)

(72) Inventors: Chao Bian, Nanjing (CN); Xiaoxiao Chen, Nanjing (CN); Zeng Zhang, Shenzhen (CN); Longsheng Wen, Shenzhen (CN); Hua Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 21 days.

(21) Appl. No.: 18/044,484

(22) PCT Filed: Aug. 16, 2021

(86) PCT No.: PCT/CN2021/112878
§ 371 (c)(1),
(2) Date: Mar. 8, 2023

(87) PCT Pub. No.: WO2022/052747
PCT Pub. Date: Mar. 17, 2022

(65) Prior Publication Data
US 2024/0036696 A1    Feb. 1, 2024

(30) Foreign Application Priority Data

Sep. 9, 2020  (CN) .......................... 202010943693.3
Apr. 30, 2021 (CN) .......................... 202110482721.0

(51) Int. Cl.
*G06F 3/0481* (2022.01)
*G06F 3/0484* (2022.01)

(52) U.S. Cl.
CPC .......... *G06F 3/0481* (2013.01); *G06F 3/0484* (2013.01)

(58) Field of Classification Search
None
See application file for complete search history.

(56) References Cited

U.S. PATENT DOCUMENTS 9,740,381 B1 * 8/2017 Chaudhri .............. G06F 3/0485
11,520,473 B2 * 12/2022 Moreno ................ G06F 3/0483
(Continued)

FOREIGN PATENT DOCUMENTS

CN    105264479 A    1/2016
CN    105843627 A    8/2016
(Continued)

OTHER PUBLICATIONS

Screen captures from YouTube video clip entitled "[No Home Button] Basic iPhoneX/XS/XS Max Operation," 5 pages, uploaded Oct. 16, 2018. Retrieved from Internet: <https://www.youtube.com/watch?app=desktop&v=kSMNUVpfOkkandt>. Discussed in NPL Cite No. 2.

Foreign Communication from a Counterpart Application, Japanese Application No. 2023-515654, Japanese Office Action dated Jan. 14, 2025, 9 pages, with English translation.

Rui Zhou, "The Interaction Design of Dynamic Efficiency in Starting State Interface," DOI: 10. 19554/j.cnki. 1001-3563.2015. 08.022, Apr. 2015, with English abstract total 4 pages.

*Primary Examiner* — Henry Orr
(74) *Attorney, Agent, or Firm* — Conley Rose, P.C.

(57) ABSTRACT

A method includes that an electronic device displays a first interface after detecting a first operation performed by a user on the electronic device. The first interface includes a first element and a second element. The electronic device displays at least one transition interface and then displays a second interface after detecting a second operation performed by the user on the first interface. The second interface includes the second element and a third element, the transition interface includes the second element, and the second element does not include an element in a status bar on the first interface, the transition interface, or the second interface.

20 Claims, 140 Drawing Sheets

(56) References Cited

U.S. PATENT DOCUMENTS

| | | | |
|---|---|---|---|
| 2009/0189915 A1 | 7/2009 | Mercer et al. | |
| 2014/0164931 A1 | 6/2014 | Lee et al. | |
| 2014/0365882 A1* | 12/2014 | Lemay | G06F 3/016 |
| | | | 715/256 |
| 2015/0046852 A1* | 2/2015 | Furtwangler | G06F 3/0484 |
| | | | 715/762 |
| 2015/0067582 A1 | 3/2015 | Donnelly et al. | |
| 2016/0196044 A1* | 7/2016 | McGill | G06F 3/04842 |
| | | | 715/720 |
| 2017/0357437 A1* | 12/2017 | Peterson | G06F 40/134 |
| 2018/0335937 A1* | 11/2018 | Hauenstein | G06F 3/0482 |
| 2019/0056828 A1* | 2/2019 | Jitkoff | G06F 21/31 |
| 2022/0214865 A1* | 7/2022 | Henry | G06F 3/0488 |

FOREIGN PATENT DOCUMENTS

| | | | |
|---|---|---|---|
| CN | 106156066 A | 11/2016 | |
| CN | 106775379 A | 5/2017 | |
| CN | 108491124 A | 9/2018 | |
| CN | 109426532 A | 3/2019 | |
| CN | 110322537 A | 10/2019 | |
| CN | 110825301 A | 2/2020 | |
| JP | 2012100185 A | 5/2012 | |
| WO | WO-2015003368 A1 * | 1/2015 | G06F 3/0488 |

\* cited by examiner

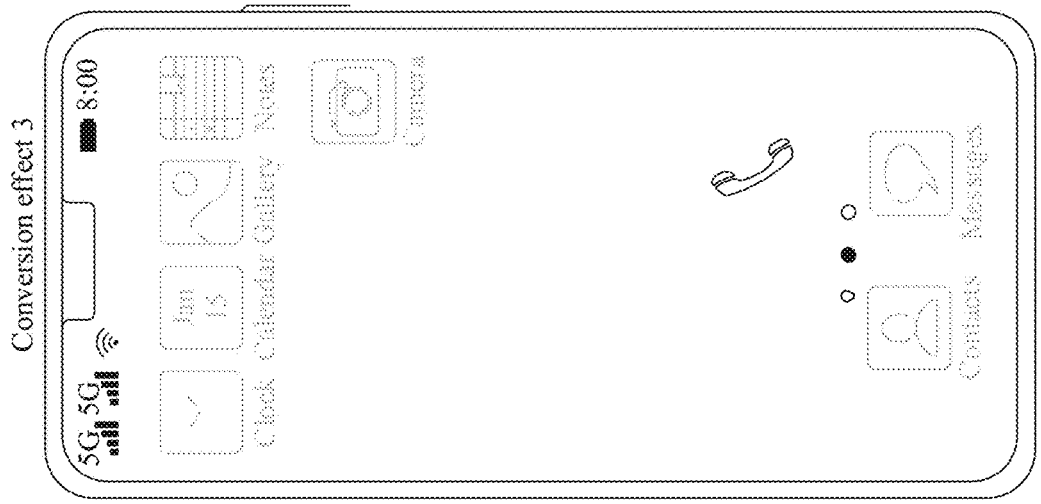
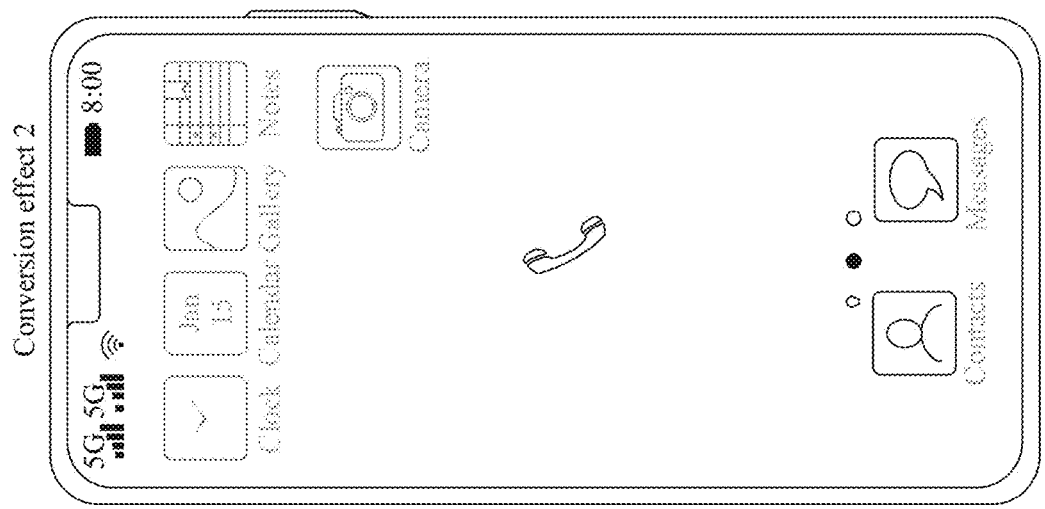
FIG. 23(b)
FIG. 23(c)
CONT. FROM FIG. 23(a)

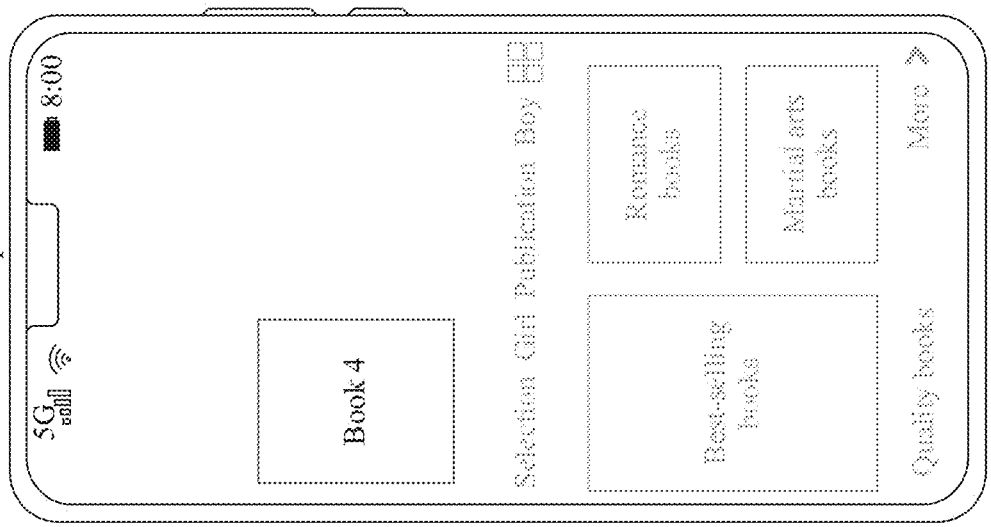
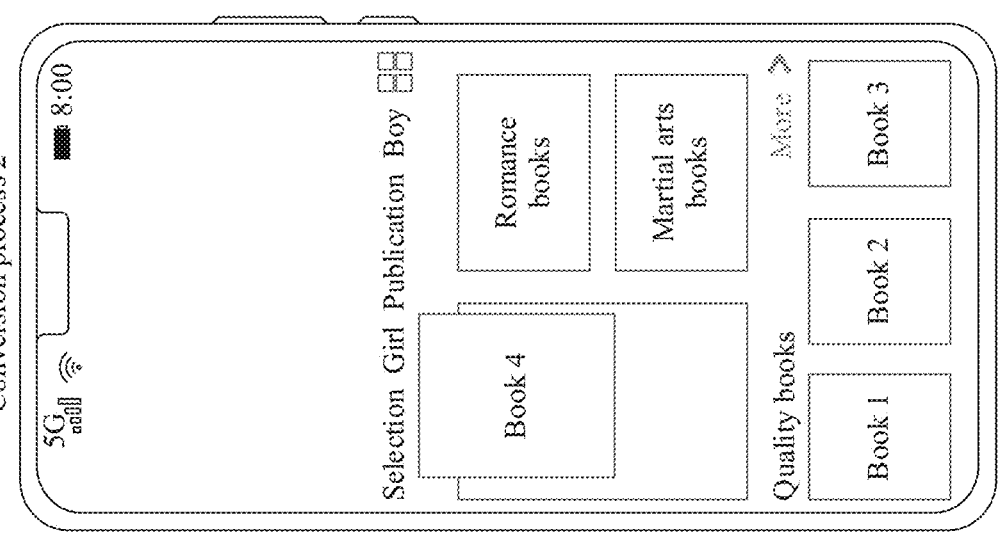
FIG. 24(b)
FIG. 24(c)

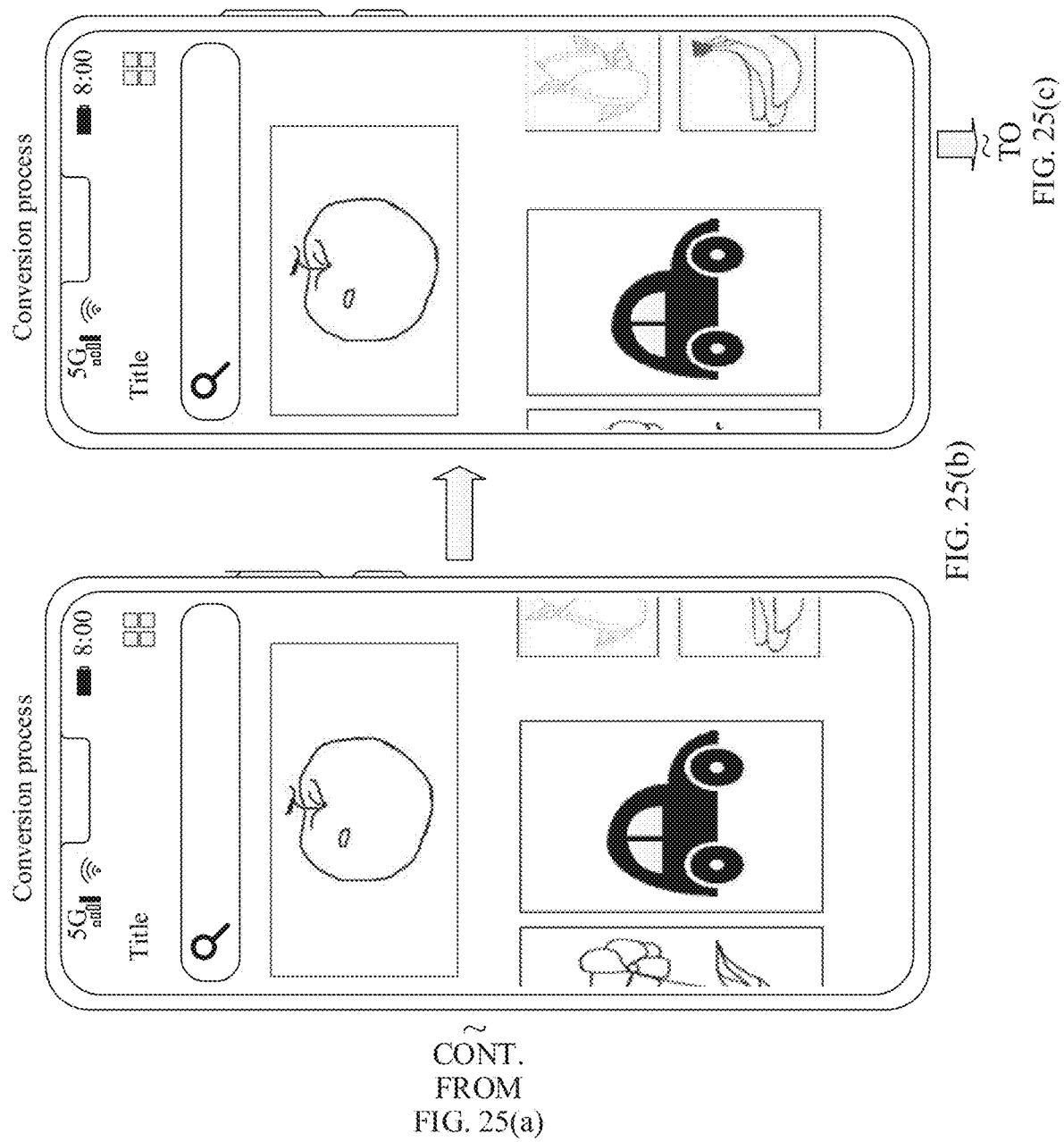

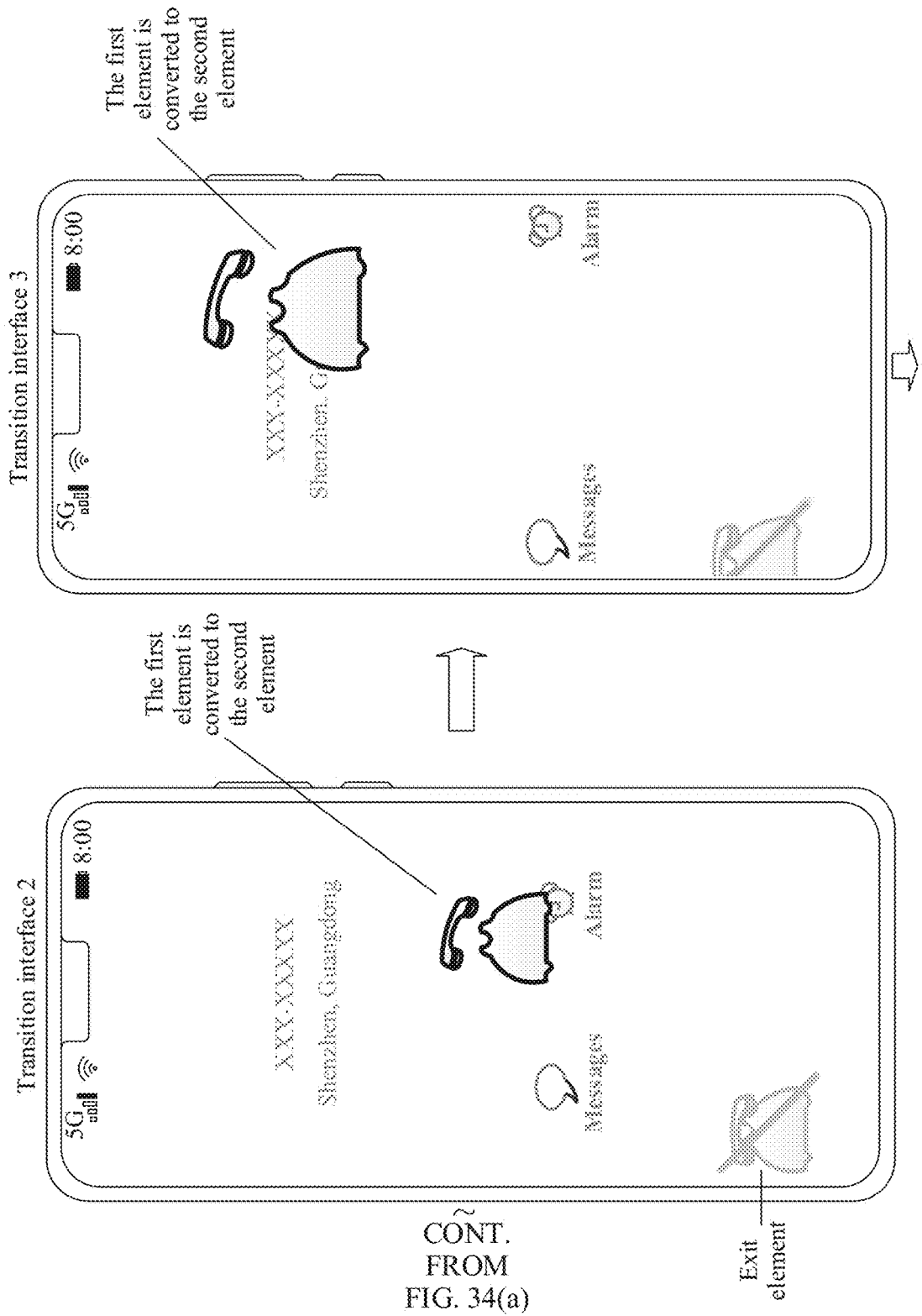

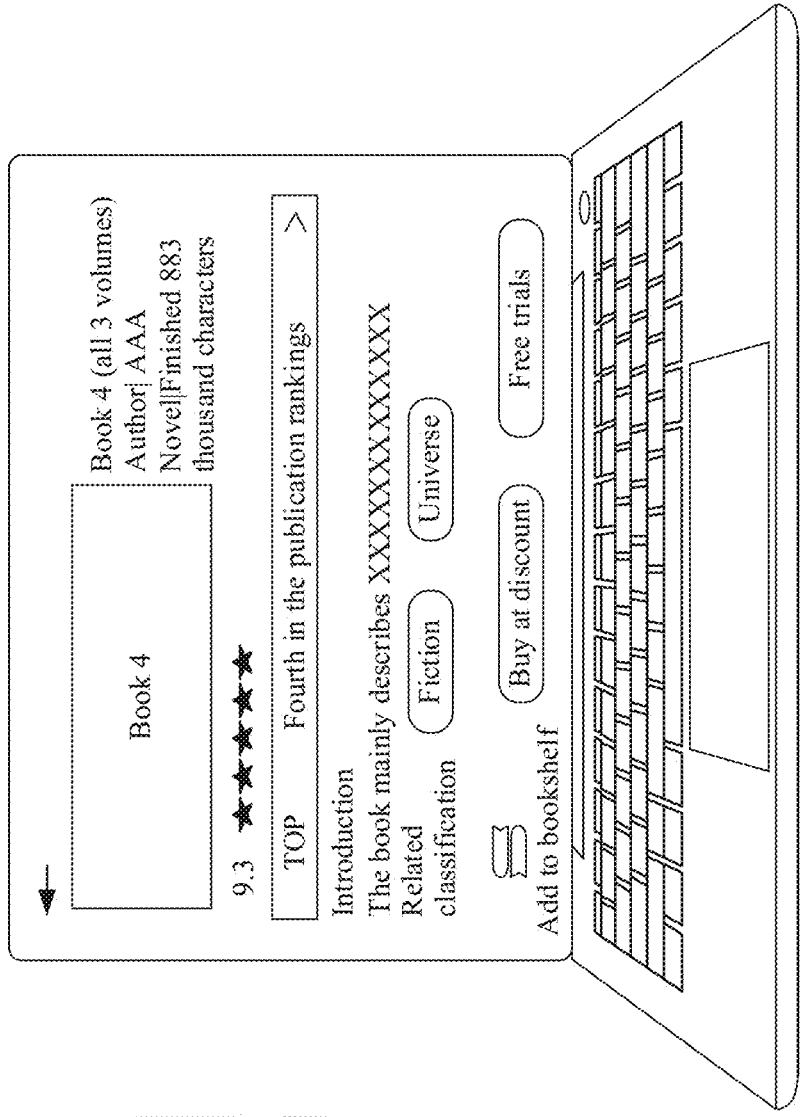
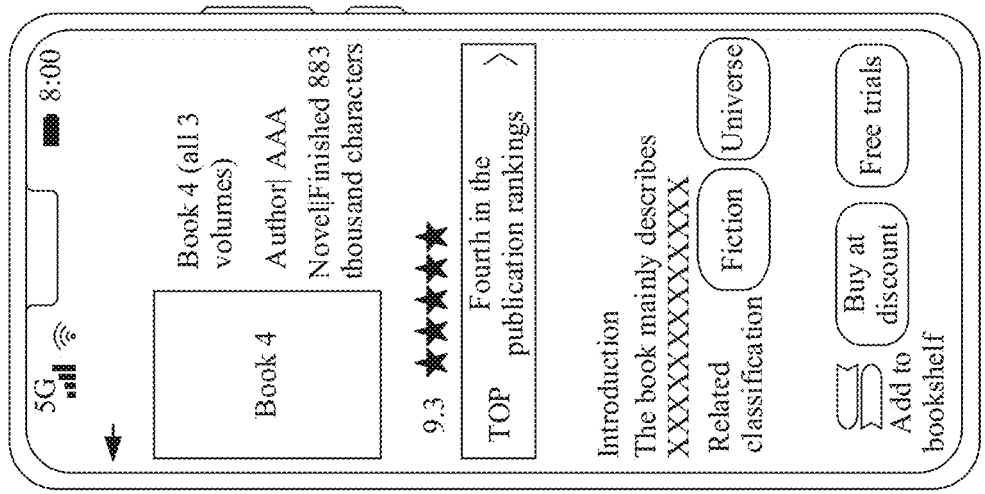
FIG. 44(a)
FIG. 44(b)

INTER-INTERFACE CONVERSION METHOD, DEVICE, AND SYSTEM

CROSS-REFERENCE TO RELATED APPLICATIONS

This is a U.S. National Stage of International Patent Application No. PCT/CN2021/112878 filed on Aug. 16, 2021, which claims priority to Chinese Patent Application No. 202010943693.3 filed on Sep. 9, 2020 and Chinese Patent Application No. 202110482721.0 filed on Apr. 30, 2021, all of which are hereby incorporated by reference in their entireties.

TECHNICAL FIELD

This application relates to the field of terminal technologies, and in particular to an inter-interface conversion method, a device, and a system.

BACKGROUND

With improvement of device performance, when using an electronic device, a user pays more attention to effect experience during inter-interface conversion.

Currently, when conversion is performed between a first interface and a second interface, the first interface is directly switched to the second interface, leading to monotonous conversion effect, relatively poor coherence, and relatively poor user experience.

SUMMARY

This application provides an inter-interface conversion method, a device, and a system, to provide a conversion solution with relatively strong coherence.

According to a first aspect, an inter-interface conversion method is provided, including:
  an electronic device displays a first interface after detecting a first operation performed by a user on the electronic device, where the first interface includes a first element and a second element; and the electronic device displays at least one transition interface and then displays a second interface after detecting a second operation performed by the user on the first interface, where the second interface includes the second element and a third element, the transition interface includes the second element, and the second element does not include an element in a status bar on the first interface, the transition interface, or the second interface.

Based on the foregoing method, in a process of switching from the first interface to the second interface, the at least one transition interface is used for splicing, and the transition interface includes the second element included in both the first interface and the second interface, so that in the process of switching between the first interface and the second interface, a change is natural and coherent, and a visual experience effect for the user is relatively good.

In a possible implementation, the first element on the first interface of the electronic device fades out, the third element on the second interface fades in, and the second element continuously exists on the first interface, the at least one transition interface, and the second interface.

In a possible implementation, the electronic device executes, based on a conversion dynamic effect configured for each interface or based on a conversion dynamic effect configured for an element on the interface, a dynamic effect corresponding to the interface and/or the element in the process of switching from the first interface to the second interface.

In a possible implementation, the first interface and the second interface are different display interfaces of a first application; or the first interface is a home screen, an interface adjacent to the home screen or a leftmost interface of the electronic device, and the second interface is a display interface of a first application; or the first interface is a display interface of a first application, and the second interface is a display interface of a second application.

According to a second aspect, an inter-interface conversion method is provided, including:
  an electronic device determines an interface type based on an interface configuration instruction triggered by a user, where the interface type includes a first interface, at least one transition interface, and a second interface; the transition interface is an intermediate splicing interface from the first interface to the second interface; and the electronic device determines a first element and a second element on the first interface based on an element configuration instruction triggered by the user, and determines the second element and a third element on the second interface, where the transition interface includes the second element.

Based on the foregoing method, in a conversion configuration for switching from the first interface to the second interface, the at least one transition interface is configured for splicing, and the transition interface includes the second element included in both the first interface and the second interface, so that in a process of switching between the first interface and the second interface, the change is natural and coherent, and the visual experience effect for the user is relatively good. In addition, an application may configure different conversion types and element types and animation effects during conversion based on its own requirements, to achieve more flexible and smooth dynamic effect experience. An overall application is simple, components are configurable, and an effect is better.

In a possible implementation, the electronic device determines, based on a dynamic effect configuration instruction triggered by the user, a dynamic effect executed by an interface and/or an element in the process of switching from the first interface to the second interface.

According to a third aspect, an inter-interface conversion method is provided, including:
  an electronic device displays a first interface after detecting a first operation performed by a user on the electronic device, where the first interface includes a first element and a second element; and the electronic device displays at least one transition interface and then displays a second interface after detecting a second operation performed by the user on the first interface, where the second interface includes a third element and a fourth element; in a process of switching from the first interface to the second interface by using the at least one transition interface, a presentation form of the second element in the transition interface gradually changes to a presentation form of the third element; and the second element is partially the same as the third element.

Based on the foregoing method, in a conversion configuration for switching from the first interface to the second interface, at least one transition interface is configured for splicing, the second element on the first interface and the third element on the second interface exist on the transition interface, and the second element is partially the same as the third element, so that in a process of switching between the first interface and the second interface, the change is natural and coherent, and the visual experience effect for the user is relatively good.

In a possible implementation, the first element on the first interface of the electronic device fades out, the fourth element on the second interface fades in, and the second element on the transition interface gradually changes to the third element.

In a possible implementation, the electronic device executes, based on a conversion dynamic effect configured for each interface or based on a conversion dynamic effect configured for an element on the interface, a dynamic effect corresponding to the interface and/or the element in the process of switching from the first interface to the second interface.

In a possible implementation, the first interface and the second interface are different display interfaces of a first application; or the first interface is a home screen, an interface adjacent to the home screen or a leftmost interface of the electronic device, and the second interface is a display interface of a first application; or the first interface is a display interface of a first application, and the second interface is a display interface of a second application.

According to a fourth aspect, an inter-interface conversion method is provided, including:

an electronic device determines an interface type based on an interface configuration instruction triggered by a user, where the interface type includes a first interface, at least one transition interface, and a second interface; the transition interface is an intermediate splicing interface from the first interface to the second interface; the electronic device determines a first element and a second element on the first interface and a third element and a fourth element on the second interface based on an element configuration instruction triggered by the user; and the electronic device determines that the second element gradually changes to the third element on the transition interface based on the element configuration instruction triggered by the user, where the second element is partially the same as the third element.

Based on the foregoing method, in a conversion configuration for switching from the first interface to the second interface, at least one transition interface is configured for splicing, the second element on the first interface and the third element on the second interface exist on the transition interface, and the second element is partially the same as the third element, so that in a process of switching between the first interface and the second interface, a change is natural and coherent, and a visual experience effect for the user is relatively good. In addition, an application may configure different conversion types and element types and animation effects during conversion based on its own requirements, to achieve more flexible and smooth dynamic effect experience. An overall application is simple, components are configurable, and an effect is better In a possible implementation, the electronic device determines, based on a dynamic effect configuration instruction triggered by the user, a dynamic effect executed by an interface and/or an element in a process of switching from the first interface to the second interface.

According to a fifth aspect, an embodiment of this application provides a method for switching between application interfaces, including:

after receiving an interface conversion instruction that is of a target application and triggered by a user, determining an interface to be converted by the target application and a shared element included in the converted interface; and performing conversion between corresponding interfaces based on the interface conversion instruction triggered by the user, where the shared element on the converted interface is continuously presented in an interface conversion process.

Based on the foregoing method, the application may configure different transition types and element types and animation effects during transition based on a requirement of the application, to achieve more flexible and smoother dynamic effect experience. An overall application is simple, components are configurable, and an effect is better.

In a possible implementation, the conversion interface includes an exit interface and an entry interface; or the conversion interface includes an exit interface, an entry interface, and a shared interface, where the exit interface is an initial interface during interface conversion, the entry interface is a final interface during interface conversion, and the shared interface is an intermediate splicing interface during interface conversion.

In a possible implementation, the method further includes: determining an exit element and/or an entry element on the conversion interface, where the exit element in the conversion interface disappears after the exit interface is converted, and the entry element on the conversion interface is displayed after the exit interface is converted to the entry interface.

In a possible implementation, the method further includes: executing a corresponding dynamic effect in a conversion process based on a conversion dynamic effect configured for each interface on the conversion interface and/or based on a conversion dynamic effect configured for each element on the conversion interface.

It should be noted that the exit interface in the fifth aspect is equivalent to the first interface in the first aspect and/or the second aspect, the entry interface in the fifth aspect is equivalent to the second interface in the first aspect and/or the second aspect, the shared interface in the fifth aspect is equivalent to the transition interface in the first aspect and/or the second aspect, the exit element in the fifth aspect is equivalent to the first element in the first aspect and/or the second aspect, the entry element in the fifth aspect is equivalent to the third element in the first aspect and/or the second aspect, and the shared element in the fifth aspect is equivalent to the second element in the first aspect and/or the second aspect.

According to a sixth aspect, an embodiment of this application provides a method for switching between application interfaces, including:

determining, based on an interface conversion configuration instruction triggered by a user, an interface type for conversion, where the interface type includes an exit interface, an entry interface, and a shared interface, the exit interface refers to an initial interface during interface conversion, the entry interface refers to a final interface during interface conversion, and the shared interface refers to an intermediate splicing interface during interface conversion; and determining, based on an element configuration instruction triggered by the user, a shared element in an interface conversion process, where the shared element is an element continuously presented in the interface conversion process.

Based on the foregoing method, the application may configure different transition types and element types and animation effects during transition based on a requirement of the application, to achieve more flexible and smoother dynamic effect experience. An overall application is simple, components are configurable, and an effect is better.

In a possible implementation, the method further includes: determining, based on the element configuration instruction triggered by the user, an exit element and/or an entry element in an interface conversion process, where the exit element on the conversion interface disappears after the exit interface is converted, and the entry element on the conversion interface is displayed after the exit interface is converted to the entry interface.

It should be noted that the exit interface in the sixth aspect is equivalent to the first interface in the first aspect and/or the second aspect, the entry interface in the sixth aspect is equivalent to the second interface in the first aspect and/or the second aspect, the shared interface in the sixth aspect is equivalent to the transition interface in the first aspect and/or the second aspect, the exit element in the sixth aspect is equivalent to the first element in the first aspect and/or the second aspect, the entry element in the sixth aspect is equivalent to the third element in the first aspect and/or the second aspect, and the shared element in the sixth aspect is equivalent to the second element in the first aspect and/or the second aspect.

According to a seventh aspect, an inter-interface device is further provided. The device may be configured to perform operations in any possible implementation of the first aspect, the third aspect, or the fifth aspect. For example, the device may include modules or units configured to perform operations in any possible implementation of the first aspect, the third aspect, or the fifth aspect. For example, a transceiver module and a processing module are included.

According to an eighth aspect, an inter-interface electronic device is further provided. The electronic device may be configured to perform operations in any possible implementation of the second aspect, the fourth aspect, or the sixth aspect. For example, the electronic device may include modules or units configured to perform the operations in any possible implementation of the second aspect, the fourth aspect, or the sixth aspect. For example, a transceiver module and a processing module are included.

According to a ninth aspect, a chip system is provided, including a processor, and optionally, further including a memory. The memory is configured to store a computer program, and the processor is configured to invoke the computer program from the memory and run the computer program, so that an electronic device on which the chip system is installed is enabled to perform any method in any possible implementation of the first aspect to the sixth aspect.

According to a tenth aspect, a computer program product is provided. The computer program product includes computer program code, and when the computer program code is run by a processing module or a processor of an electronic device, the electronic device is enabled to perform any method in any possible implementation of the first aspect to the sixth aspect.

According to an eleventh aspect, a computer-readable storage medium is provided. The computer-readable storage medium stores a program, and the program enables an electronic device to perform any method in any possible implementation of the first aspect to the sixth aspect.

According to a twelfth aspect, an electronic device is provided, including a display, one or more processors, and one or more memories. The one or more memories store one or more computer programs, the one or more computer programs include instructions, and when the instructions are executed by the one or more processors, the electronic device is enabled to perform any method in any possible implementation of the first aspect to the sixth aspect.

BRIEF DESCRIPTION OF DRAWINGS

FIG. 23(a) to FIG. 23(c) are schematic diagrams of a first effect of conversion between a desktop and an application according to Embodiment 1 of this application;

FIG. 24(a) to FIG. 24(d) are schematic diagrams of a conversion effect of a book application according to Embodiment 1 of this application:

FIG. 25(a) to FIG. 25(d) are schematic diagrams of a conversion effect of a gallery application according to Embodiment 1 of this application;

FIG. 34(a) to FIG. 34(c) are schematic diagrams of a first inter-application conversion effect according to Embodiment 2 of this application;

DESCRIPTION OF EMBODIMENTS

Figure 1:
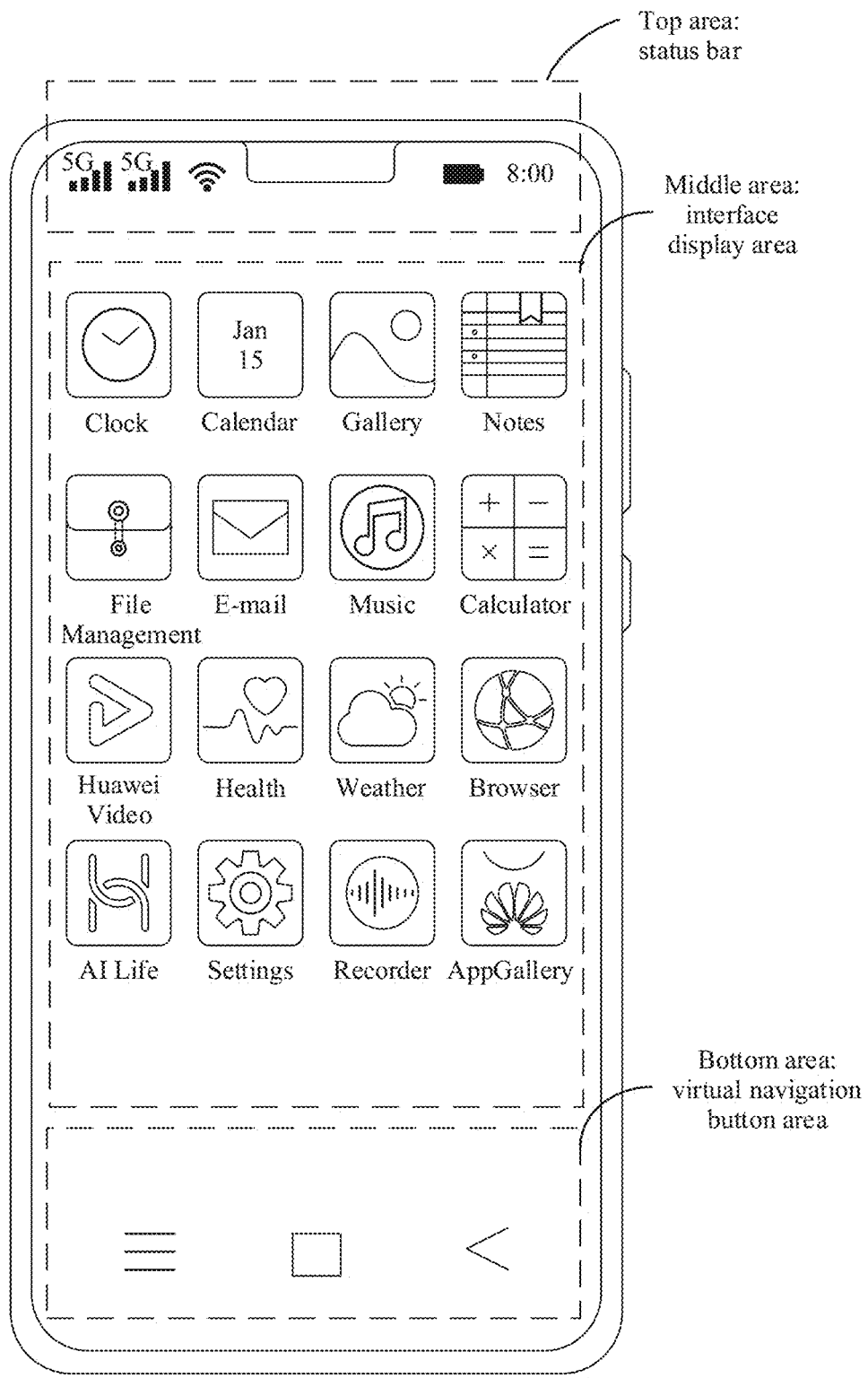
FIG. 1 is a schematic diagram of interface area division of an electronic device according to an embodiment of this application.

For ease of understanding, example descriptions of some concepts related to embodiments of this application are provided as follows for reference.

(1) A single shot: In embodiments of this application, the single shot mainly means that, when switching is performed between a first interface and a second interface, there is at least one transition interface, and the transition interface includes an element on the first interface and/or the second interface, so that switching between the two interfaces is more coherent without interrupting user experience.

For example, in an optional manner of embodiments of this application, the transition interface includes elements that exist on both the first interface and the second interface. For example, there is an element 1 on the first interface, the transition interface also includes the element 1, and the second interface also includes the element 1. In other words, the element 1 continuously exists in a process of switching from the first interface to the second interface, so that the user feels that the interface switching transition is relatively natural, smooth, and coherent in terms of visual sensory experience in the switching process.

For example, in another optional manner of embodiments of this application, when the element 1 on the first interface is switched to the second interface by using the at least one transition interface, the element 1 gradually changes to an element 2, and the element 2 is partially similar to the element 1.

The element 2 being partially similar to the element 1 may be that a display pattern of the element 2 is partially similar to a display pattern of the element 1. For example, a display pattern of the element 2 is ABCD, and a display pattern of the element 1 is ABEF.

The element 2 being partially similar to the element 1 may alternatively be that a similarity between the element 2 and the element 1 is higher than a similarity threshold. For example, a presentation form of the element 1 on the first interface is a man wearing a hat. In a process of transitioning to the second interface, the man wearing a hat presented in the element 1 slowly removes the hat and becomes the element 2 on the second interface. A presentation form of the element 2 on the second interface is a man holding a hat in a hand. In this way, in terms of visual sensory experience in the switching process, the user feels that interface switching transition is relatively natural, coherent, and more vivid and interesting.

(2) Conversion: In embodiments of this application, the conversion mainly means that a display interface on a terminal display changes from a first interface to a second interface. It should be understood that the conversion may also be referred to as a transition.

The interface conversion may be conversion between different interfaces in a same application, interface conversion during conversion between different applications, interface conversion during conversion between a terminal display desktop and an application cover, or the like.

In addition, the inter-interface conversion in embodiments of this application may also be referred to as conversion between interfaces, transition between interfaces, or switching between interfaces.

(3) Conversion object: In embodiments of this application, the conversion object may be understood as an application that needs to perform inter-interface conversion, or the like.

In embodiments of this application, a terminal display desktop may also be understood as an application of a terminal device. It should be understood that the conversion object may also be referred to as a transition object.

(4) Conversion scenario: In embodiments of this application, the conversion scenario may be understood as interface classification during interface conversion. It should be understood that the conversion scenario may also be referred to as a transition scenario.

In embodiments of this application, the conversion scenario may include an exit scenario (which may also be referred to as a departure scenario), an entry scenario (which may also be referred to as an entrance scenario), and a sharing scenario (which may also be referred to as a transition scenario).

The exit scenario may be understood as a first interface in embodiments of this application, the entry scenario may be understood as a second interface in embodiments of this application, and the sharing scenario may be understood as a transition interface in embodiments of this application.

(5) An entry element refers to a type of element included in an entry scenario, or may be understood as an element included in a second interface. It should be understood that the entry element may also be referred to as an entrance element.

(6) A shared element is a type of element that continuously appears and changes during conversion, or may be understood as an element included in a transition interface.

(7) An exit element is a type of element included in an exit scenario, or may be understood as an element included in a first interface. It should be understood that the exit element may also be referred to as a departure element.

(8) A shared container is configured to carry at least one shared element, that is, in a conversion process, all elements in the shared container continuously change.

In embodiments of this application, there may be at least one shared element on a transition interface.

(9) An interface display area is an area in which a first interface, a transition interface, and a second interface are displayed.

Generally, an interface of an electronic device is often divided into three parts from top to bottom. For example, as shown in FIG. 1, the interface of the electronic device is divided into a status bar in a top area, configured to display power information, network connection information, card insertion information, signal strength information, time information, and the like of the electronic device; an interface display area in a middle area, configured to display an application scenario interface and the like; and a virtual navigation button area in a bottom area.

It should be noted that an area division manner of the interface of the electronic device in embodiments of this application is not limited to the foregoing case. For example, an area of the interface of electronic device may include only the status bar and the interface display area.

In embodiments of this application, when interface switching is performed, a shared element refers to only an element that continuously exists in an interface display area.

It may be understood that, when the electronic device performs interface switching, an element in the status bar in the top area of the interface of the electronic device may continuously exist, and the virtual navigation button element in the bottom area of the interface of the electronic device may also continuously exist, but neither of them is the shared element described in embodiments of this application.

(9) ARR is a file format, namely, a binary archive file of an Android library project.

In an optional manner of embodiments of this application, a file such as an application corresponding to a method for conversion between application interfaces is packaged into an ARR file format.

The file in the ARR package format in embodiments of this application includes a class file, a res (resource) file, and the like.

(10) A Jar package is a file format.

In an optional manner of embodiments of this application, a file such as an application corresponding to a method for conversion between application interfaces is packaged into a Jar package file format. The file in the Jar package format in embodiments of this application includes a class file, a list file, and the like.

In embodiments of this application, the term "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" usually indicates an "or" relationship between associated objects. At least one of the following items (pieces) or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

Unless otherwise stated, ordinal numbers such as "first" and "second" mentioned in embodiments of this application are intended to distinguish a plurality of objects, rather than limit an order, a time sequence, priorities, or importance degrees of the plurality of objects. In addition, the terms "include" and "have" in embodiments, claims, and accompanying drawings of this application are not exclusive. For example, a process, a method, a system, a product, or a device including a series of steps or modules is not limited to the listed steps or modules, and may further include steps or modules that are not listed.

In addition, according to the foregoing content description, it may be understood that a first interface described in embodiments of this application is equivalent to an exit interface in the priority document (application No. 202010943693.3); a second interface described in this application is equivalent to an entry interface in the priority document (application No. 202010943693.3); a transition interface described in this application is equivalent to a shared interface in the priority document (application No. 202010943693.3); a first element in embodiments of this application is equivalent to an exit element in the priority document (application No. 202010943693.3); a second element in embodiments of this application is equivalent to a shared element in the priority document (application No. 202010943693.3); and a third element in embodiments of this application is equivalent to an entry element in the priority document (application No. 202010943693.3).

The following describes technical solutions in embodiments of this application with reference to the accompanying drawings in embodiments of this application.

Figure 2:
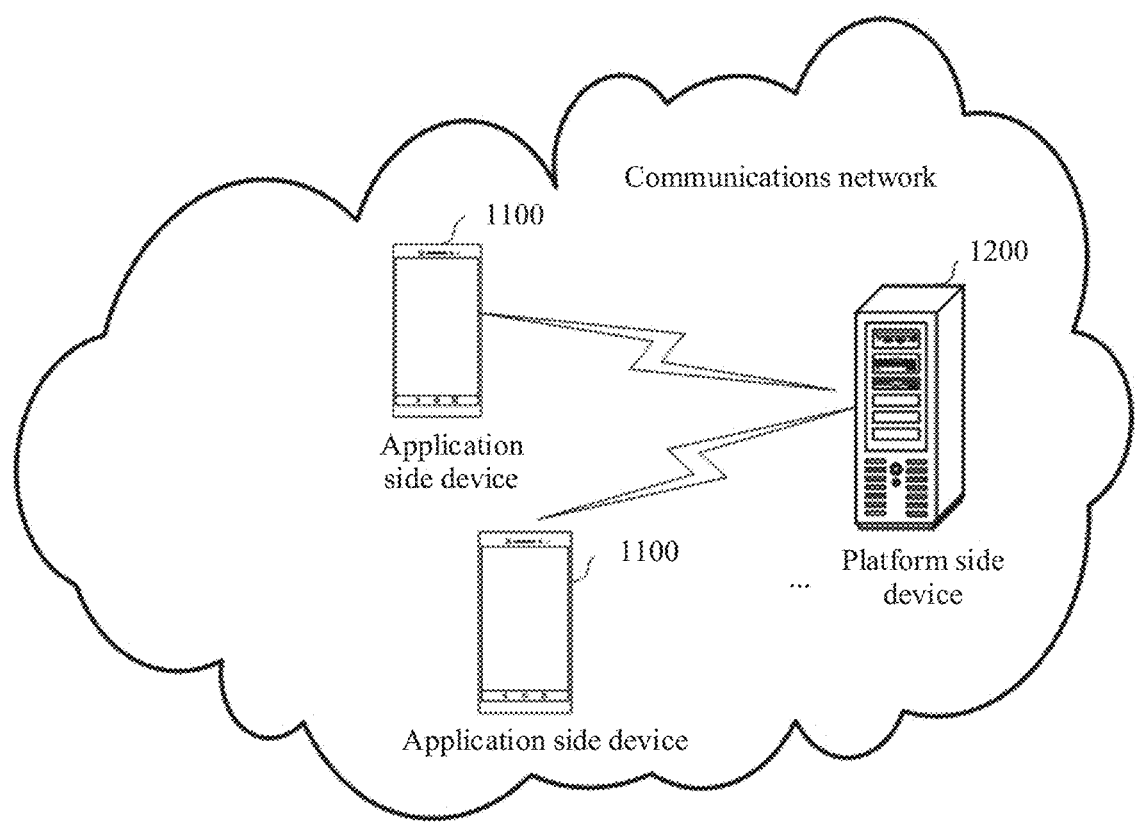
FIG. 2 is a schematic diagram of a system architecture according to an embodiment of this application.

An inter-interface conversion method provided in embodiments of this application may be applied to a system architecture shown in FIG. 2. The system architecture includes at least one application side device 1100 and a platform side device 1200.

The application side device 1100 and the platform side device 1200 may be interconnected by using a communications network. The communications network may be a local area network, or may be a wide area network transferred by using a relay (relay) device. When the communications network is a local area network, for example, the communications network may be a short-range communications network such as a Wi-Fi hotspot network, a Wi-Fi P2P network, a Bluetooth network, a ZigBee network, or a near field communication (near field communication, NFC) network. When the communications network is a wide area network, for example, the communications network may be the 3rd generation mobile communication technology (3rd generation wireless telephone technology, 3G) network, the 4th generation mobile communication technology (4th generation mobile communication technology, 4G) network, the 5th generation mobile communication technology (5th generation mobile communication technology, 5G) network, a future evolved public land mobile network (public land mobile network, PLMN), or the Internet. In the scenario shown in FIG. 1, different electronic devices may exchange data with each other by using a communications network, for example, transmitting an inter-interface conversion effect, and configure an inter-interface conversion solution on an application.

In an optional manner, the application side device 1100 accesses, through a communications interface established to the platform side device 1200, an application framework that is in the platform side device 1200 and that is used for application interface conversion. The application side device 1100 configures an inter-interface conversion solution for a conversion object by using the application framework, that is, determines a first interface, a second interface, at least one transition interface, and a shared element in the conversion object. Therefore, when the conversion object performs inter-interface conversion, the shared element can be continuously presented, so that an inter-interface conversion effect is smoother and user experience is more coherent.

Further, when the application side device 1100 enables the inter-interface conversion solution corresponding to the conversion object, the platform side device 1200 parses the inter-interface conversion solution corresponding to the conversion object in the application side device 1100, and executes the inter-interface conversion solution, so that the conversion object implements a coherent and smooth conversion effect.

It may be understood that the application side device 1100 performs online integration by accessing the platform side device 1200.

In addition, the application side device 1100 may alternatively complete configuration of an inter-interface conversion solution of a conversion object with the platform side device 1200 in advance, and store the inter-interface conversion solution in another server. When the conversion object is started subsequently, an interface for communicating with the server is invoked, and the inter-interface conversion solution is obtained through the interface. In addition, in the online integration manner, the application side device 1100 in this embodiment of this application may further grant, to a user, permission of the platform side device 1200 for configuring the inter-interface conversion solution for the conversion object. For example, the user may invoke, based on an intention of the user, the interface for communicating with the platform side device 1200, and update and adjust an inter-interface conversion solution of a conversion object at any time.

In a second optional manner of embodiments of this application, the application side device 1100 obtains, from the platform side device 1200, a file package of an application used for configuring an inter-interface conversion solution for a conversion object, and stores the file package. The application side device 1100 parses the locally stored file package of the application to obtain the application program used for configuring the inter-interface conversion solution for the conversion object. The application side device 1100 determines the conversion object by using the application, and configures the inter-interface conversion solution for the conversion object, that is, determines a first interface, a second interface, at least one transition interface, and a shared element in the conversion object. Therefore, when inter-interface conversion is performed on the conversion object, the shared element can be continuously presented, so that an inter-interface conversion effect is smoother and user experience is more coherent.

It is assumed that the file package of the application is an ARR file package, and the application side device 1100 may obtain the file package of the application from the platform side device 1200 and store the file package. When an application in the application side device 1100 needs to use the inter-interface conversion method described in embodiments of this application, the application may invoke the file package of the application in the application side device 1100, and perform local integration based on the file package of the application.

For example, it is assumed that the application side device 1100 is a mobile phone, and the mobile phone has obtained the file package of the application. A calendar application in the mobile phone may invoke the file package of the application in the mobile phone, integrate a configuration file for interface conversion in this embodiment of this application into the calendar application, and store the configuration file in a libs folder, so that a path can be subsequently introduced into a compilation script.

It is assumed that the file package of the application is a Jar file package, the application side device 1100 may obtain the file package of the application from the platform side device 1200 and store the file package. When an application (namely, a conversion object) in the application side device 1100 needs to use the inter-interface conversion method described in embodiments of this application, the application side device 1100 may directly invoke the file package of the application.

It should be noted that a system for performing inter-interface conversion in embodiments of this application is not limited to the architecture shown in FIG. 1. Any variation of the system architecture or the like may be applied to embodiments of this application. For example, the system in embodiments of this application may further include a third-party material supplier or the like.

The third-party material supplier described in embodiments of this application may be configured to provide a dynamic effect template and the like.

For example, it is assumed that in an application that is included in the platform side device 1200 and that is used for inter-interface conversion, provided dynamic effect templates include an explosion effect, a displacement effect, a scaling effect, a cropping effect, a rotation effect, and the like. Compared with the dynamic effect templates provided by the platform side device 1200, dynamic effect templates provided by the third-party material supplier further include a black hole effect, a snowflake effect, and the like, and are more diversified. Therefore, to reduce modifications to the application in the platform side device 1200, an interface used to communicate with the third-party material supplier may be added to the system, so that when designing a dynamic effect in the inter-interface conversion solution, the user may invoke the dynamic effect templates provided by the third-party material supplier.

The following separately describes hardware structures and software structures of the platform side device 1200 and the application side device 1100 by using examples.

1. Platform Side Device:

Specifically, in a scenario of embodiments of this application, the platform side device 1200 may be a server or a cloud server that stores application codes used to implement an inter-interface conversion method provided in this application.

It should be noted that, in embodiments of this application, there may be a plurality of types of application code that are stored in the platform side device 1200 and that are used to implement the inter-interface conversion method provided in this application.

For example, the application code may be application code that is applicable to an Android® system and that is used to perform the inter-interface conversion method, application code that is applicable to an Harmony® system and that is used to perform the inter-interface conversion method, and application code that is applicable to an IOS® system and that is used to perform the inter-interface conversion method. In embodiments of this application, adapted application code used to perform the inter-interface conversion method may be selected based on a system installed in an electronic device. This is not limited herein.

Figure 3:
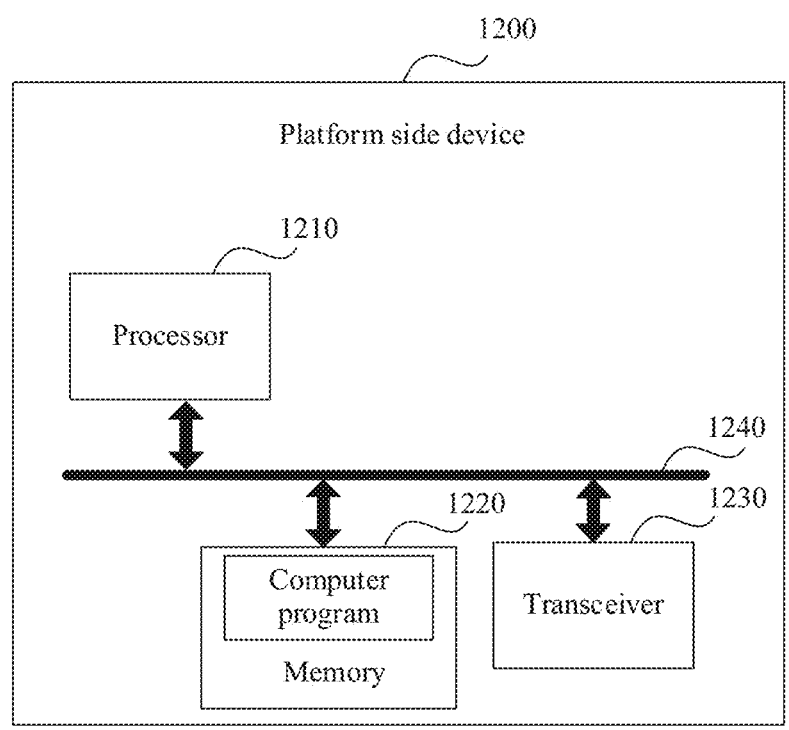
FIG. 3 is a schematic diagram of an internal structure of a platform side device according to an embodiment of this application.

FIG. 3 is a framework diagram of a partial structure of the platform side device 1200 related to embodiments of this application.

As shown in FIG. 3, the platform side device 1200 may include:

a processor 1210, a memory 1220, and a transceiver 1230.

One or more computer programs are stored in the memory 1220, and are configured to be executed by the one or more processors 1210.

The processor 1210 in this embodiment of this application may be a central processing unit (central processing unit, CPU), a digital processing unit, or the like.

The processor 1210 is a control center of the platform side device 1200, is connected to all parts of the entire platform side device 1200 by using various interfaces and lines, and performs various functions of the platform side device 1200 by running or executing the computer programs stored in the memory 1220.

In an optional manner of this embodiment of this application, the processor 1210 is configured to determine, based on an operation instruction of a user, a conversion object for inter-interface conversion, a conversion scenario in an inter-interface conversion process, an element in the scenario, and a corresponding scenario dynamic effect and element dynamic effect. Then, the processor 1210 processes and packages an inter-interface conversion solution of the conversion object based on a configuration procedure, and stores the inter-interface conversion solution locally.

When the application side device 1100 starts an inter-interface conversion effect of the conversion object, the processor 1210 is further configured to parse the inter-interface conversion solution corresponding to the conversion object, that is, determine attributes separately corresponding to the conversion scenario and the element in the conversion object. The attribute includes a dynamic effect, a display ratio, and the like.

Further, the processor 1210 performs one-tap execution based on the inter-interface conversion solution configured by the application side device 1100 for the conversion object.

For example, the processor 1210 determines, based on the inter-interface conversion solution corresponding to the conversion object, configuration parameters of a related scenario and element in the conversion object.

Then, the processor 1210 may send, in a form of streaming media, running data of the related scenario and element to the application side device 1100 for playing.

In another optional manner of this embodiment of this application, the processor 1210 is configured to determine, based on an operation instruction of a user, a conversion object for inter-interface conversion, a conversion scenario in an inter-interface conversion process, an element in the scenario, and a corresponding scenario dynamic effect and element dynamic effect. Then, the processor 1210 processes and packages an inter-interface conversion solution of the conversion object based on a configuration procedure, and sends the inter-interface conversion solution to the corresponding application side device 1100.

The application side device 1100 receives and stores the inter-interface conversion solution corresponding to the conversion object. When starting an inter-interface conversion effect of the conversion object, the application side device 1100 invokes the inter-interface conversion solution corresponding to the conversion object, and parses the inter-interface conversion solution corresponding to the conversion object, that is, determines attributes separately corresponding to the conversion scenario and the element in the conversion object. The attribute includes a dynamic effect, a display ratio, and the like.

Further, the application side device 1100 performs one-tap execution based on the inter-interface conversion solution corresponding to the conversion object.

For example, the application side device 1100 determines, based on the inter-interface conversion solution corresponding to the conversion object, configuration parameters of a related scenario and element in the conversion object.

Then, the application side device 1100 runs running data of the related scenario and element of the conversion object, and displays, on a display of the application side device 1100, an effect of inter-interface conversion performed on the conversion object.

In an optional manner, the transceiver 1230 is configured to receive an operation instruction triggered by the user, and send the operation instruction to the processor 1210, so that the processor 1210 configures the inter-interface conversion solution for the corresponding conversion object based on the operation instruction by using the application that is used for inter-interface conversion and that is in the platform side device 1200; and/or in an optional manner, the transceiver is configured to send the file package of the application in the platform side device 1200 to the application side device 1100; and/or in an optional manner, the transceiver is configured to send a solution in which the application side device 1100 performs inter-interface conversion on the conversion object in the platform side device 1200 to the application side device 1100.

A specific connection medium between the processor 1210 and the memory 1220 is not limited in this embodiment of this application. In this embodiment of this application, the memory 1220, the processor 1210, and the transceiver 1230 are connected through a bus 1240 in FIG. 3. The bus is represented by using a thick line in FIG. 3. A connection manner between other components is schematically described, and is not limited thereto. The bus may be classified into an address bus, a data bus, a control bus, and the like. For ease of representation, only one thick line is used to represent the bus in FIG. 3, but this does not indicate that there is only one bus or only one type of bus.

The memory 1220 may be a volatile memory (volatile memory), for example, a random access memory (random access memory, RAM). Alternatively, the memory 1220 may be a non-volatile memory (non-volatile memory), for example, a read-only memory, a flash memory (flash memory), a hard disk drive (hard disk drive, HDD), or a solid-state drive (solid-state drive, SSD). Alternatively, the memory 1220 is any other medium that can be used to carry or store expected program code in a form of an instruction or a data structure and can be accessed by a computer, but is not limited thereto. The memory 1220 may be a combination of the foregoing memories.

In addition, in this embodiment of this application, an Android® system with a layered architecture is used as an example to describe a software structure of the platform side device 1200. It should be noted that in another operating system (for example, an Harmony® system or an IOS® system), the solutions of this application can still be implemented provided that functions implemented by functional modules are similar to those in embodiments of this application. This is not limited herein.

Figure 4:
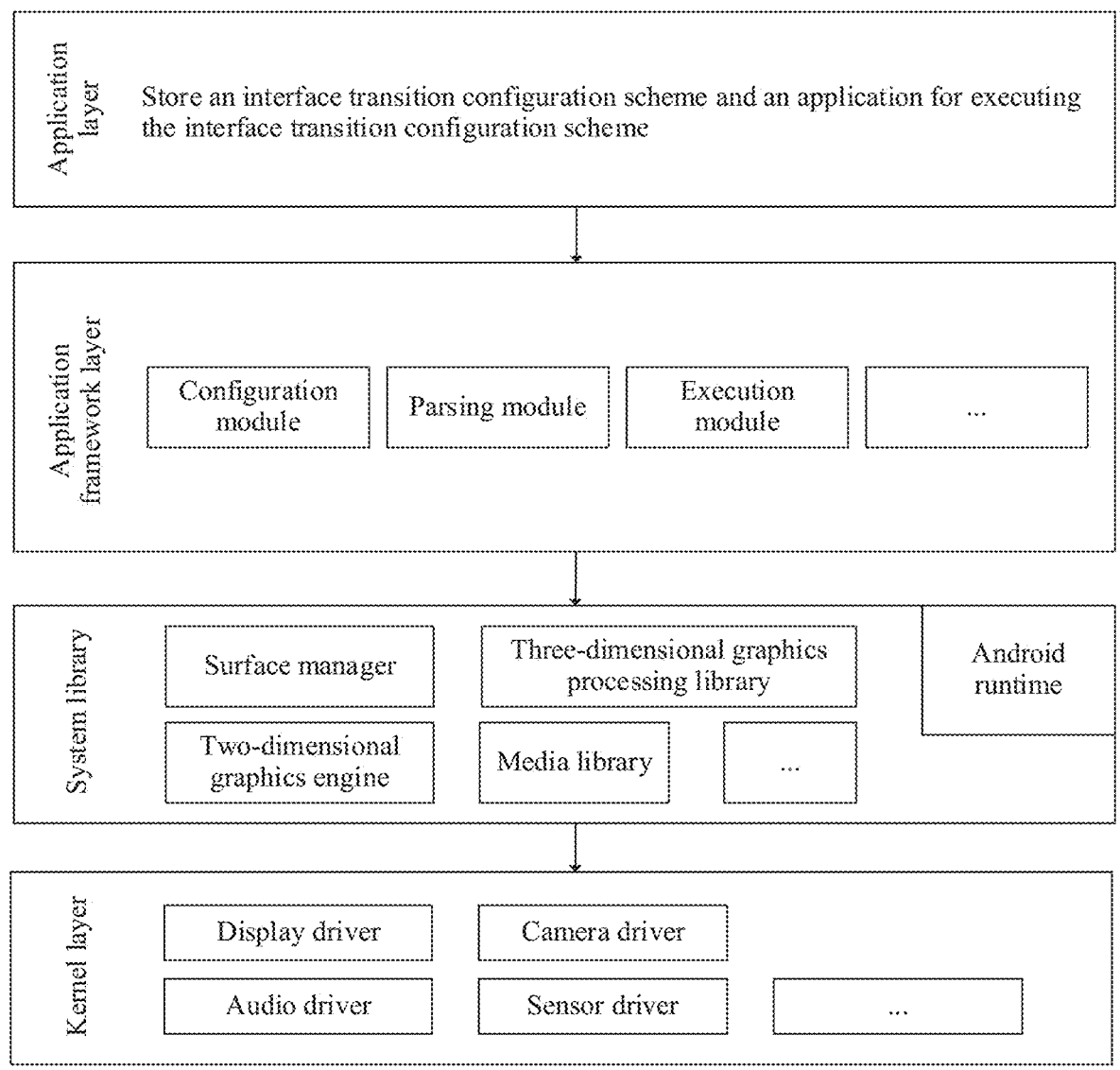
FIG. 4 is a schematic diagram of a structure of an Android operating system of a platform side device according to an embodiment of this application.

In an optional manner of this embodiment of this application, a block diagram of the software structure of the platform side device 1200 may be shown in FIG. 4.

The platform side device 1200 divides software into several layers based on the layered architecture, and each layer has a clear role and division of labor. The layers communicate with each other through a software interface.

For example, in some embodiments, the Android system is divided into four layers: an application layer, an application framework layer, an Android runtime (Android runtime) and system library, and a kernel layer from top to bottom.
(1) Application Layer:

In an optional manner of this embodiment of this application, the application layer may include a series of application packages.

For example, the application layer in this embodiment of this application may store an application used to perform the inter-interface conversion solution provided in this application.

(2) Application framework layer.

In an optional manner of this embodiment of this application, the application framework layer provides an application programming interface (application programming interface, API) and a programming framework for an application at the application layer. The application framework layer may include some predefined functions.
(3) Android Runtime and System Library:

The Android runtime may include a kernel library and a virtual machine, and is configured to be responsible for scheduling and management of the Android system.

Further, the kernel library in this embodiment of this application may include two parts: a function that needs to be invoked by a Java language and a core library of Android.

In this embodiment of this application, the virtual machine is configured to perform functions such as object life cycle management, stack management, thread management, security and exception management, and garbage collection. For example, the application layer and the application framework layer run on the virtual machine. The virtual machine executes java files at the application layer and the application framework layer as binary files.

In this embodiment of this application, the system library may include a plurality of functional modules, for example, a surface manager (surface manager), a media library (Media Library), a three-dimensional graphics processing library (for example, OpenGL ES), and a 2D graphics engine (for example, SGL).

Further, in this embodiment of this application, the surface manager is configured to manage a display subsystem, and provide fusion of 2D and 3D layers for a plurality of applications.

The media library supports playing and recording of a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.
(4) Kernel Layer

In this embodiment of this application, the kernel layer may be understood as a layer between hardware and software, and includes at least a display driver, a camera driver, an audio driver, and a sensor driver.

Further, as shown in FIG. 4, a capability framework corresponding to an application used for inter-interface conversion in this embodiment of this application may include a configuration module, a parsing module, and an execution module.

It should be noted that a system layer at which the capability framework is located is not limited in this embodiment of this application. For example, the capability framework described in this embodiment of this application may be located at the application layer. Alternatively, the capability framework in this embodiment of this application may be independent of the four layers included in the system. For example, the capability framework is an external layer, is an extension based on a capability of the framework layer, and may be extended to an AAR form or a Jar form, to facilitate application use.

A configuration module in the platform side device in this embodiment of this application is configured to perform parameter configuration on a conversion scenario and element of a determined conversion object.

Specifically, the configuration module receives a configuration instruction sent by the application side device 1100, and performs, based on the configuration instruction, parameter configuration on the conversion scenario and element of a conversion object on which inter-interface conversion needs to be performed.

A parsing module in the platform side device in this embodiment of this application is configured to parse an inter-interface conversion solution corresponding to a conversion object, and store the parsed inter-interface conversion solution.

For example, the inter-interface conversion solution may include a name of the conversion object, a name of a shared element or a shared container, a conversion dynamic effect ID configured for an exit interface, a conversion dynamic effect ID configured for an entry interface, a conversion dynamic effect ID configured for the shared element or the shared container, and the like.

It may be understood that the parsing module mainly determines the conversion scenario in the conversion object, an element in each conversion scenario, and a corresponding execution effect based on the inter-interface conversion solution corresponding to the conversion object.

An execution module in the platform side device in this embodiment of this application is configured to execute different animation effects for different elements at different times based on the inter-interface conversion solution.

2. Application Side Devices

Figure 5:
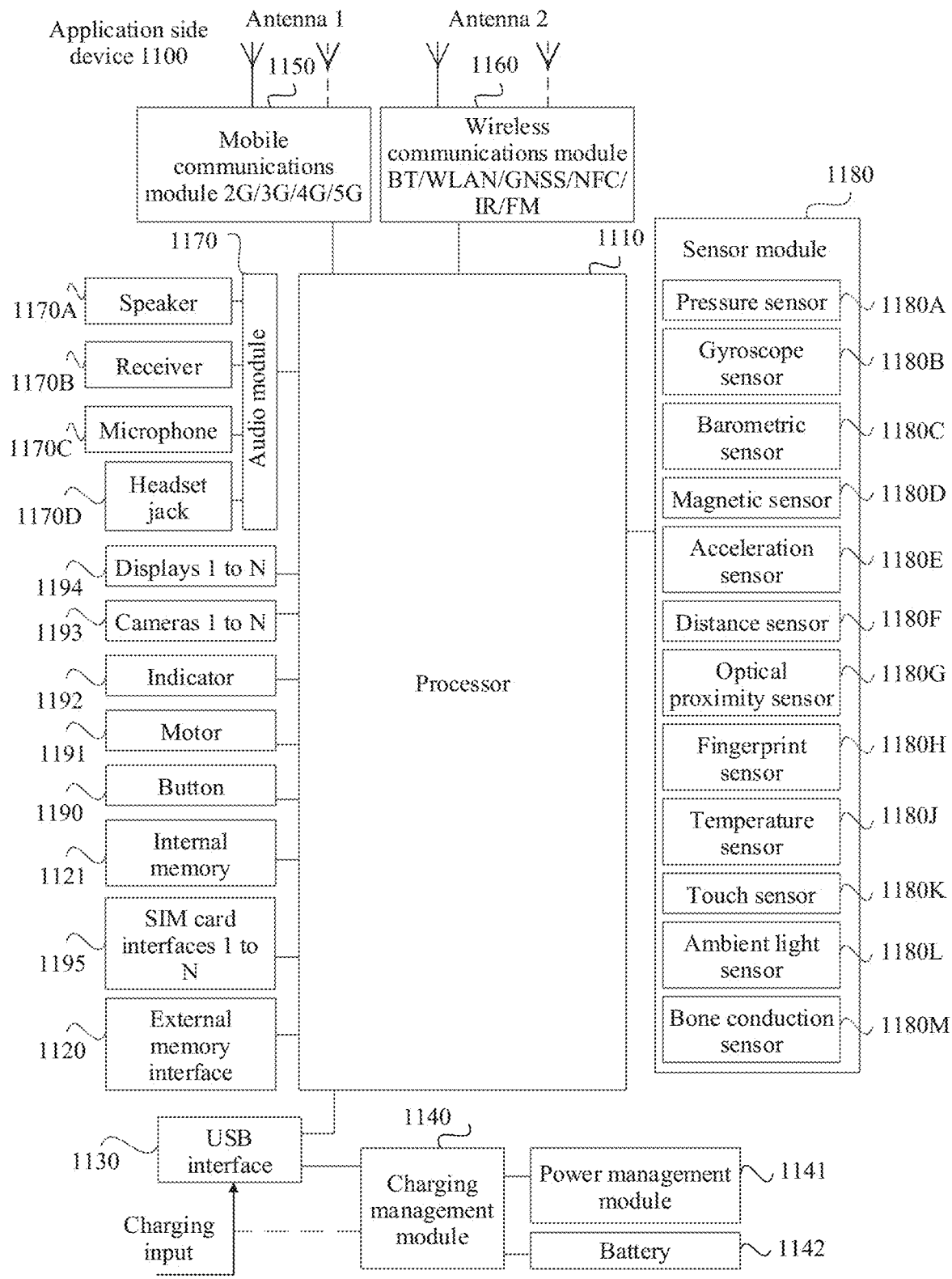
FIG. 5 is a schematic diagram of an internal structure of an application side device according to an embodiment of this application.

The application side device 1100 may be a portable electronic device, such as a mobile phone, a tablet computer, or a wearable device (for example, a smartwatch) with a wireless communication function, that further includes other functions such as a personal digital assistant and/or a music player function. An example embodiment of the portable electronic device includes but is not limited to a portable electronic device carrying iOS®, Android®, Microsoft®. Harmony®, or another operating system. The portable electronic device may alternatively be another portable electronic device, for example, a laptop (laptop) with a touch-sensitive surface (for example, a touch panel). The following uses an example in which the application side device 1100 is a mobile phone for description. FIG. 5 is a block diagram of a partial structure of the application side device 1100 related to embodiments of this application.

As shown in FIG. 5, the application side device 1100 may be a mobile phone. The mobile phone 1100 may include a processor 1110, an external memory interface 1120, an internal memory 1121, a universal serial bus (universal serial bus, USB) interface 1130, a charging management module 1140, a power management module 1141, a battery 1142, an antenna 1, an antenna 2, a mobile communications module 1150, a wireless communications module 1160, an audio module 1170, a speaker 1170A, a receiver 1170B, a microphone 1170C, a headset jack 1170D, a sensor module 1180, a button 1190, a motor 1191, an indicator 1192, a camera 1193, a display 1194, a subscriber identification module (subscriber identification module, SIM) card interface 1195, and the like. The sensor module 1180 may include a pressure sensor 1180A, a gyroscope sensor 1180B, a barometric pressure sensor 1180C, a magnetic sensor 1180D, an acceleration sensor 1180E, a distance sensor 1180F, an optical proximity sensor 1180G, a fingerprint sensor 1180H, a temperature sensor 11803, a touch sensor 1180K, an ambient light sensor 1180L, a bone conduction sensor 1180M, and the like.

It may be understood that the structure shown in this embodiment of this application does not constitute a specific limitation on the application side device 1100. In some other embodiments of this application, the application side device 1100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors. The controller may be a nerve center and a command center of the mobile phone 100. The controller may generate an operation control signal based on an instruction operation code and a time sequence signal, to complete control of instruction fetching and instruction execution. A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 1110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface. MIPI), a general-purpose input/output (general-purpose input/output, GPIO) interface, a subscriber identity module (subscriber identity module, SIM) interface, a universal serial bus (universal serial bus, USB) interface, and/or the like.

The USB interface 130 is an interface that conforms to USB standard specifications, and may be specifically a mini USB interface, a micro USB interface, a USB Type-C interface, or the like. The USB interface 130 may be configured to connect to a charger to charge the mobile phone 100, or may be configured to perform data transmission between the mobile phone 100 and a peripheral device. The charging management module 140 is configured to receive a charging input from the charger. The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like.

In an optional manner of this embodiment of this application, the processor 1110 is configured to: determine a conversion object, and invoke an application that is in the platform side device 1200 and that is used for inter-interface conversion, to determine an inter-interface conversion method of the conversion object.

In a second optional manner of this embodiment of this application, the processor 1110 is configured to: determine a conversion object and an inter-interface conversion solution corresponding to the conversion object, and when inter-interface conversion is performed on the conversion object, implement inter-interface conversion of the conversion object based on the inter-interface conversion solution.

In a third optional manner of this embodiment of this application, the processor 1110 is further configured to indicate the platform side device 1200, so that the platform side device 1200 displays, based on an inter-interface conversion solution of a conversion object, an inter-interface conversion effect of the conversion object.

A wireless communication function of the mobile phone 1100 may be implemented by using the antenna 1, the antenna 2, the mobile communications module 150, the wireless communications module 160, the modem processor, the baseband processor, and the like. The antenna 1 and the antenna 2 are configured to transmit and receive an electromagnetic wave signal. Each antenna in the mobile phone 100 may be configured to cover one or more communications frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 1150 may provide a solution that is applied to the mobile phone 1100 and that includes wireless communication such as 2G/3G/4G/5G. The mobile communications module 1150 may include at least one filter, a switch, a power amplifier, a low noise amplifier (low noise amplifier, LNA), and the like. The mobile communications module 1150 may receive an electromagnetic wave through the antenna 1, perform processing such as filtering or amplification on the received electromagnetic wave, and transmit the electromagnetic wave to the modem processor for demodulation. The mobile communications module 1150 may further amplify a signal modulated by the modem processor, and convert the signal into an electromagnetic wave for radiation through the antenna 1. In some embodiments, at least some functional modules of the mobile communications module 1150 may be disposed in the processor 1110. In some embodiments, at least some functional modules of the mobile communications module 1150 may be disposed in a same device as at least some modules of the processor 1110.

The wireless communications module 1160 may provide a wireless communication solution that is applied to the mobile phone 1100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system. GNSS), frequency modulation (frequency modulation, FM), a near field communication (near field communication, NFC) technology, an infrared (infrared, IR) technology, or the like. The wireless communications module 1160 may be one or more components integrating at least one communications processor module. The wireless communications module 1160 receives an electromagnetic wave through the antenna 2, performs frequency modulation and filtering processing on an electromagnetic wave signal, and sends a processed signal to the processor 1110. The wireless communications module 1160 may further receive a to-be-sent signal from the processor 1110, perform frequency modulation and amplification on the signal, and convert the signal into an electromagnetic wave for radiation through the antenna 2. For example, in this embodiment of this application, communication connections may be established between different electronic devices by using the BT or the WLAN.

In some embodiments, in the mobile phone 1100, the antenna 1 and the mobile communications module 1150 are coupled, and the antenna 2 and the wireless communications module 1160 are coupled, so that the mobile phone 1100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division code division multiple access (time-division code division multiple access, TD-SCDMA), long term evolution (long term evolution, LTE), a fifth generation (fifth generation, 5G) mobile communications system, a future communications system such as a sixth generation (6th generation, 6G) system, the BT, the GNSS, the WLAN, the NFC, the FM and/or IR technology, or the like. The GNSS may include a global positioning system (global positioning system, GPS), a global navigation satellite system (global navigation satellite system, GLONASS), a BeiDou navigation satellite system (BeiDou navigation satellite system. BDS), a quasi-zenith satellite system (quasi-zenith satellite system, QZSS), and/or a satellite based augmentation system (satellite based augmentation system. SBAS).

The display 1194 is configured to display a display interface of an application, and the like. The display 1194 includes a display panel. The display panel may be a liquid crystal display (liquid crystal display. LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the mobile phone 1100 may include one or N displays 194, where N is a positive integer greater than 1. In this embodiment of this application, the display 1194 may be configured to display an application interface.

The camera 1193 is configured to capture a static image or a video. The camera 1193 may include a front-facing camera and a rear-facing camera.

The internal memory 1121 may be configured to store computer-executable program code. The executable program code includes instructions. The processor 1110 implements various function applications and data processing of the mobile phone 1100 by running the instructions stored in the internal memory 1121. The internal memory 1121 may include a program storage area and a data storage area. The program storage area may store an operating system, software code of at least one application (for example, a sound playing function or an image playing function), and the like. The data storage area may store data (for example, an image and a video) and the like generated in a process of using the mobile phone 1100. In addition, the internal memory 1121 may include a high-speed random access memory, and may further include a non-volatile memory, for example, at least one magnetic disk storage device, a flash memory device, a universal flash storage (universal flash storage, UFS), or the like.

The external memory interface 1120 may be configured to connect to an external storage card, for example, a micro SD card, to extend a storage capability of the mobile phone 1100. The external storage card communicates with the processor 1110 through the external memory interface 1120, to implement a data storage function. For example, files such as images or videos are stored in the external storage card.

The mobile phone 1100 may implement an audio function, for example, music playing and recording, through the audio module 1170, the speaker 1170A, the receiver 1170B, the microphone 1170C, the headset jack 1170D, the application processor.

The button 1190 includes a power button, a volume button, and the like. The button 1190 may be a mechanical button, or maybe a touch button. The mobile phone 1100 may receive a button input, and generate a button signal input related to user setting and function control of the mobile phone 1100. The motor 1191 may generate a vibration prompt. The motor 1191 may be configured to produce an incoming call vibration prompt and a touch vibration feedback. For example, touch operations performed on different applications (for example, photographing and audio playing) may correspond to different vibration feedback effects. The indicator 1192 may be an indicator light, and may be configured to indicate a charging status and a power change, or may be configured to indicate a message, a missed call, a notification, and the like. The SIM card interface 1195 is configured to connect to a SIM card. The SIM card may be inserted into the SIM card interface 1195 or removed from the SIM card interface 1195, to implement contact with and separation from the mobile phone 1100.

In addition, in this embodiment of this application, an Android® system with a layered architecture is used as an example to describe a software structure of the application side device 1100. It should be understood that the Android® system is used as an example in this specification. In another operating system (for example, an Harmony® system or an IOS® system), the solutions of this application can still be implemented provided that functions implemented by functional modules are similar to those in embodiments of this application.

Figure 6:
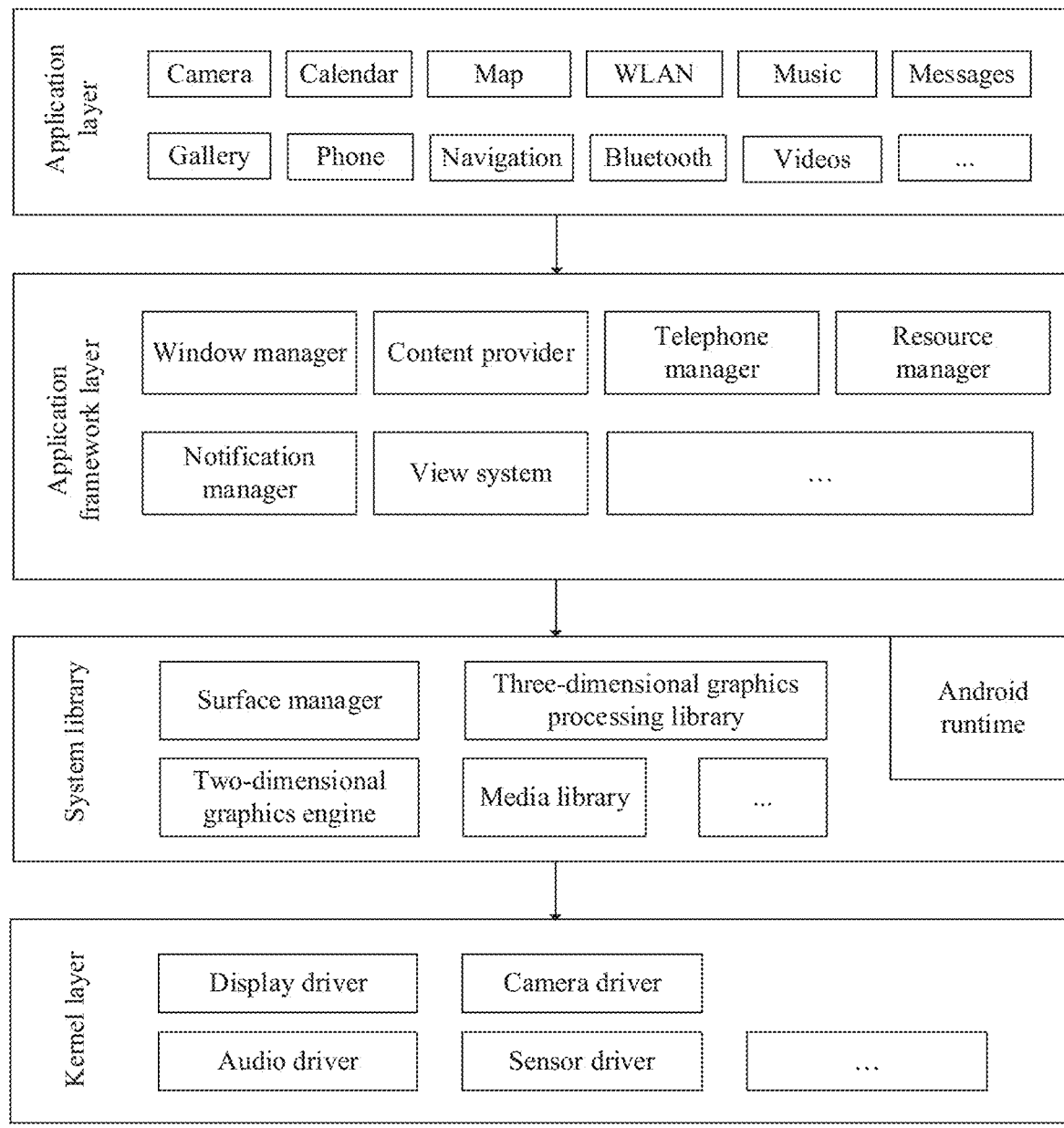
FIG. 6 is a schematic diagram of a structure of an Android operating system of an application side device according to an embodiment of this application.

FIG. 6 is a block diagram of the software structure of the application side device 1100 according to an embodiment of this application.

In the layered architecture, software is divided into several layers, and each layer has a clear role and task. The layers communicate with each other through a software interface.

In some embodiments, the Android system is divided into four layers: an application layer, an application framework layer, an Android runtime (Android runtime) and system library, and a kernel layer from top to bottom.

The application layer in the application side device 1100 in this embodiment of this application may include a series of application packages.

As shown in FIG. 6, the application packages may include applications such as Dialer, Camera, Gallery, Calendar, Phone, Map, Navigation, WLAN, Bluetooth, Music, Videos, and Messages.

The application framework layer in the application side device 1100 in this embodiment of this application is mainly configured to provide an application programming interface (application programming interface, API) and a programming framework for an application at the application layer. The application framework layer may include some predefined functions.

As shown in FIG. 6, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a notification icon of Messages may include a text display view and a picture display view.

The phone manager is configured to provide a communication function of the application side device 1100, for example, management of a call status (including answering, declining, or the like).

The resource manager provides, for an application, various resources such as a localized character string, an icon, a picture, a layout file, and a video file.

The notification manager enables an application to display notification information in the status bar, and may be configured to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

In addition, content of the system library and the kernel layer in the application side device 1100 in this embodiment of this application is similar to content of the system library and the kernel layer in the platform side device 1200. For brevity of description, for details, refer to descriptions of the system library and the kernel layer in the platform side device 1200. Details are not described herein again.

When using an electronic device, a user pays more and more attention to effect experience of an interface.

Currently, when a first interface is switched to a second interface, the first interface is directly switched to the second interface. Therefore, coherence is relatively poor, and user experience is relatively poor.

Figure 7:
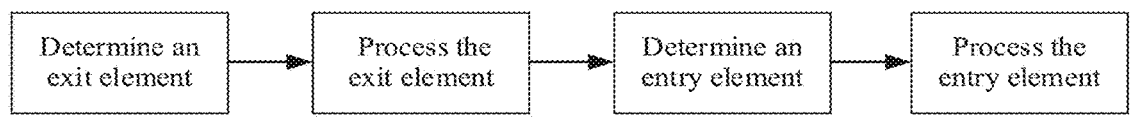
FIG. 7 is a schematic flowchart of an existing configuration for a single shot solution.

For example, as shown in FIG. 7, currently, in a second interface switching configuration performed on the first interface, only an exit element on the first interface and a dynamic effect executed by the exit element during switching, and/or an entry element on the second interface, and a dynamic effect executed by the entry element during switching are determined. In the switching process, the exit element on the first interface executes the corresponding dynamic effect and exits, and the entry element on the second interface executes the corresponding dynamic effect and enters, to complete switching from the first interface to the second interface.

The exit element in FIG. 7 may be understood as an exit element in the priority document (application No. 202010943693.3), and the entry element may be understood as an entry element in the priority document (application No. 202010943693.3).

It can be learned from the foregoing content that processing logic of a current inter-interface conversion solution is relatively simple, and only dynamic effects of exit and entry are simply implemented. In addition, a process of switching between the first interface and the second interface is discontinuous, and visual experience of a user is poor. To resolve this problem, embodiments of this application provide an inter-interface conversion method, an apparatus, and a system, to efficiently and flexibly implement a more coherent inter-interface conversion effect.

With reference to the accompanying drawings and application scenarios, the following describes in detail a method for performing inter-interface conversion based on a single shot effect provided in embodiments of this application.

First, in this embodiment of this application, the capability framework corresponding to the application used for inter-interface conversion is specifically described, that is, the application framework layer in FIG. 4 is specifically described.

It can be learned from the content in FIG. 4 that the application framework layer mainly includes the configuration module, the parsing module, and the execution module. Therefore, it may be understood that in this embodiment of this application, when inter-interface conversion is performed based on the application framework, as shown in FIG. 8, there may be three phases: a configuration phase, a parsing phase, and an execution phase.

Figure 8:
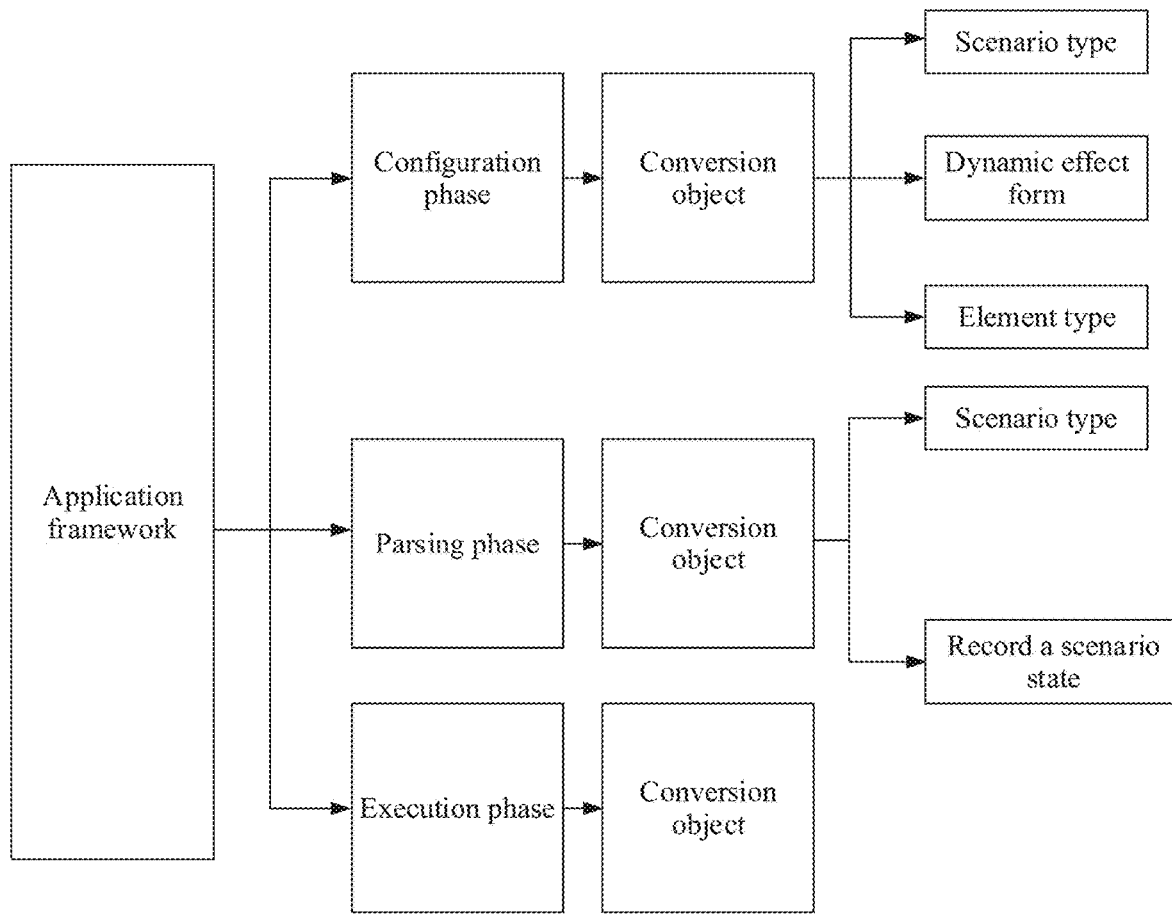
FIG. 8 is a schematic diagram of a logical framework of a single shot according to an embodiment of this application.

The application framework shown in FIG. 8 is mainly used to provide an efficient, flexible, and rich single-shot effect. Therefore, the application framework may be understood as a single-shot framework shown in FIG. 7 in the priority document (application No. 202010943693.3).

Phase 1: Configuration Phase:

The phase 1 mainly refers to performing parameter configuration on a scenario and an element in a conversion object by using the configuration module in the application framework.

Figure 9:
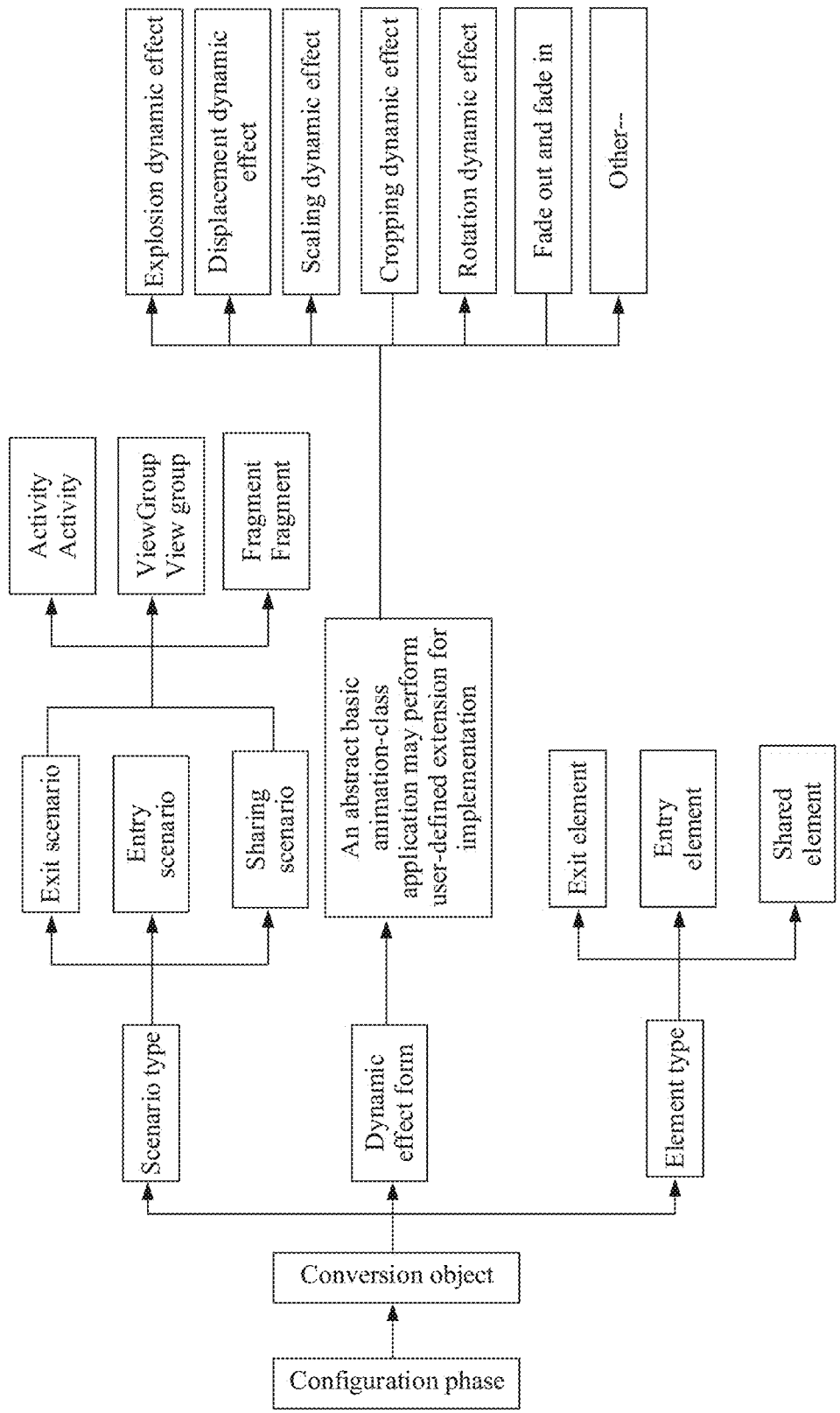
FIG. 9 is a schematic diagram of a logical framework of a configuration phase according to an embodiment of this application.

For details of the application framework in the configuration phase in this embodiment of this application, refer to FIG. 9.

The configuration phase shown in FIG. 9 in this application may be understood as a configuration module shown in FIG. 8 in the priority document (application No. 202010943693.3). Therefore, the exit scenario shown in FIG. 9 in this application is equivalent to an exit scenario shown in FIG. 8 in the priority document (application No. 202010943693.3). The entry scenario shown in FIG. 9 in this application is equivalent to an entry scenario shown in FIG. 8 in the priority document (application No. 202010943693.3). The sharing scenario shown in FIG. 9 in this application is equivalent to a sharing scenario shown in FIG. 8 in the priority document (application No. 202010943693.3). The exit element shown in FIG. 9 in this application is equivalent to an exit element shown in FIG. 8 in the priority document (application No. 202010943693.3). The entry element shown in FIG. 9 in this application is equivalent to an entry element shown in FIG. 8 in the priority document (application No. 202010943693.3). The shared element shown in FIG. 9 in this application is equivalent to a shared element shown in FIG. 8 in the priority document (application No. 202010943693.3). Specifically, when the inter-interface conversion solution is designed in this embodiment of this application, the conversion object first needs to be determined.

Figure 10:
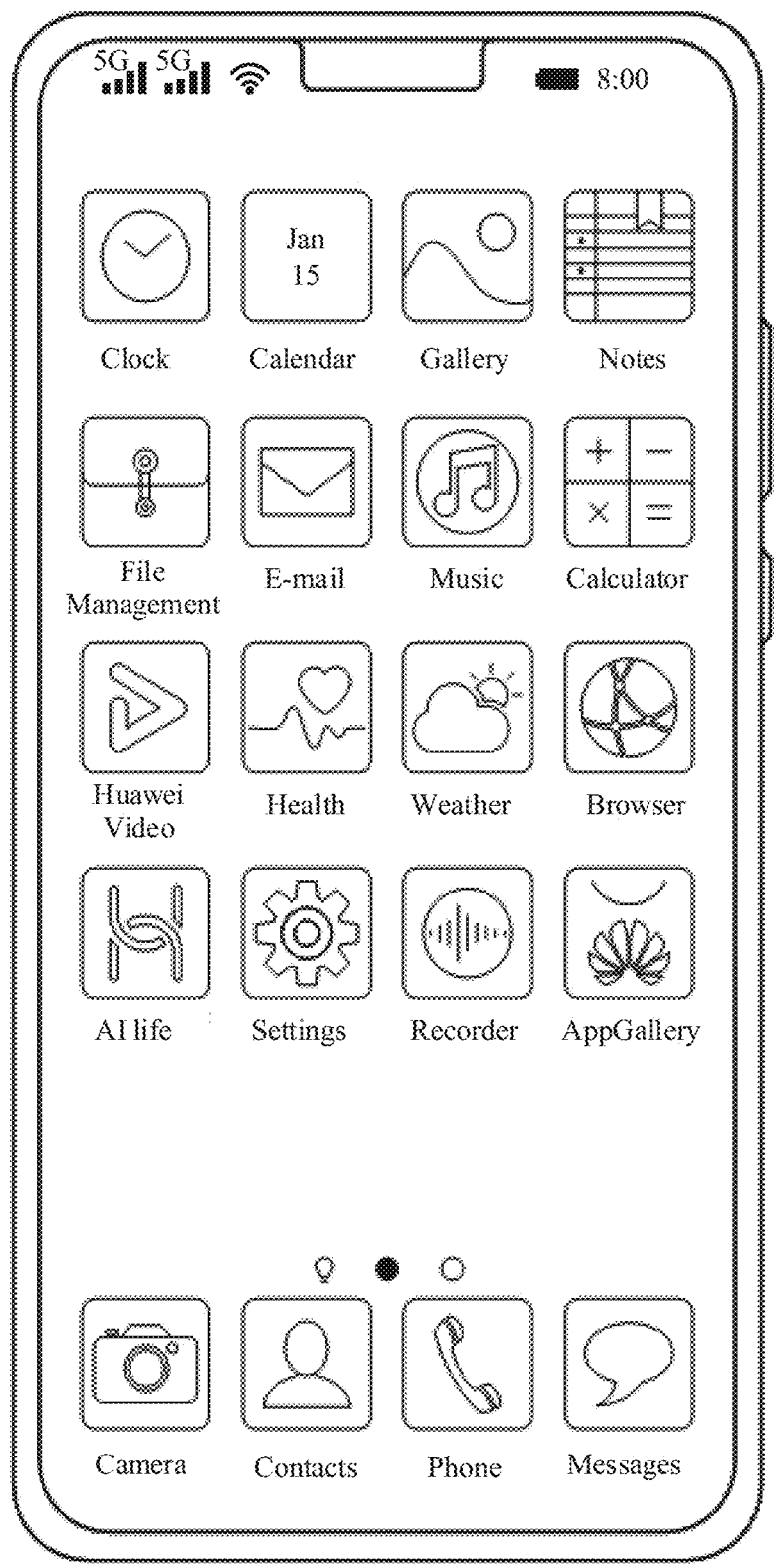
FIG. 10 is a schematic diagram of applications included in an application side device according to an embodiment of this application.

For example, as shown in FIG. 10, it is assumed that an application side device is a mobile phone, and applications in the mobile phone include Calendar, Gallery, AppGallery, Weather, Phone, and the like. The application side device determines Gallery as a conversion object based on a selection instruction triggered by a user, for example, determines to perform an inter-interface conversion solution on an internal application interface in Gallery.

Then, in an optional manner of this embodiment of this application, a device (for example, a processor in the application-side device or a processor in a platform-side device) that configures the inter-interface conversion solution for the conversion object determines a conversion scenario in the conversion object.

Figure 11:
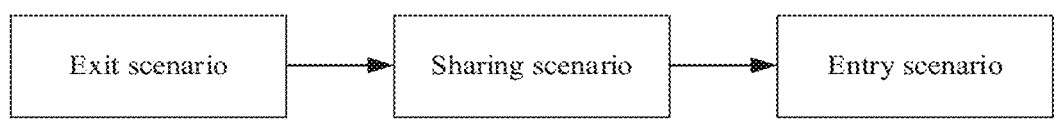
FIG. 11 is a schematic diagram of a scenario category according to an embodiment of this application.

As shown in FIG. 11, determining an exit scenario, a transition scenario, and an entry scenario is mainly included. It may be understood that different scenarios are located at different nodes in the conversion object. The exit scenario shown in FIG. 11 in this application is equivalent to an exit scenario shown in FIG. 10 in the priority document (application No. 202010943693.3). The transition scenario shown in FIG. 11 in this application is equivalent to the sharing scenario shown in FIG. 10 in the priority document (application No. 202010943693.3). The entry scenario shown in FIG. 11 in this application is equivalent to an entry scenario shown in FIG. 10 in the priority document (application No. 202010943693.3).

Figure 12:
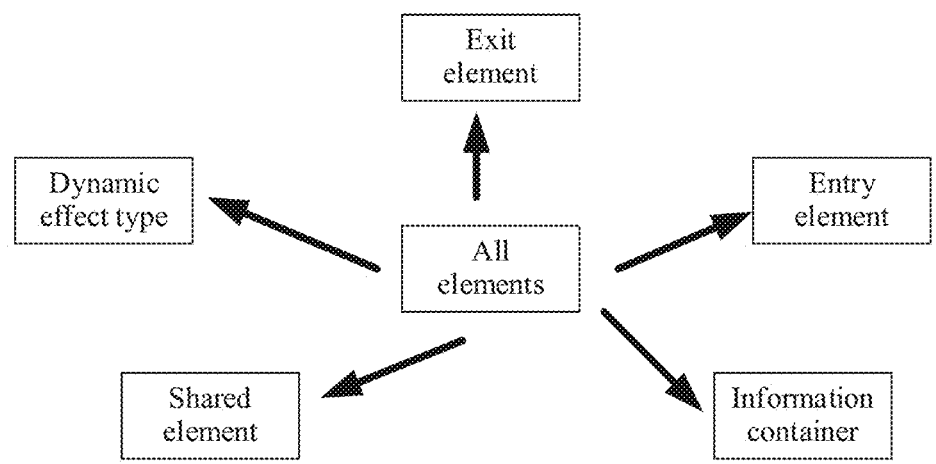
FIG. 12 is a schematic diagram of an element category according to an embodiment of this application.
Figure 13:
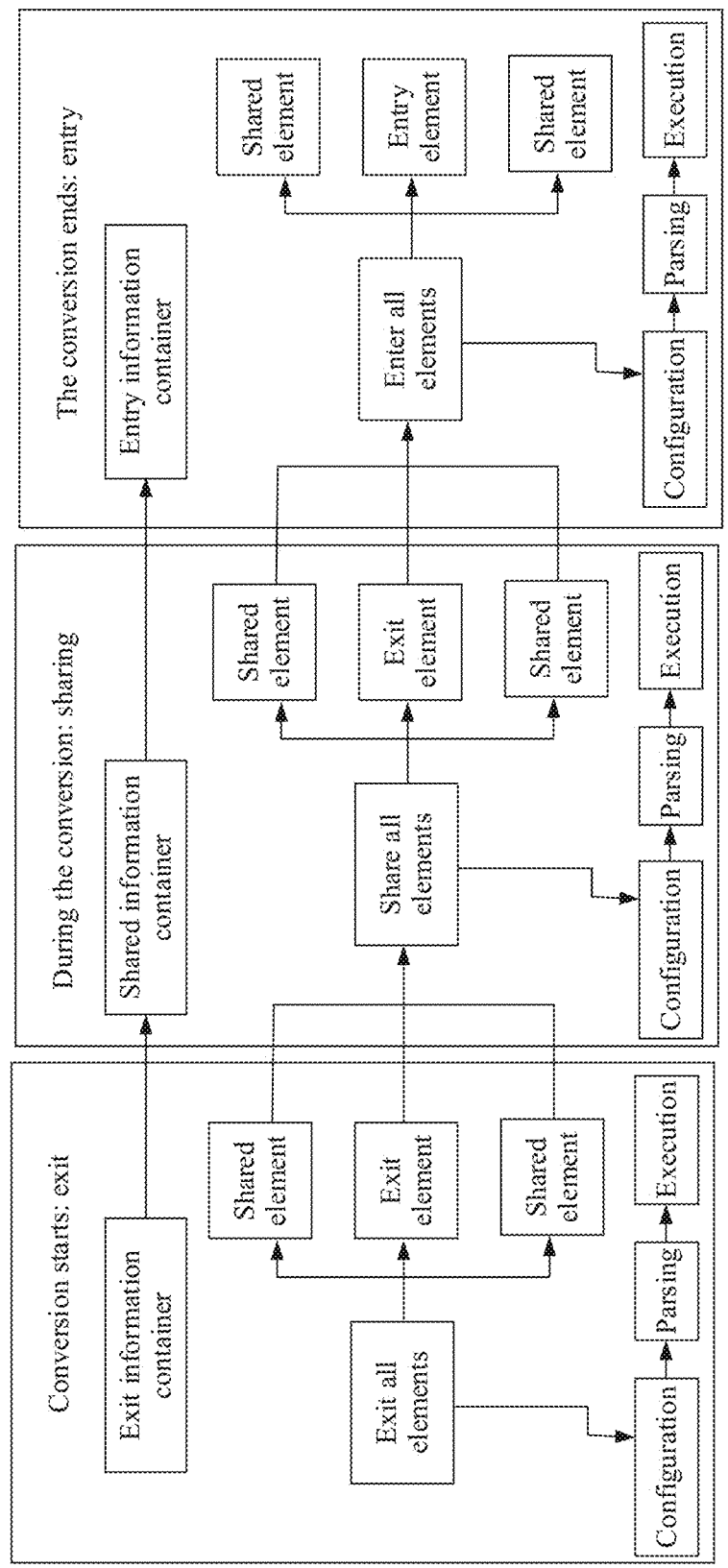
FIG. 13 is a schematic diagram of a conversion configuration according to an embodiment of this application.

As shown in FIG. 12, the application side device determines an element type and a dynamic effect form based on an instruction triggered by the user. The element type includes a shared element, an exit element, and an entry element. The exit element shown in FIG. 12 in this application is equivalent to an exit element shown in FIG. 11 in the priority document (application No. 202010943693.3). The shared element shown in FIG. 12 in this application is equivalent to a continuous element shown in FIG. 11 in the priority document (application No. 202010943693.3). The entry element shown in FIG. 12 in this application is equivalent to an entry element shown in FIG. 11 in the priority document (application No. 202010943693.3). Further, as shown in FIG. 13, a device configured to perform inter-interface conversion solution configuration on the conversion object determines, based on the selection instruction triggered by the user, classification of elements in each conversion scenario, that is, which elements are used as exit elements, which elements are used as shared elements, and which elements are used as entry elements in each scenario, and determines corresponding dynamic effects when the elements are converted. An exit information container shown in FIG. 13 in this application is equivalent to an exit information container shown in FIG. 12 in the priority document (application No. 202010943693.3). An entry information container shown in FIG. 13 in this application is equivalent to an entry information container shown in FIG. 12 in the priority document (application No. 202010943693.3). All exit elements shown in FIG. 13 in this application are equivalent to all exit elements shown in FIG. 12 in the priority document (application No. 202010943693.3). All entry elements shown in FIG. 13 in this application is equivalent to all entry elements shown in FIG. 12 in the priority document (application No. 202010943693.3).

It should be noted that, in this embodiment of this application, the device configured to perform inter-interface conversion solution configuration on the conversion object may further divide element types based on containers in which the elements are located. For example, it is assumed that the container 1 is determined as a shared container. It may be understood that all elements in the container 1 are shared elements.

In addition, in an optional manner of this embodiment of this application, the device configured to perform inter-interface conversion solution configuration on the conversion object may further set a size of the information container based on a processing instruction triggered by the user.

For example, in this embodiment of this application, a current mainstream Activity conversion type is used as an example to briefly describe some parameters related to the element in the conversion object in this embodiment of this application.

Parameters related to the element in this embodiment of this application may include a name, motion duration, a control ID, a dynamic effect, a dynamic effect delay, interface (exit and/or enter) duration, and the like.

It should be noted that the parameters related to the element in this embodiment of this application are not limited to the foregoing several types, and any configuration parameter that can be applied to the element in this embodiment of this application falls within the protection scope of this embodiment of this application. For example, if a plurality of dynamic effects are set for an element, the configured parameter may further include interval duration of each dynamic effect, and the like.

For example, as shown in the following Table 1, in this embodiment of this application, parameters that may need to be configured for interface conversion on a selected conversion object are briefly listed in a form of a table.

TABLE 1

Parameter description of the conversion object

| Parameter description | Configuration content |
| --- | --- |
| Name (name) | Name of the conversion object |
| Duration (duration) | Total conversion time T1 for completing a single shot |
| Exit element (exit element) | 1. Container ID or element ID used as the exit element<br>2. At least one exit animation (addAnimCreator), where when there are a plurality of exit animations, animation effects may be superimposed<br>3. Exit animation delay (delay), where when there are a plurality of exit animations, an animation delay may be separately set for each animation<br>4. Exit duration T2 |
| Shared element (shared element) | 1. Container ID or element ID used as the shared element<br>2. At least one shared animation, where when there are a plurality of shared animations, animation effects may be superimposed<br>3. Shared animation delay, where when there are a plurality of shared animations, an animation delay may be separately set for each animation<br>4. Shared duration T3 |
| Entry element (entry element) | 1. Container ID or element ID used as the entry element<br>2. At least one entry animation, where when there are a plurality of entry animations, animation effects may be superimposed<br>3. Entry animation delay, where when there are a plurality of entry animations, an animation delay may be separately set for each animation.<br>4. Entry duration T4 |

It may be learned from the content of Table 1 that in this embodiment of this application, when the inter-interface conversion solution is configured for the conversion object, the name of the conversion object on which inter-interface conversion needs to be performed needs to be first determined. Then, the exit element, the shared element, and the entry element in the conversion object are determined; the exit dynamic effect, the exit duration, the exit dynamic effect delay, and the like related to the exit element are determined, the entry dynamic effect, the entry duration, the entry dynamic effect delay, and the like related to the entry element are determined; and the shared dynamic effect, the shared duration, and the shared dynamic effect delay related to the shared element are determined.

In this embodiment of this application, if the exit element, the entry element, or the shared element is determined by setting the container ID, it may be understood that all elements in the container ID are set as the exit element, the entry element, or the shared element.

For example, it is assumed that there are three elements in a container 1: an element 1, an element 2, and an element 3. If the container 1 is set as a shared element, all elements included in the container 1 are shared elements.

Further, when a shared dynamic effect is configured for the container 1, a dynamic effect may be separately configured for each shared element, or a unified dynamic effect may be configured for the entire container.

For example, when the dynamic effect is configured for the elements in the container 1, the dynamic effect configured for the shared element 1 is flipping, and the dynamic effect configured for the shared element 2 and the shared element 3 is gradient. In this case, in an inter-interface conversion process, the shared element 1 executes the flipping dynamic effect. The shared element 2 and the shared element 3 execute a gradient dynamic effect. Alternatively, when the dynamic effect is configured for the elements in the container 1, a gradient dynamic effect may be configured for the container 1. In this case, in an inter-interface conversion process, the gradient dynamic effect is uniformly executed by the shared elements 1 to 3 in the container 1.

If conversion is performed between a plurality of interfaces in this embodiment of this application, an intermediate interface on which conversion is performed may be considered as a transition interface (which may also be referred to as a shared interface).

It should be noted that in this embodiment of this application, when the exit interface, the transition interface, and the entry interface do not overlap in the inter-interface conversion process, the total conversion time T1 in this embodiment of this application is a sum of the exit time T2, the shared time T3, and the entry time T4. When the exit interface, the transition interface, and the entry interface overlap in the inter-interface conversion process, the total conversion time T1 in this embodiment of this application is less than a sum of the exit time T2, the shared time T3, and the entry time T4.

Further, dynamic effect forms in this embodiment of this application include but are not limited to the following several types:

an explosion effect, a displacement effect, a scaling effect, a cropping effect, a rotation effect, and a fade-out and fade-in effect.

In addition, the dynamic effect forms in this embodiment of this application may alternatively be implemented through user-defined extension. For example, the dynamic effect forms may alternatively be set to a black hole effect, a hiding effect, or the like in a user-defined manner.

The user may further set an attribute of the dynamic effect based on a requirement of the user, for example:

when to trigger a start of the dynamic effect, when to trigger an end of the dynamic effect, a type of the dynamic effect, an application scenario (that is, whether the dynamic effect is an exit dynamic effect or an entry dynamic effect), a total running time of the dynamic effect, a delay time of the dynamic effect, an interpolator of the dynamic effect, and the like.

For example, Table 2 shows a dynamic effect solution configured in this embodiment of this application.

TABLE 2

Single-shot dynamic effect solution 1

| Name | Implication | Parameter | Scenario |
|---|---|---|---|
| AbstractAnimCreator | Abstract class | None | Entry, exit, and shared |
| VisibilityAnimCreator | Base class of the exit and entry dynamic effects | None | |
| AutoExplodeAnimCreator | Explosion dynamic effect | Rect: explosion target area<br>Rect: explosion center area | Exit and entry |
| BoundsAnimCreator | Displacement scaling | None | Shared |
| ZoomAnimCreator | Scaling animation | Scale: scaling to a target size<br>Pivot: scaling animation center (where a value is similar to that of a Gravity model) | Exit and entry |
| DisplacementAnimCreator | Relative displacement animation | transitionX: pixels displaced relative to X<br>transitionY: pixels displaced relative to Y | Exit and entry |
| RectZoomAnimCreator | Scaling animation based on Rect | fromRect: initial Rect<br>toRect: target Rect | Exit and entry |
| ClipBoundsAnimCreator | Cropping + displacement animation | startClip: initial cropping area<br>endClip: end cropping area<br>isUseStartView: whether to use an initial view as a cropping object | Shared |

It can be learned from the content of Table 2 that, for the element named "AutoExplodeAnimCreator", an explosive dynamic effect is executed during exit and entry.

It should be noted that a conversion type is not limited in this embodiment of this application. For example, the conversion type in this embodiment of this application may alternatively be a ViewGroup conversion type, a Fragment conversion type, or the like. A setting manner of another conversion type is similar to that of the Activity conversion type. A main difference lies in that forms of controls are different, that is, conversion settings are different. For brief description, refer to the foregoing description of the Activity conversion type.

In this embodiment of this application, three conversion types: Activity, ViewGroup, and Fragment are selected, and conversion settings are separately briefly described.

For example, in this embodiment of this application, conversion settings for the three conversion types: Activity, ViewGroup, and Fragment may be shown in Table 3.

TABLE 3

Conversion settings for different conversion types

| | |
|---|---|
| Activity | During redirection, a bundle parameter is transferred:<br>start Activity(intent, activityTransition.getBundle(AppDoodlePage.this)); |
| ViewGroup | During redirection, an exit view and an entry view are determined:<br>viewGroupTransition.go(container, onCallView, inCallView); |
| Fragment | The Fragment supports only a replace operation of two Fragments, or a hide operation of one Fragment and a show operation of the other Fragment:<br>fragmentTransaction.hide(fragmentMain).show(fragmentDetail).commit( ); |

Further, in this embodiment of this application, when inter-interface conversion is configured in the configuration phase, the inter-interface conversion solution may be configured in a user-defined manner, or the inter-interface conversion solution may be configured in a preset template manner. The following separately provides descriptions.

Configuration Manner 1: Configured in the User-Defined Manner

In an optional manner of this embodiment of this application, the application framework separately performs corresponding parameter configuration based on content selected by the user.

Figure 14:
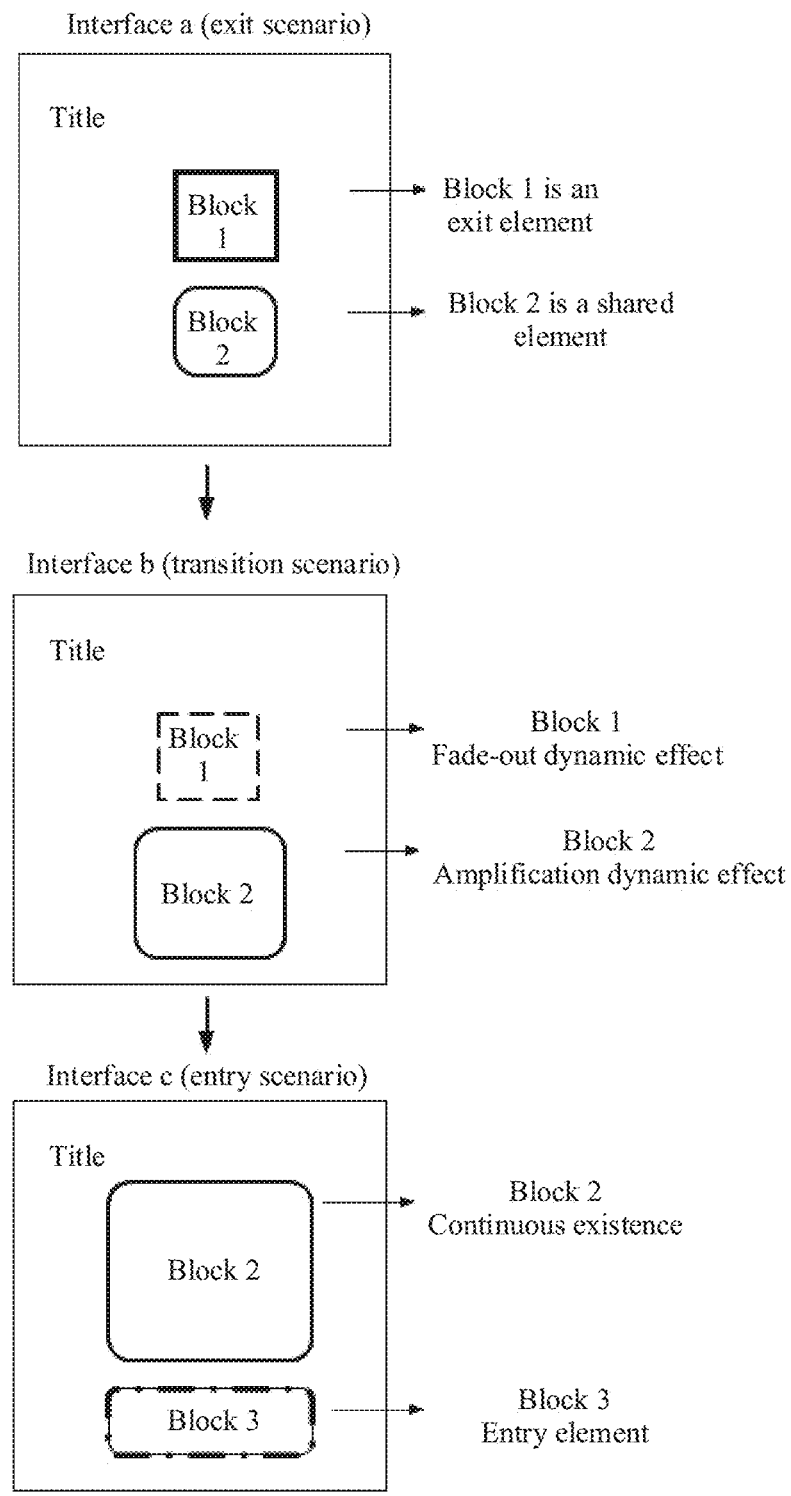
FIG. 14 is a schematic diagram of a conversion effect according to an embodiment of this application.

For example, as shown in FIG. 14, it is assumed that the inter-interface conversion solution is configured for an application A. The user determines, in a user-defined manner, an element corresponding to a block 2 in the application A as a shared element, a dynamic effect configured for an exit element as gradient disappearance, a dynamic effect configured for the shared element as amplification, and a dynamic effect configured for an entry element as gradient appearance. An interface a (an exit scenario) shown in FIG. 14 in this application is equivalent to an interface a (an exit scenario) shown in FIG. 13 in the priority document (application No. 202010943693.3). An interface b (a transition scenario) shown in FIG. 14 in this application is equivalent to an interface b (a sharing scenario) shown in FIG. 13 in the priority document (application No. 202010943693.3). An interface c (an entry scenario) shown in FIG. 14 in this application is equivalent to an interface c (an entry scenario) shown in FIG. 13 in the priority document (application No. 202010943693.3). An exit element in a block 1 shown in FIG. 14 in this application is equivalent to an exit element in a block 1 shown in FIG. 13 in the priority document (application No. 202010943693.3). The shared element in the block 2 shown in FIG. 14 in this application is equivalent to a shared element in a block 2 shown in FIG. 13 in the priority document (application No. 202010943693.3). An entry element in a block 3 shown in FIG. 14 in this application is equivalent to an entry element in a block 3 shown in FIG. 13 in the priority document (application No. 202010943693.3).

When the application A performs inter-interface conversion, it is assumed that in this case, the interface a in FIG. 13 is the exit scenario of the application A, the interface b in FIG. 13 is the transition scenario of the application A, the interface c in FIG. 13 is the entry scenario of the application A, the block 1 is an exit element, the block 2 is a shared element, and the block 3 is an entry element.

In a process of switching from the interface a to the interface b, the block 2 used as a shared element always exists, an amplification dynamic effect is displayed, and the block 1 used as an exit element fades out.

Further, in a process of continuing the conversion, the interface b is switched to the interface c. In the switching process, the block 2 used as the shared element always exists, and the block 3 used as the entry element fades in.

In this embodiment of this application, a size of an information container and a location of the information container may be set.

Figure 15:
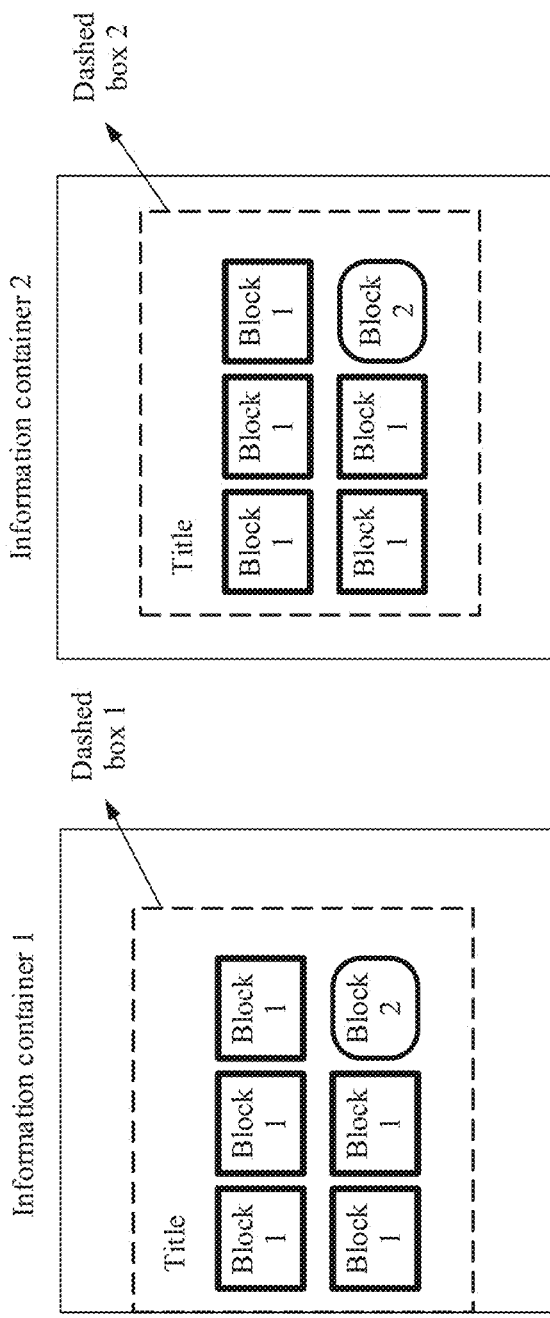
FIG. 15 is a schematic diagram of setting an information container according to an embodiment of this application.

For example, as shown in FIG. 15, if a size of an information container for displaying the exit scenario is set to a size of a dashed box 1, and the information container is displayed at a left boundary of the screen, content of the exit scenario is displayed only in the dashed box 1 in FIG. 15. If a size of an information container for displaying a transition scenario is set to a size of a dashed box 2, and the information container is displayed in a center of the screen, content of the sharing scenario is displayed only in the dashed box 2 in FIG. 15.

Configuration Manner 2: Configured in the Preset Template Manner

In an optional manner of this embodiment of this application, a plurality of fast configuration templates may be set. To be specific, in the fast configuration template, a related configuration parameter of an element is set in advance, and the user only needs to determine a name of the element. This implements a fast configuration and effectively reduces configuration complexity.

In an optional manner of this embodiment of this application, after the user determines the conversion object, the user may determine, by tapping the screen with a finger, an element that needs to be configured by using the template.

Specifically, after the user taps the screen with the finger, the mobile phone determines, based on a tapped screen position, a name of an element or a container displayed at the position, and binds the name of the element or the container to a fast configuration template selected by the user, so that when the element or the container performs inter-interface conversion, a configuration corresponding to the selected fast configuration module is executed.

Figure 16A:
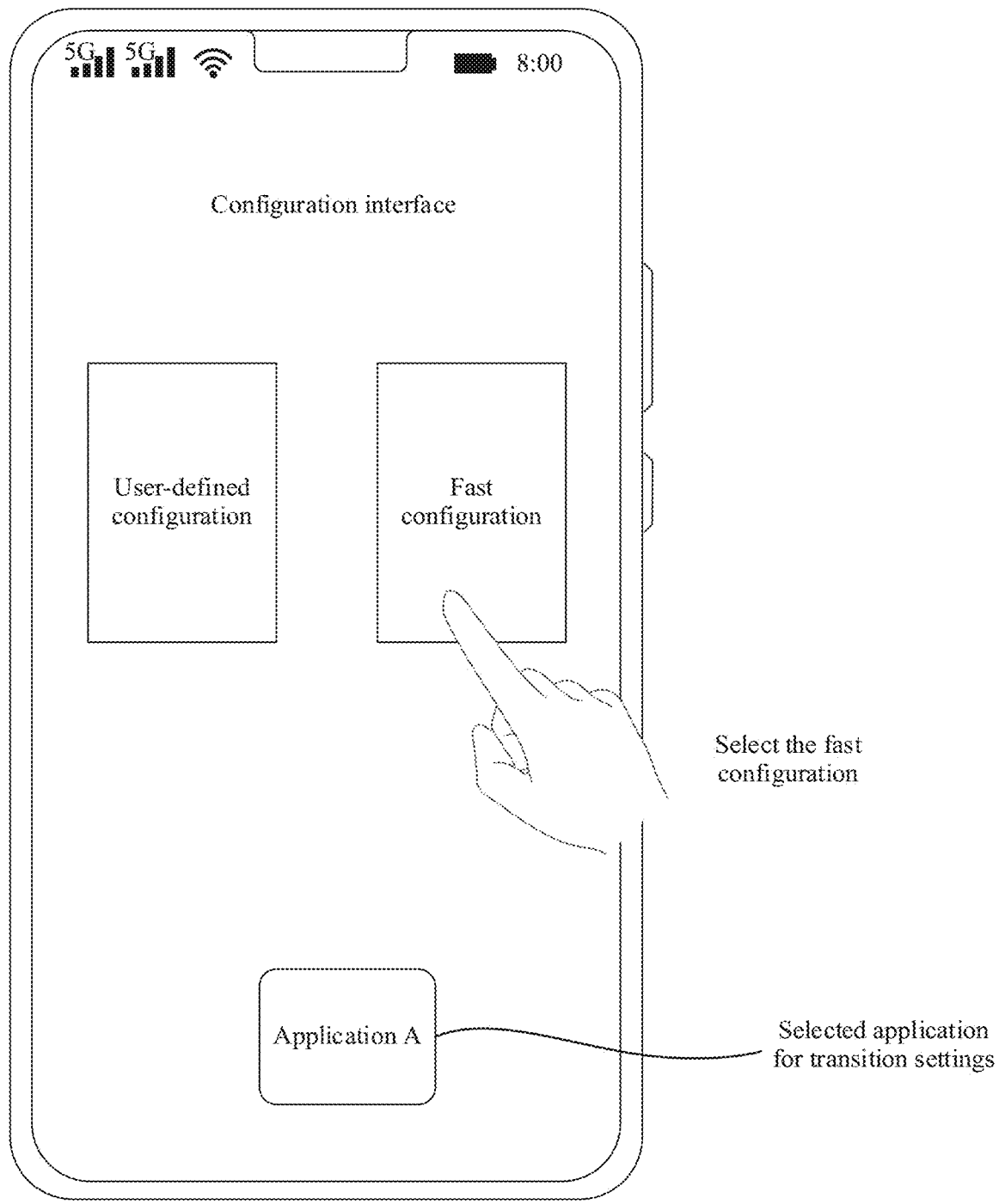
FIG. 16(a) to FIG. 16(c) are schematic diagrams of a fast conversion configuration according to an embodiment of this application.
Figure 16B:
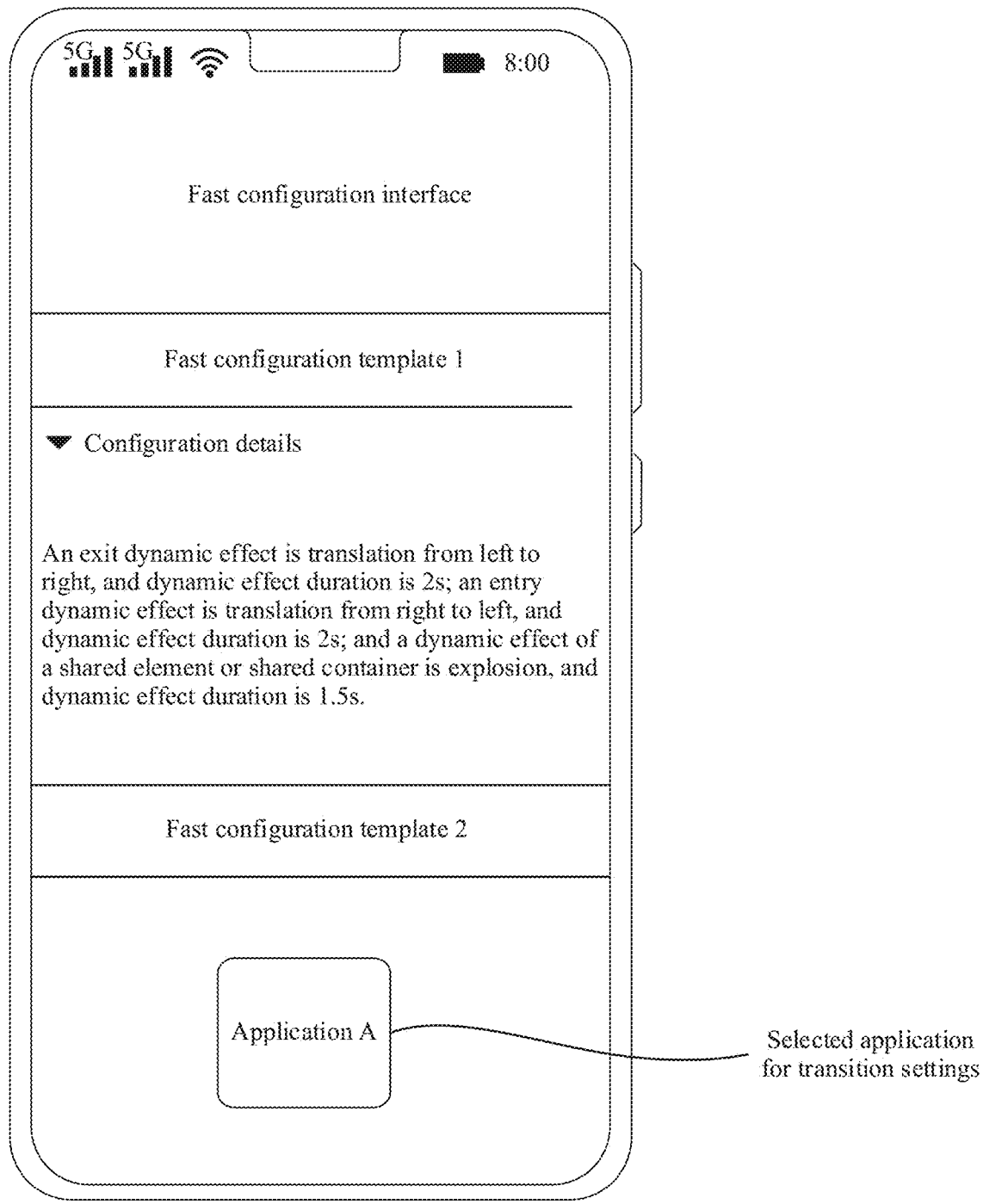

For example, it is assumed that when the user configures the inter-interface conversion solution for the application A, a current configuration interface is shown in FIG. 16(a), and a customized configuration and a fast configuration are displayed on the current configuration interface. After the user taps the fast configuration with a finger, the current interface is shown in FIG. 16(b), and two fast configuration modules are displayed: the fast configuration template 1 and the fast configuration template 2 described above.

Related configurations in the fast configuration template 1 are as follows:

An exit dynamic effect is translation from left to right, and dynamic effect duration is 2 s. An entry dynamic effect is translation from right to left, and dynamic effect duration is 2 s. A dynamic effect of a shared element or a shared container is explosion, and dynamic effect duration is 1.5 s. A center point of the explosive dynamic effect is a center point of the shared element or the shared container, an explosive area is a quarter size of the interface, and the like.

Related configurations in the fast configuration module 2 are as follows:

An exit dynamic effect is gradient, and dynamic effect duration is 2 s. An entry dynamic effect is flipping, and dynamic effect duration is 2 s. A dynamic effect of a shared element or a shared container is shaking, and dynamic effect duration is 1.5 s. A center point of the shaking dynamic effect is a center point of the shared element or the shared container, and the like. It is assumed that the user selects the fast configuration template 1 in a process of selecting a fast configuration template.

After determining the fast configuration template to be applied, the user only needs to determine an element to which the template is applied.

Figure 16C:
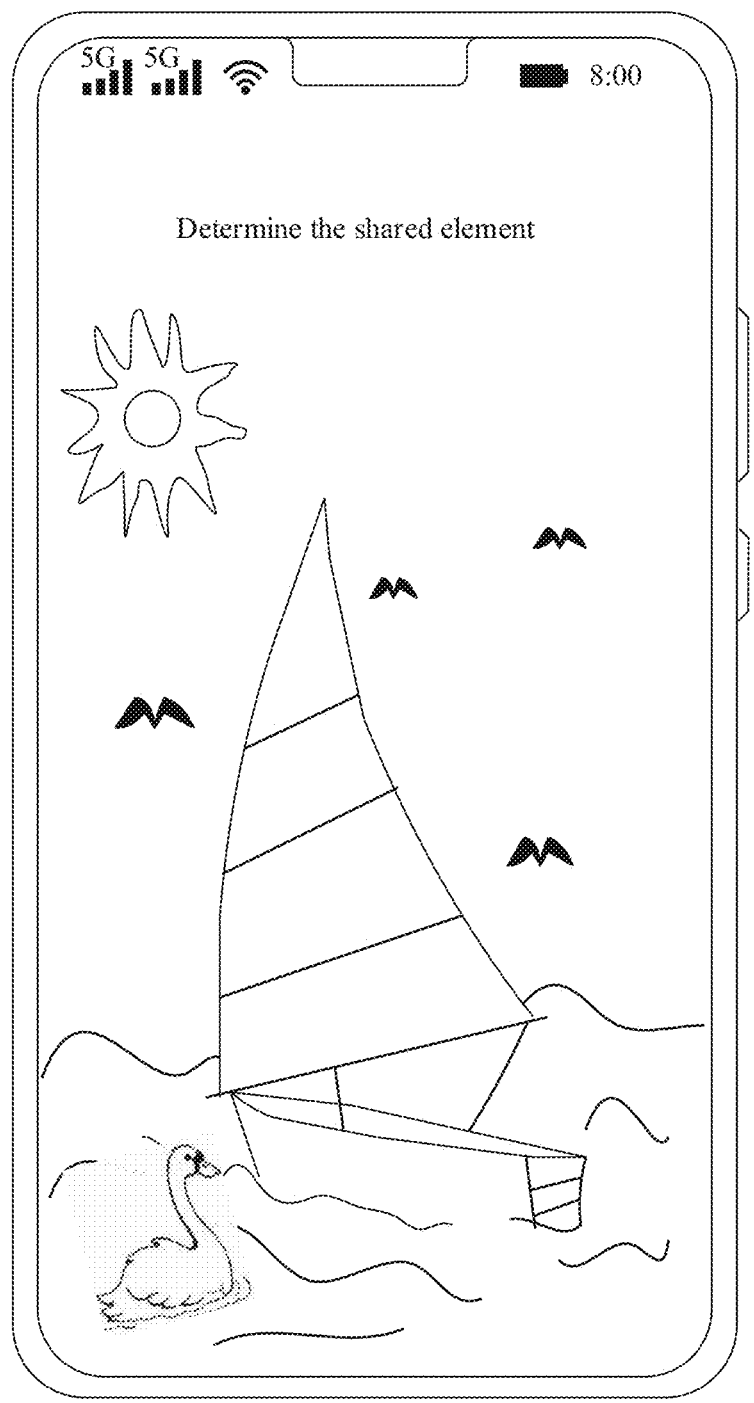
Figure 17A:
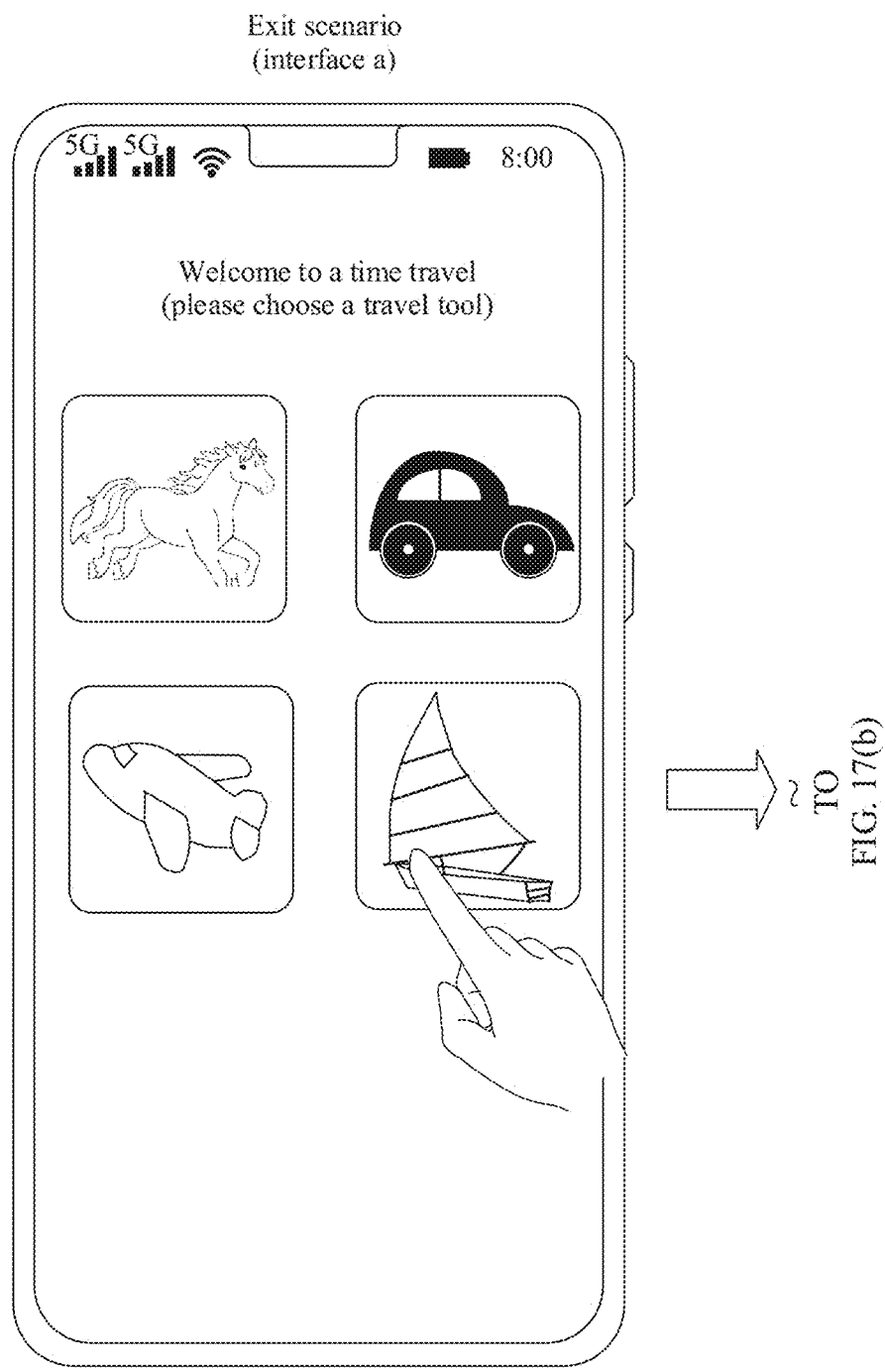
FIG. 17(a) to FIG. 17(h) are schematic diagrams of a first conversion effect of a single shot according to an embodiment of this application.
Figure 17B:
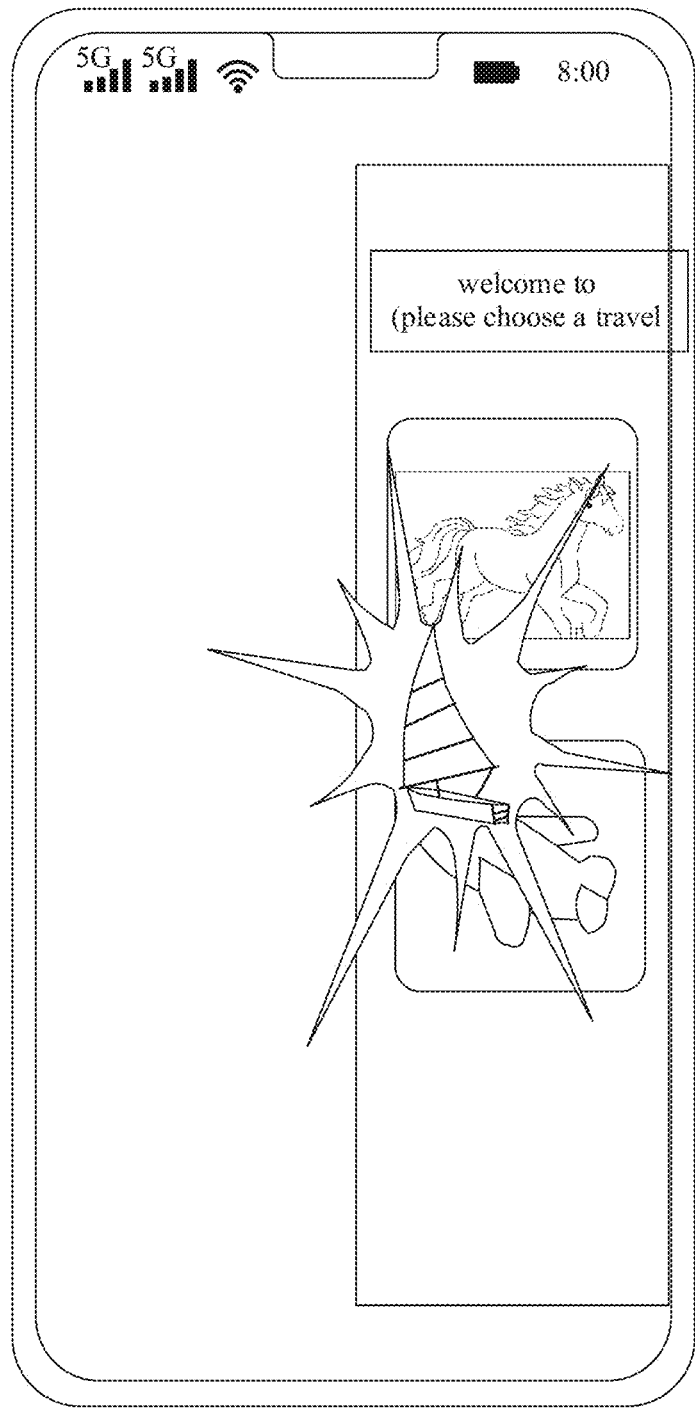
Figure 17C:
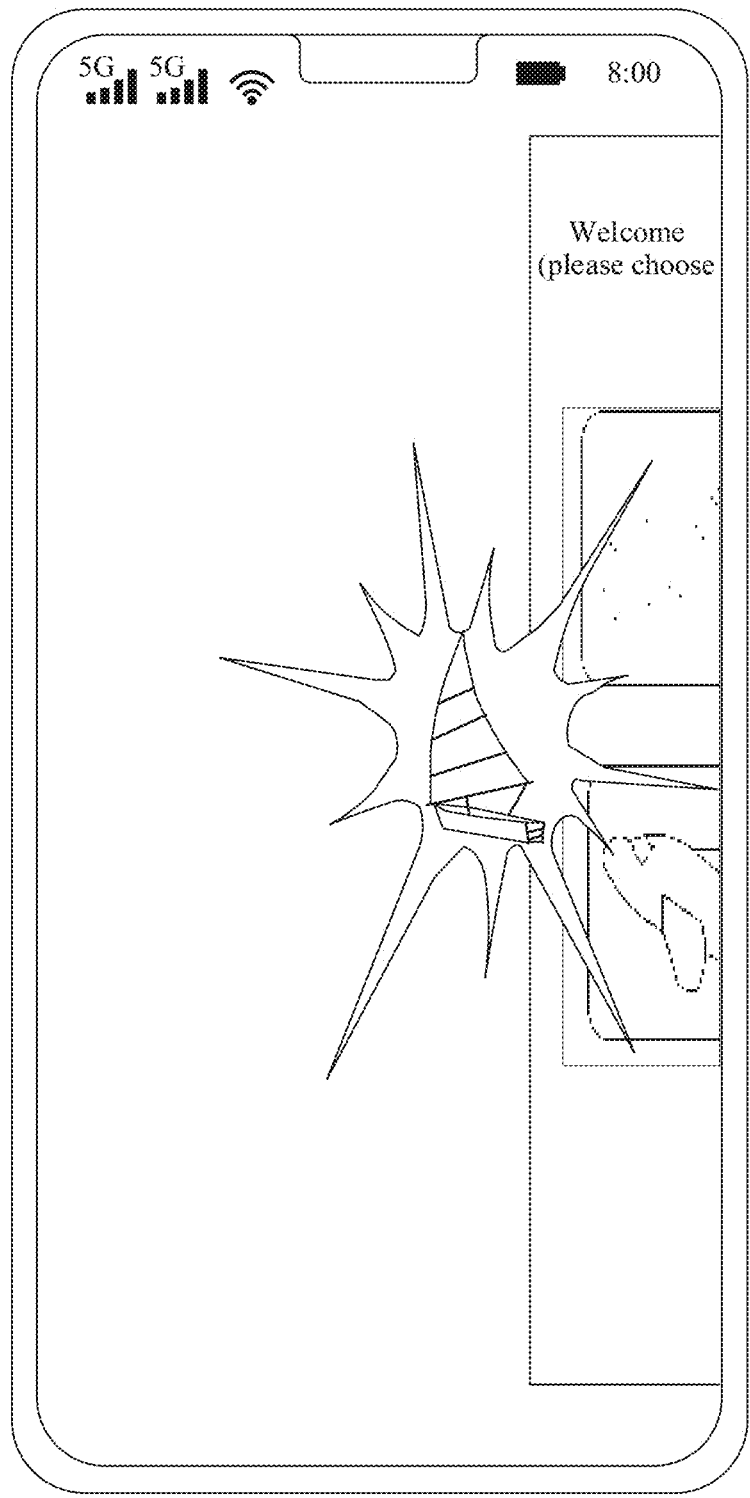
Figure 17D:
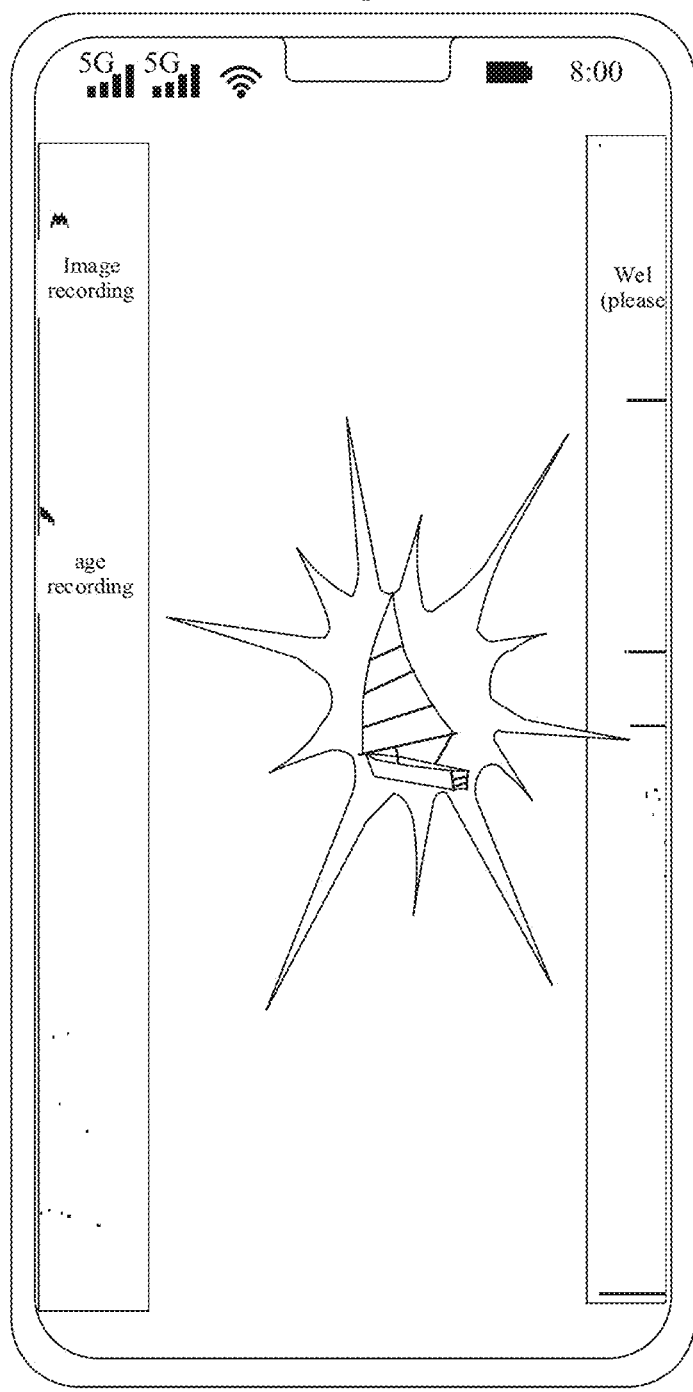
Figure 17E:
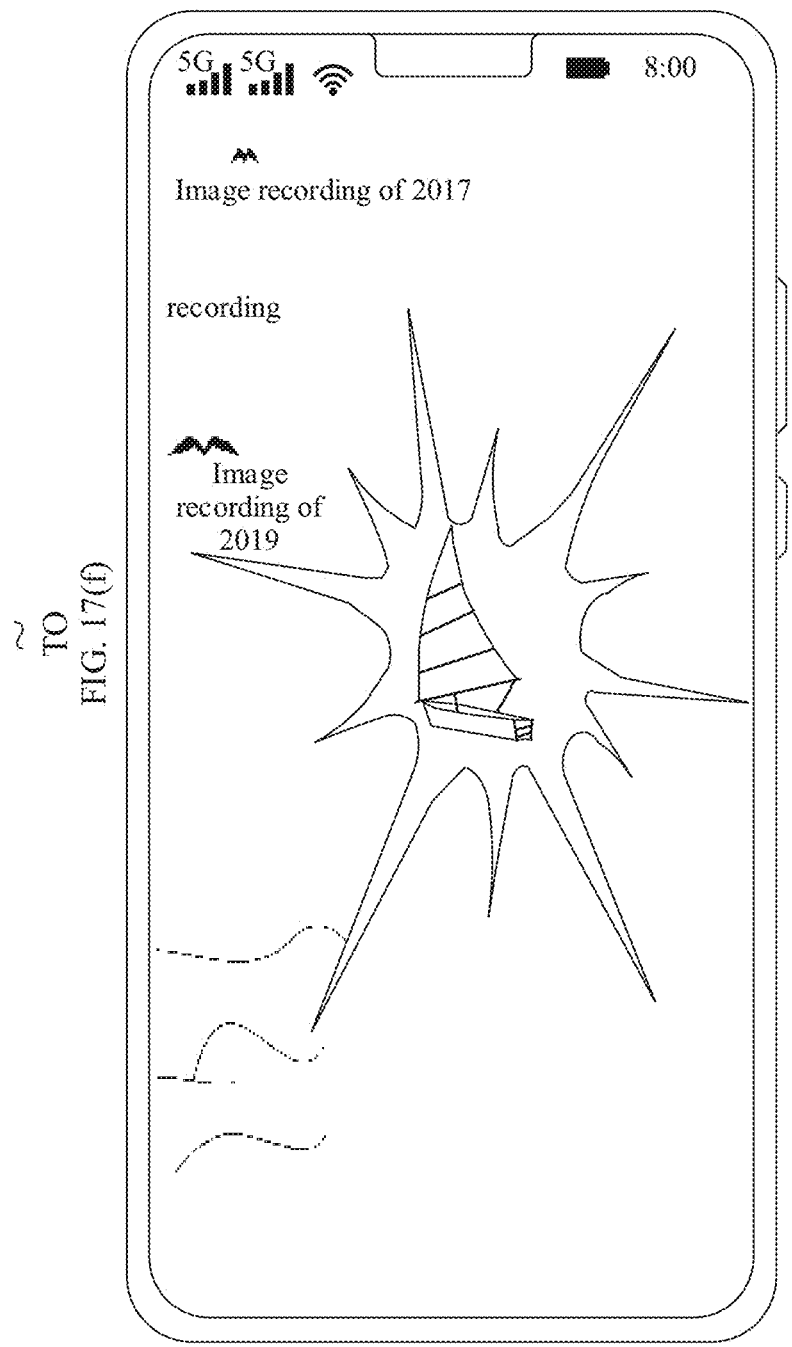
Figure 17F:
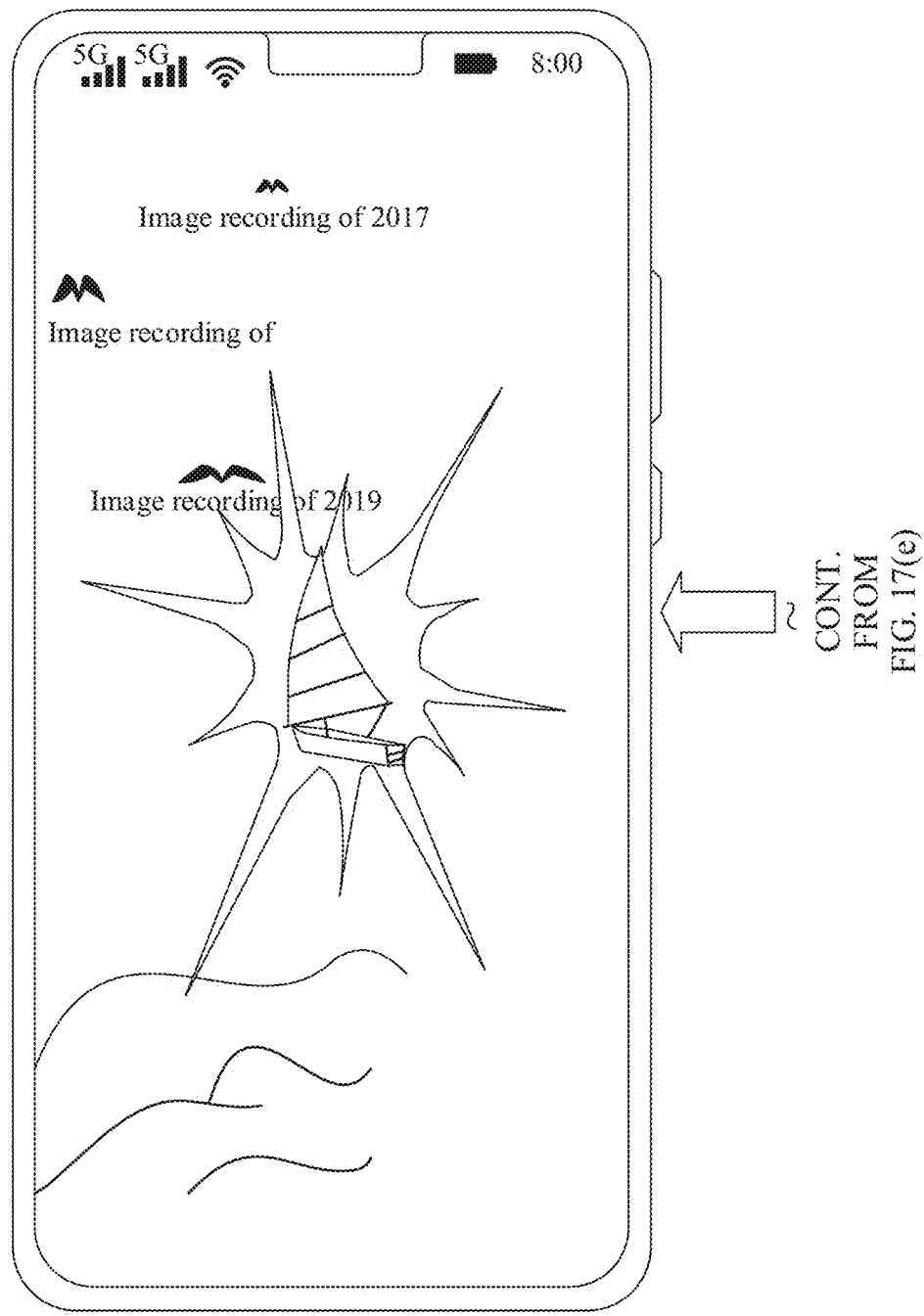
Figure 17G:
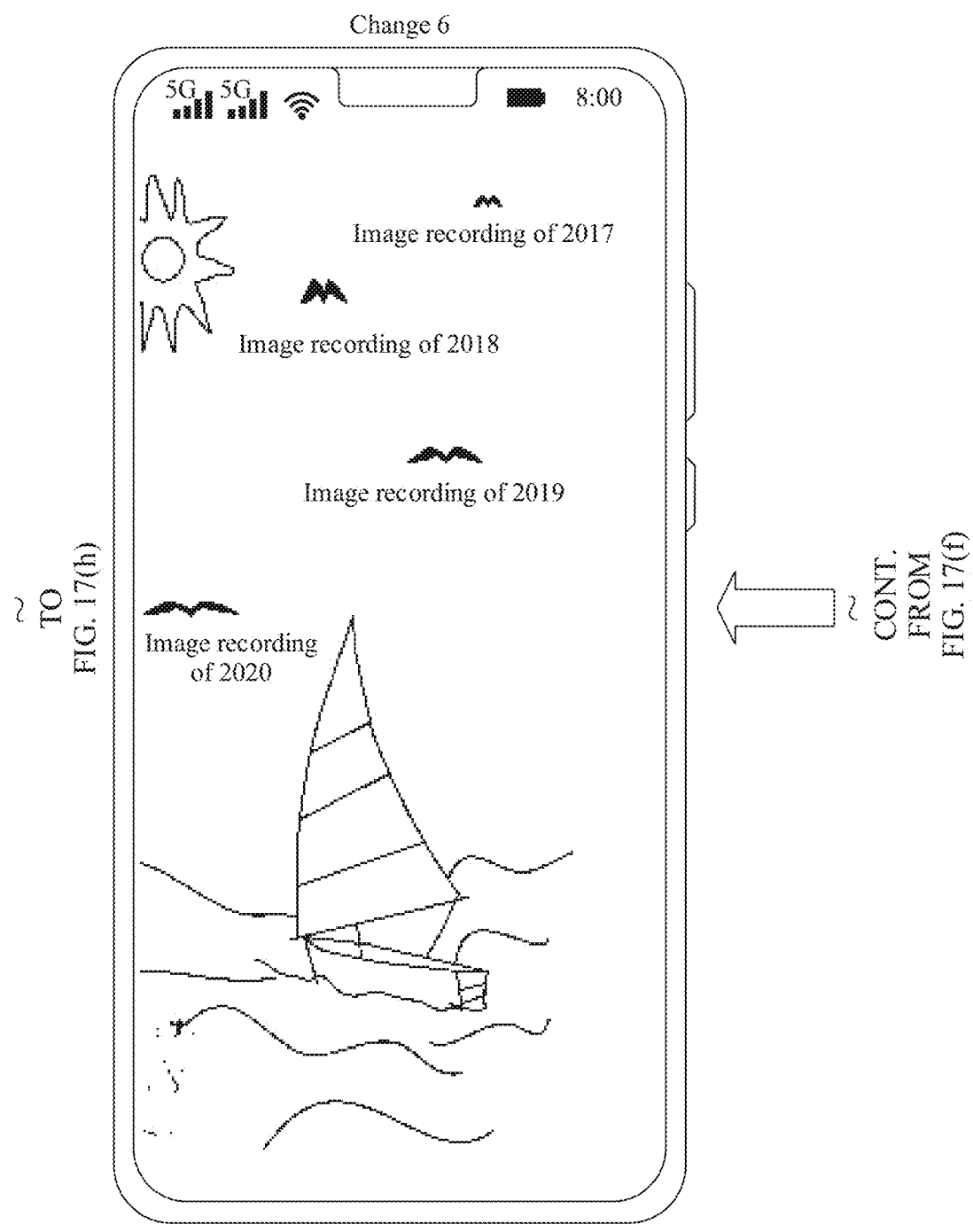
Figure 17H:
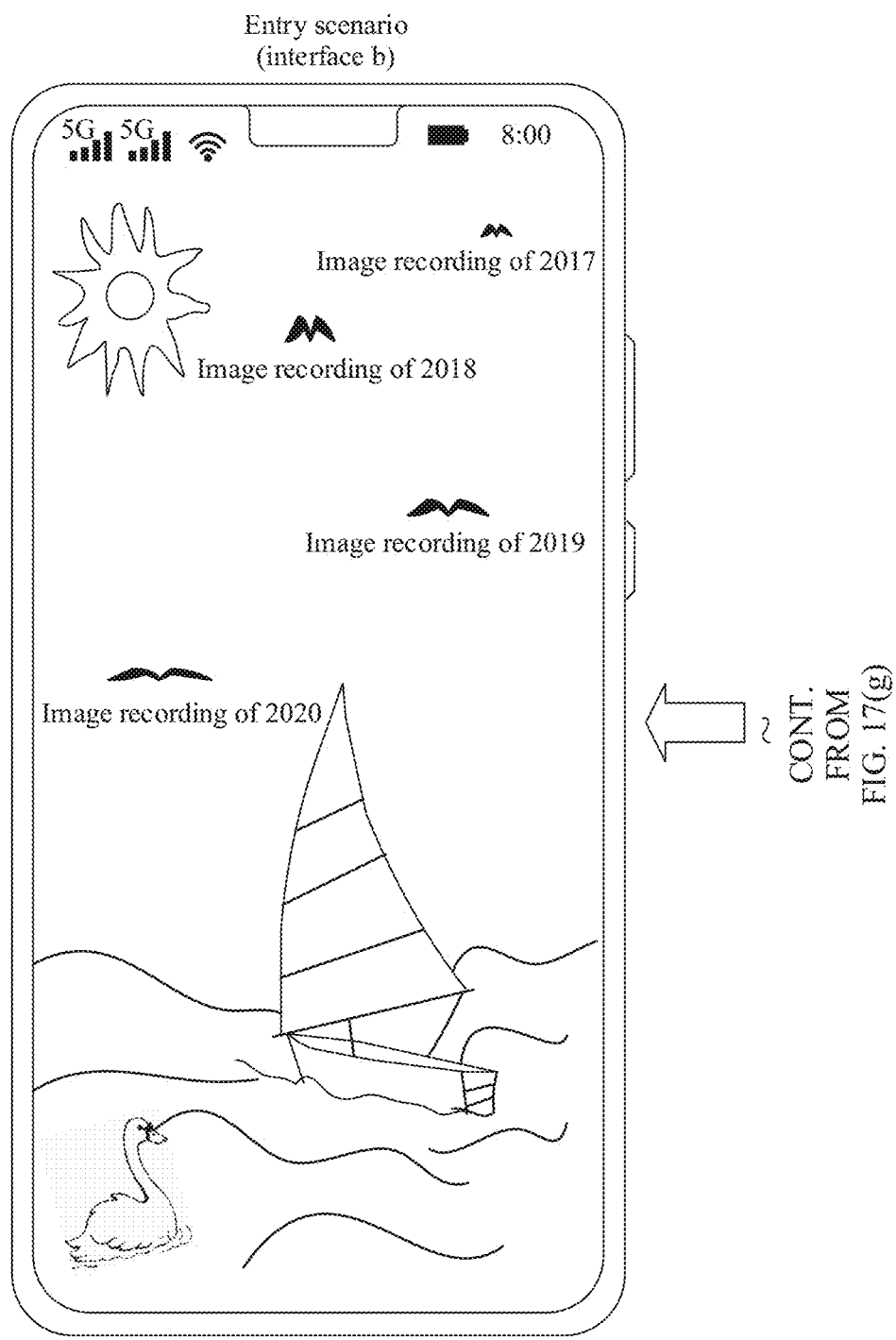

For example, as shown in FIG. 16(c), the user determines, based on an indication on the screen and in a finger tapping manner, the shared element from the content displayed on the current interface. It is assumed that the user taps a vessel on the screen by using a finger. In this case, the application framework may determine the vessel as a shared element.

Therefore, when the application A performs inter-interface conversion, as shown in FIG. 17(a) to FIG. 17(h), it is assumed that in this case, the interface a is the exit scenario of the application A, and the interface b is the entry scenario of the application A. In a process of exiting the interface a, the interface a is translated from left to right to exit, and dynamic effect duration is 2 s. In a process of exiting the interface b, the interface b is translated from right to left to enter, and dynamic effect duration is 2 s. The vessel used as the shared element always exists, and the explosion dynamic effect is displayed in a size of a quarter of the screen by using a center point of the vessel as the center point of the shared element.

Further, after the user configures the inter-interface conversion solution for the conversion object by using the application framework provided in this embodiment of this application, a configuration file of the inter-interface conversion solution may be generated, and the configuration file can be invoked when the conversion object subsequently performs inter-interface conversion display.

It should be noted that, in this embodiment of this application, a manner of combining the user-defined manner and the preset template manner may be alternatively used to configure the inter-interface conversion solution or the like for the conversion object. This is not limited in this embodiment of this application.

Further, in an optional manner of this embodiment of this application, to further improve confidentiality of the inter-interface conversion solution performed on the conversion object, the inter-interface conversion solution corresponding to the conversion object may be encrypted by using a public key for encryption. In this way, only a device or an application that knows a private key that is for decryption and that corresponds to the public key for encryption can parse the inter-interface conversion solution corresponding to the conversion object and obtain the inter-interface conversion solution corresponding to the conversion object.

Phase 2: Parsing Phase:

The phase 2 mainly means that a device configured to parse the inter-interface conversion solution corresponding to the conversion object parses the inter-interface conversion solution obtained by the conversion object in the configuration phase, to obtain information such as an element configured for inter-interface conversion in the inter-interface conversion solution and an attribute of the element, so as to determine an effect of the inter-interface conversion solution for the conversion object.

For example, the platform side device parses, by using the parsing module of the application framework, the inter-interface conversion solution corresponding to the conversion object. For another example, the application side device parses, by using the processor of the application side device or a chip having a parsing function, the inter-interface conversion solution corresponding to the conversion object.

expanded based on the layout type. Therefore, adaptability is better and adhesion is higher.

Further, the device configured to parse the inter-interface conversion solution corresponding to the conversion object determines a state of each converted interface based on the inter-interface conversion solution.

It may be understood that the device for parsing the inter-interface conversion solution corresponding to the conversion object determines, based on the inter-interface conversion solution, the element included in the exit scenario and a state corresponding to the element, the element included in the transition scenario and a state corresponding to the element, and the element included in the entry scenario and a state corresponding to the element.

The state of the element in this embodiment of this application mainly includes a type of the element, a dynamic effect form of the element, dynamic effect duration, and the like.

For example, it is assumed that the conversion object is a calendar application. A configuration file that is obtained by the calendar application in the phase 1 and that is used for interface conversion is shown in Table 4.

| Name | Implication | Parameter | Scenario |
| --- | --- | --- | --- |
| Abstract_Calendar (calendar) | Abstract class (where the calendar is the conversion object) | None | Entry, exit, and shared |
| Displacement_ExitAnimNode | Relative displacement animation | Displace 20 pixels from left to right with displacement duration of 2 s | Exit |
| Displacement_EnterAnimNode | Relative displacement animation | Displace 20 pixels from right to left with displacement duration of 2 s | Entry |
| Shade_ExitAnimNode | Gradient animation | Gradient duration: 2 s | Exit |
| Shade_EnterAnimNode | Gradient animation | Gradient duration: 2 s | Entry |
| Abstract_Share_year | Abstract class (where the shared element is year) | 2020 | Shared |
| Rock_year | Shaking animation | Shake from left to right with a shaking amplitude of 2 pixels | Shared |

Figure 18:
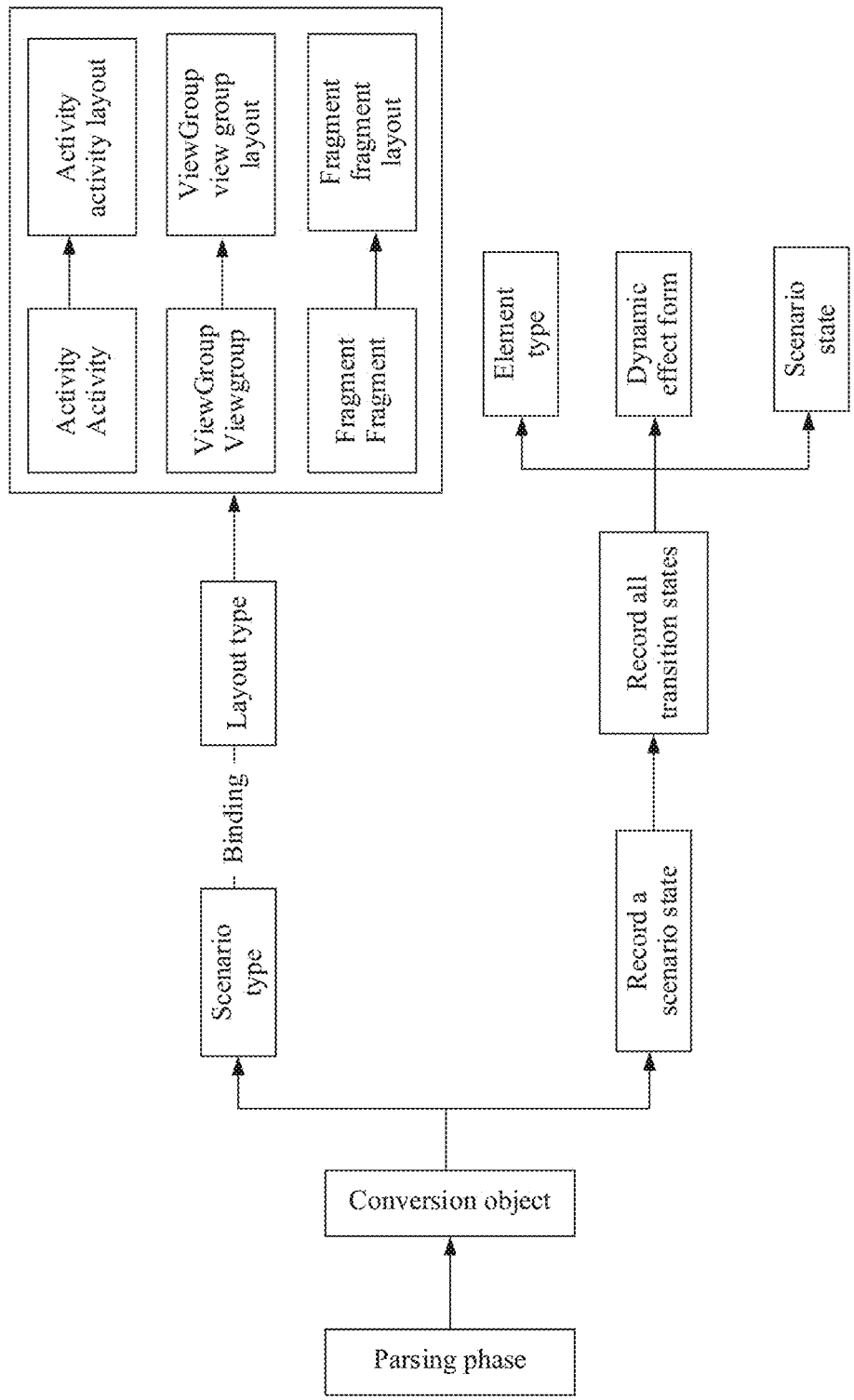
FIG. 18 is a schematic diagram of a logical framework of a parsing phase according to an embodiment of this application.

For details of an internal logical framework of the parsing phase in this embodiment of this application, refer to FIG. 18. The parsing phase shown in FIG. 18 in this application may be understood as a parsing module shown in FIG. 15 in the priority document (application No. 202010943693.3). In other words, FIG. 18 in this application is equivalent to FIG. 15 in the priority document (application No. 202010943693.3).

First, in the parsing phase in this embodiment of this application, the device configured to execute the inter-interface conversion solution for the conversion object determines, by using the inter-interface conversion solution corresponding to the conversion object, a scenario type configured for inter-interface conversion in the inter-interface conversion solution and a layout type corresponding to the scenario type, so as to bind the scenario type to the layout type.

In this embodiment of this application, a scenario is bound to a layout, so that the conversion dynamic effect is The device configured to parse the inter-interface conversion solution corresponding to the conversion object may determine, based on the content in Table 4, that an exit dynamic effect in the exit scenario is a dynamic effect with a displacement of 20 pixels from left to right and a gradient of 2 s, that an entry dynamic effect in the entry scenario is a dynMamic effect with a displacement of 20 pixels from right to left and a gradient of 2 s, and that the shared element is the year in the sharing scenario, and in an interface conversion process, the year element shakes from left to right with a shake amplitude of 2 pixels.

Phase 3: Execution Phase:

The phase 3 mainly means that a device configured to execute the inter-interface conversion solution corresponding to the conversion object displays, based on the inter-interface conversion solution corresponding to the conversion object, a conversion effect configured in the inter-interface conversion solution when the inter-interface conversion is performed on the conversion object.

Figure 19:
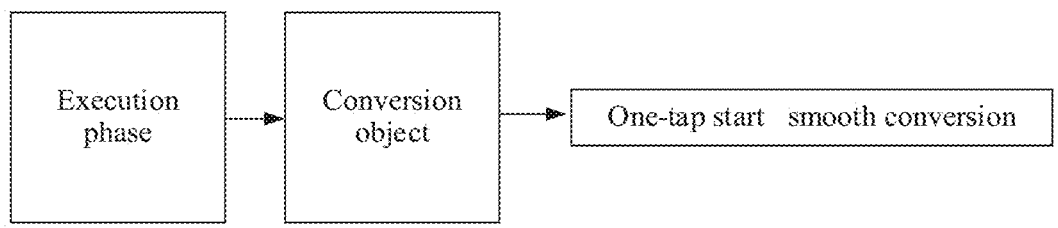
FIG. 19 is a schematic diagram of a logical framework of an execution phase according to an embodiment of this application.

For details of an internal logical framework of the execution phase in this embodiment of this application, refer to FIG. 19. The execution phase shown in FIG. 19 in this application may be understood as an execution module shown in FIG. 16 in the priority document (application No. 202010943693.3). In other words, FIG. 19 in this application is equivalent to FIG. 16 in the priority document (application No. 202010943693.3).

For example, in this embodiment of this application, when the user starts conversion, the platform side device starts conversion in a one-tap manner based on various parameters in the inter-interface conversion solution corresponding to the conversion object that are obtained through parsing, to display an effect of performing inter-interface conversion on the conversion object.

Specifically, in this embodiment of this application, the platform side device executes different animation effects for different elements at different times based on the parameters.

It may be understood that, based on the foregoing descriptions of FIG. 11, FIG. 12, and the content of each module in this application, content shown in FIG. 27 in the priority document (application No. 202010943693.3) may be obtained. A combination of FIG. 9, FIG. 18, and FIG. 19 in this application is equivalent to content shown in FIG. 32 in the priority document (application No. 202010943693.3).

Figure 20:
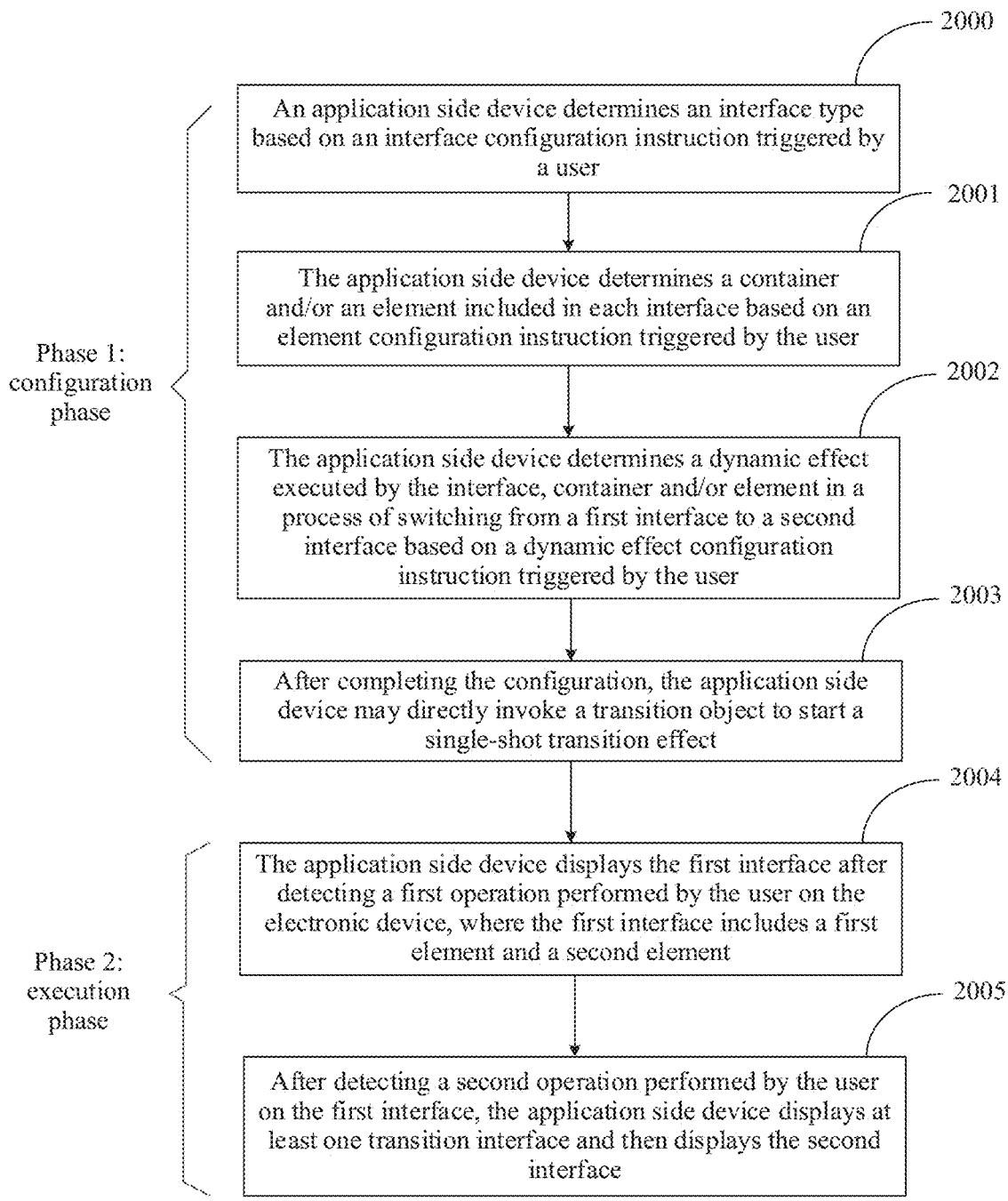
FIG. 20 is a schematic flowchart of a single-shot configuration method according to an embodiment of this application.

Based on the foregoing detailed description of the single-shot framework in embodiments of this application, an inter-interface conversion method is provided for an application side device using the single-shot framework. As shown in FIG. 20, specific steps are as follows:

Phase 1: Configuration Phase:

S2000: The application side device determines an interface type based on an interface configuration instruction triggered by a user.

In this embodiment of this application, the interface type includes a first interface, at least one transition interface, and a second interface, and the transition interface is an intermediate splicing interface from the first interface to the second interface.

It may be understood that, in this embodiment of this application, the first interface is an exit interface, the second interface is an entry interface, and the transition interface is a shared interface.

S2001: The application side device determines, based on an element configuration instruction triggered by the user, a container and/or an element included in each interface.

In this embodiment of this application, containers and/or elements may be set based on different interfaces.

For example, on the exit interface, at least one container and/or element is set as an exit element, and at least one container and/or element is set as a shared element; and on the entry interface, at least one container and/or element is set as an entry element, and at least one container and/or element is set as a shared element.

In an optional manner of this embodiment of this application, the shared element on the exit interface is the same as the shared element on the entry interface.

Specifically, the application side device determines a first element and a second element on the first interface and the second element and a third element on the second interface based on the element configuration instruction triggered by the user, where the transition interface includes the second element.

It may be understood that, in this embodiment of this application, the first element is an exit element, the second element is a shared element, and the third element is an entry element. In another optional manner of this embodiment of this application, the shared element on the exit interface is partially similar to the shared element on the entry interface.

Specifically, the application side device determines a first element and a second element on the first interface and a third element and a fourth element on the second interface based on the element configuration instruction triggered by the user; and the electronic device determines, based on the element configuration instruction triggered by the user, that the second element gradually changes to the third element on the transition interface, where the second element is partially the same as the third element.

It may be understood that, it is assumed that the second element on the first interface is an element 2, the third element on the second interface is an element 3, and the element 2 is partially similar to the element 3.

S2002: The application side device determines, based on a dynamic effect configuration instruction triggered by the user, a dynamic effect executed by an interface, a container, and/or an element in a process of switching from the first interface to the second interface.

Specifically, in this embodiment of this application, different dynamic effects may be specified for different interfaces.

In addition, different dynamic effects may be specified for containers and/or elements on the interface.

In this embodiment of this application, various dynamic effect capabilities are provided for integration and use by an application. The dynamic effects in this embodiment of this application may be used independently, or may be used in combination, and the application may combine the dynamic effects randomly.

In this embodiment of this application, the application side device may obtain, by performing the foregoing configuration operation, the inter-interface conversion solution corresponding to the conversion object. For a specific implementation, refer to the description of the configuration module on the AAR side.

S2003: After completing the configuration, the application side device may directly invoke the inter-interface conversion solution corresponding to the conversion object, to start an effect of the inter-interface conversion.

Further, in this embodiment of this application, after the application side device configures the inter-interface conversion solution corresponding to the conversion object, the application side device may integrate the inter-interface conversion solution. To be specific, the application side device encapsulates and stores the inter-interface conversion solution corresponding to the conversion object, so that when the inter-interface conversion is performed on the conversion object again, the inter-interface conversion effect of the conversion object is directly triggered to start.

It should be noted that the foregoing configuration steps do not constitute a limitation on this embodiment of this application. When the inter-interface conversion method in this embodiment of this application is used to configure the inter-interface conversion solution, the performed steps may be flexibly adjusted based on an actual situation. For example, when the inter-interface conversion solution is configured in this embodiment of this application, a scenario type corresponding to a conversion interface may be further considered. In this way, a more suitable, standard, and effective interface conversion solution can be designed based on the scenario type. In this embodiment of this application, a scenario type of the conversion may be determined as one of an Activity, a ViewGroup, or a Fragment. It should be noted that the conversion type in this embodiment of this application is not limited to the foregoing three types, and may be further extended.

Phase 3: Execution Phase:

S2004: The application side device displays the first interface after detecting a first operation performed by the user on the electronic device, where the first interface includes the first element and the second element.

S2005: The application side device displays the at least one transition interface and then displays the second interface after detecting a second operation performed by the user on the first interface.

In an optional manner of this embodiment of this application, the second interface includes the second element and the third element, and the transition interface includes the second element.

In another optional manner of this embodiment of this application, the second interface includes the third element and the fourth element; and in a process of switching from the first interface to the second interface by using the at least one transition interface, a presentation form of the second element on the transition interface gradually changes to a presentation form of the third element. The second element is partially the same as the third element.

According to the foregoing method, in the process of switching from the first interface to the second interface, the electronic device performs splicing by using the at least one transition interface, and an element that is the same as or similar to a shared element on the first interface and the second interface exists on the transition interface. Therefore, in the process of switching between the first interface and the second interface, a change is natural and coherent, and a visual experience effect for the user is relatively good.

The solution of performing inter-interface conversion based on a single shot in this embodiment of this application is not limited by a conversion type or a usage scenario. For example, the solution may be used inside an application, between applications, or between a system and an application. The solution is also applicable to different screen scenarios, for example, full-screen, split-screen, and projection scenarios.

Further, in this embodiment of this application, there are a plurality of conversion effects of a single shot. Based on a display status of the shared element, the conversion effects may be specifically classified into the following several application examples.

Application example 1: The transition interface includes elements that exist on both the first interface and the second interface.

Based on different conversion types such as an Activity conversion type, a ViewGroup conversion type, and a Fragment conversion type, the following separately describes, by using examples, the solution for performing inter-interface conversion based on a single-shot effect provided in this embodiment of this application.

Conversion Type 1: Fragment Conversion Type

In this embodiment of this application, the inter-interface conversion solution based on the Fragment conversion type may be further classified into a plurality of cases such as inter-application conversion, intra-application conversion, and desktop-to-application conversion. This is not specifically limited to the following content.

Figure 21A:
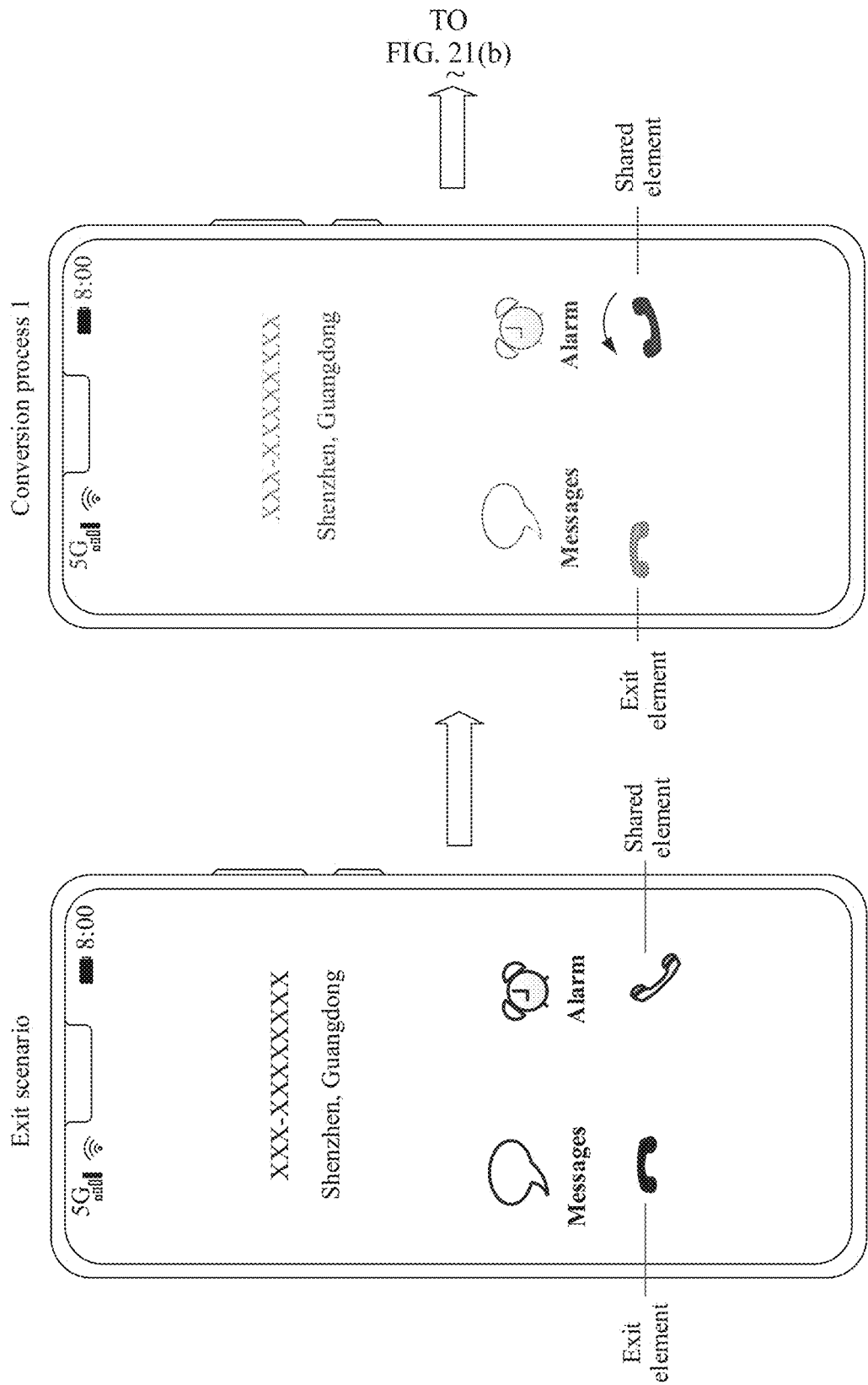
FIG. 21(a) to FIG. 21(c) are schematic diagrams of a conversion effect of a call application according to Embodiment 1 of this application.
Figure 21B:
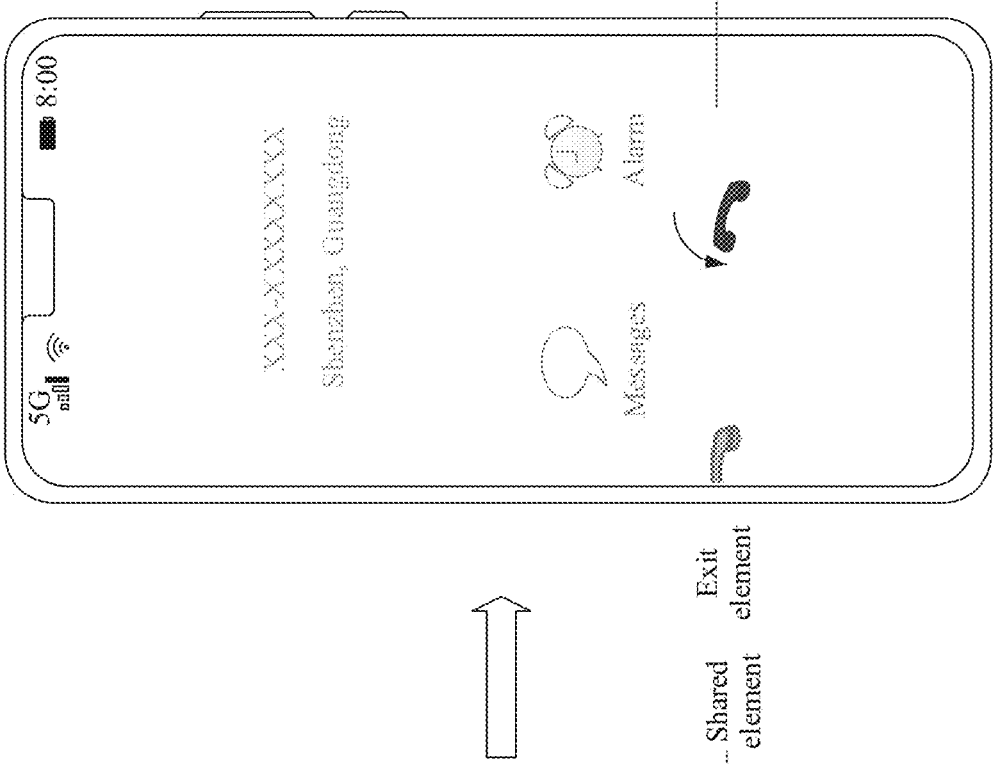
Figure 21B:
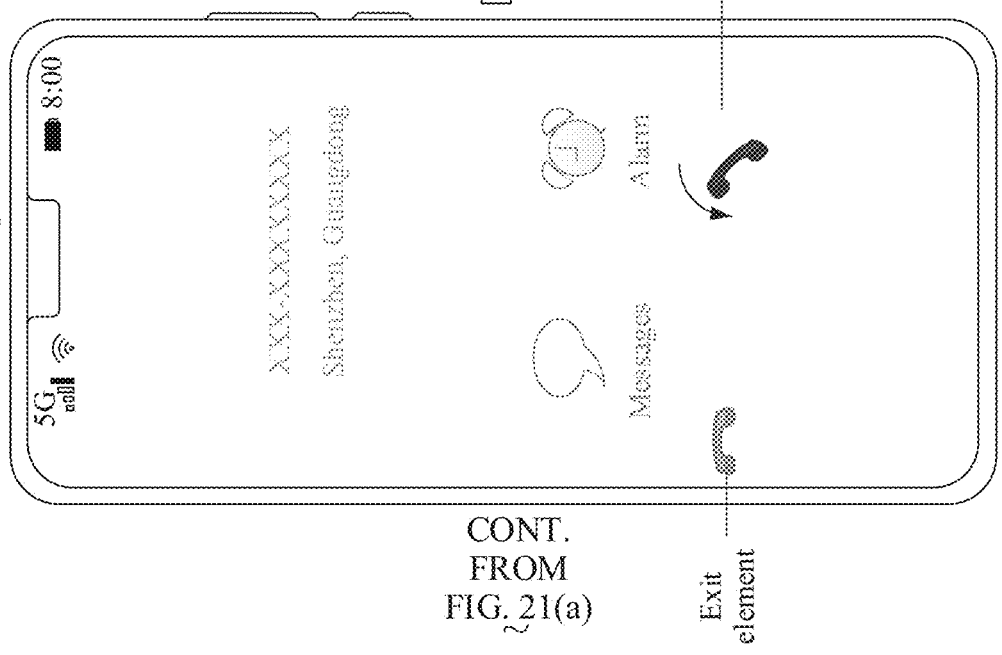
Figure 21C:
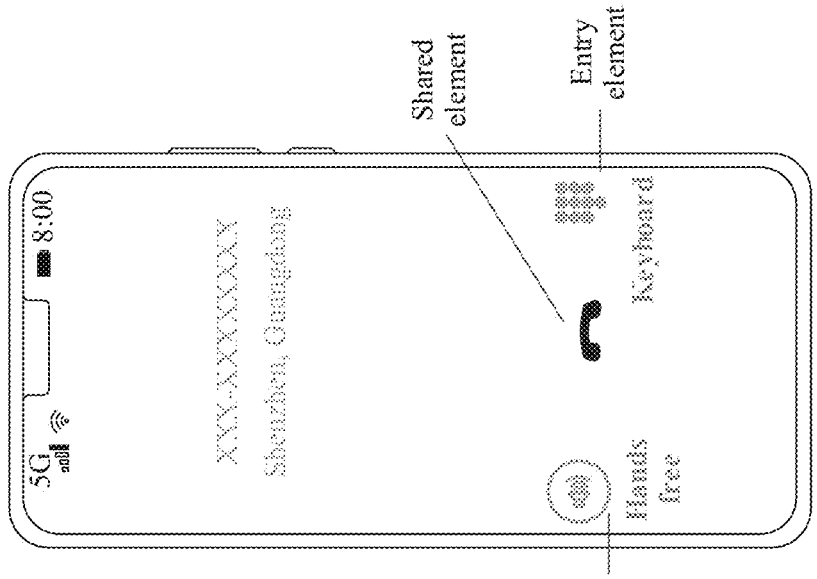
Figure 21C:
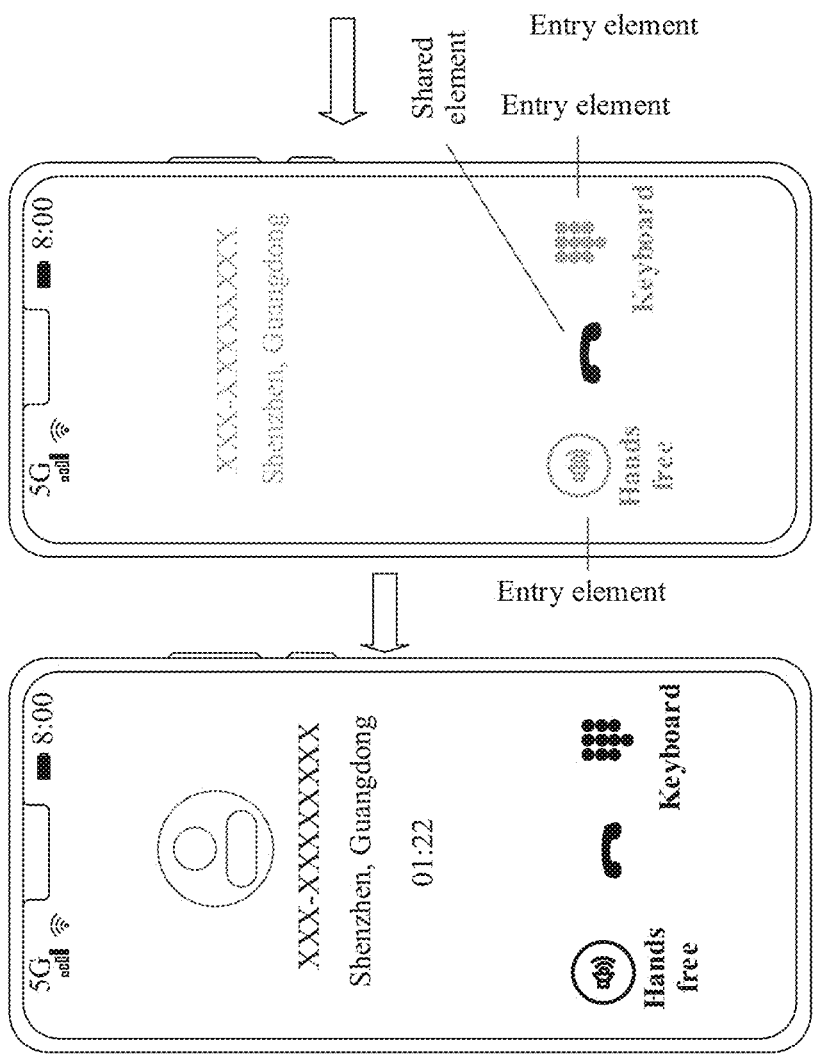

Case 1: Intra-Application Conversion:

As shown in FIG. 21(a) to FIG. 21(c), in this embodiment of this application an example of an effect of intra-application conversion based on at least two Fragments is provided by using a call application as an example.

In this embodiment of this application, corresponding ids may be set for an answer key and a hang-up key in an answer button, and a use status of the call application is determined based on an answer or hang-up instruction triggered by the user.

For example, as shown in Table 5, a configuration file applied in this embodiment of this application is as follows:

| Name | Implication | Parameter | Scenario |
| --- | --- | --- | --- |
| Abstract_Call (call application) | Abstract class (where the conversion object is the call application) | None | Entry, exit, and shared |
| Fade_ExitAnimNode | Fade-out effect animation | | Exit |
| FadeIn_EnterAnimNode | Fade-in effect animation | | Entry |
| Abstract_Share_ answer key | Abstract class (where the shared element is the hang-up key) | After the user triggers the answer instruction, the answer key is determined as a shared element | Shared |
| Rotate_ ShareNode | Rotational dynamic effect | 90 degrees counterclockwise | Shared |
| Discolor_ ShareNode | Color-change dynamic effect | White to black | Shared |
| Displacement_ Share Node | Relative displacement dynamic effect | From left to right | Shared |

It is assumed that when inter-interface conversion is performed, an exit interface and an entry interface of the call application are shown in FIG. 21(a) to FIG. 21(c). It may be learned from the exit interface of the call application that the exit interface includes an answer key icon and a hang-up key icon.

When the call application starts the inter-interface conversion solution, in a process of switching from the exit interface to the entry interface, if the user triggers the answer instruction, the answer key is a shared element.

It may be learned from the content in Table 5 that when the answer key icon is a shared element, in a conversion process, anticlockwise rotation of 270 degrees, rightward movement, and color conversion are executed. In this case, the exit element is the hang-up key icon, and when interface conversion is performed, the fade-out dynamic effect is executed. The entry elements are a hands-free icon and a keyboard icon, and when interface conversion is performed, the fade-in dynamic effect is executed.

It should be noted that, in this embodiment of this application, the answer key is used as a shared element, and after dynamic effect conversion is executed, a presentation form of the answer key is similar to that of the hang-up key used as an exit element, but an icon of the answer key is different from that of the hang-up key used as an exit element on the switching interface.

Therefore, a rotational animation effect is presented in the interface conversion process.

Case 2: Inter-Application Conversion:

The following describes, by using an example in which the user needs to switch to a messages application when using a call application, the method for performing inter-interface conversion based on a single-shot effect provided in this embodiment of this application.

It is assumed that when the user configures the inter-interface conversion solution between the call application and the messages application, an answer button in the call application is used as a shared element, and continuously exists in the conversion process.

Figures 22A, 22B:
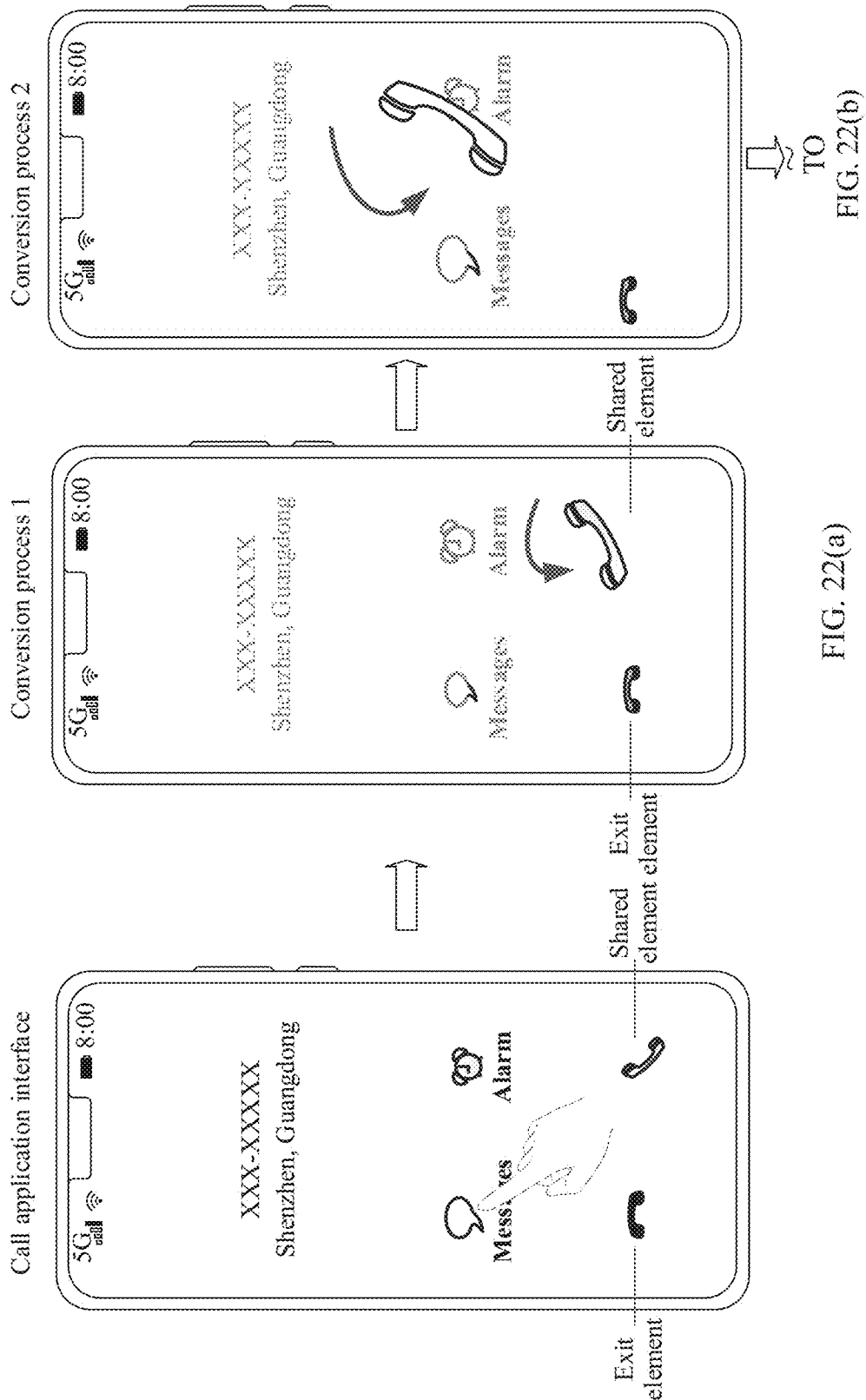
FIG. 22(a) and FIG. 22(b) are schematic diagrams of a first inter-application conversion effect according to Embodiment 1 of this application.
Figure 22B:
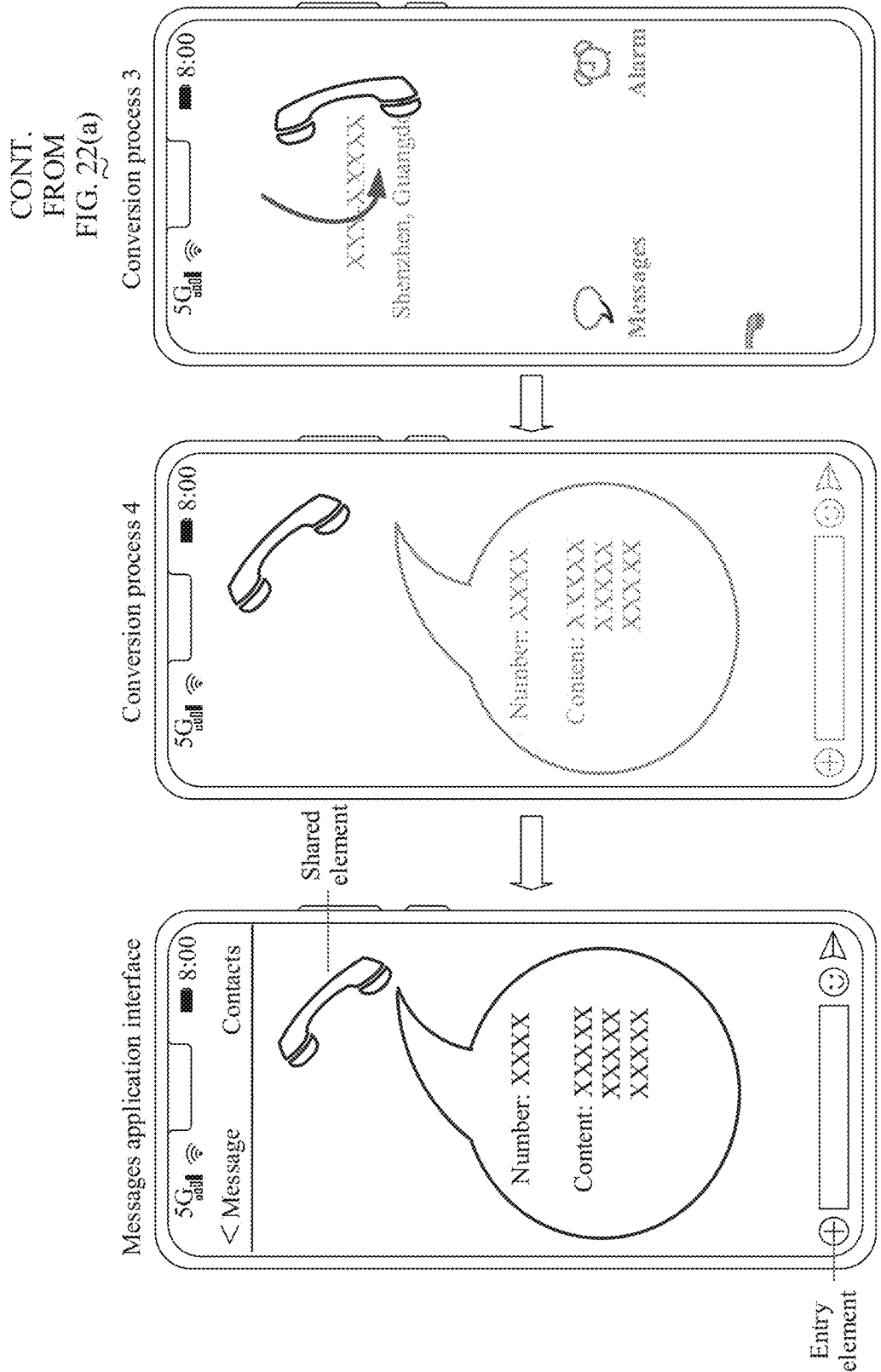

For example, as shown in FIG. 22(a) and FIG. 22(b), when the user taps a messages button on a call interface, the call application and the messages application are triggered to perform interface conversion. After the call application jumps to the messages application, the answer button of the call application continuously exists. In addition, the answer button executes an amplification effect, a bubble window appears, and an SMS message editing interface is displayed for editing an SMS message. After the SMS message is edited, the answer button is tapped, the answer button executes a rotation and scaling-down dynamic effect, and the call interface is displayed.

Case 3: Desktop-to-Application Conversion:

The following describes, by using an example in which the user needs to switch from an application desktop to a call application, the method for performing inter-interface conversion based on a single-shot effect provided in this embodiment of this application.

It is assumed that when the user configures the inter-interface conversion solution between the application desktop and the call application, an answer button in the call application is used as a shared element, and continuously exists in the conversion process.

Figure 23A:
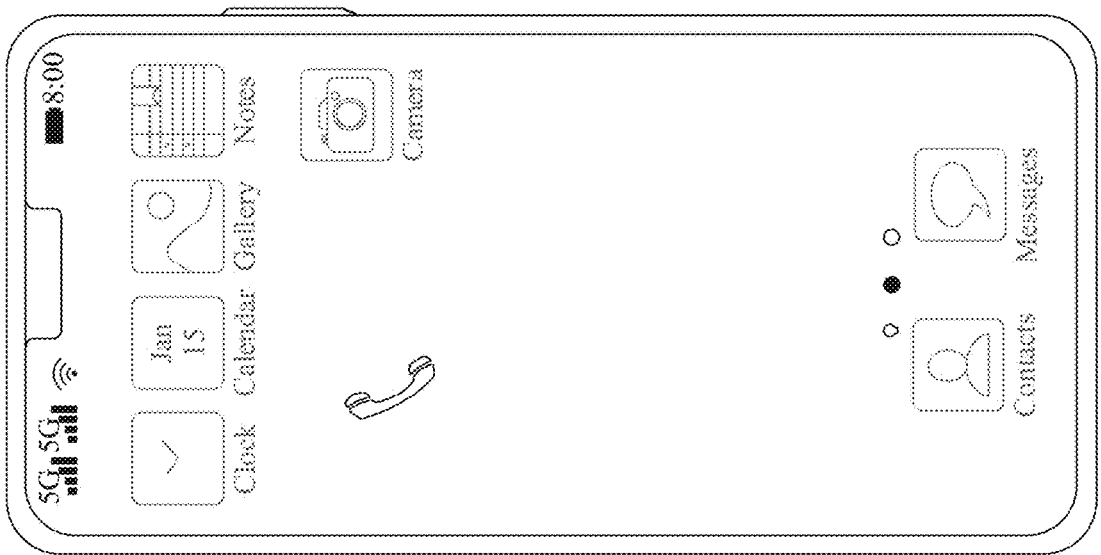
Figure 23A:
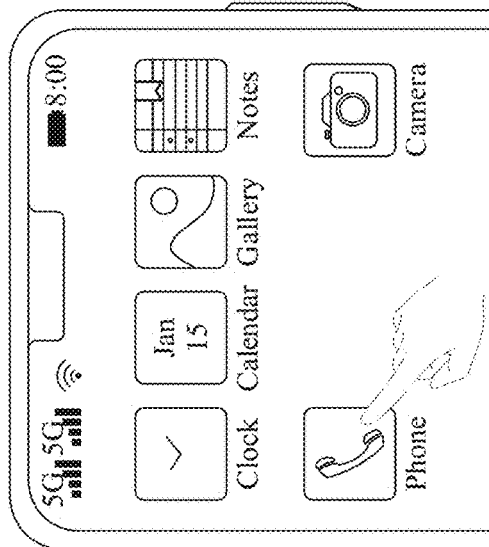
Figure 23C:
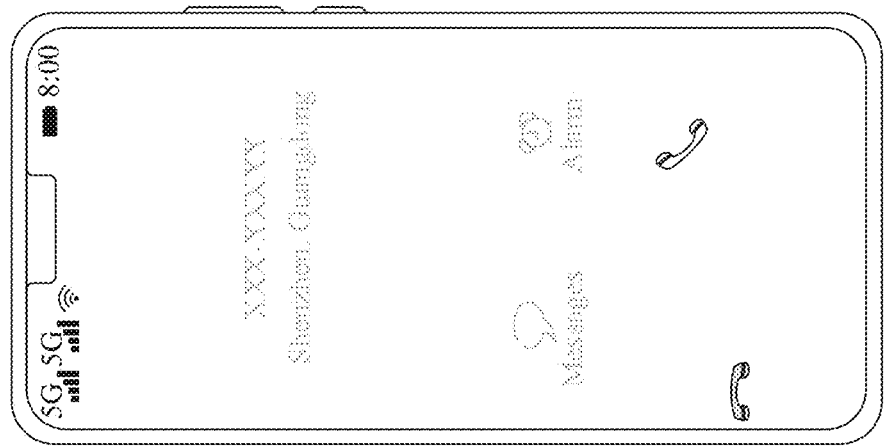
Figure 23C:
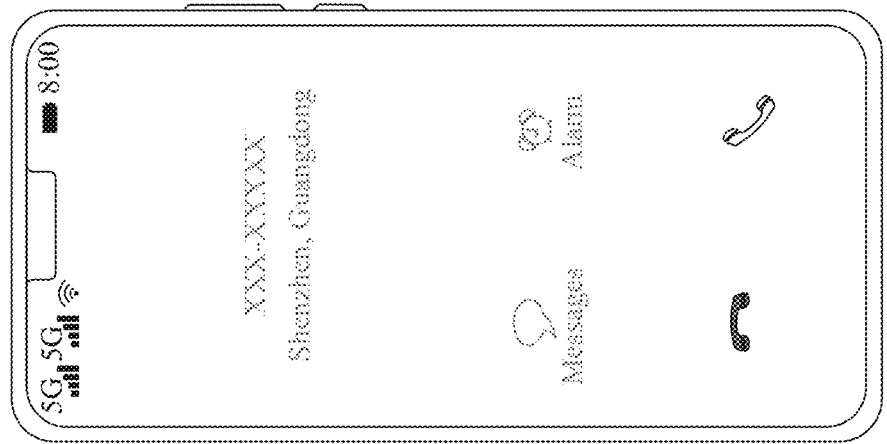
Figure 23C:
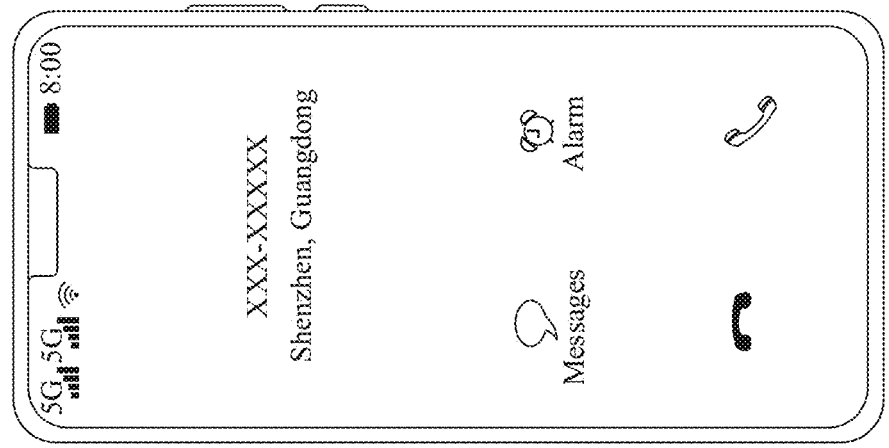
Figure 24A:
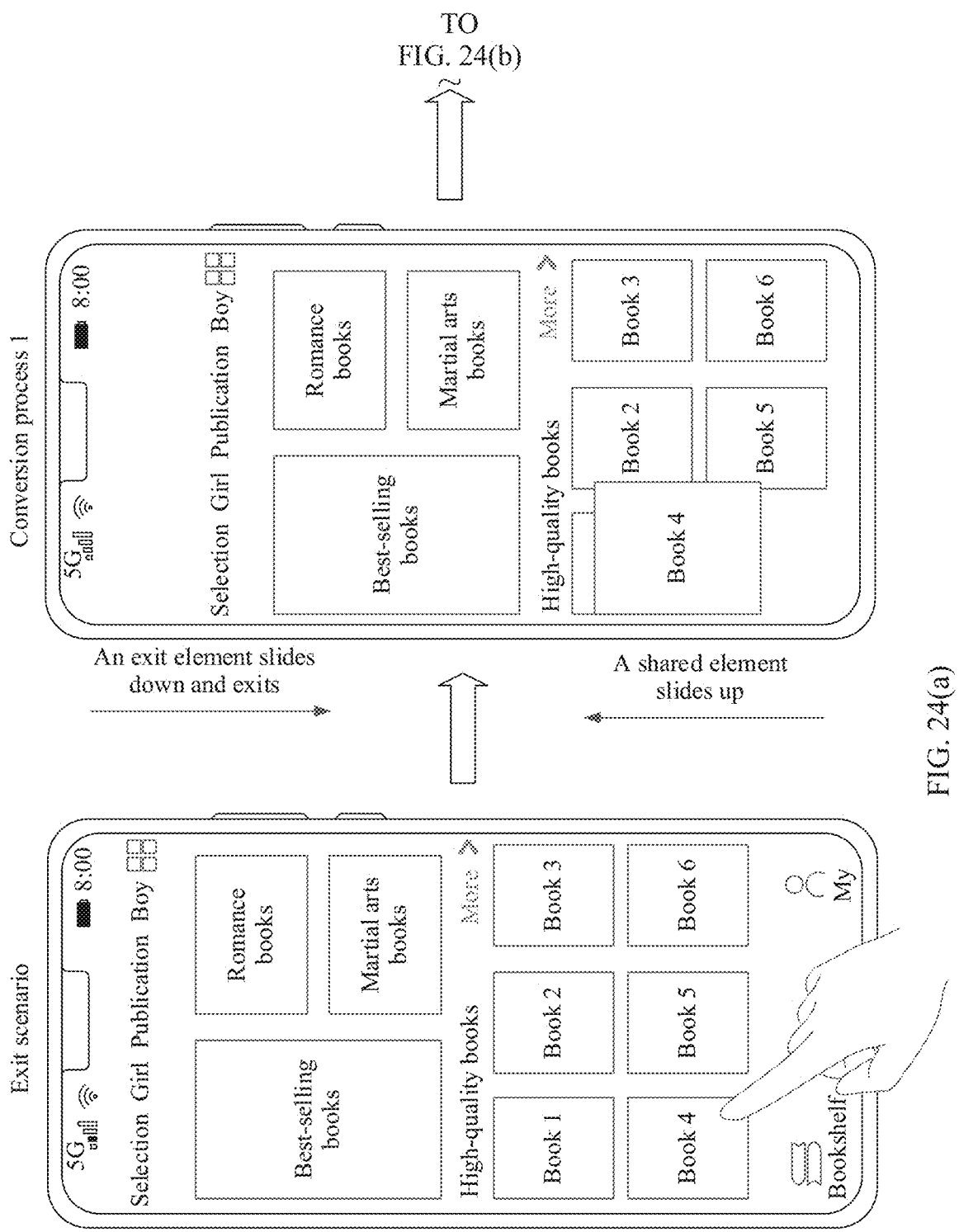
Figure 24C:
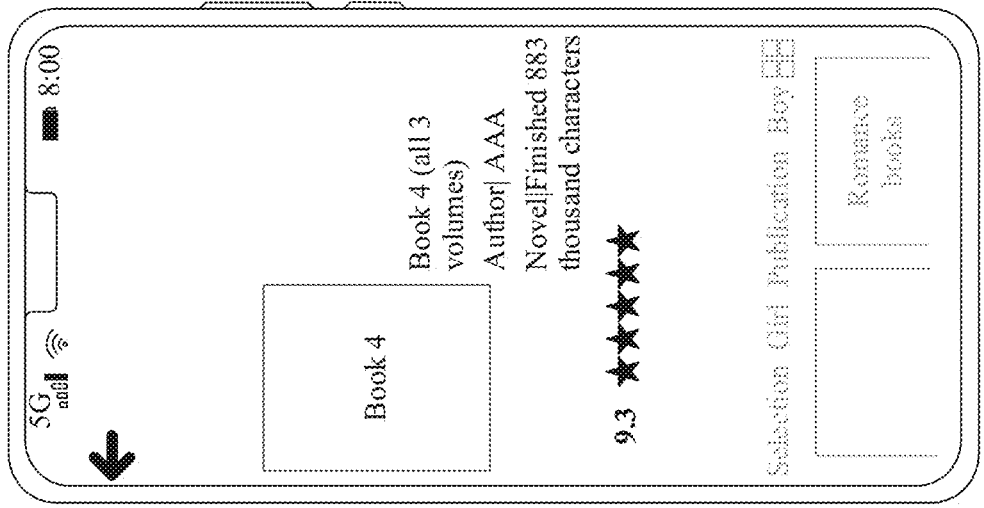
Figure 24D:
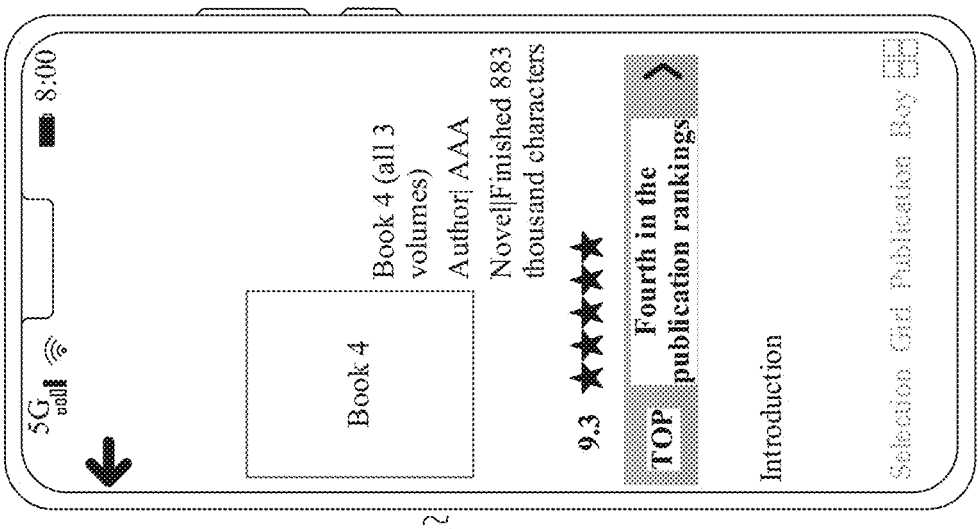
Figure 24D:
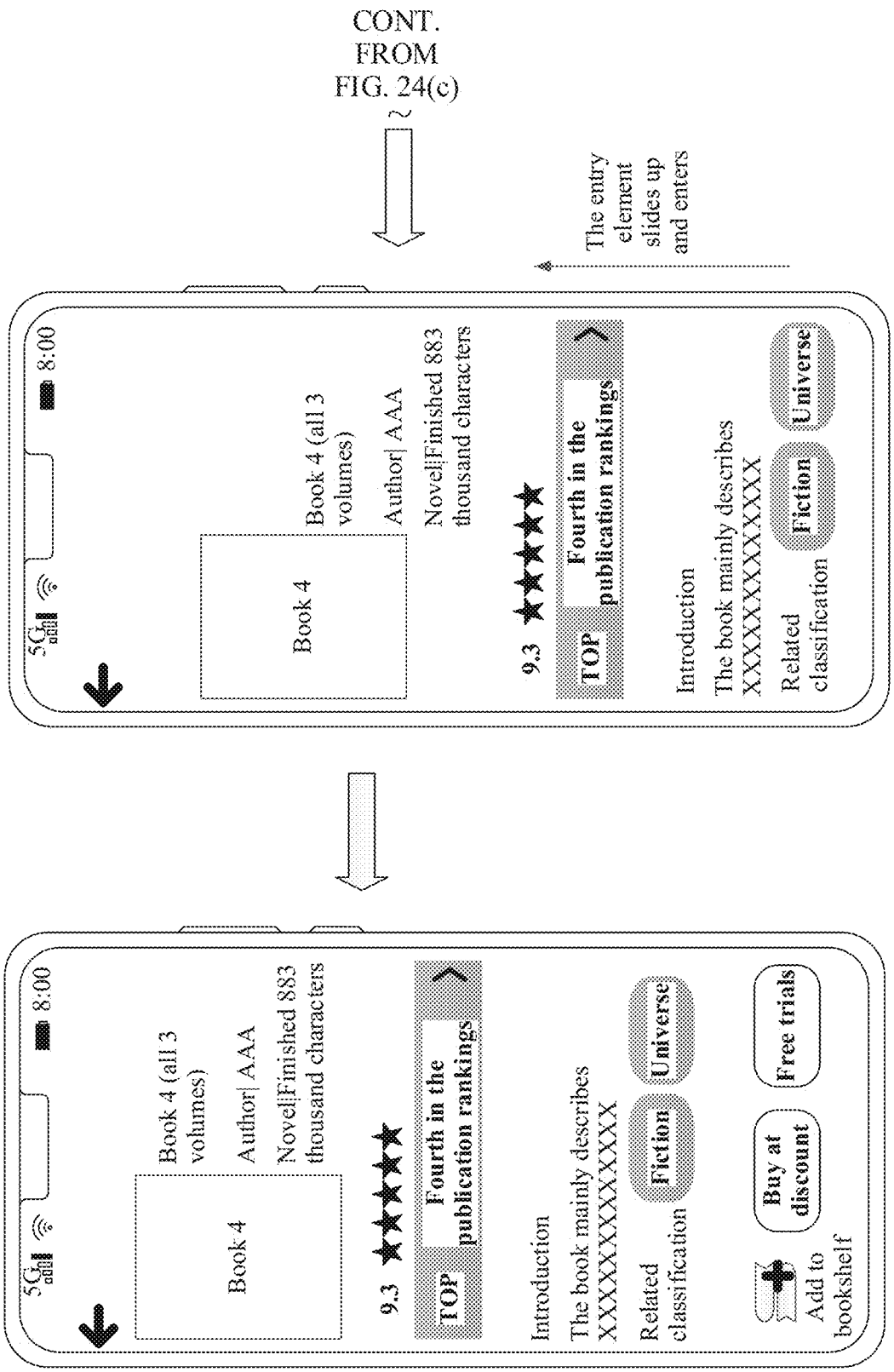
Figure 25A:
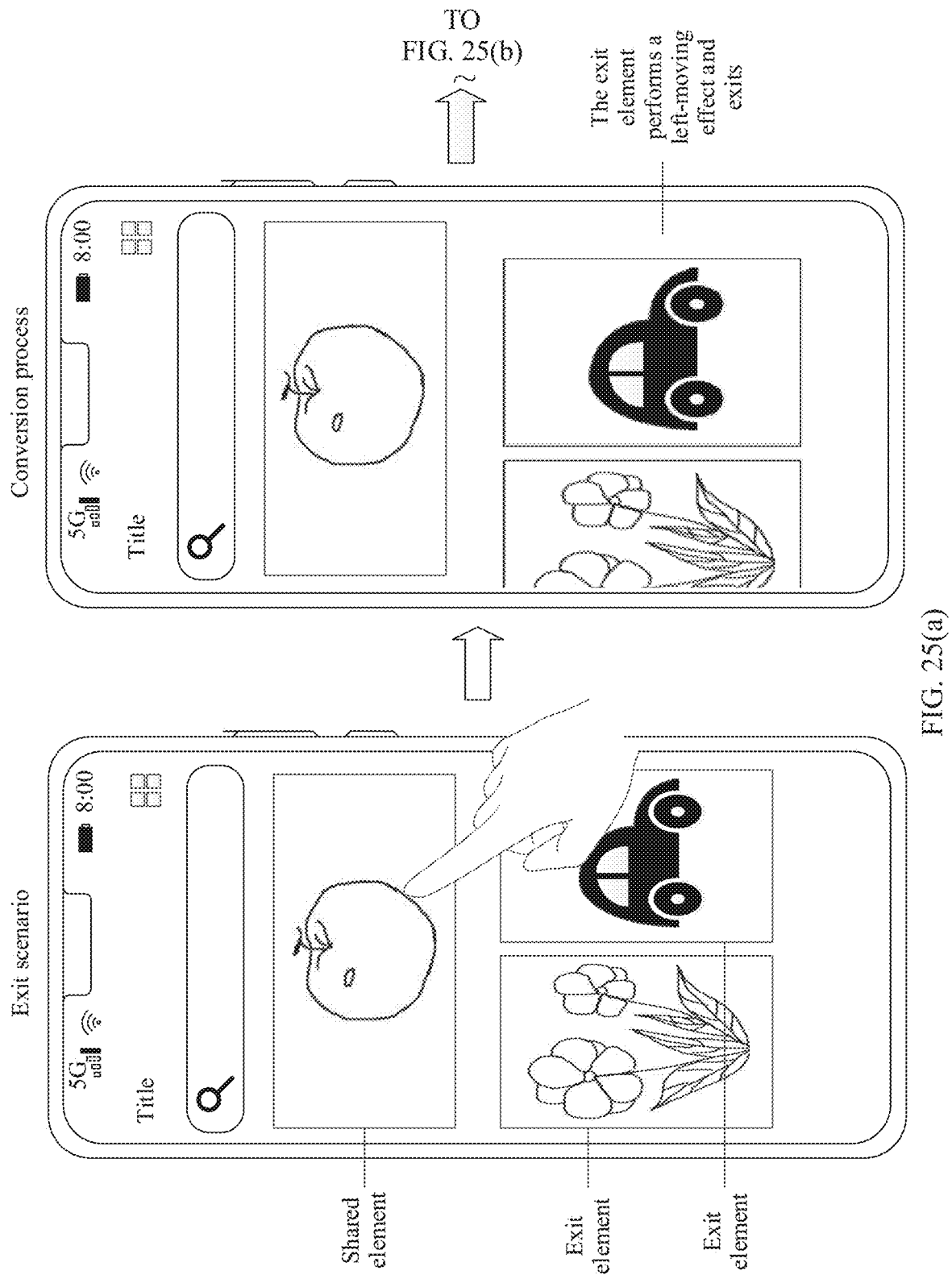
Figure 25C:
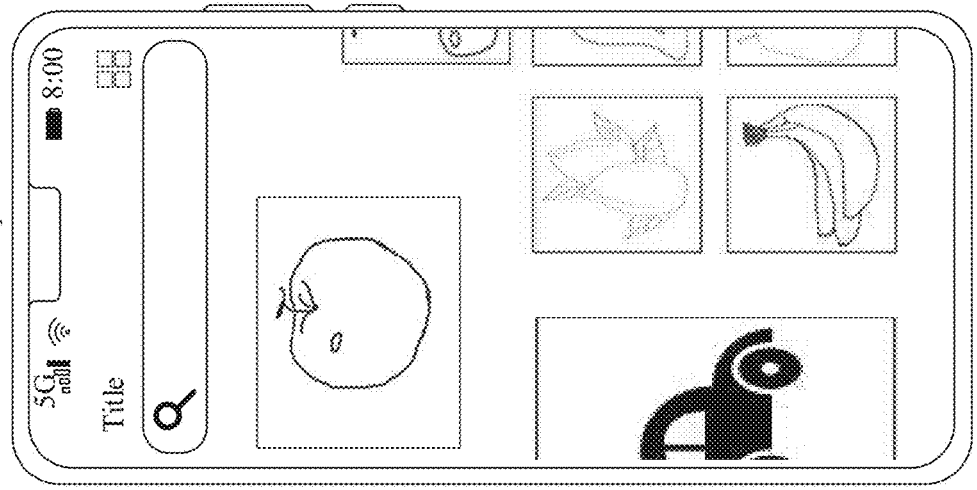
Figure 25D:
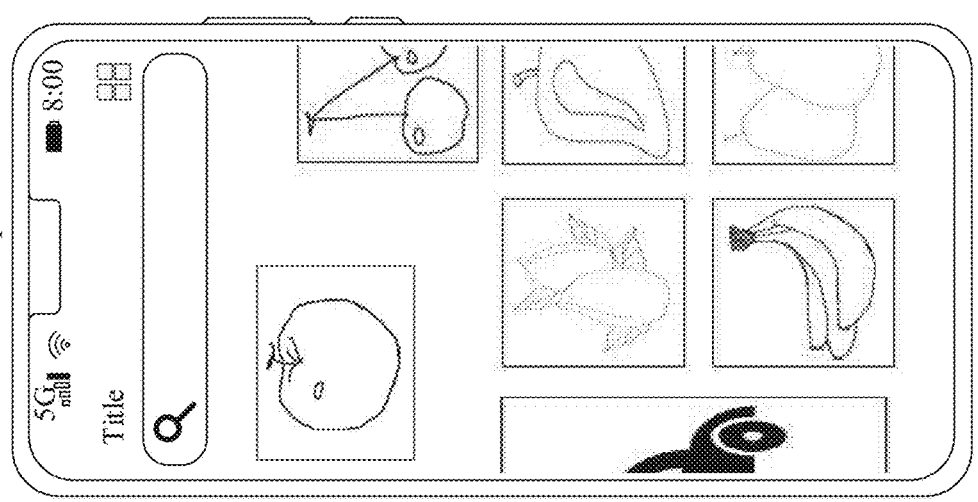
Figure 25D:
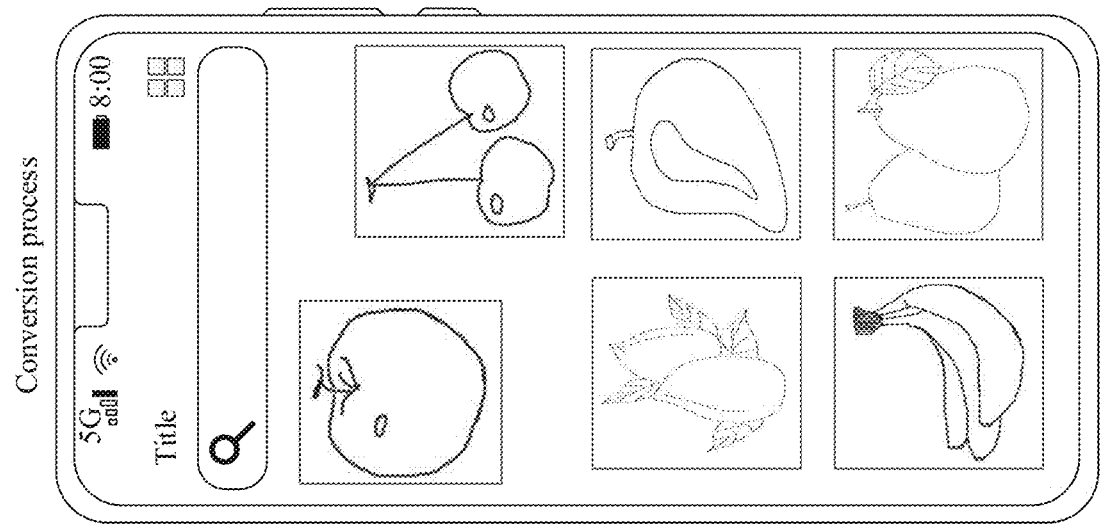
Figure 25D:
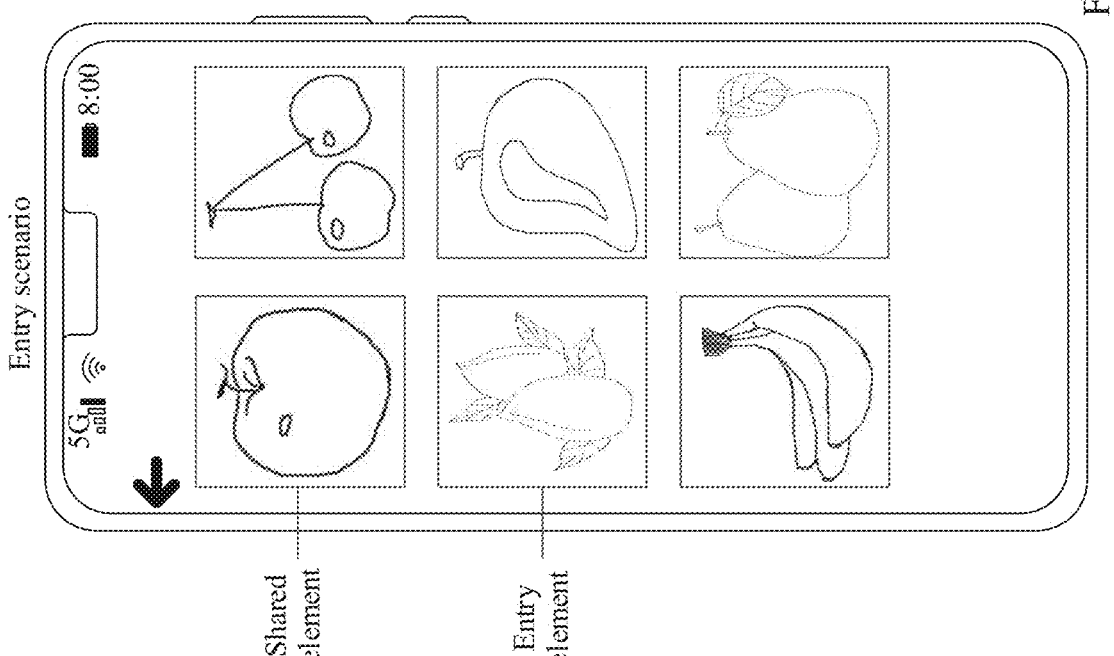
Figure 26A:
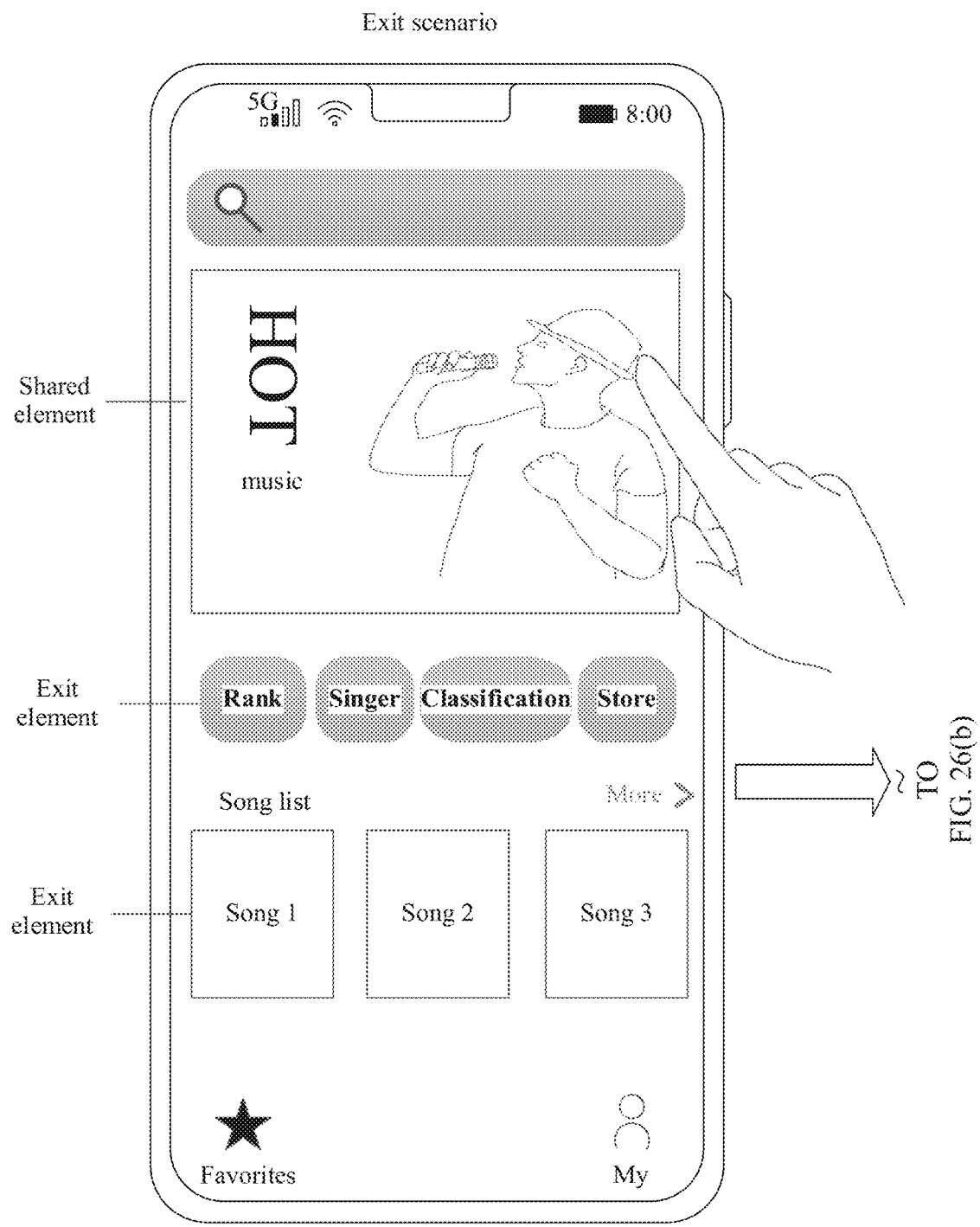
FIG. 26(a) to FIG. 26(g) are schematic diagrams of a first conversion effect of a music application according to Embodiment 1 of this application.
Figure 26B:
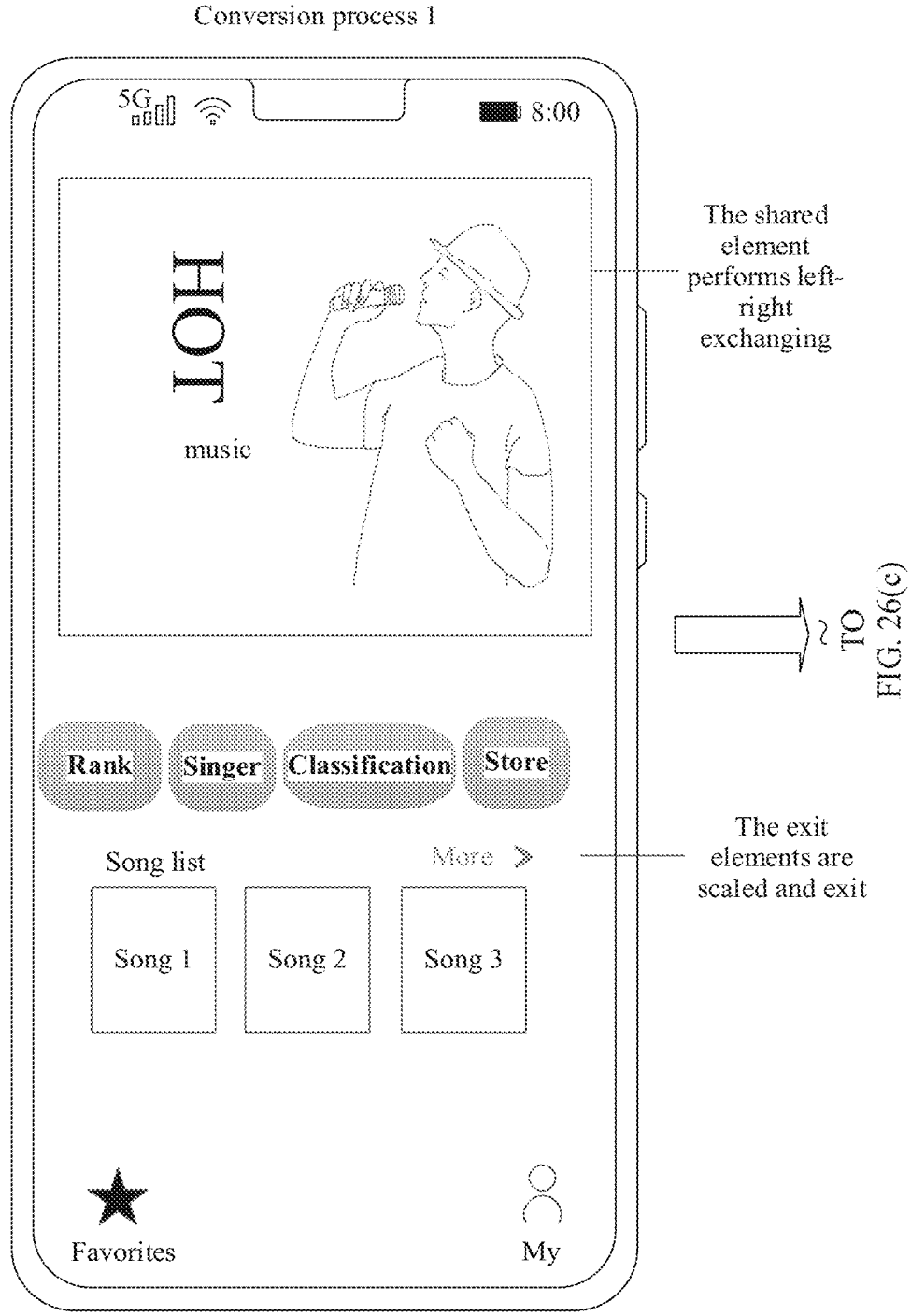
Figure 26C:
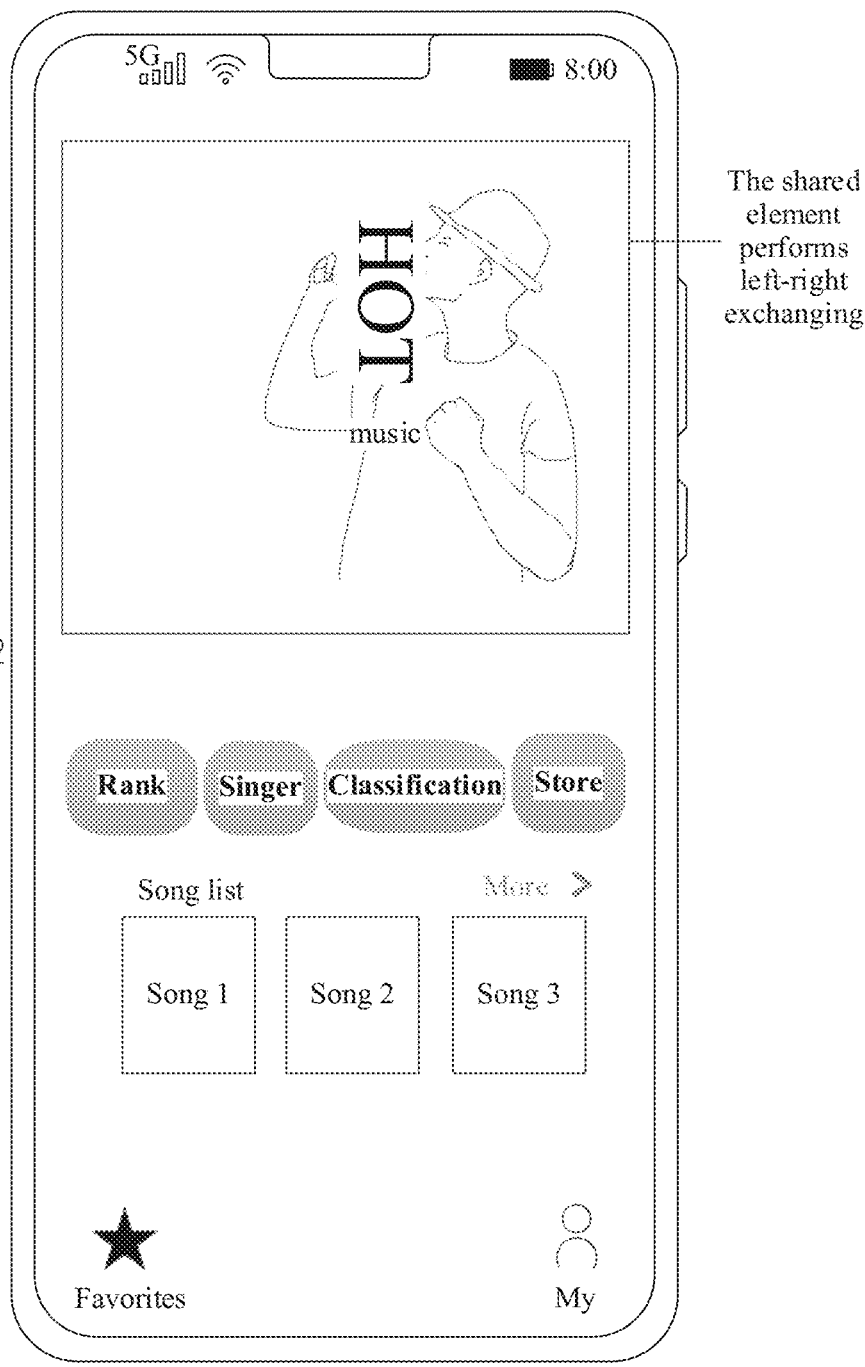
Figure 26D:
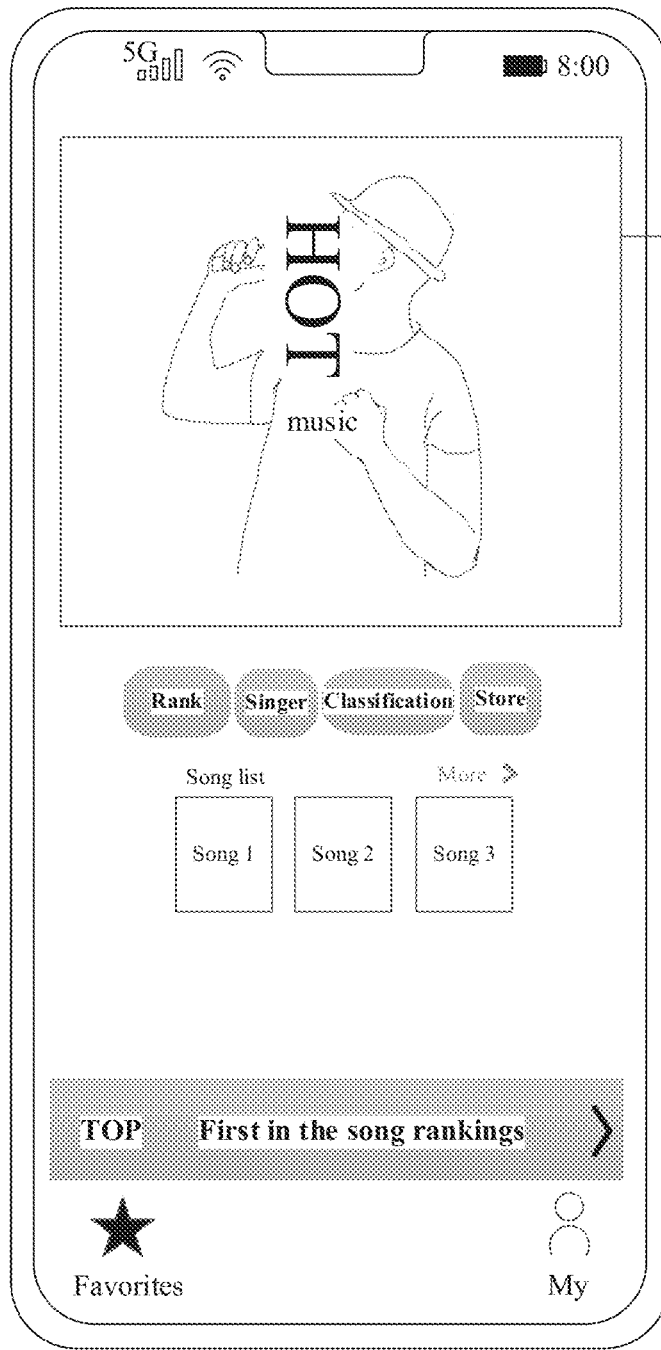
Figure 26E:
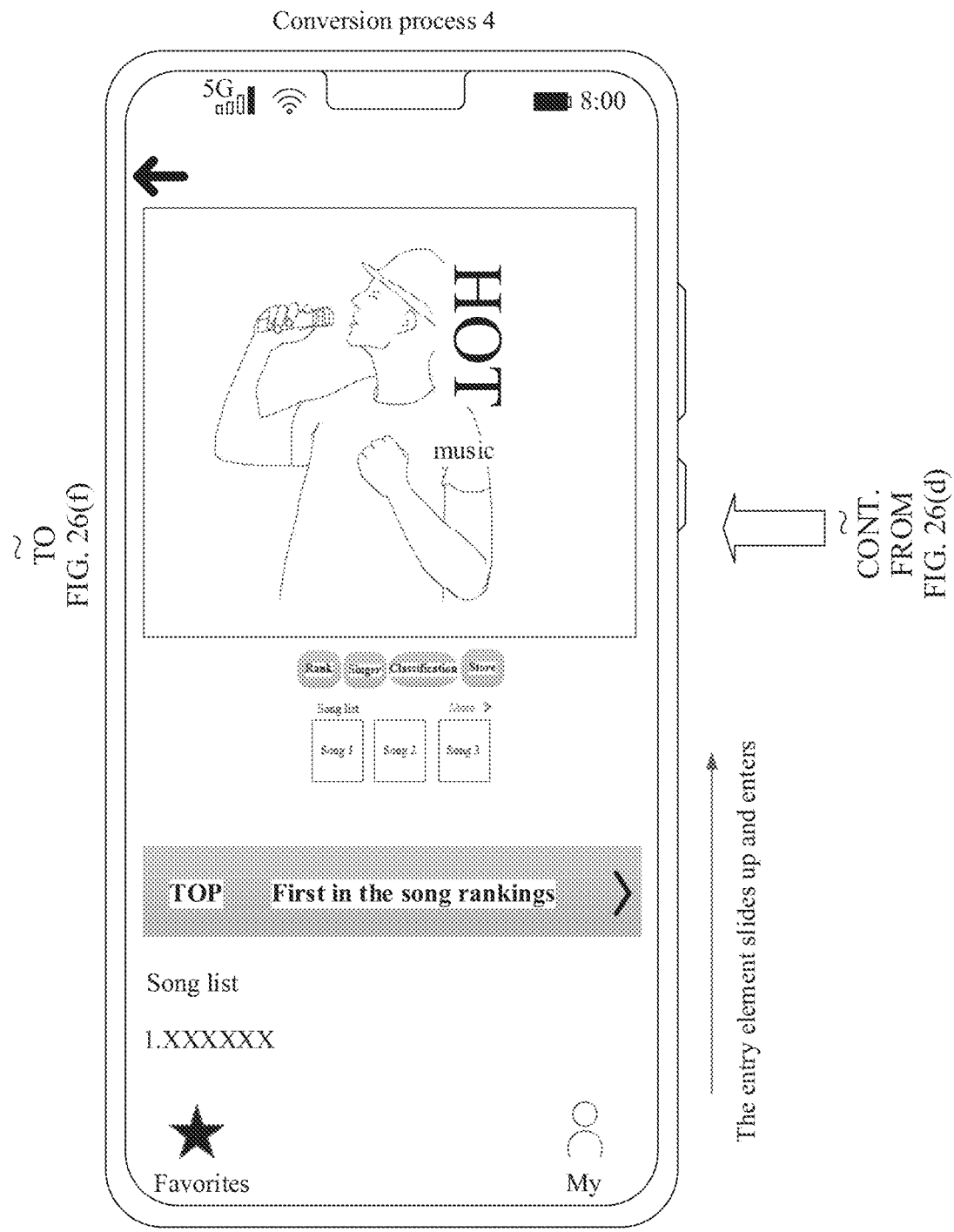
Figure 26F:
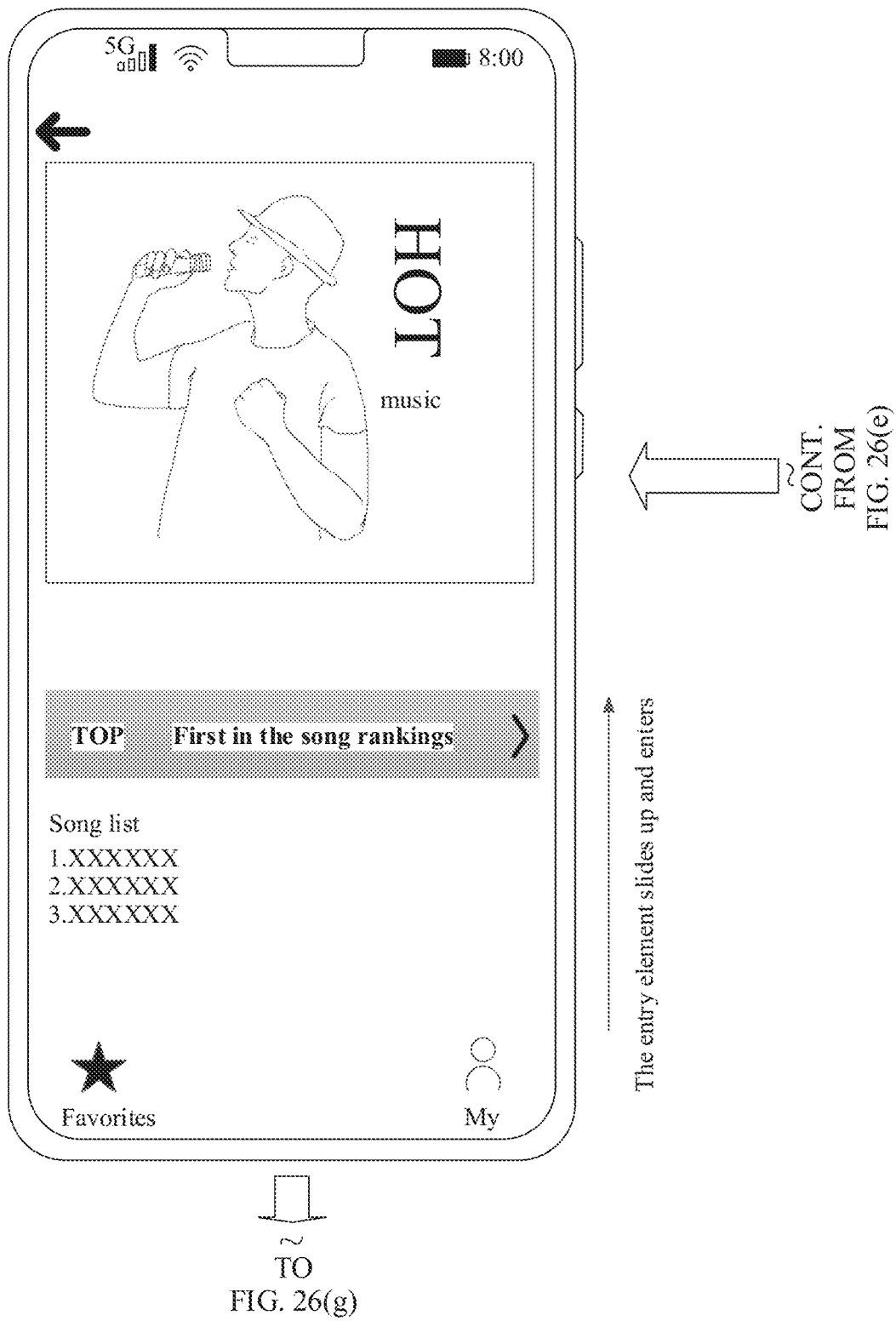
Figure 26G:
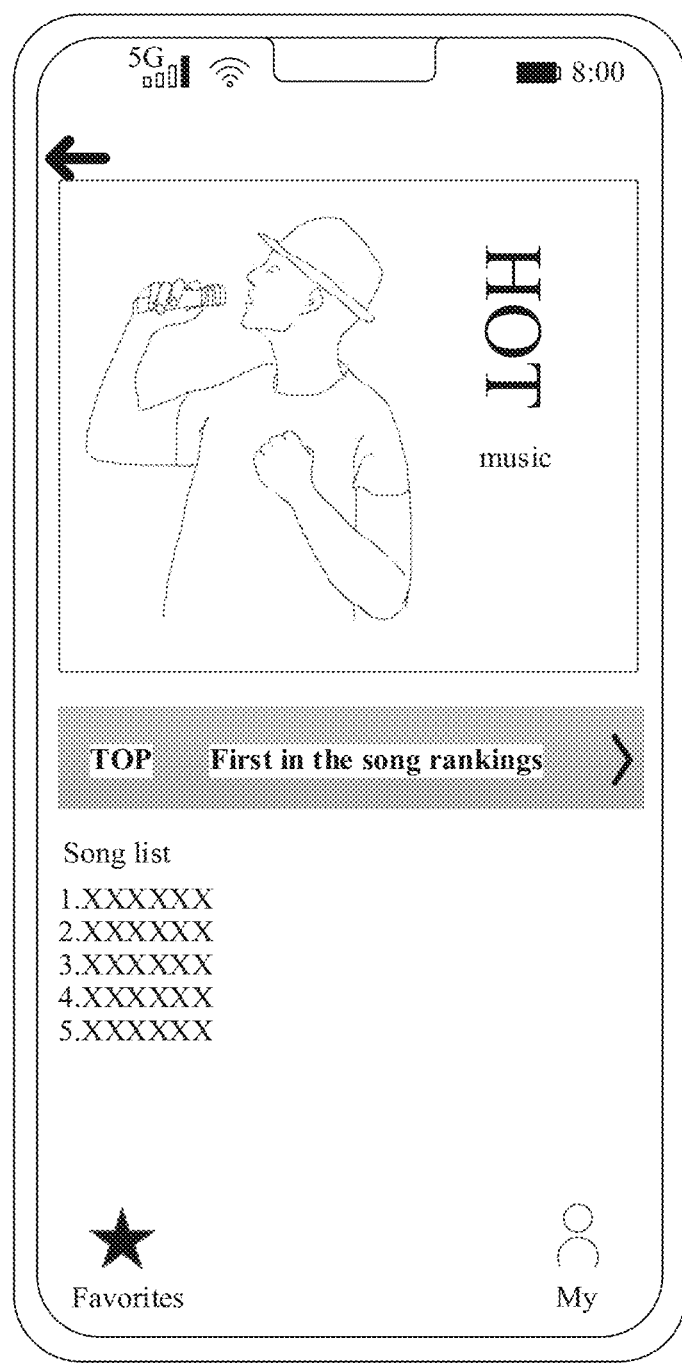
Figure 27A:
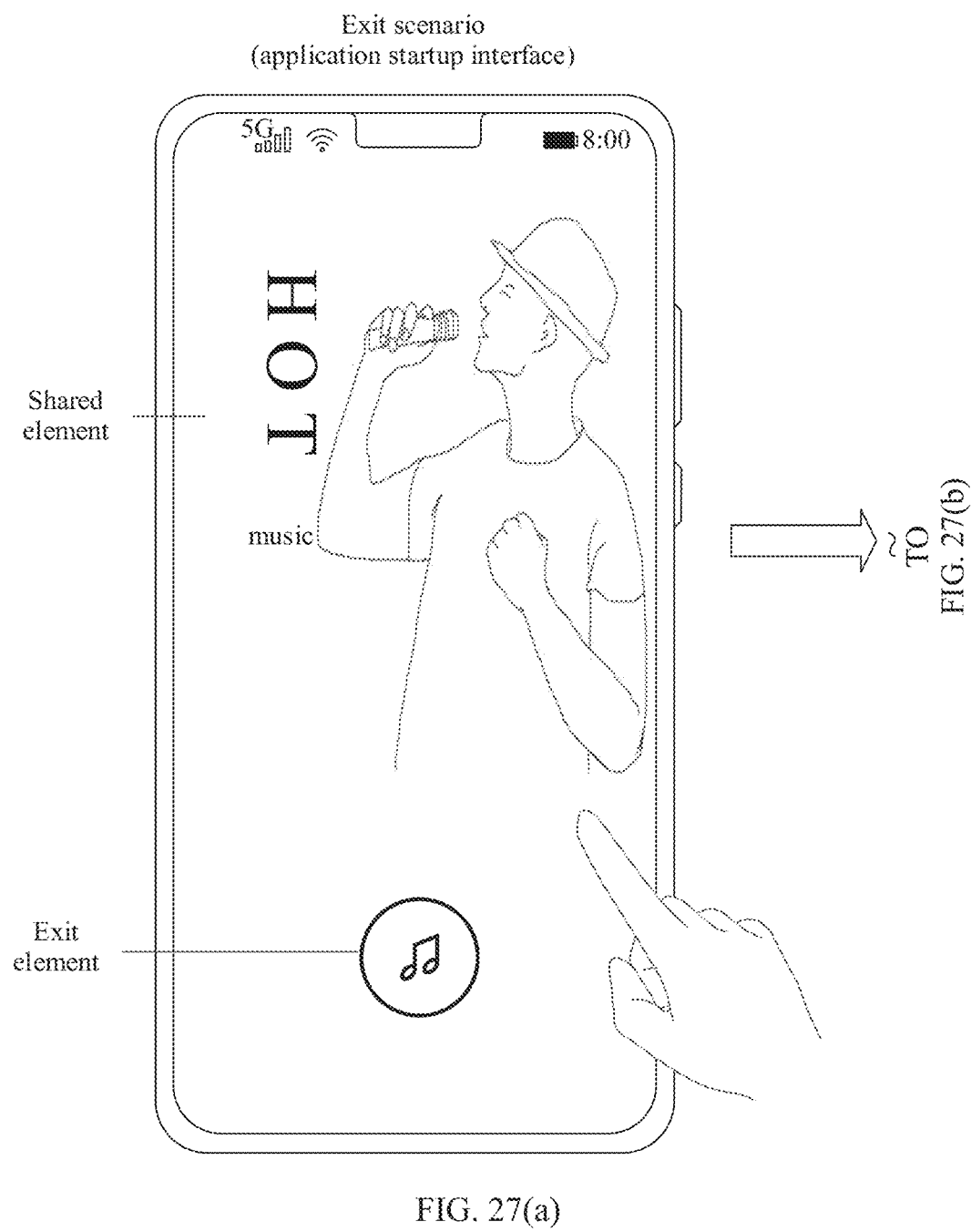
FIG. 27(a) to FIG. 27(f) are schematic diagrams of a second conversion effect of a music application according to Embodiment 1 of this application.
Figure 27B:
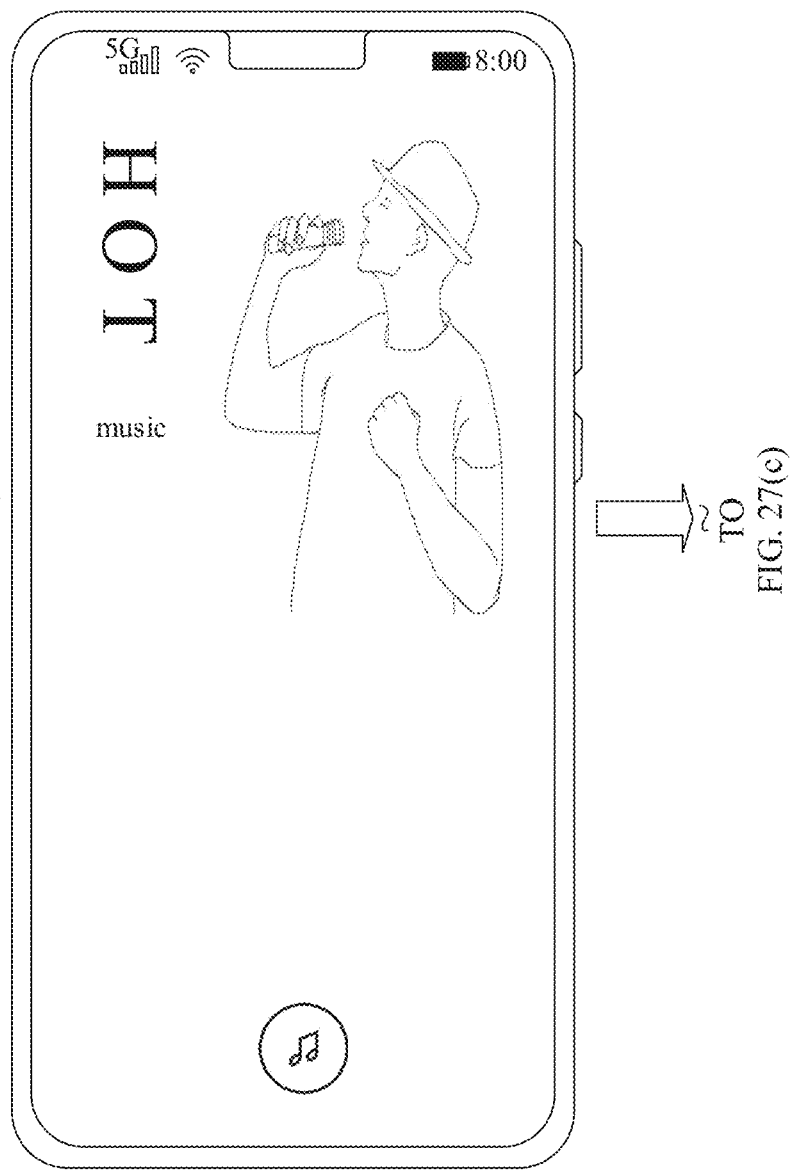
Figure 27C:
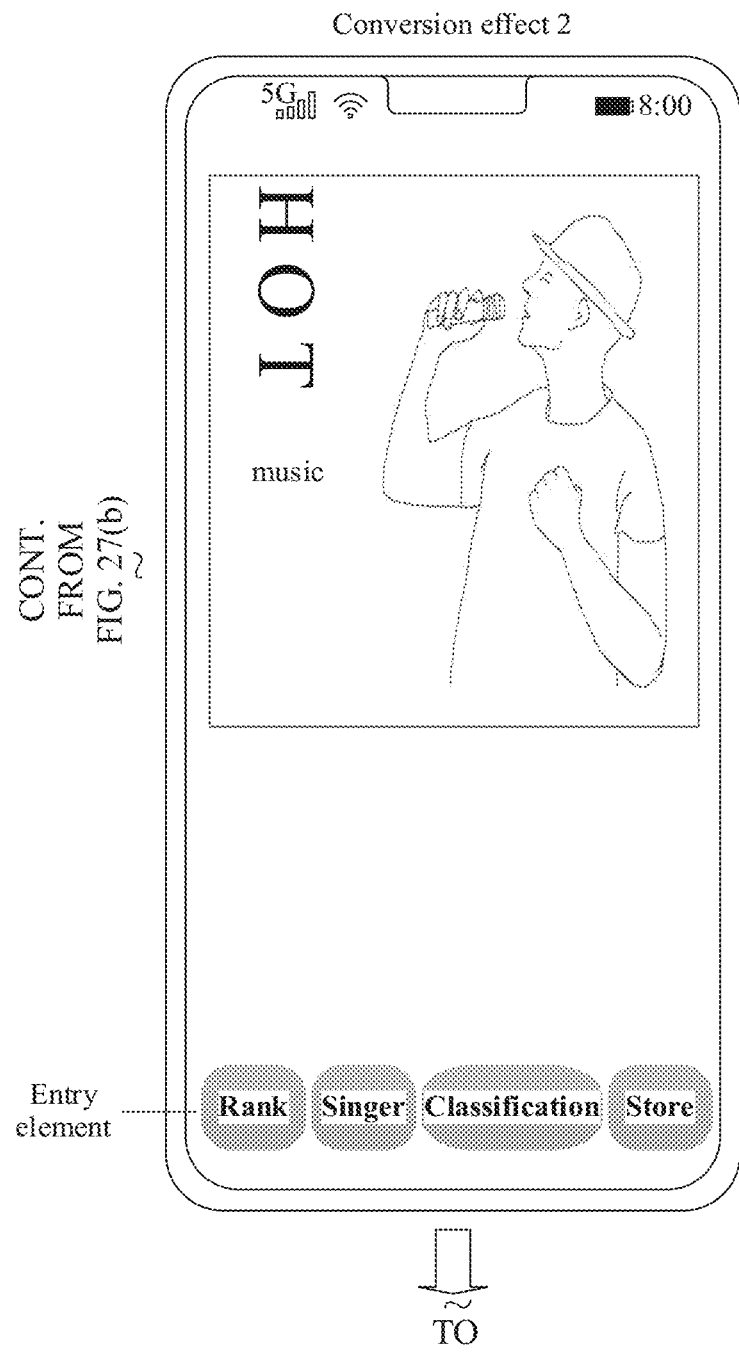
Figure 27D:
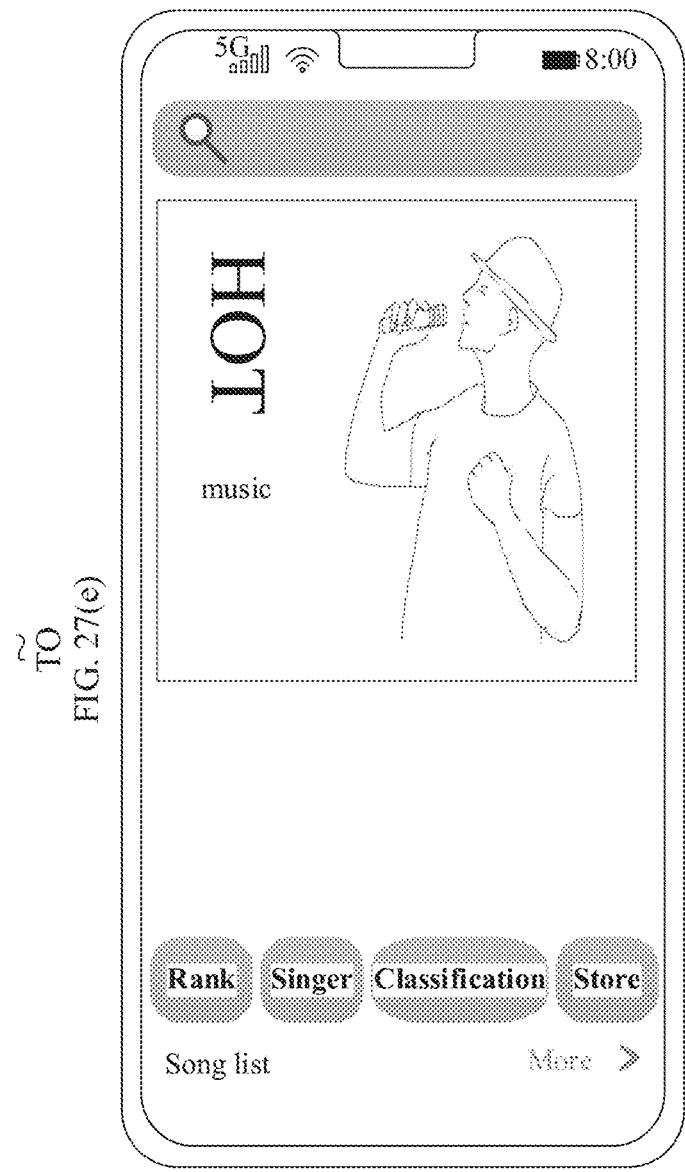
Figure 27E:
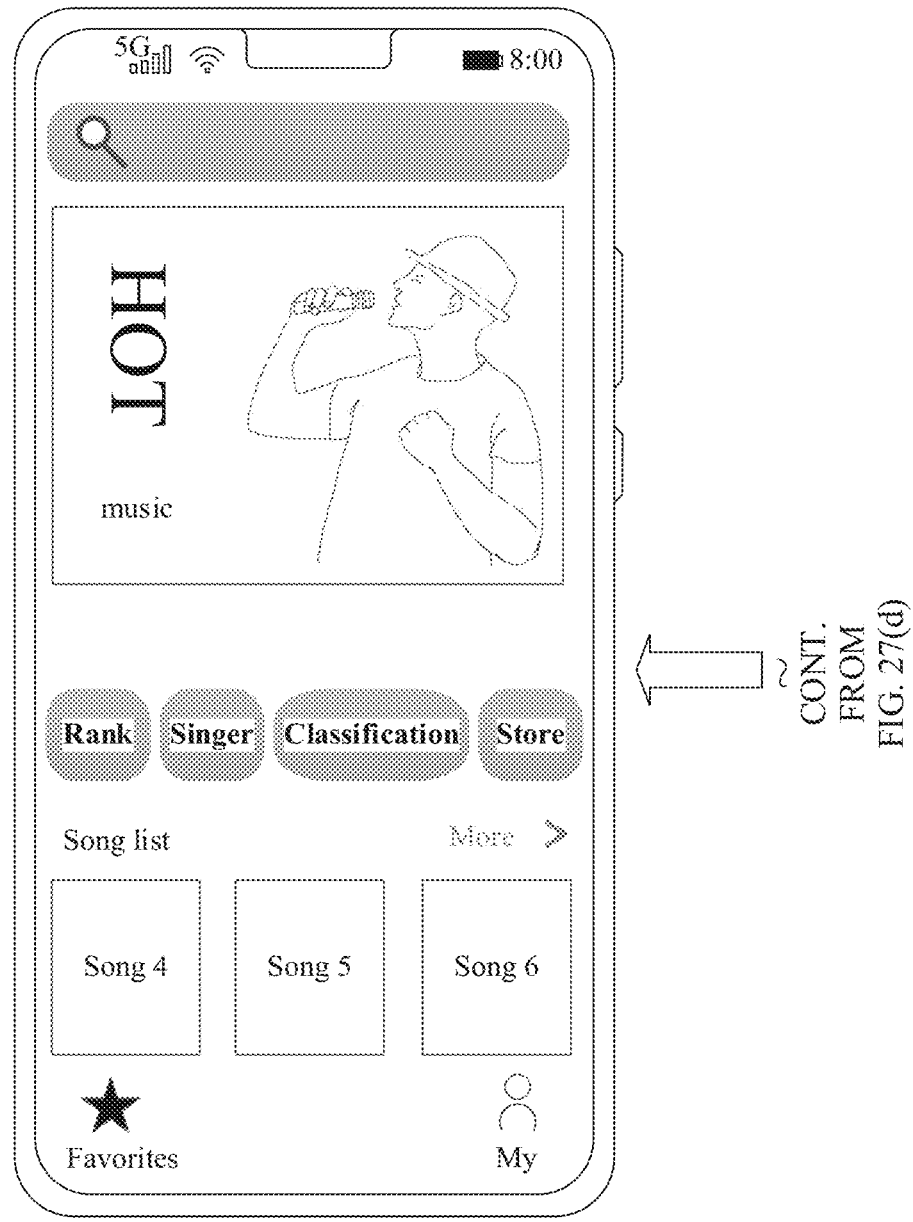
Figure 27F:
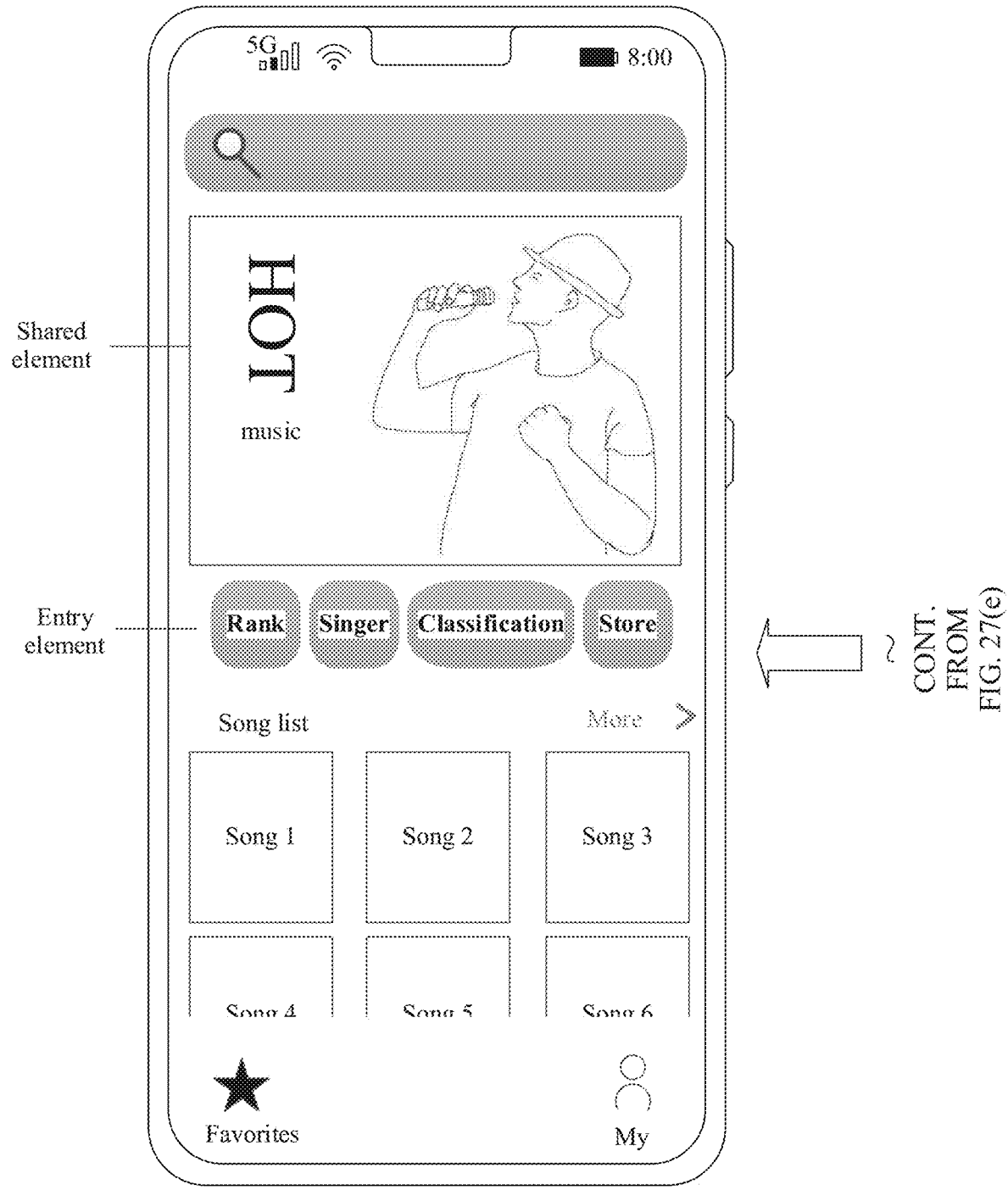
Figure 28A:
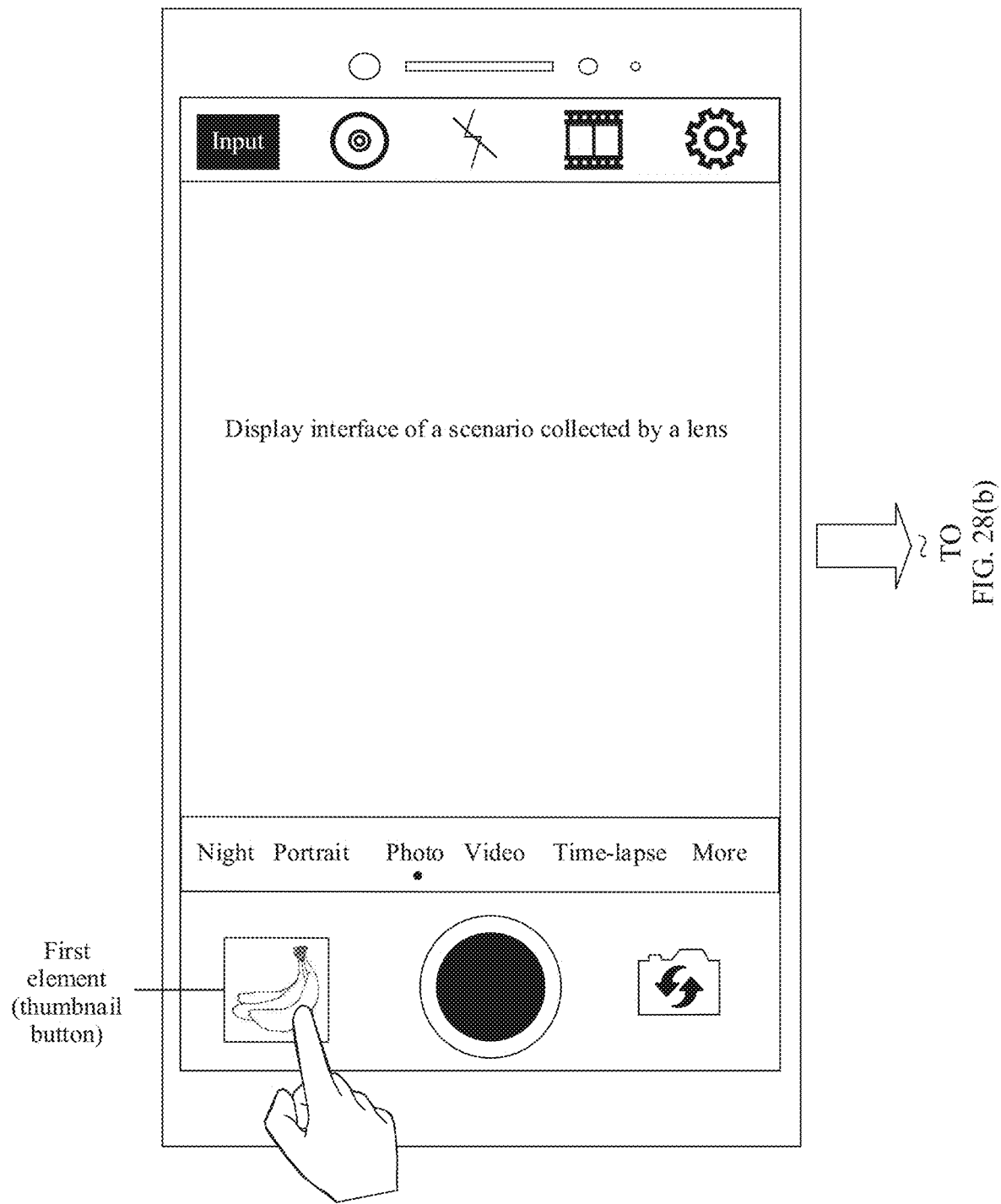
FIG. 28(a) to FIG. 28(f) are schematic diagrams of a second inter-application conversion effect according to Embodiment 1 of this application.
Figure 28B:
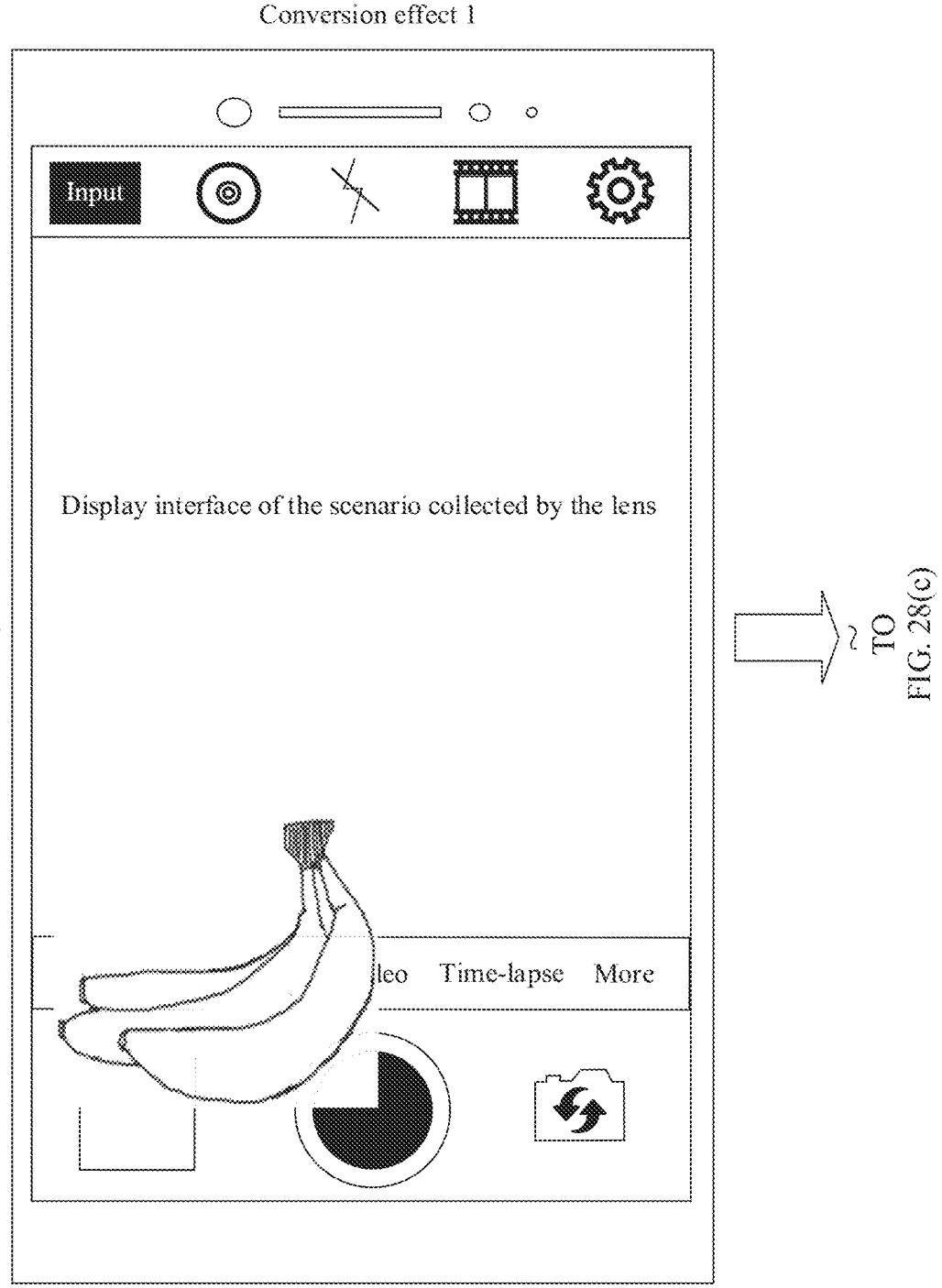
Figure 28C:
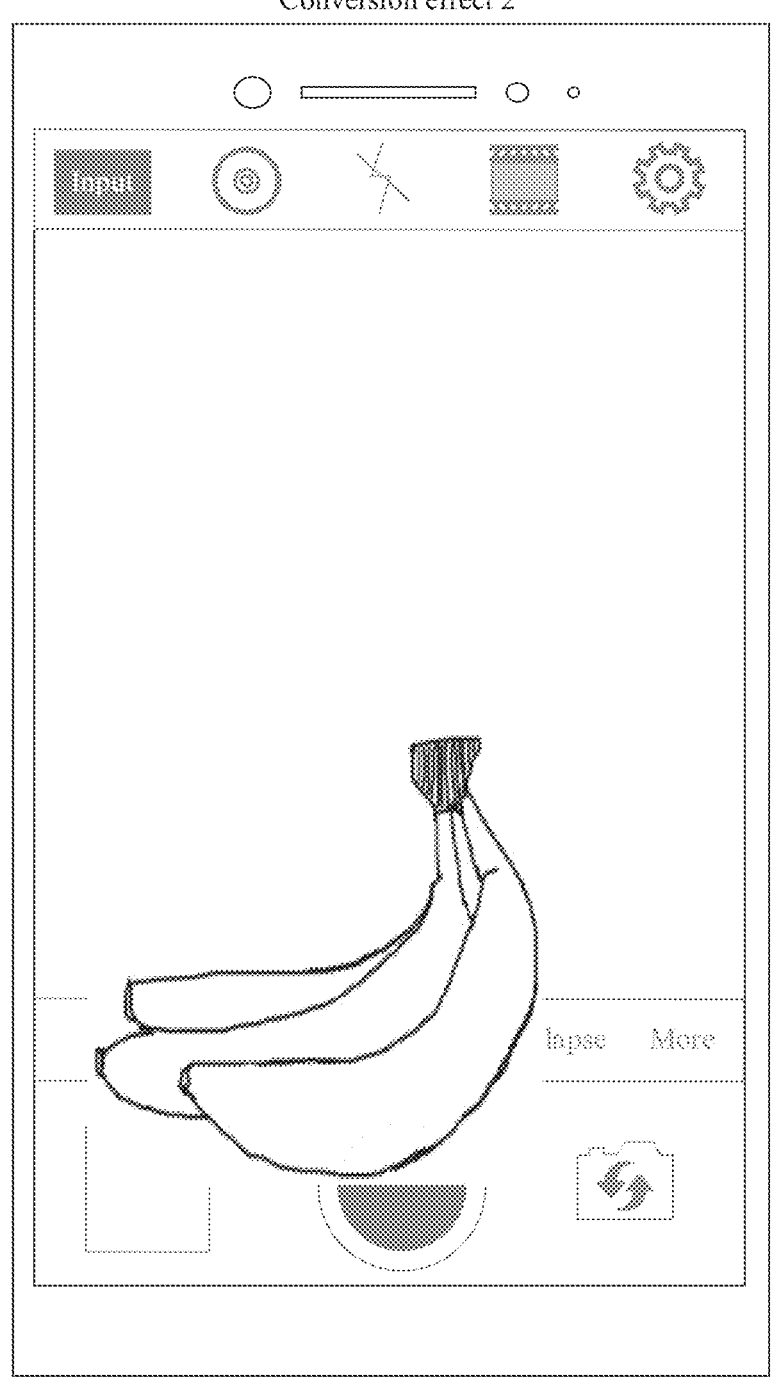
Figure 28D:
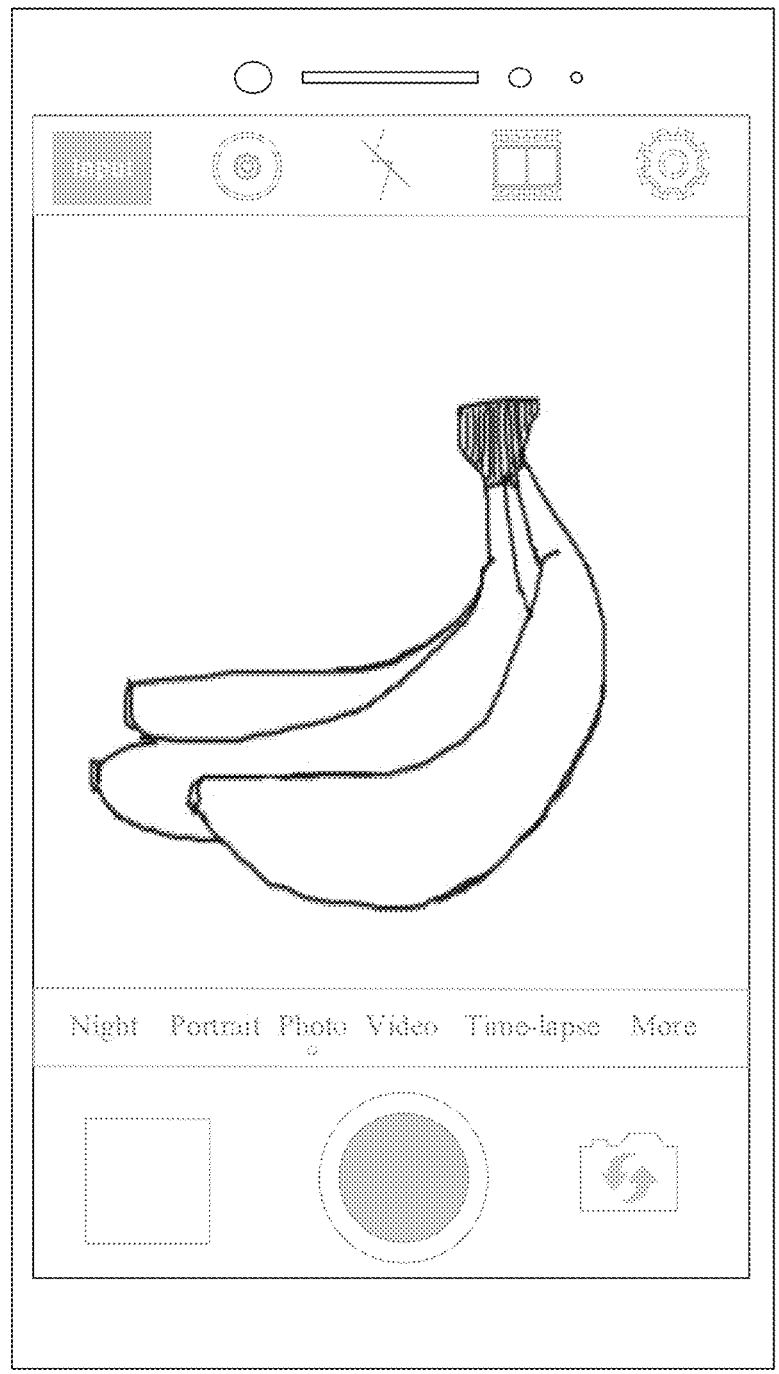
Figure 28E:
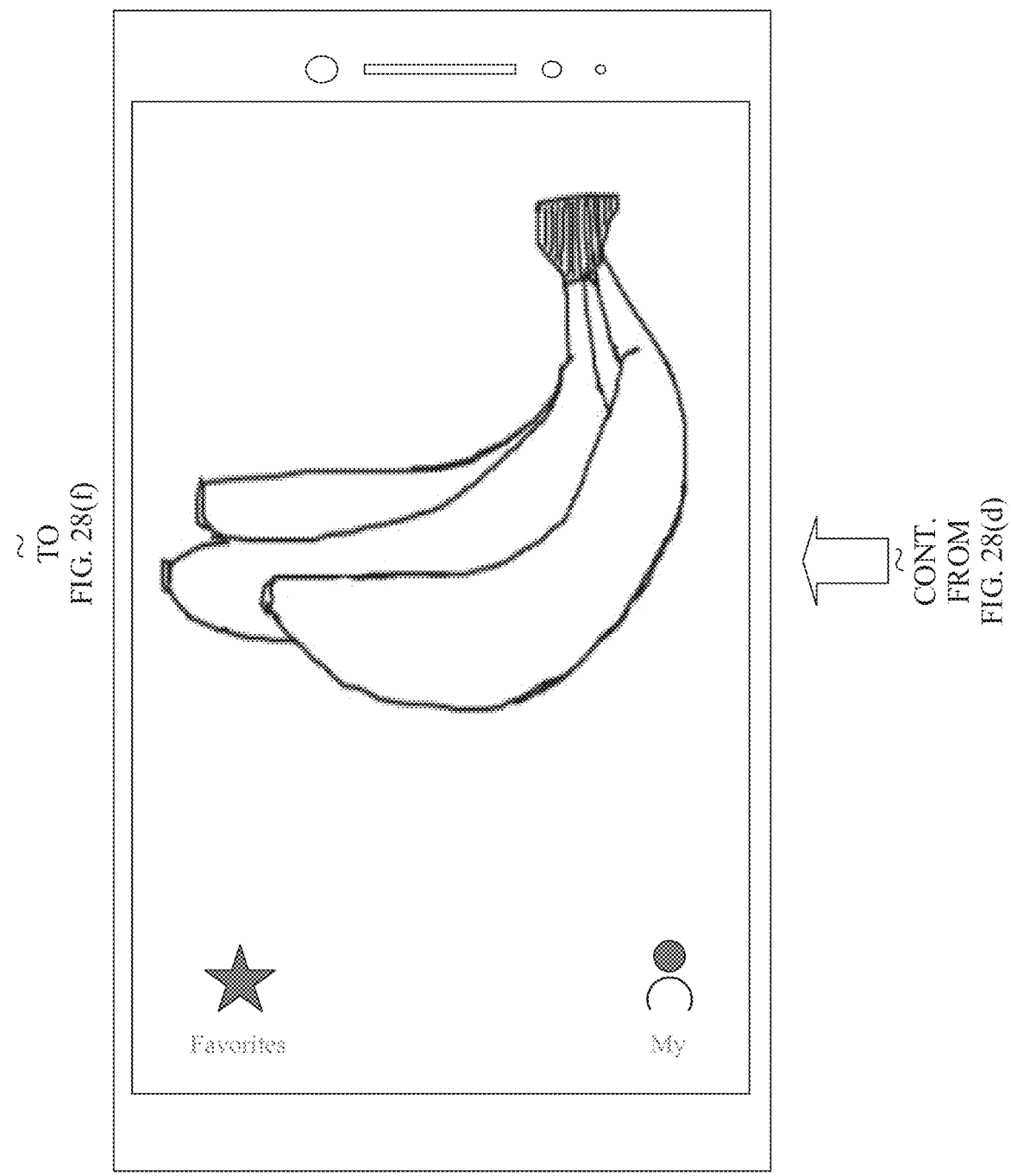
Figure 28F:
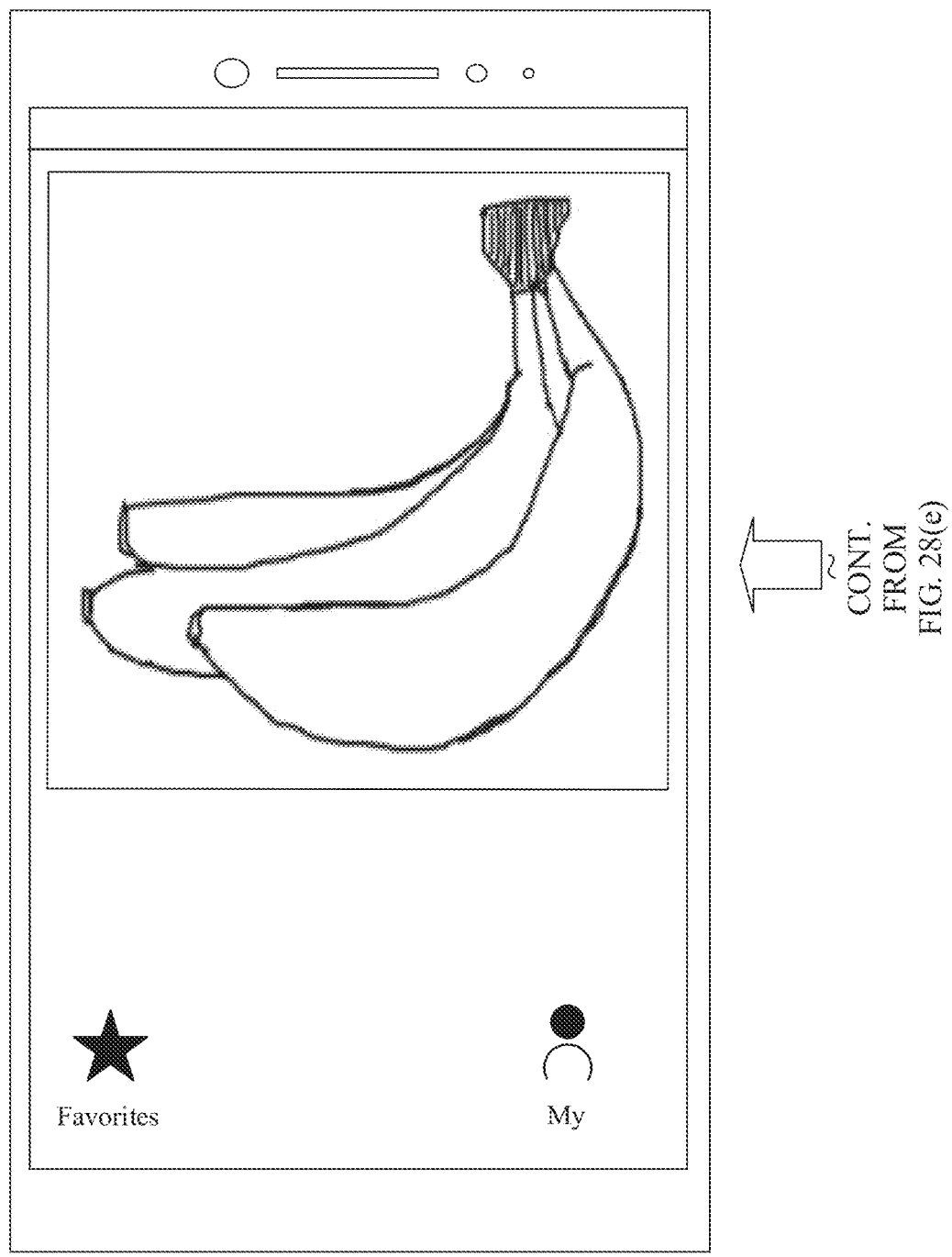
Figure 29A:
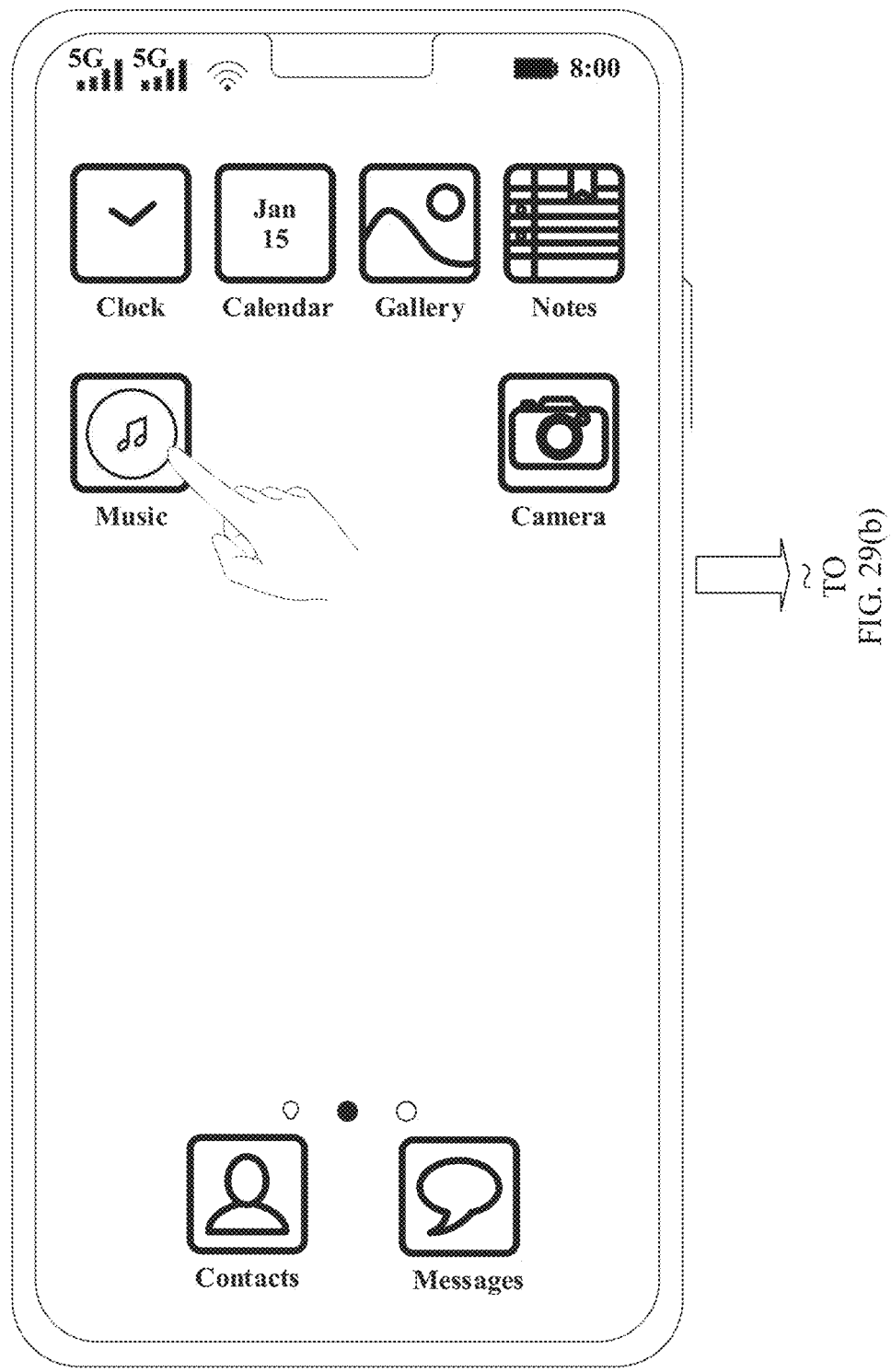
FIG. 29(a) to FIG. 29(f) are schematic diagrams of a second effect of conversion between a desktop and an application according to Embodiment 1 of this application.
Figure 29B:
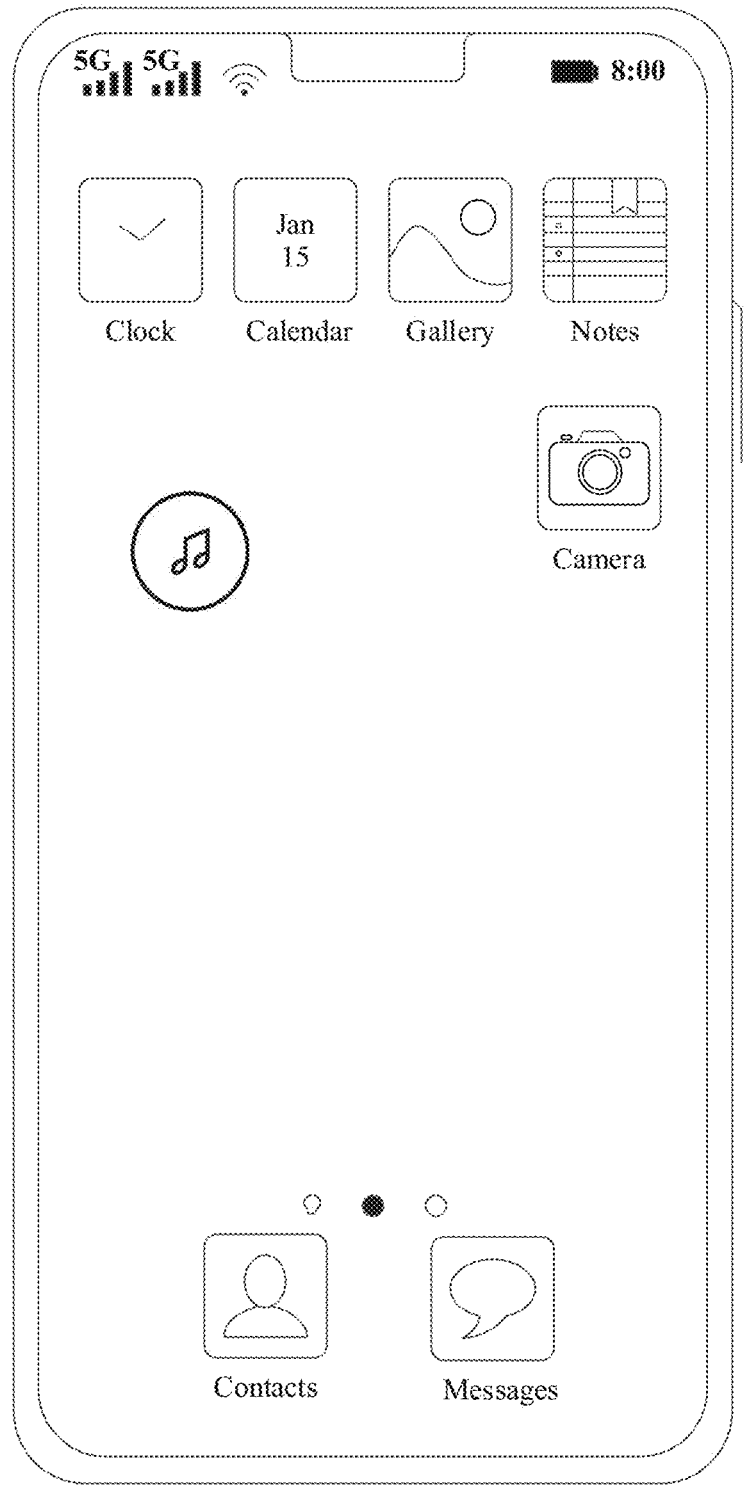
Figure 29C:
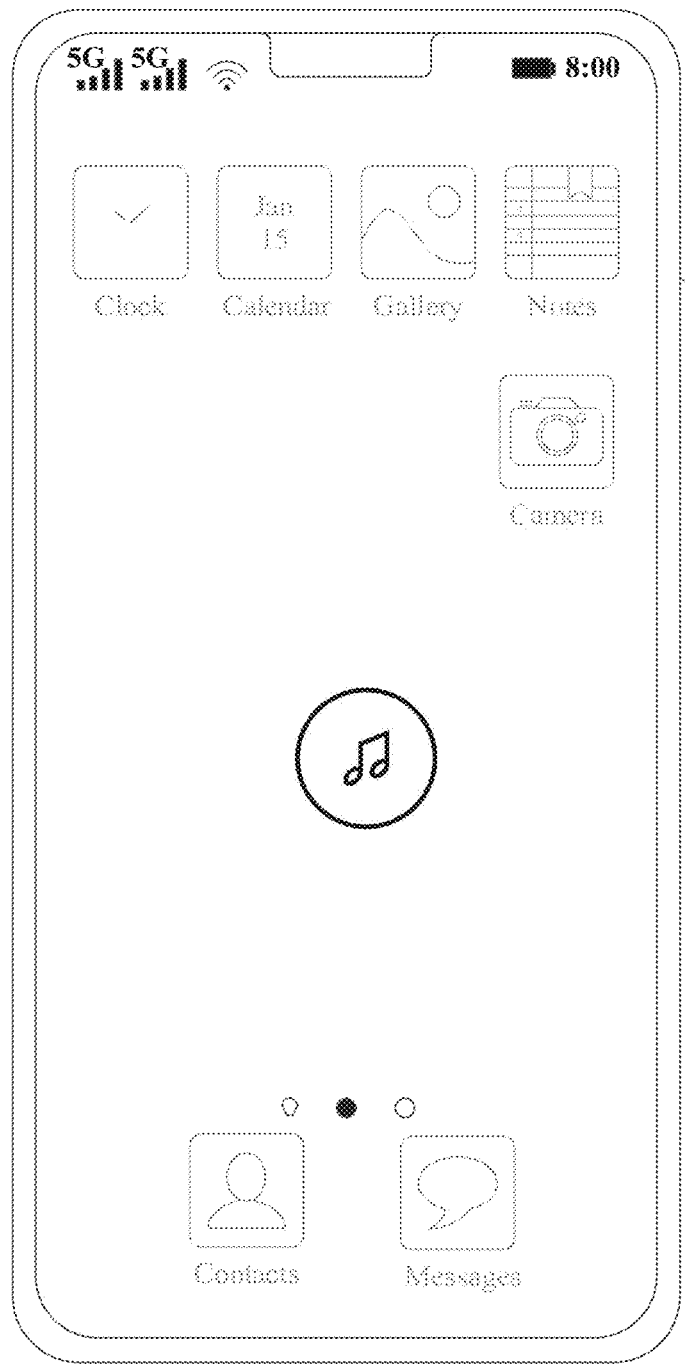
Figure 29D:
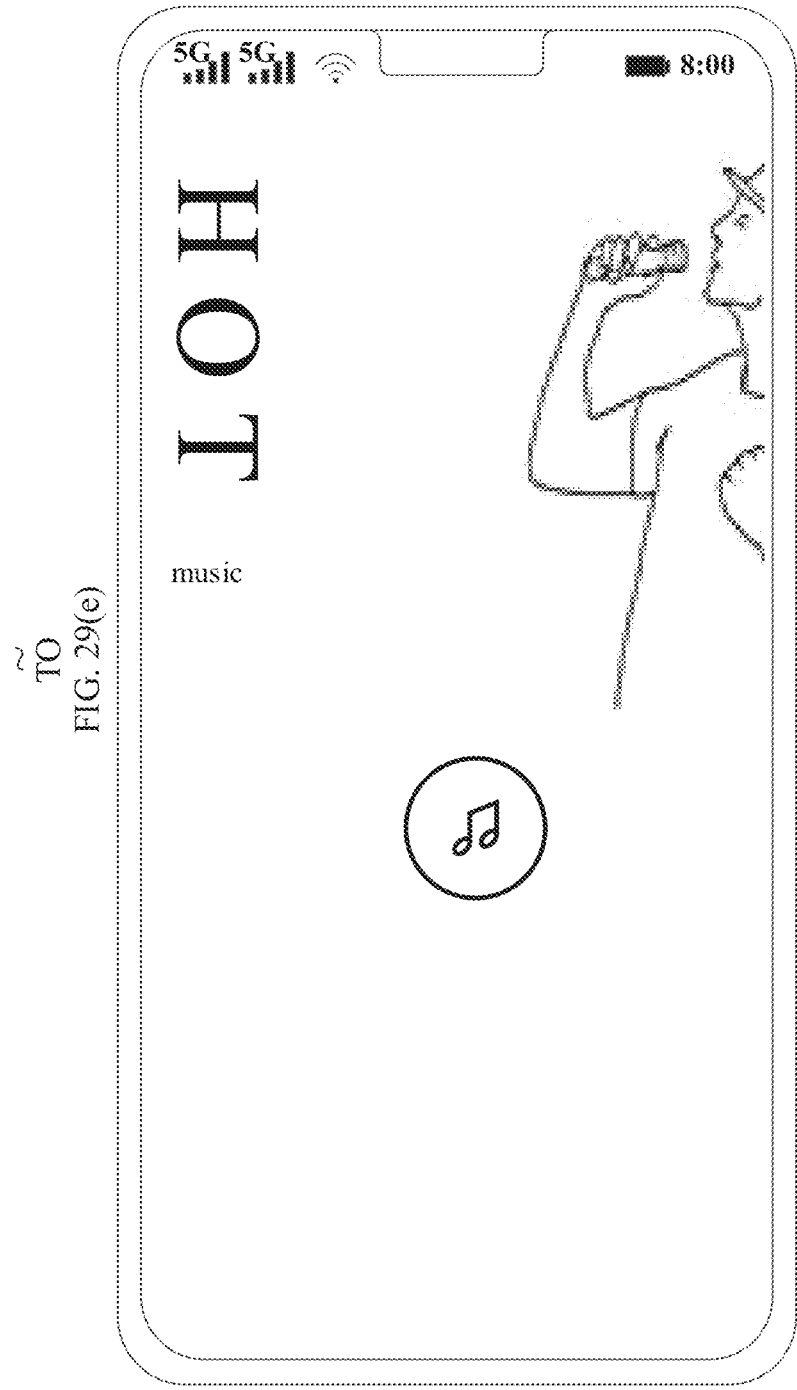
Figure 29E:
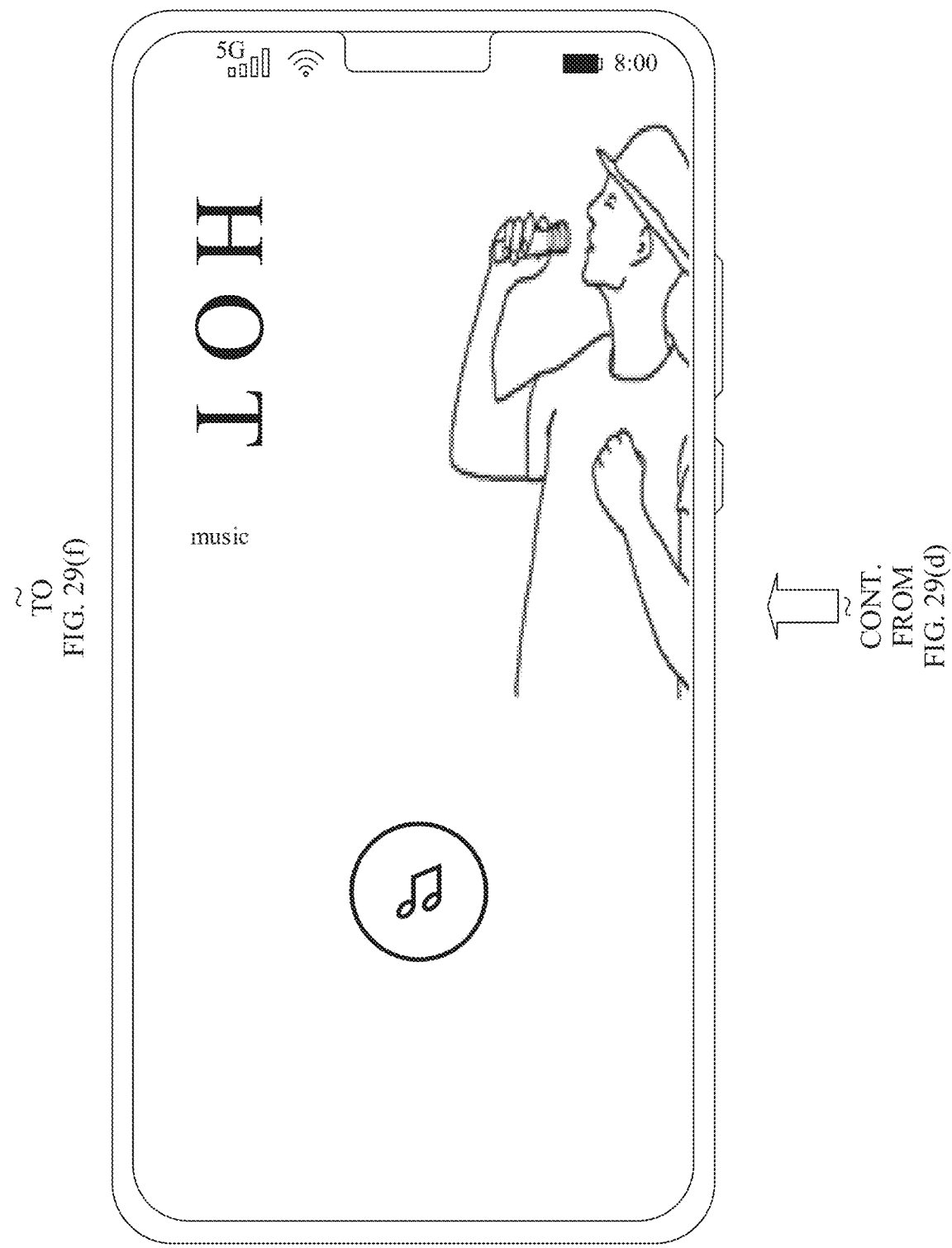
Figure 29F:
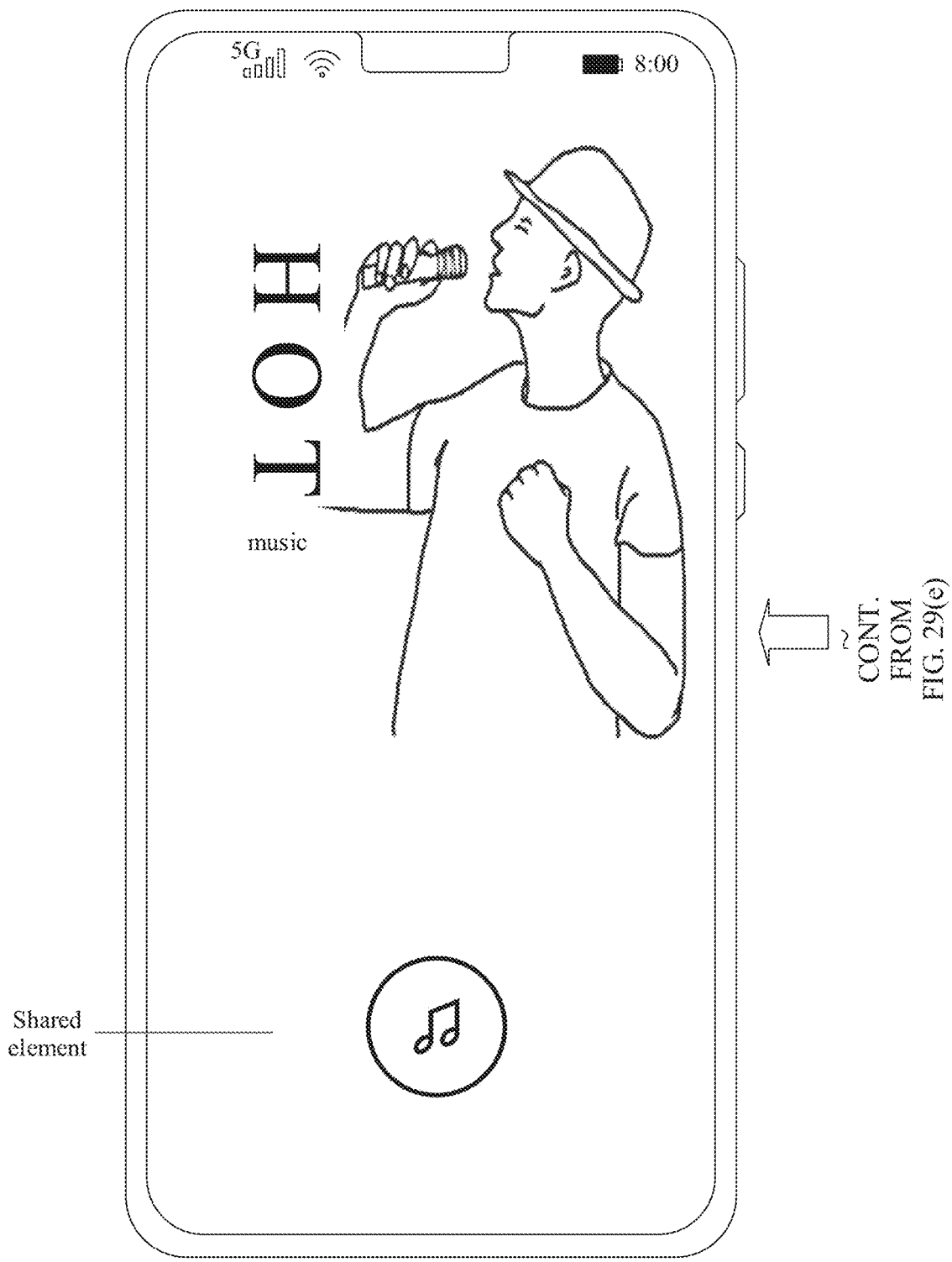

For example, as shown in FIG. 23(a) to FIG. 23(c), after the user taps a call application icon on the application desktop, inter-interface conversion between the application desktop and the call application is triggered. In a process in which the application desktop jumps to the call application, the answer button used as a shared element always exists, and a smooth moving-down dynamic effect is executed on the answer button. Then, a call application interface is displayed.

Conversion Type 2: Activity Conversion Type

In this embodiment of this application, the inter-interface conversion solution based on the Activity conversion type may be further classified into a plurality of cases such as inter-application conversion, intra-application conversion, and desktop-to-application conversion. This is not specifically limited to the following content.

Case 1: Intra-Application Conversion:

As shown in FIG. 24(a) to FIG. 24(d), an embodiment of this application provides a first example of an effect of interface conversion based on at least two Activities by using a book application in an application market as an example. For example, as shown in Table 6, a configuration file of the book application in the application market in this embodiment of this application is as follows:

| Name | Implication | Parameter | Scenario |
| --- | --- | --- | --- |
| Abstract_Book (book application) | Abstract class (where the conversion object is the book application) | None | Entry, exit, and shared |
| Glide_ExitAnimNode | Slide-down effect animation | | Exit |
| Slide_EnterAnimNode | Slide-up effect animation | | Entry |
| Abstract_Share_ Book covers | Abstract class (where the shared element is a selected book cover) | After the user triggers a selection instruction, a book cover selected by the user is determined as a shared element | Shared |

It is assumed that when inter-interface conversion is performed, an exit interface and an entry interface of the book application are shown in FIG. 24(a) to FIG. 24(d). It may be learned from the exit interface of the book application that the exit interface includes a title bar, a classification icon, and at least one book cover.

It may be learned from the content of Table 6 that the book cover selected by the user is a shared element, and the shared element continuously exists during inter-interface conversion. The exit elements are the title bar, the classification icon, and another book cover that is not selected by the user. During inter-interface conversion, a slide-down dynamic effect is executed. It may be learned from the entry interface of the book application that a content introduction part, an evaluation bar, a function icon, and the like on the entry interface are all entry elements. During inter-interface conversion, a slide-up dynamic effect is executed.

Therefore, when the book application starts the inter-interface conversion solution, as shown in FIG. 24(a) to FIG. 24(d), it is assumed that a book selected by the user is a book 4. Therefore, in the process of switching from the exit interface to the entry interface, the exit interface is exited through sliding down, an icon of the book 4 always exists, and the entry interface is entered through sliding up.

As shown in FIG. 25(a) to FIG. 25(d), an embodiment of this application provides a second example of an effect of inter-interface coversion based on at least two Activities by using a gallery application in an application market as an example.

For example, as shown in Table 7, a configuration file of the gallery application in this embodiment of this application is as follows:

| Name | Implication | Parameter | Scenario |
| --- | --- | --- | --- |
| Abstract_gallery (gallery application) | Abstract class (where the conversion object is the gallery application) | None | Entry, exit, and shared |
| Split_ExitAnimNode | Split effect exit animation | | Exit |
| CenterOfAmplification_EnterAnimNode | Center amplification effect entry animation | | Entry |
| Abstract_Share_ Picture | Abstract class (where the shared element is a selected picture) | After the user triggers a selection instruction, the picture selected by the user is determined as a shared element | Shared |

It is assumed that when inter-interface conversion is performed, an exit interface and an entry interface of the gallery application are shown in FIG. 25(a) to FIG. 25(d). It may be learned from the exit interface of the gallery application that the exit interface includes a search bar, a function icon, at least one picture, and the like.

It may be learned from the content of Table 7 that the picture selected by the user is a shared element, and continuously exists during inter-interface conversion. The exit elements are the search bar, the function icon, another picture that is not selected by the user, and the like. During inter-interface conversion, a left-moving dynamic effect is executed. It may be learned from the entry interface of the gallery application that a function icon on the entry interface, another picture that is not selected by the user, and the like are all entry elements. During inter-interface conversion, a center amplification dynamic effect is executed.

Therefore, when the book application starts single-shot inter-interface conversion, as shown in FIG. 25(a) to FIG. 25(d), it is assumed that the picture selected by the user is a flower picture. Therefore, in a process of switching from the exit interface to the entry interface, the exit interface is exited through left moving, an icon of the flower picture always exists, and the entry interface is entered.

As shown in FIG. 26(a) to FIG. 26(g), an embodiment of this application provides three examples of an effect of inter-interface conversion based on at least two Activities by using a music application as an example.

For example, as shown in Table 8, a configuration file of the music application in this embodiment of this application is as follows:

| Name | Implication | Parameter | Scenario |
| --- | --- | --- | --- |
| Abstract_Music (music) | Abstract class (where the conversion object is the music application) | None | Entry, exit, and shared |
| Zoom_ExitAnimNode | Scaling animation | | Exit |
| Slide _EnterAnimNode | Slide-up animation | | Entry |
| Abstract_Share_Cover | Abstract class (where the shared element is a cover) | | Shared |
| About Exchange_Cover | Left-right exchange dynamic effect | In a shared container corresponding to the cover, display positions of an element whose display position is on the left and an element whose display position is on the right are exchanged. | Shared |

It is assumed that when inter-interface conversion is performed, an exit interface and an entry interface of the music application are shown in FIG. 26(a) to FIG. 26(g). It may be learned from the scenario shown in FIG. 26(a) to FIG. 26(g) that the exit scenario includes a classification icon, at least one cover, a function button, and the like.

It may be learned from the content of Table 8 that a cover picture selected by the user is a shared element, and continuously exists during inter-interface conversion: and the exit element executes the scaling dynamic effect during inter-interface conversion. It may be learned from the entry scenario of the music application that, a song list, a function icon, and the like on the entry interface are all entry elements. During interface conversion, a slide-up dynamic effect is executed.

Therefore, when the book application starts single-shot inter-interface conversion, as shown in FIG. 26(a) to FIG. 26(g), it is assumed that the cover selected by the user is a main cover. Therefore, in a process of switching from the exit interface to the entry interface, the ex it interface is exited through scaling, the main cover always exists, and the entry interface is entered through sliding up.

To better implement an effect of inter-interface conversion, in this embodiment, a startup interface of an application may be directly used as an exit scenario. For example, as shown in FIG. 27(a) to FIG. 27(f), a startup interface of the music application is considered as an exit scenario, and a cover picture on the startup interface is used as a shared element. When the user continues to operate the application and enters a specific operation interface of the music application, the main cover always exists.

Case 2: Inter-Application Conversion:

As shown in FIG. 28(a) to FIG. 28(f), the following describes, by using an example in which the user needs to switch to a gallery application when using a camera application, the method for performing inter-interface conversion based on a single-shot effect provided in this embodiment of this application.

It is assumed that when the user configures the inter-interface conversion solution between the camera application and the gallery application, a thumbnail button in the camera application is used as a shared element, and continuously exists in a conversion process.

For example, as shown in FIG. 28(a) to FIG. 28(f), when the user taps the thumbnail button on the camera interface, inter-interface conversion between the camera application and the gallery application is triggered. After the camera application jumps to the gallery application, a photographed picture is displayed. In this case, the thumbnail button of the camera application continuously exists, a photographing interface disappears, and a picture in the gallery appears. After the thumbnail button on the gallery interface is tapped, the thumbnail button continuously exists.

Case 3: Desktop-to-Application Conversion:

The following describes, by using an example in which the user needs to switch from an application desktop to a music application, the method for performing inter-interface conversion based on a single-shot effect provided in this embodiment of this application.

It is assumed that when the user configures the inter-interface conversion solution between the application desktop and the music application, a note element in a music application icon is used as a shared element, and the note element continuously exists in the conversion process.

For example, as shown in FIG. 29(a) to FIG. 29(f), after the user taps the music application icon on the application desktop, inter-interface conversion between the application desktop and the music application is triggered. In a process in which the application desktop jumps to the music application, the note used as a shared element always exists, and a smooth moving-down dynamic effect is performed on the note, and then a music application interface is displayed.

Conversion Type 3: ViewGroup Conversion Type

In this embodiment of this application, the inter-interface conversion solution based on the ViewGroup conversion type may be further classified into a plurality of cases such as inter-application conversion, intra-application conversion, and desktop-to-application conversion. This is not specifically limited to the following content.

Figure 30A:
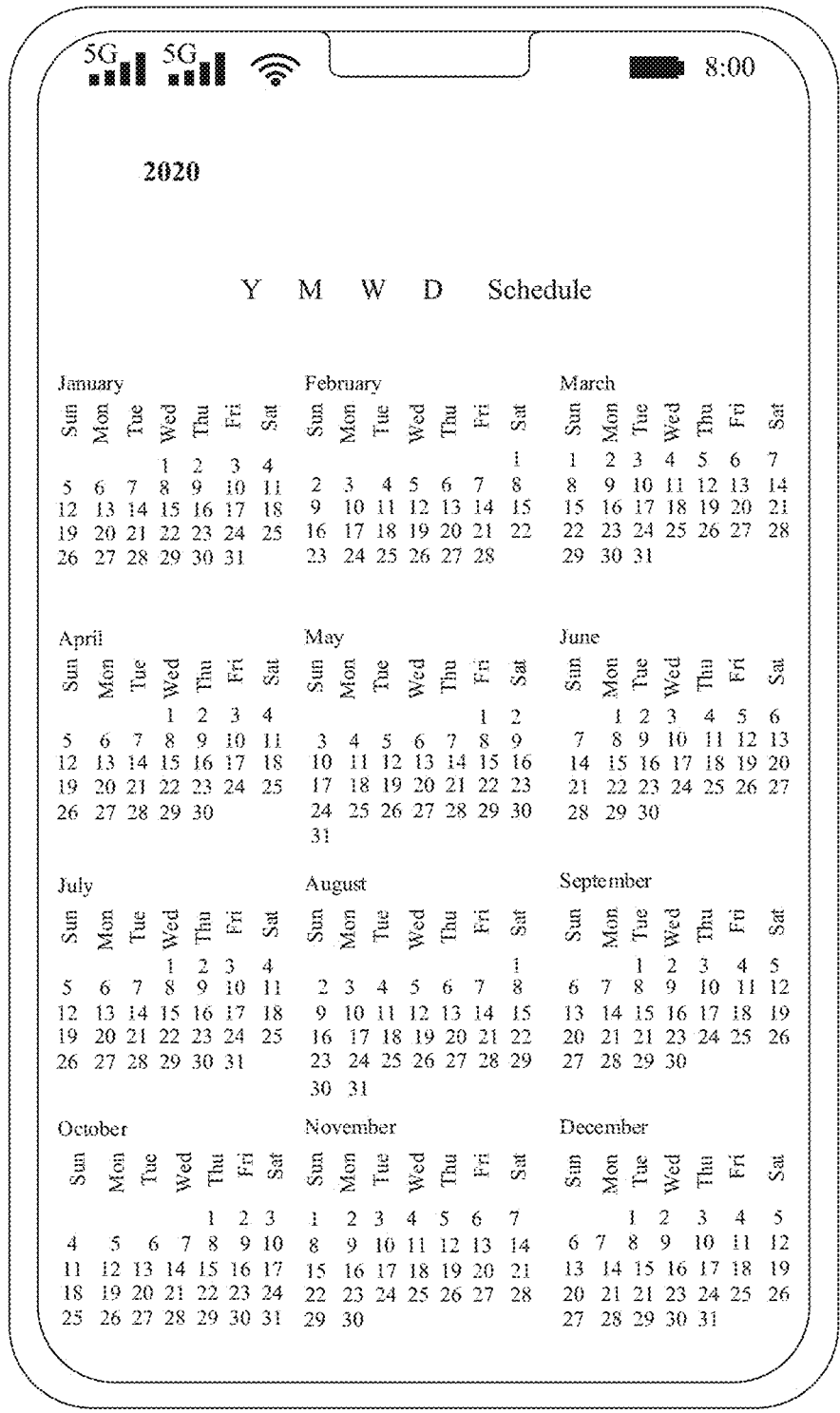
FIG. 30(a) to FIG. 30(f) are schematic diagrams of a conversion effect of a calendar application according to Embodiment 1 of this application.
Figure 30B:
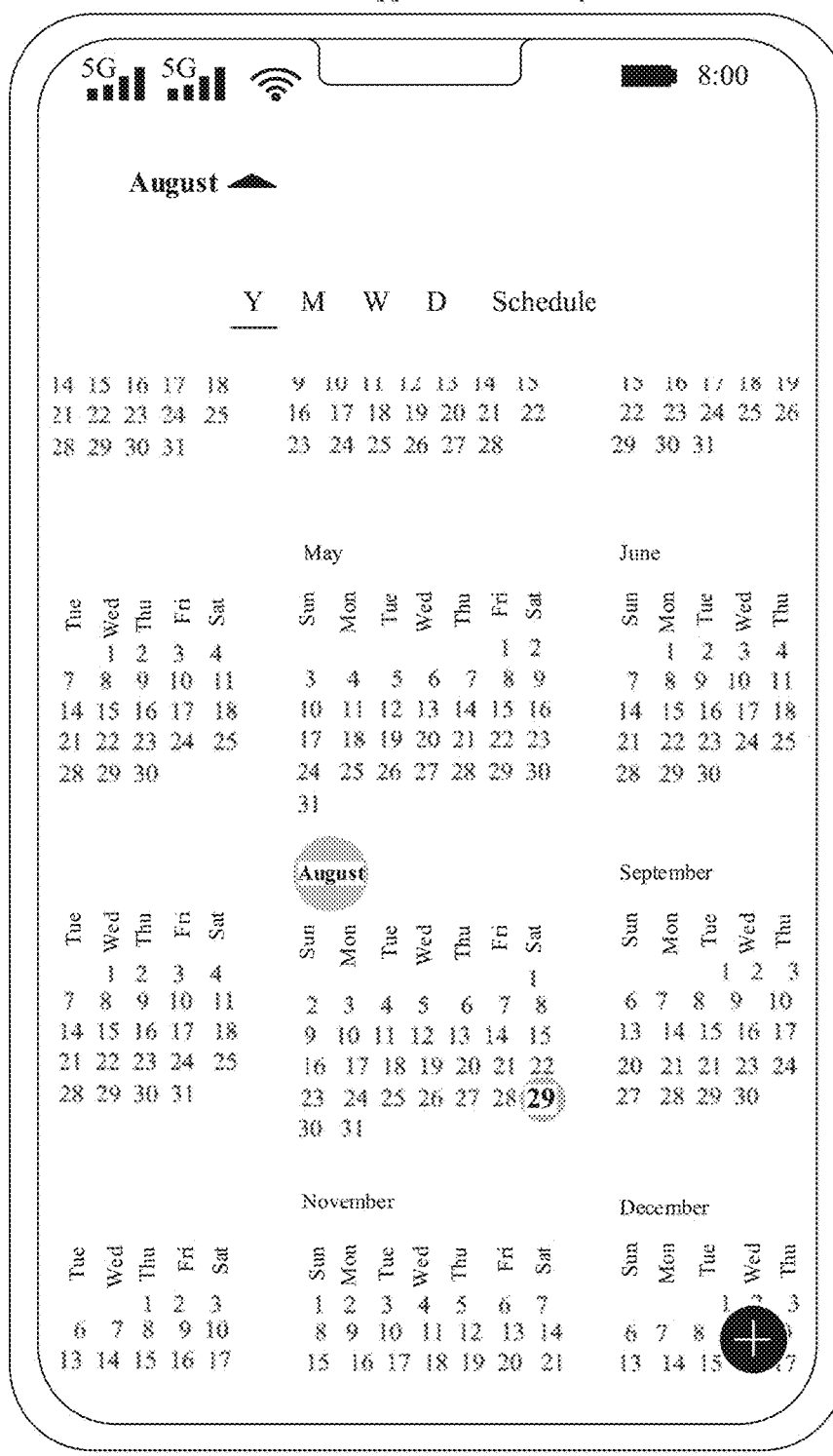
Figure 30C:
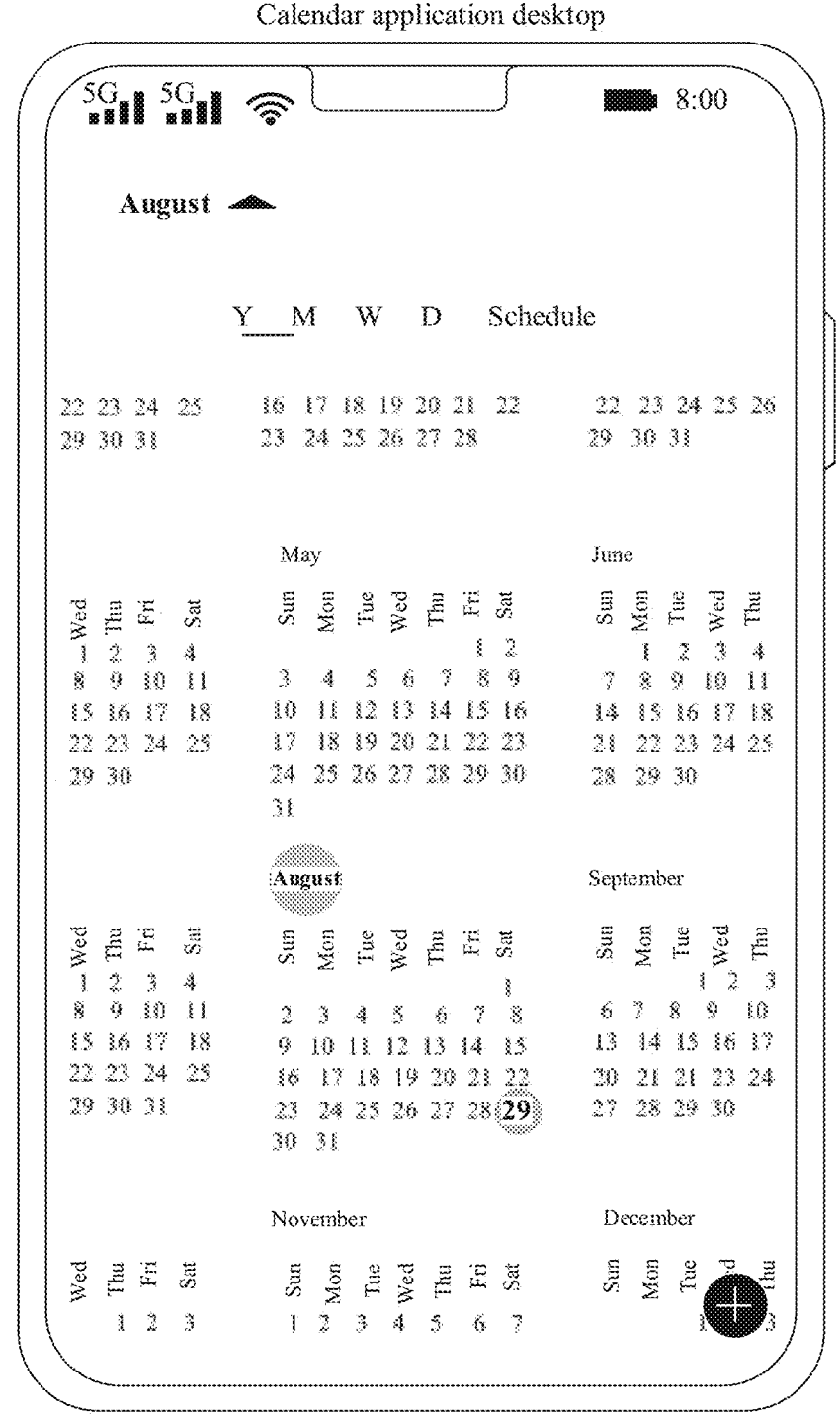
Figure 30D:
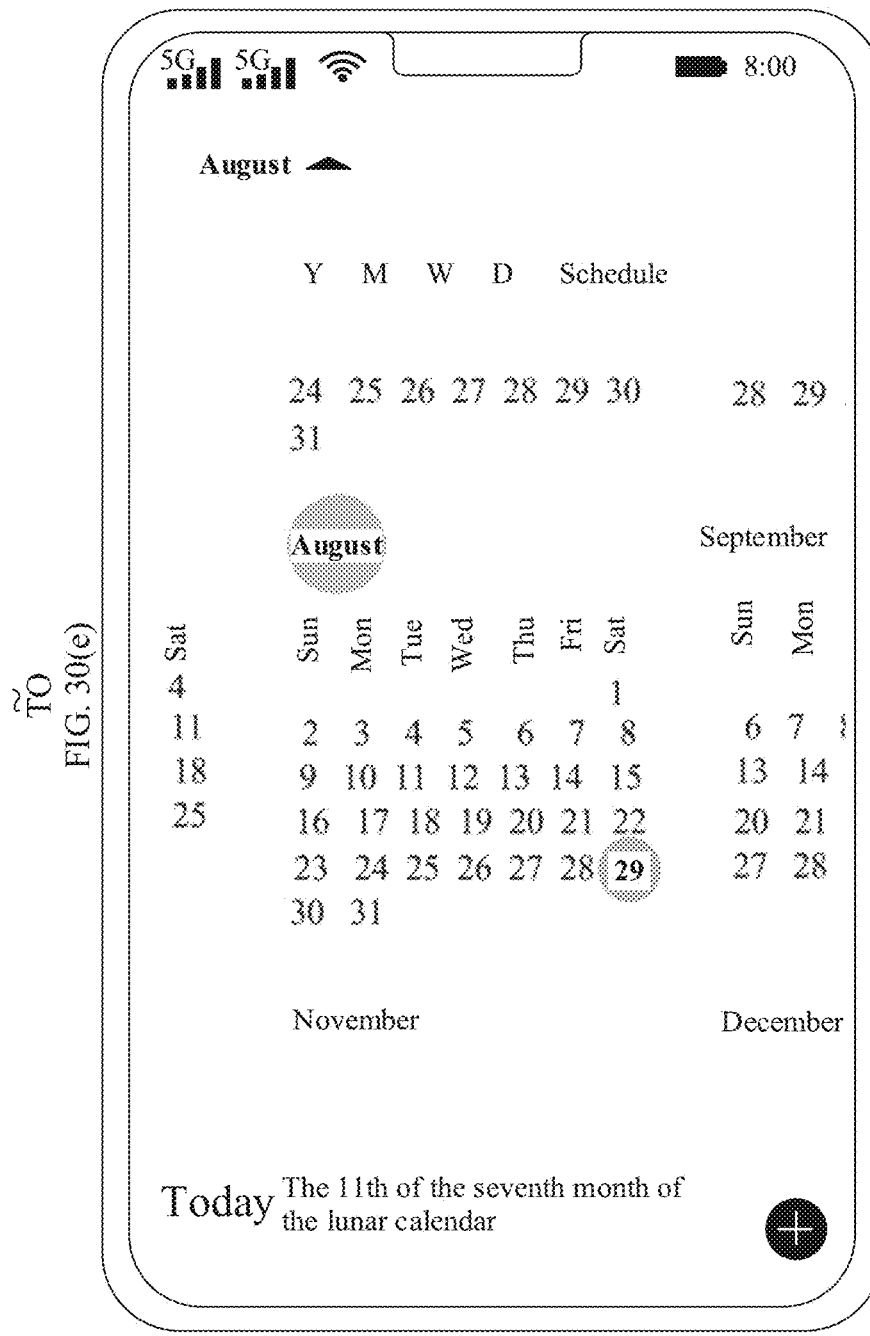
Figure 30E:
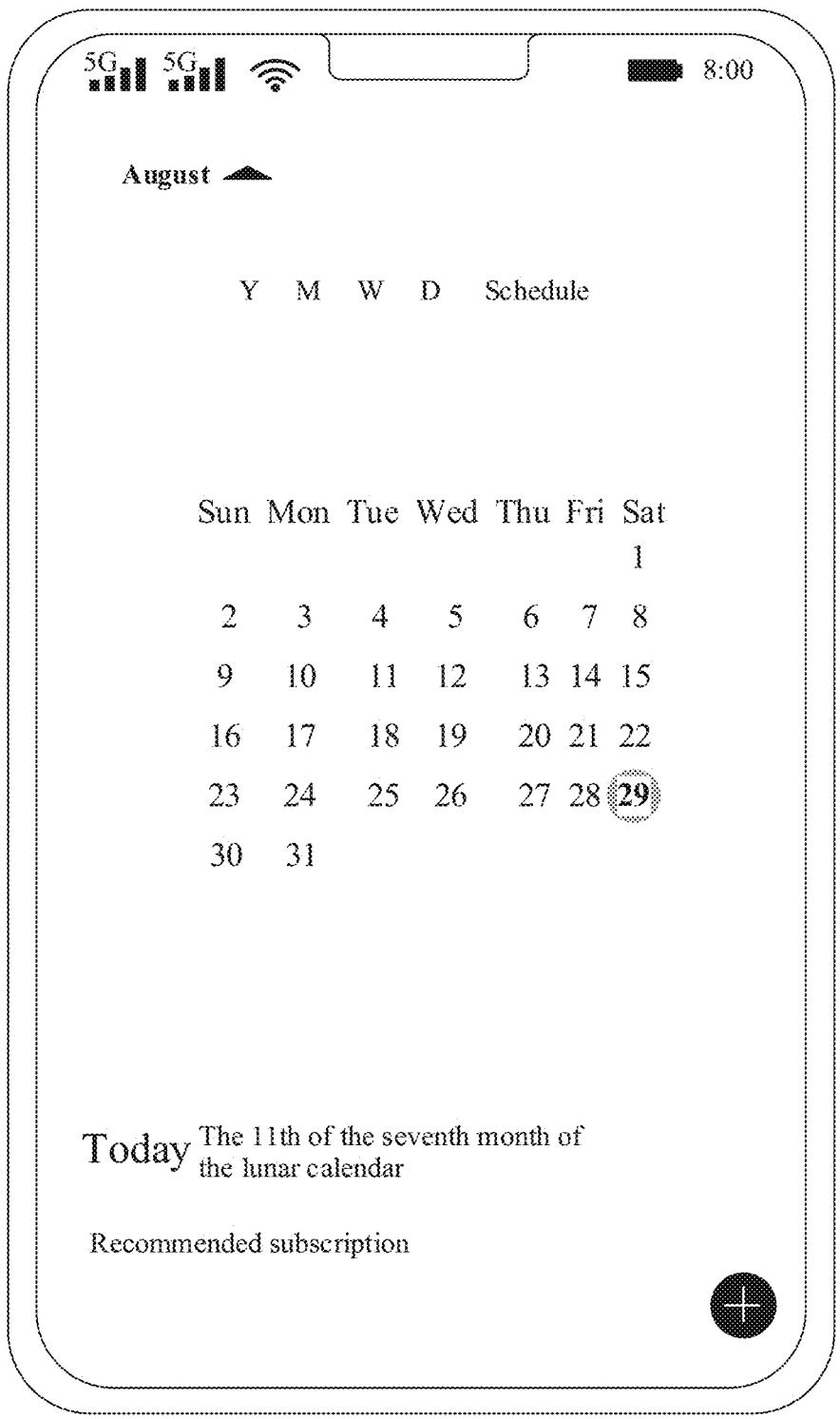
Figure 30F:
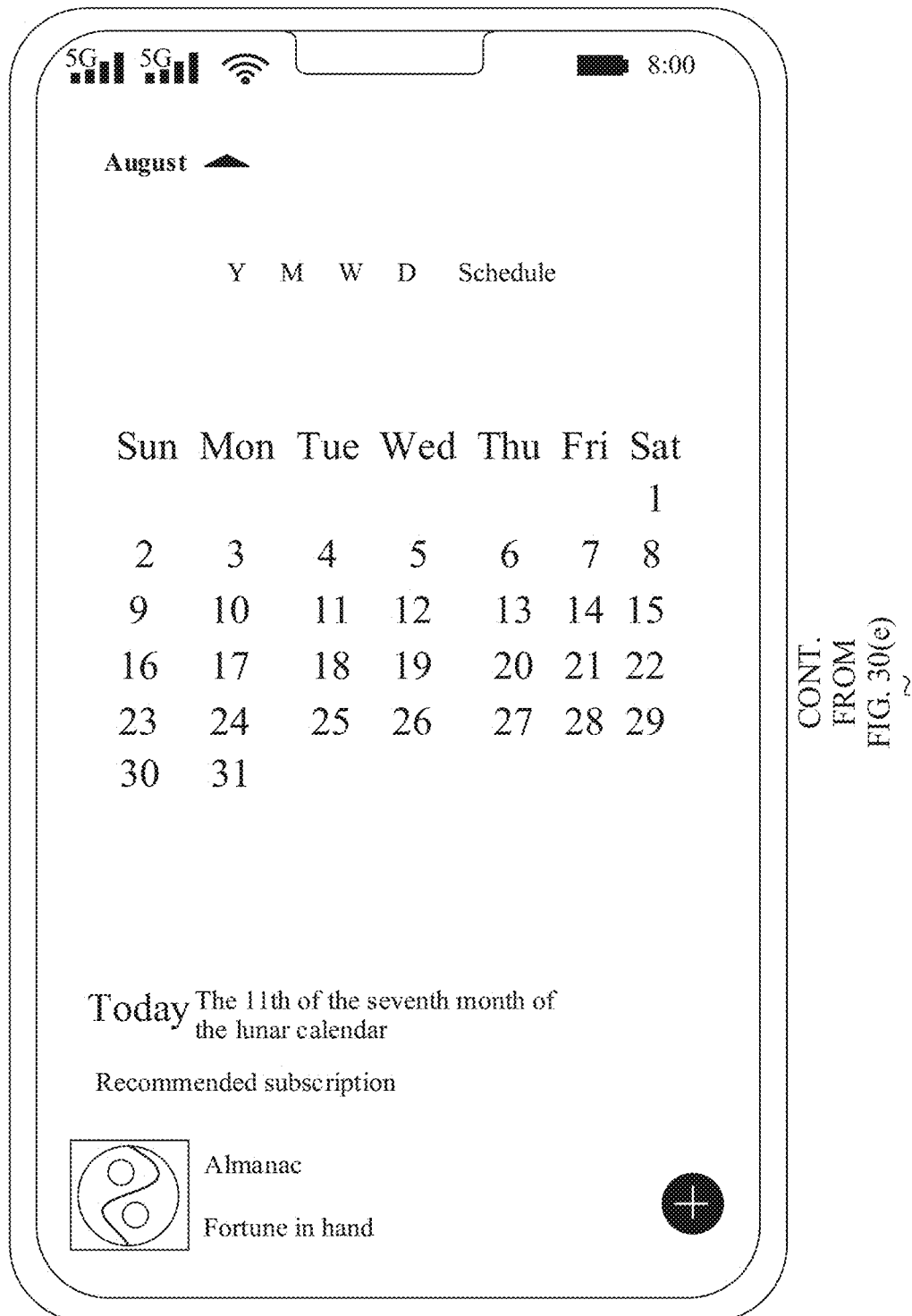
Figure 31A:
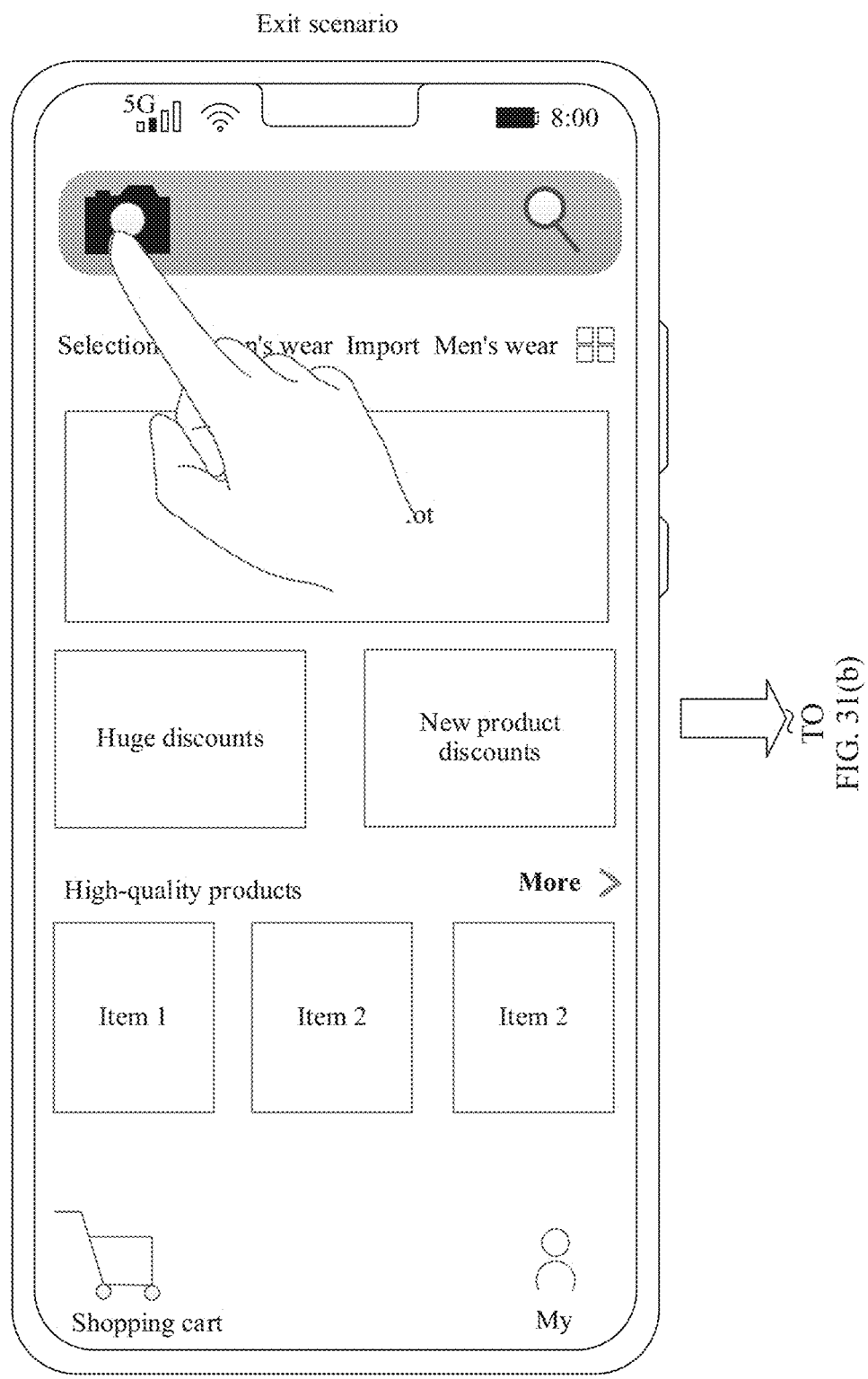
FIG. 31(a) to FIG. 31(g) are schematic diagrams of a third inter-application conversion effect according to Embodiment 1 of this application.
Figure 31B:
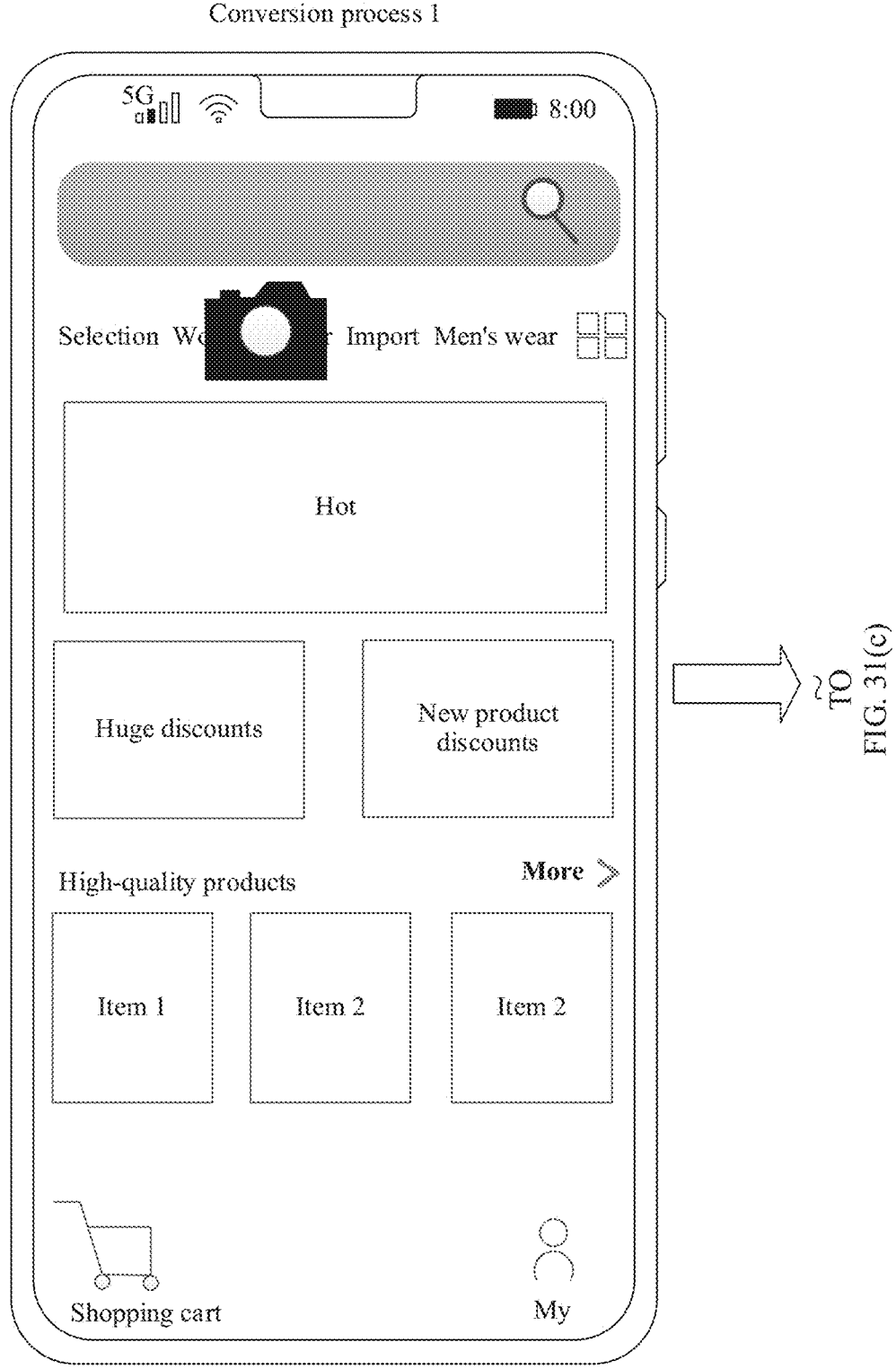
Figure 31C:
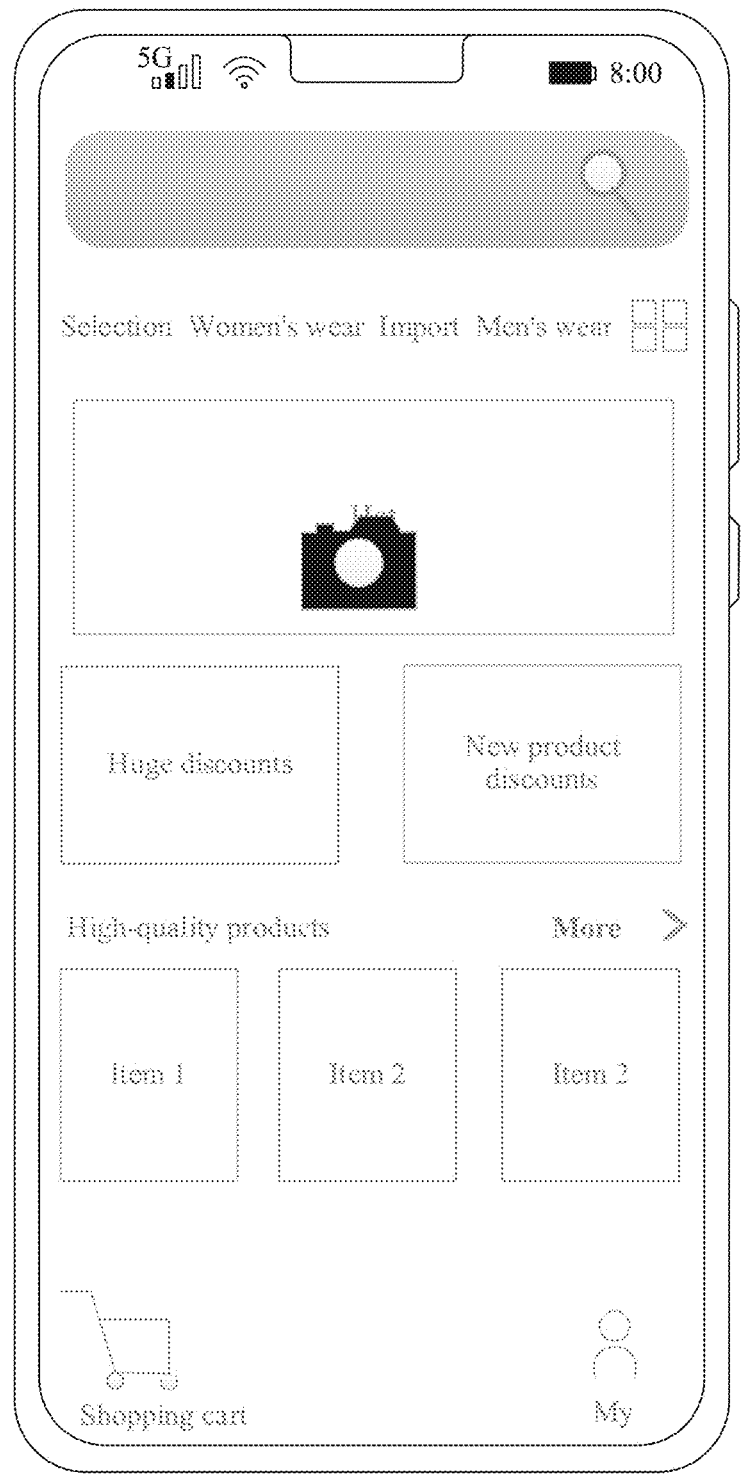
Figure 31D:
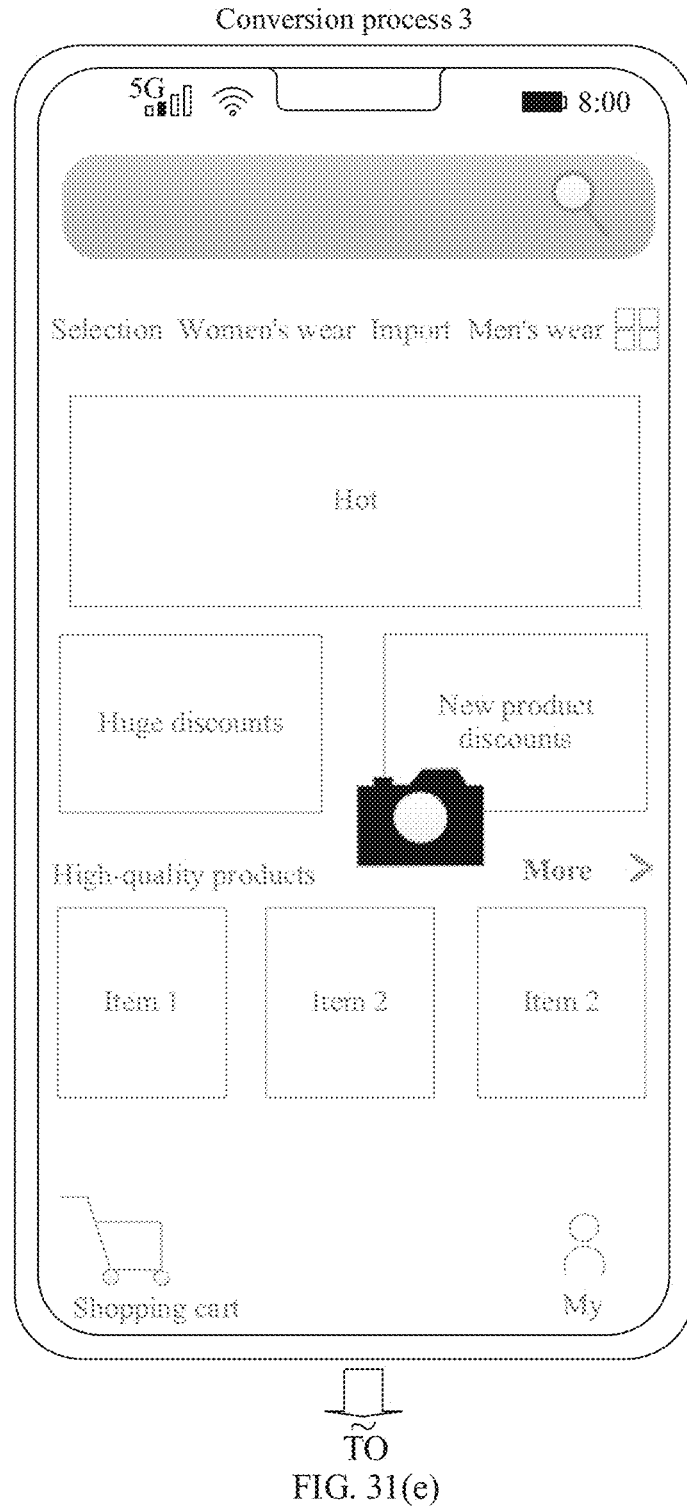
Figure 31E:
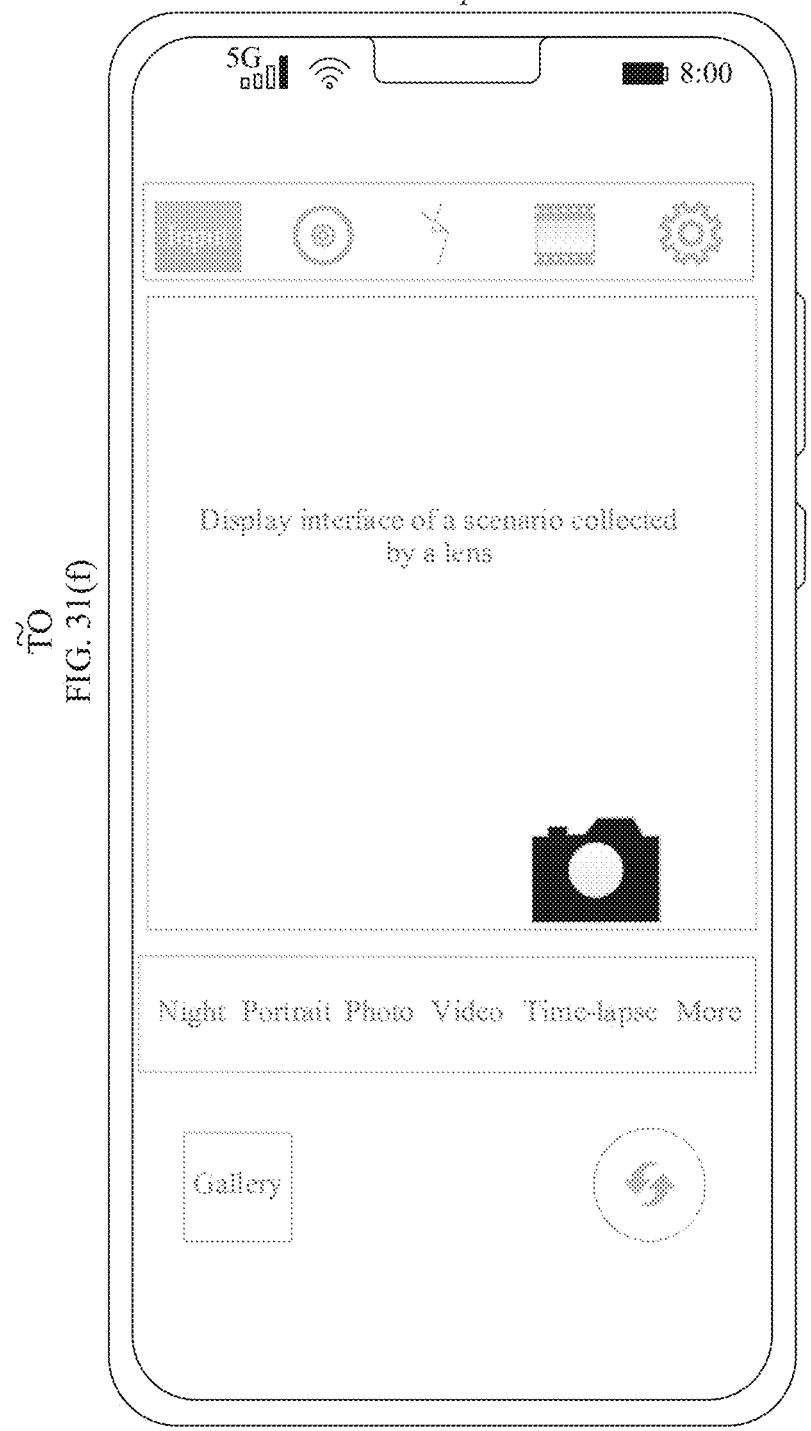
Figure 31F:
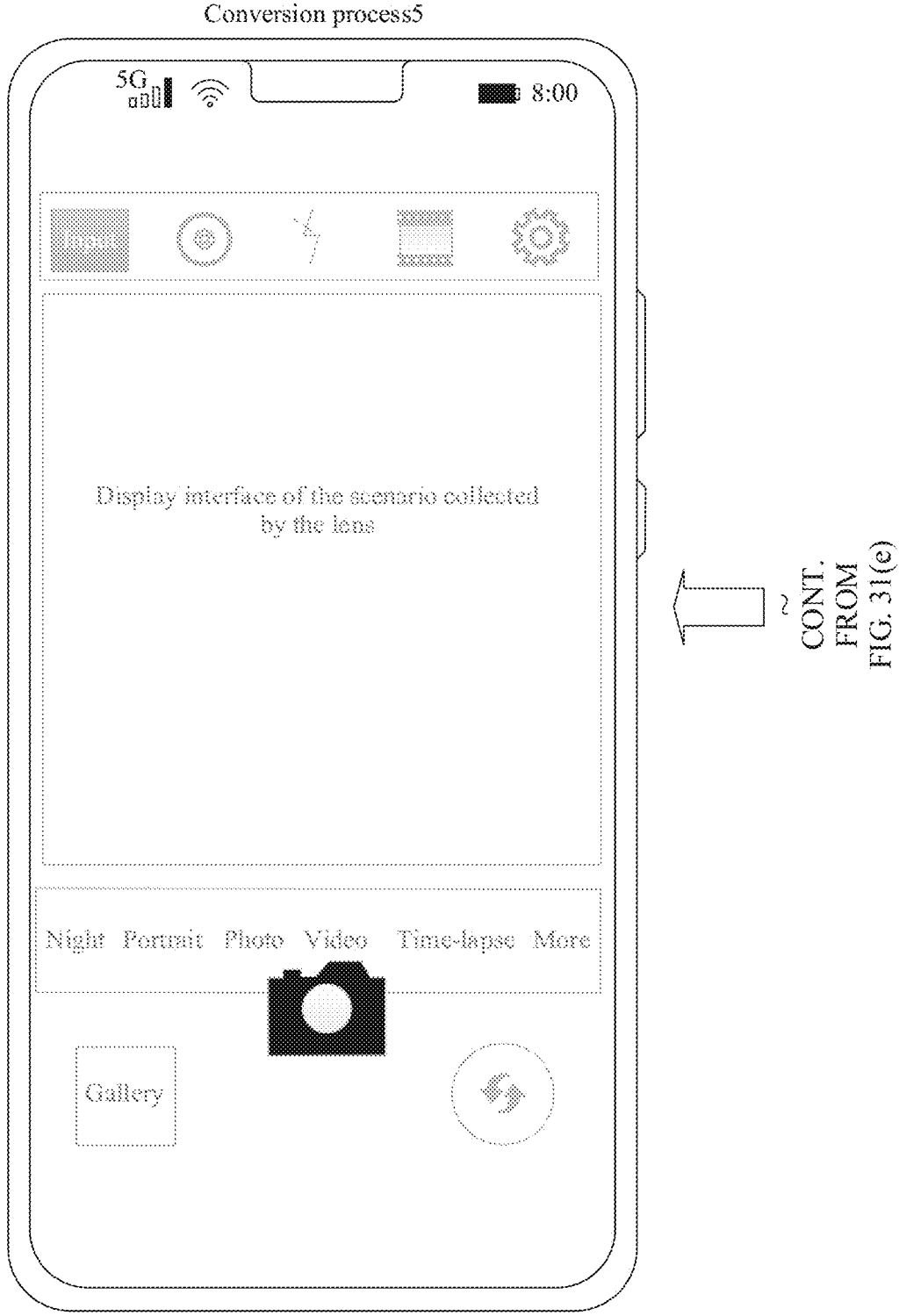
Figure 31G:
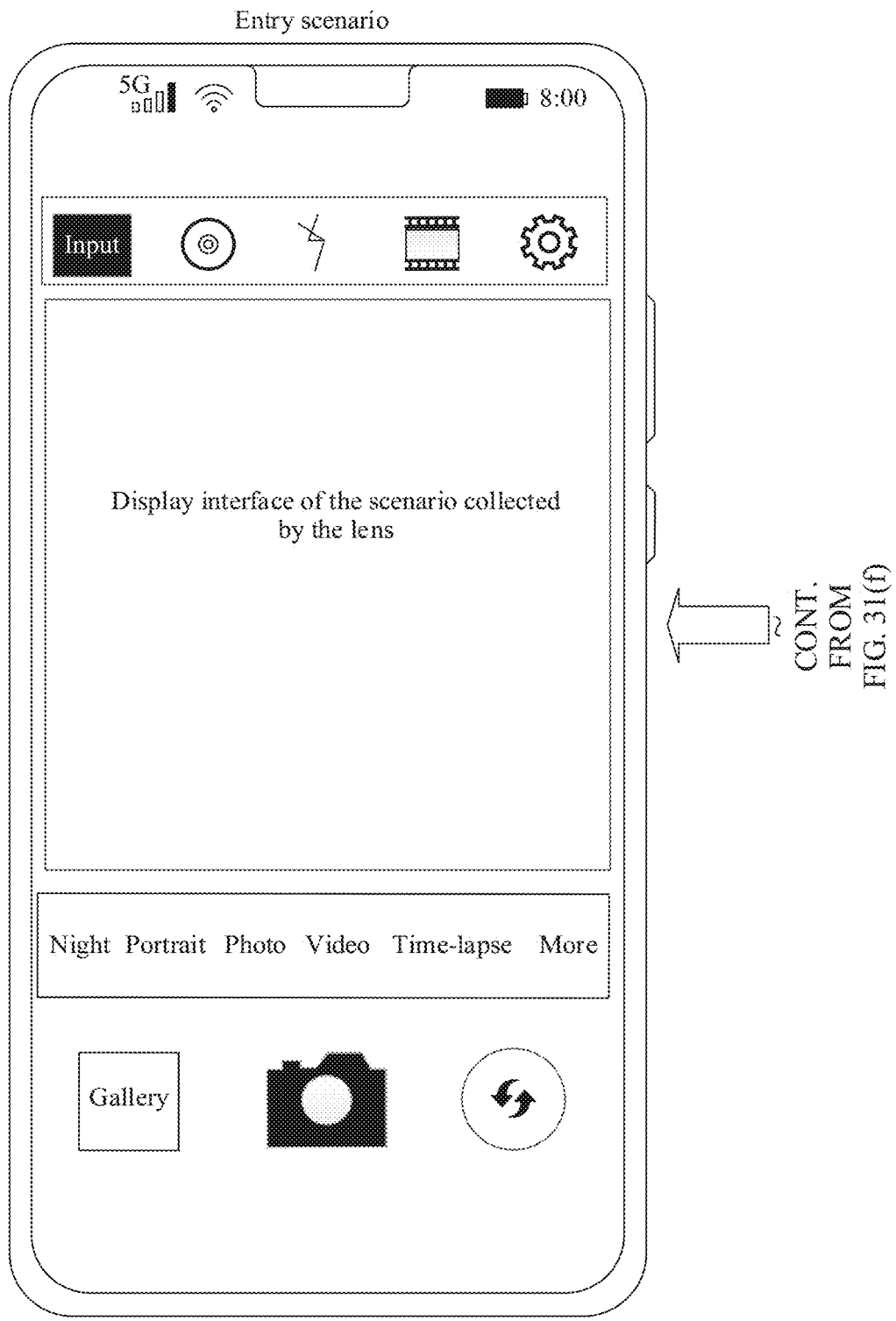
Figure 32A:
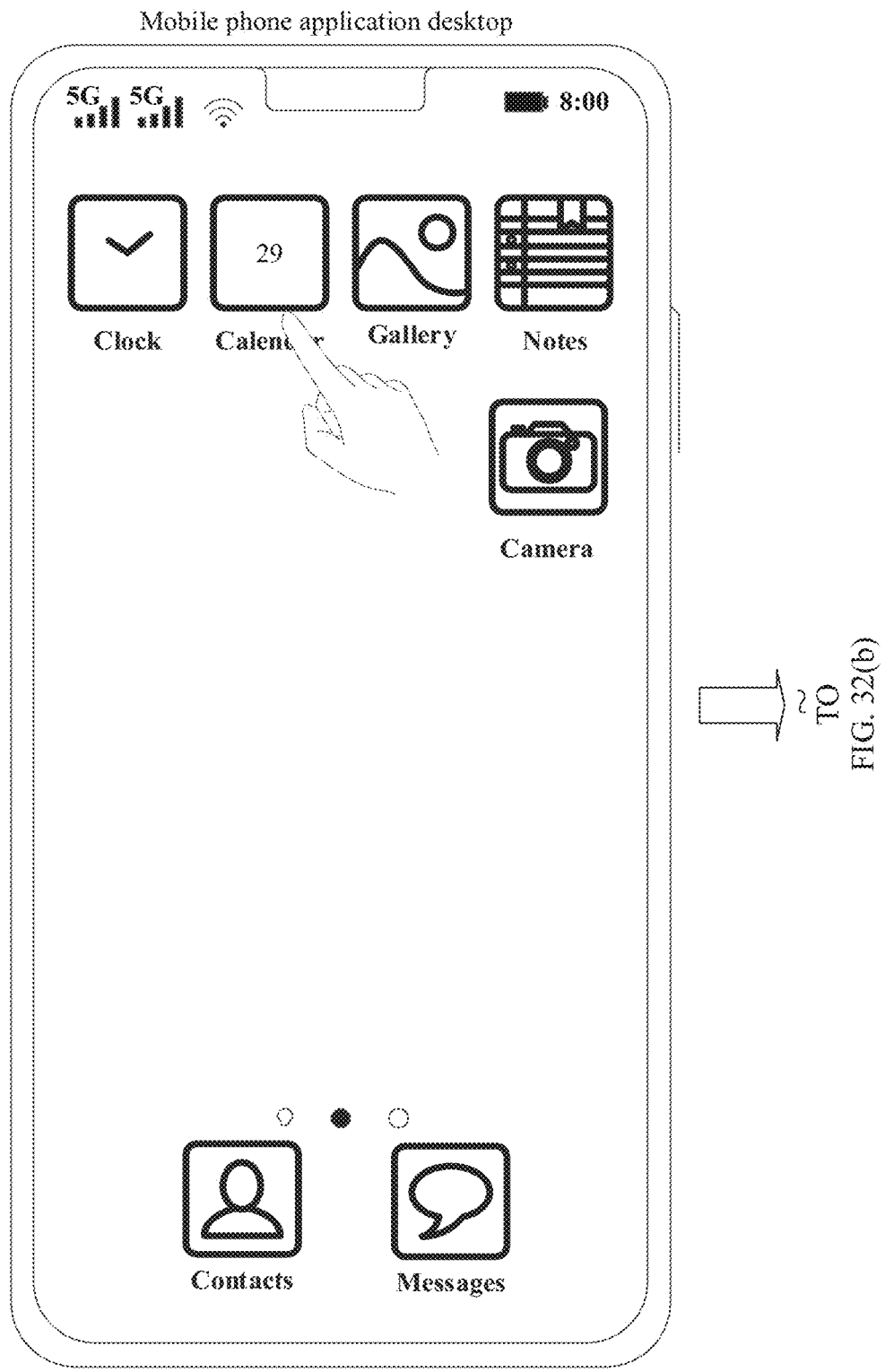
FIG. 32(a) to FIG. 32(f) are schematic diagrams of a third effect of conversion between a desktop and an application according to Embodiment 1 of this application.
Figure 32B:
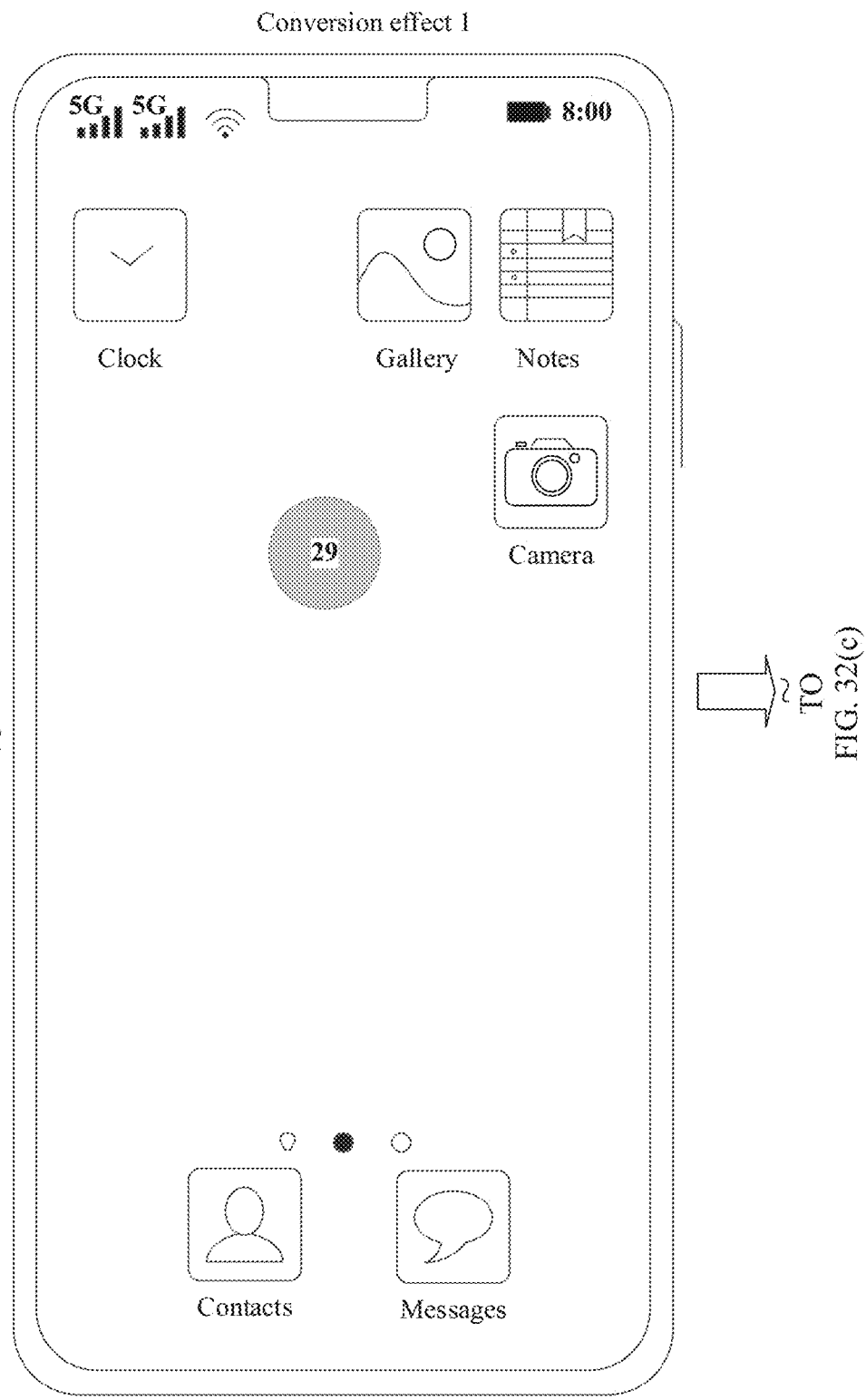
Figure 32C:
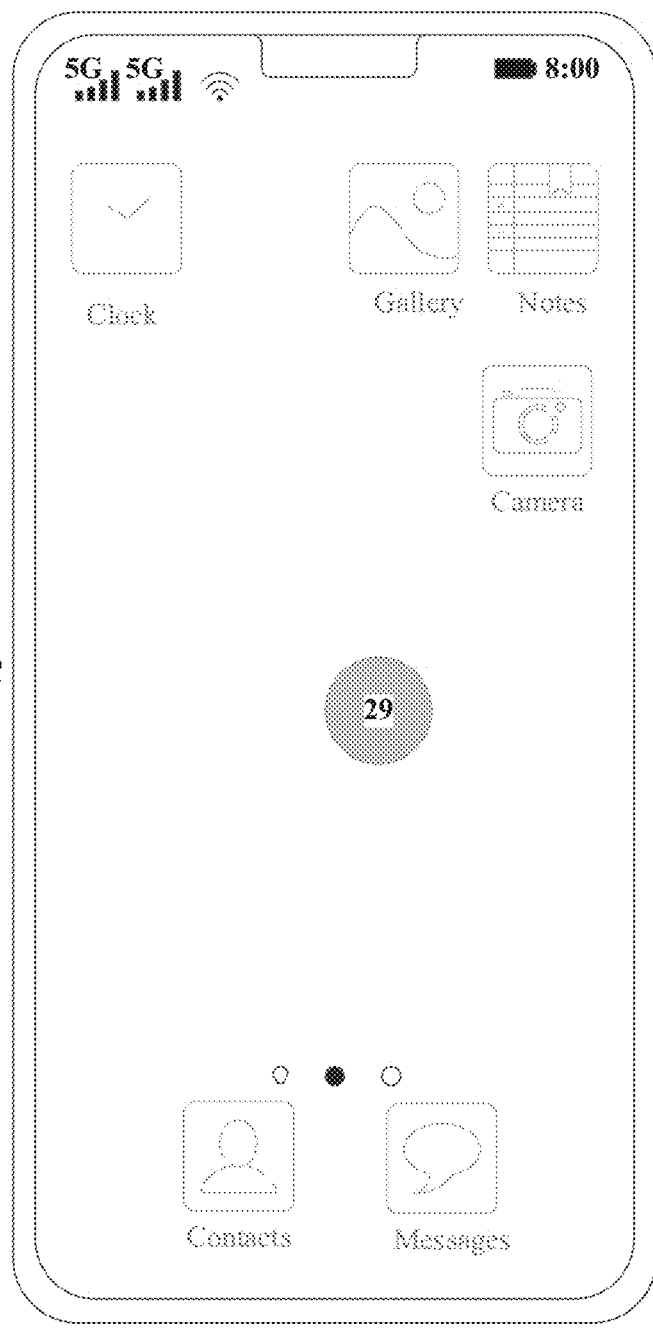
Figure 32D:
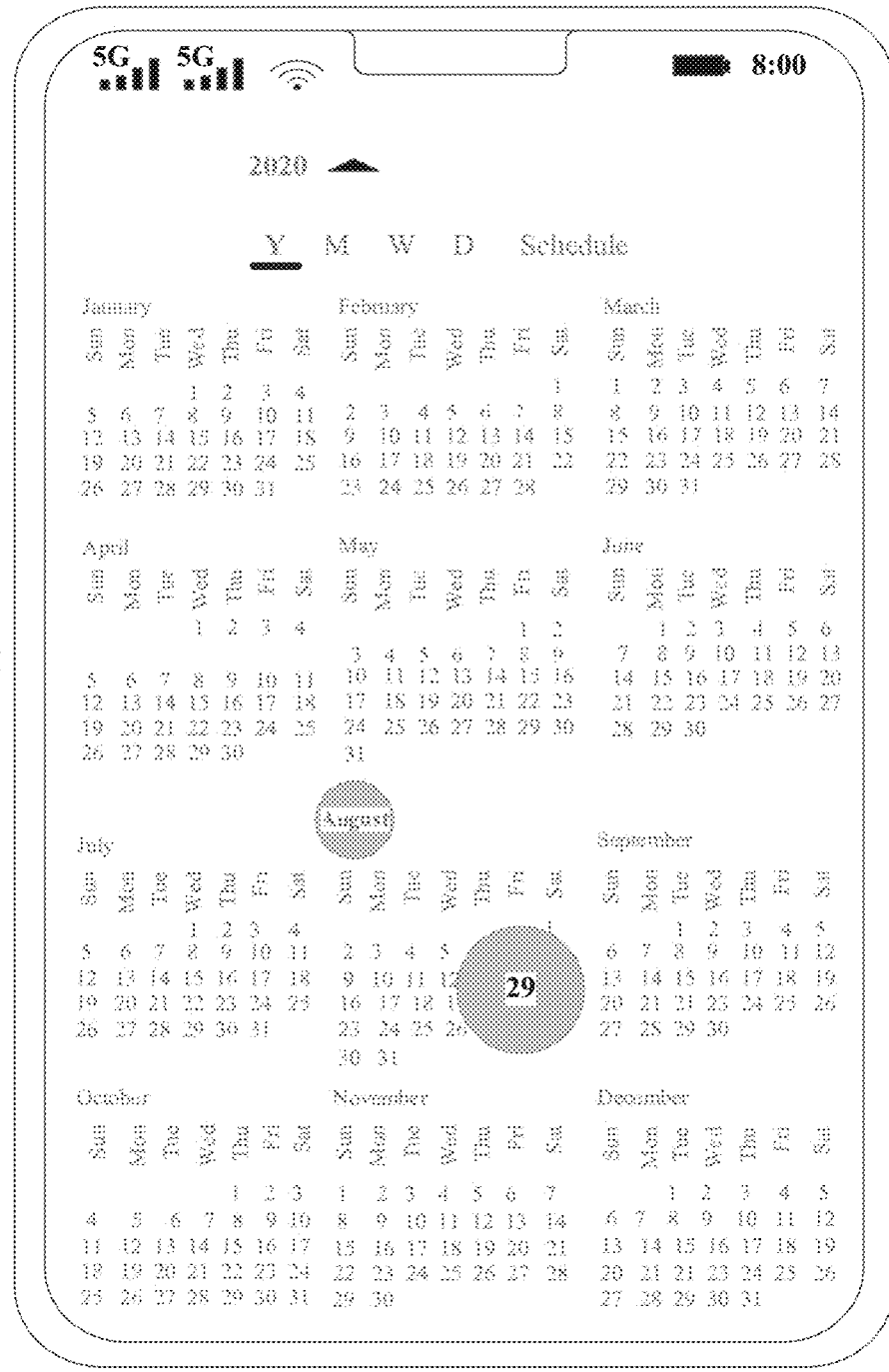
Figure 32E:
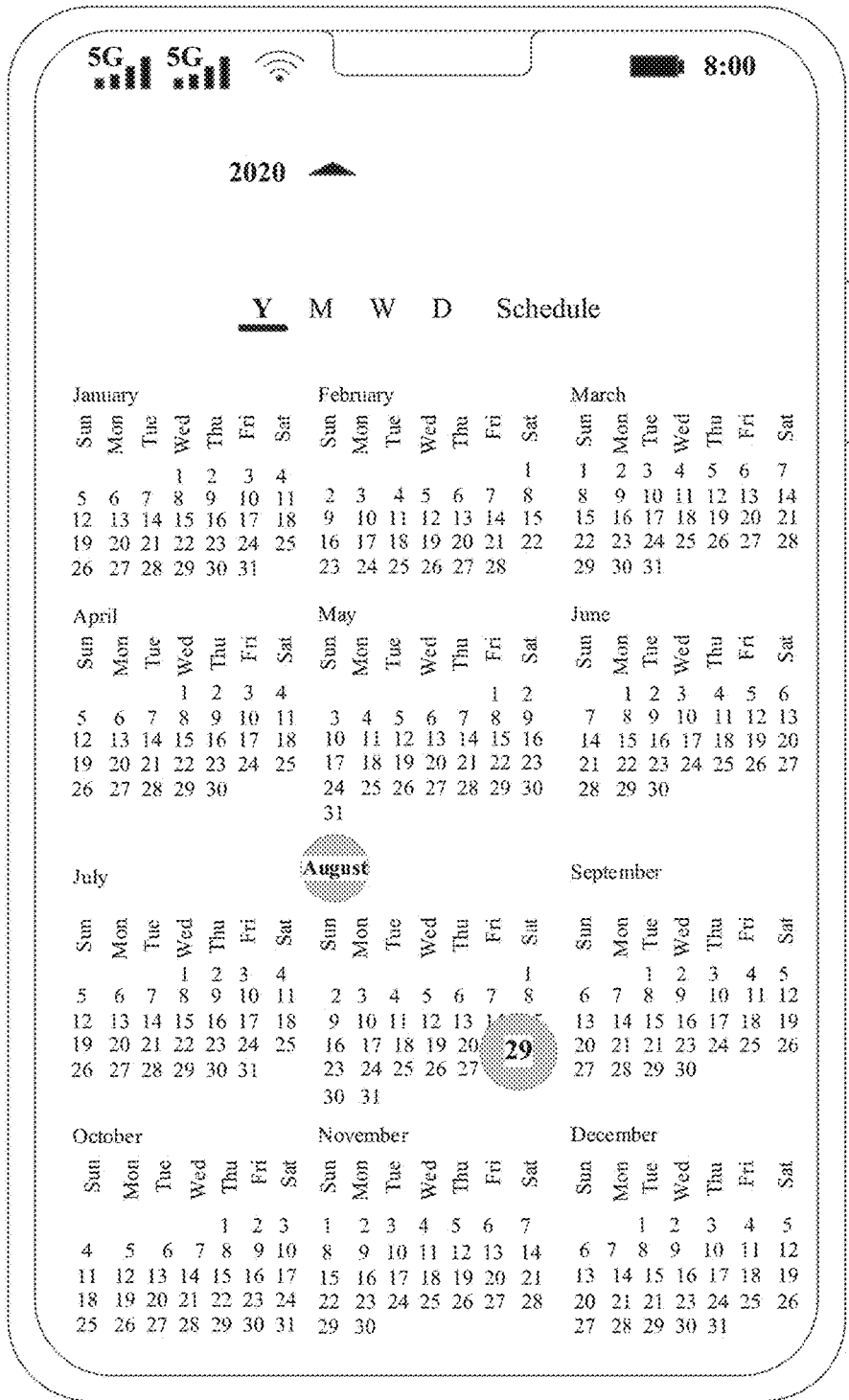
Figure 32F:
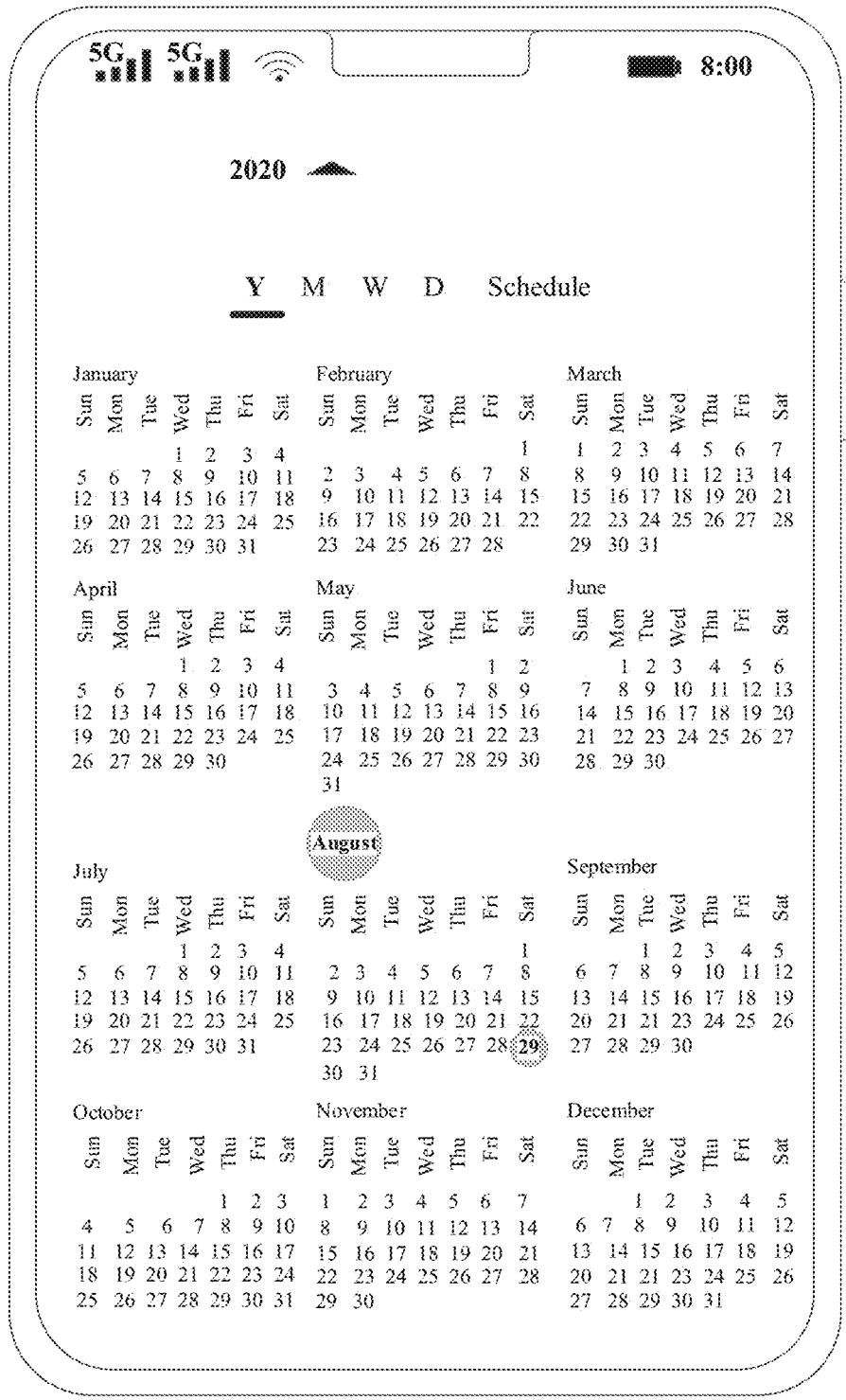

Case 1: Intra-Application Conversion:

As shown in FIG. 30(a) to FIG. 30 (an embodiment of this application provides a first example of an effect of inter-interface conversion based on at least two ViewGroups by using a calendar application as an example.

For example, as shown in Table 9, a configuration file of the calendar application in this embodiment of this application is as follows:

| Name | Implication | Parameter | Scenario |
|---|---|---|---|
| Abstract_Calendar (calendar) | Abstract class (where the calendar is the conversion object) | None | Entry, exit, and shared |
| Displacement_ExitAnimNode | Relative displacement animation | Displace 20 pixels from left to right with displacement duration of 2 s | Exit |
| Displacement_EnterAnimNode | Relative displacement animation | Displace 20 pixels from right to left with displacement duration of 2 s | Entry |
| Shade_ExitAnimNode | Gradient animation | Gradient duration: 2 s | Exit |
| Shade_EnterAnimNode | Gradient animation | Gradient duration: 2 s | Entry |
| Abstract_Share_year | Abstract class (where the shared element is year) | 2020 | Shared |
| Rock_year | Shaking animation | Shake from left to right with a shaking amplitude of 2 pixels | Shared |

It is assumed that when inter-interface conversion is performed, an exit interface and an entry interface of the music application are shown in FIG. 30(a) to FIG. 30(f). Based on the content of Table 9, it may be determined that an exit dynamic effect on the exit interface is a dynamic effect with a displacement of 20 pixels from left to right and a gradient of 2 s, that an entry dynamic effect on the entry interface is a dynamic effect with a displacement of 20 pixels from right to left and a gradient of 2 s, and that in the inter-interface conversion process, the shared element presents an effect of shaking from left to right with a shaking amplitude of 2 pixels.

Therefore, when the calendar application starts inter-interface conversion, as shown in FIG. 30(a) to FIG. 30(f), it is assumed that the user taps an icon of August on an interface a of the calendar application, and the icon of August is determined as the shared element. During interface conversion, the icon of August always exists.

Case 2: Inter-Application Conversion:

As shown in FIG. 31(a) to FIG. 31(g), the following describes, by using an example in which the user needs to switch to a camera application when using a shopping application, the method for performing inter-interface conversion based on a single-shot effect provided in this embodiment of this application.

It is assumed that when the user configures the inter-interface conversion solution between the shopping application and the camera application, a photographing button in the shopping application is used as a shared element, and continuously exists in a conversion process.

For example, as shown in FIG. 31(a) to FIG. 31(g), when the user taps the photographing button on the shopping interface, inter-interface conversion between the shopping application and the camera application is triggered. In a process in which the shopping application jumps to the camera application, the photographing button of the camera application continuously exists, the shopping interface fades out, and a camera interface fades in.

Case 3: Desktop-to-Application Conversion:

The following describes, by using an example in which the user needs to switch from an application desktop to a calendar application, the method for performing inter-interface conversion based on a single-shot effect provided in this embodiment of this application.

It is assumed that when the user configures the inter-interface conversion solution between the application desktop and the calendar application, a date element in a calendar application icon is used as a shared element and continuously exists in the conversion process.

For example, as shown in FIG. 32(a) to FIG. 32(f), after the user taps the calendar application icon on the application desktop, inter-interface conversion between the application desktop and the calendar application is triggered. In a process in which the application desktop jumps to the calendar application, the date used as a shared element always exists.

Application example 2: When an element 1 on the first interface is switched to the second interface by using the at least one transition interface, the element 1 gradually changes to an element 2, where a similarity between the element 2 and the element 1 is higher than a similarity threshold.

Based on different conversion types such as an Activity conversion type, a ViewGroup conversion type, and a Fragment conversion type, the following separately describes, by using examples, the solution for performing inter-interface conversion based on a single-shot effect provided in this embodiment of this application.

Conversion Type 1: Fragment Conversion Type

In this embodiment of this application, the inter-interface conversion solution based on the Fragment conversion type may be further classified into a plurality of cases such as inter-application conversion, intra-application conversion, and desktop-to-application conversion. This is not specifically limited to the following content.

Figure 33A:
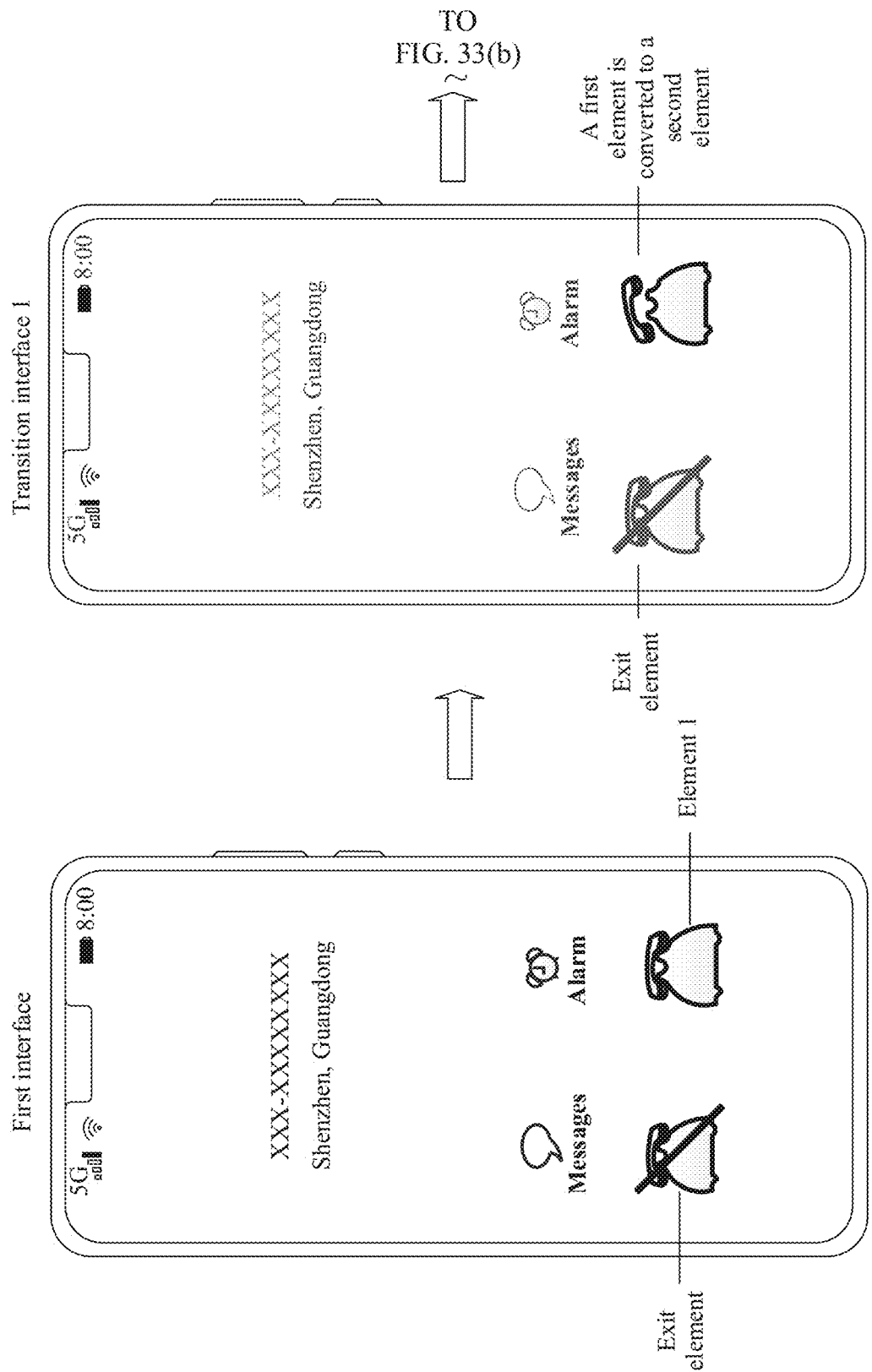
FIG. 33(a) to FIG. 33(c) are schematic diagrams of a conversion effect of a call application according to Embodiment 2 of this application.
Figure 33B:
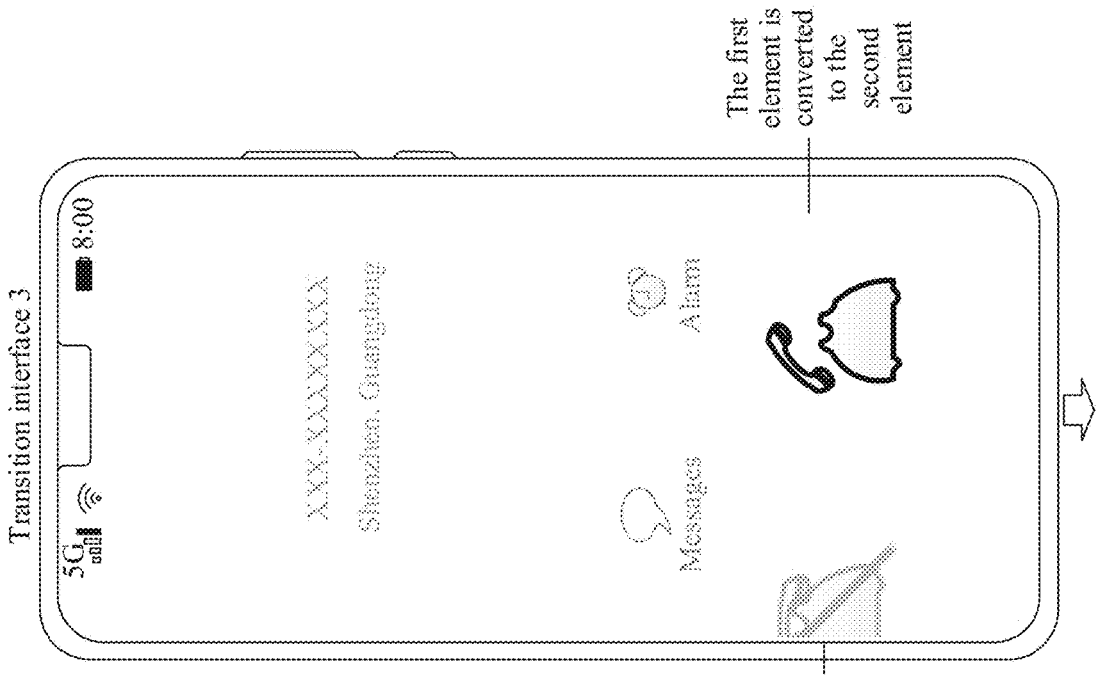
Figure 33C:
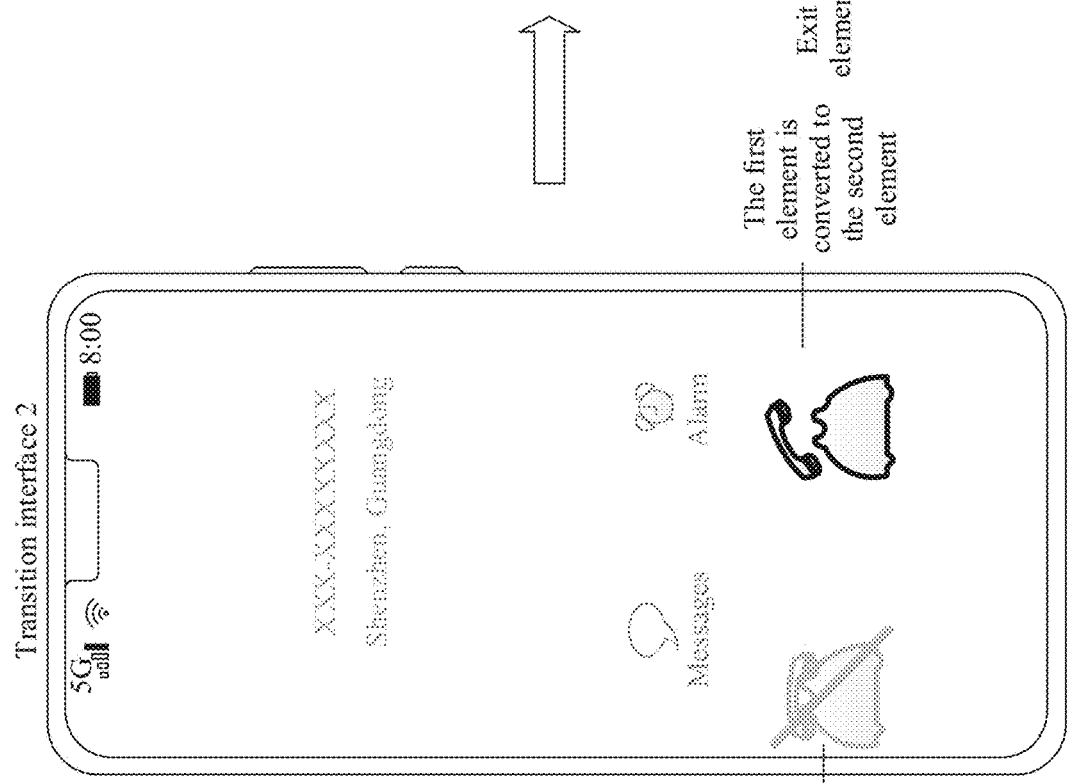
Figure 33C:
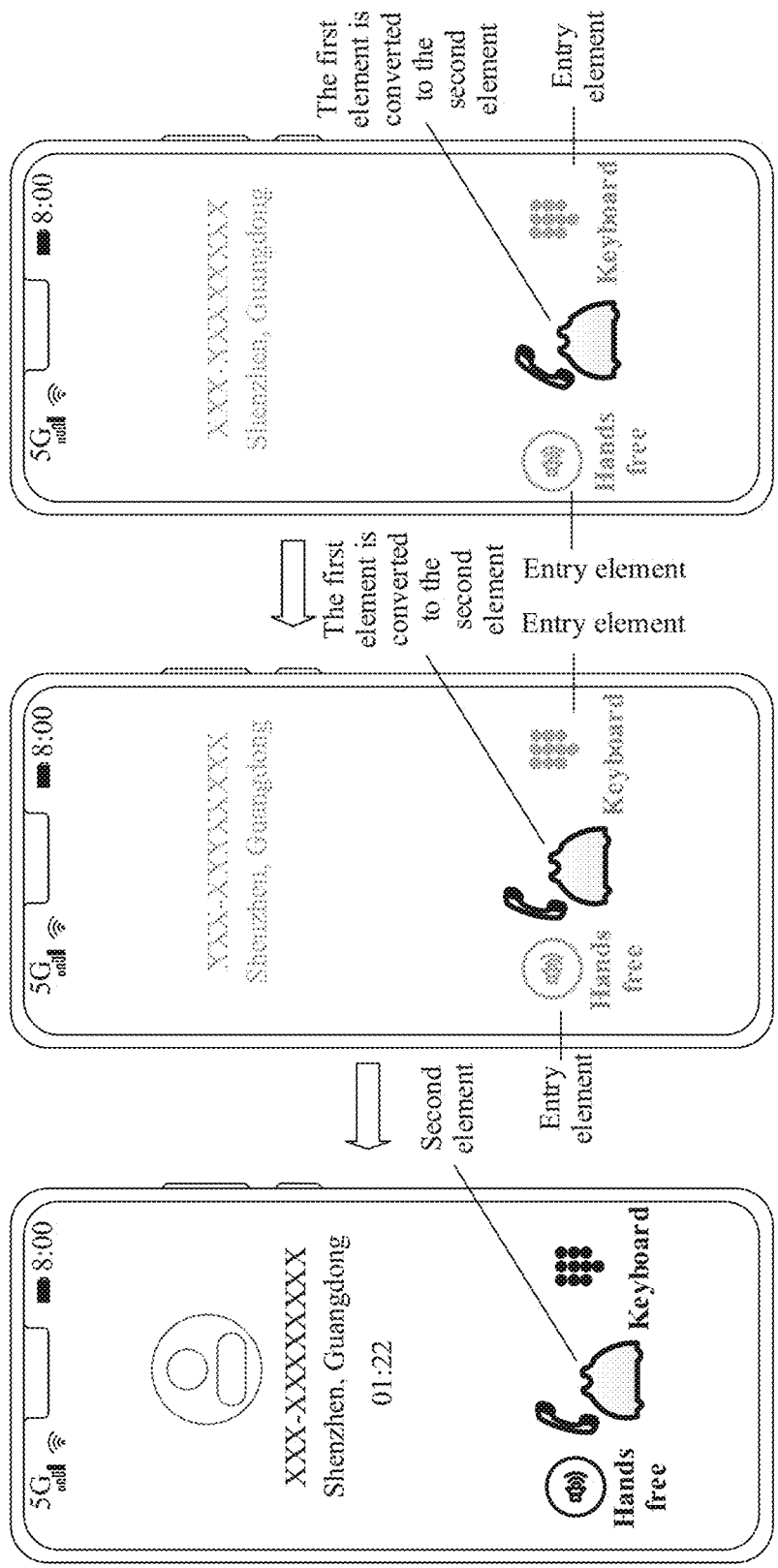

Case 1: Intra-Application Conversion:

As shown in FIG. 33(a) to FIG. 33(c), an embodiment of this application provides an example of an effect of intra-application conversion based on at least two Fragments by using a call application as an example.

In this embodiment of this application, corresponding ids may be set for an answer key and a hang-up key in an answer button, and a use status of the call application is determined based on an answer or hang-up instruction triggered by the user.

For example, as shown in FIG. 33(a) to FIG. 33(c), when the call application starts inter-interface conversion, in a process of switching from the first interface to the second interface, if the user triggers an answer instruction, the answer button is a shared element.

In other words, the transition interface in the process of switching from the first interface to the second interface includes the shared element. A presentation form of the shared element on the first interface is the element 1, a presentation form of the shared element on the second interface is the element 2, and the similarity between the element 1 and the element 2 is higher than the similarity threshold.

Further, in the process of switching from the first interface to the second interface, the element 1 gradually changes to the presentation form of the element 2. It can be learned from FIG. 33(a) to FIG. 33(c) that in the process in which the element 1 gradually changes to the element 2, presented content is that a call is gradually picked up. This enriches interestingness and brings more vivid interface switching experience to the user.

In addition, an exit element on the first interface fades out. For example, an exit element is a hang-up key icon. During interface switching, a fade-out dynamic effect is executed. An entry element on the second interface fades in. For example, entry elements are a hands-free icon and a keyboard icon. During interface switching, a fade-in dynamic effect is executed.

Case 2: Inter-Application Conversion:

The following describes, by using an example in which the user needs to switch to a messages application when using a call application, the method for performing inter-interface conversion based on a single-shot effect provided in this embodiment of this application.

It is assumed that when the user configures the inter-interface conversion solution between the call application and the messages application, an answer button in the call application is used as a shared element, and continuously exists in the conversion process.

Figure 34A:
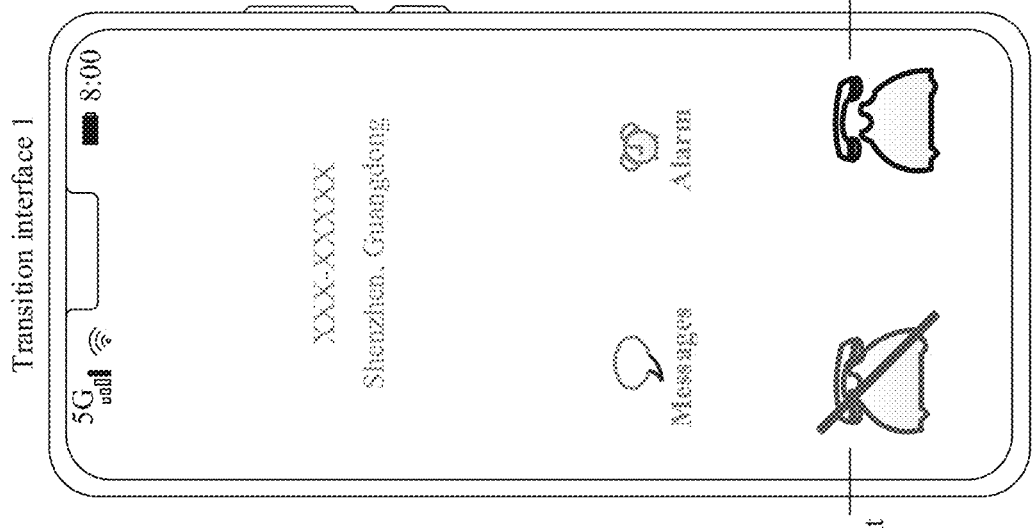
Figure 34A:
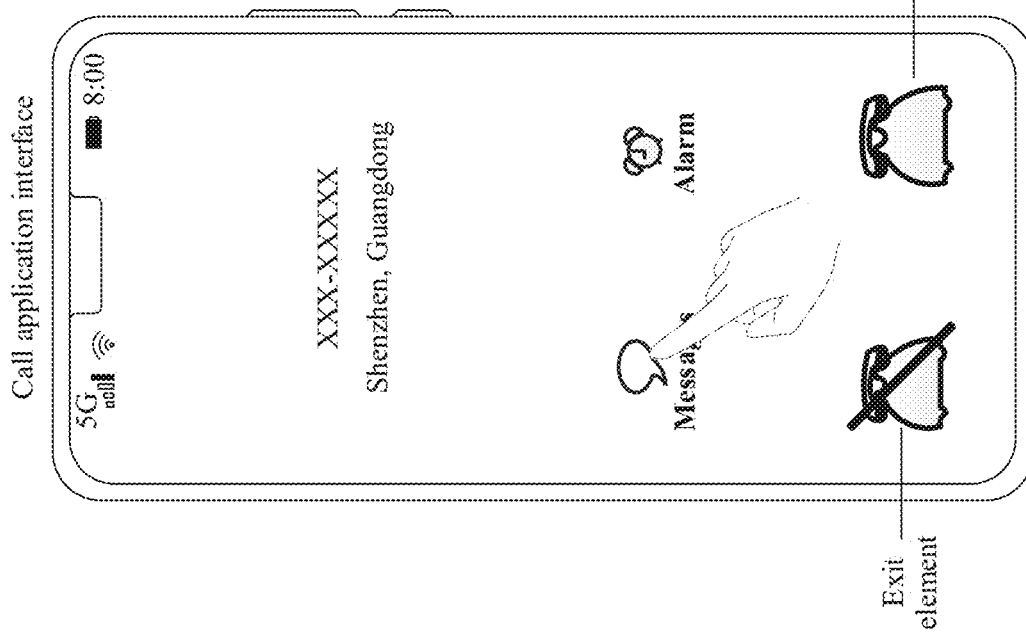
Figure 34C:
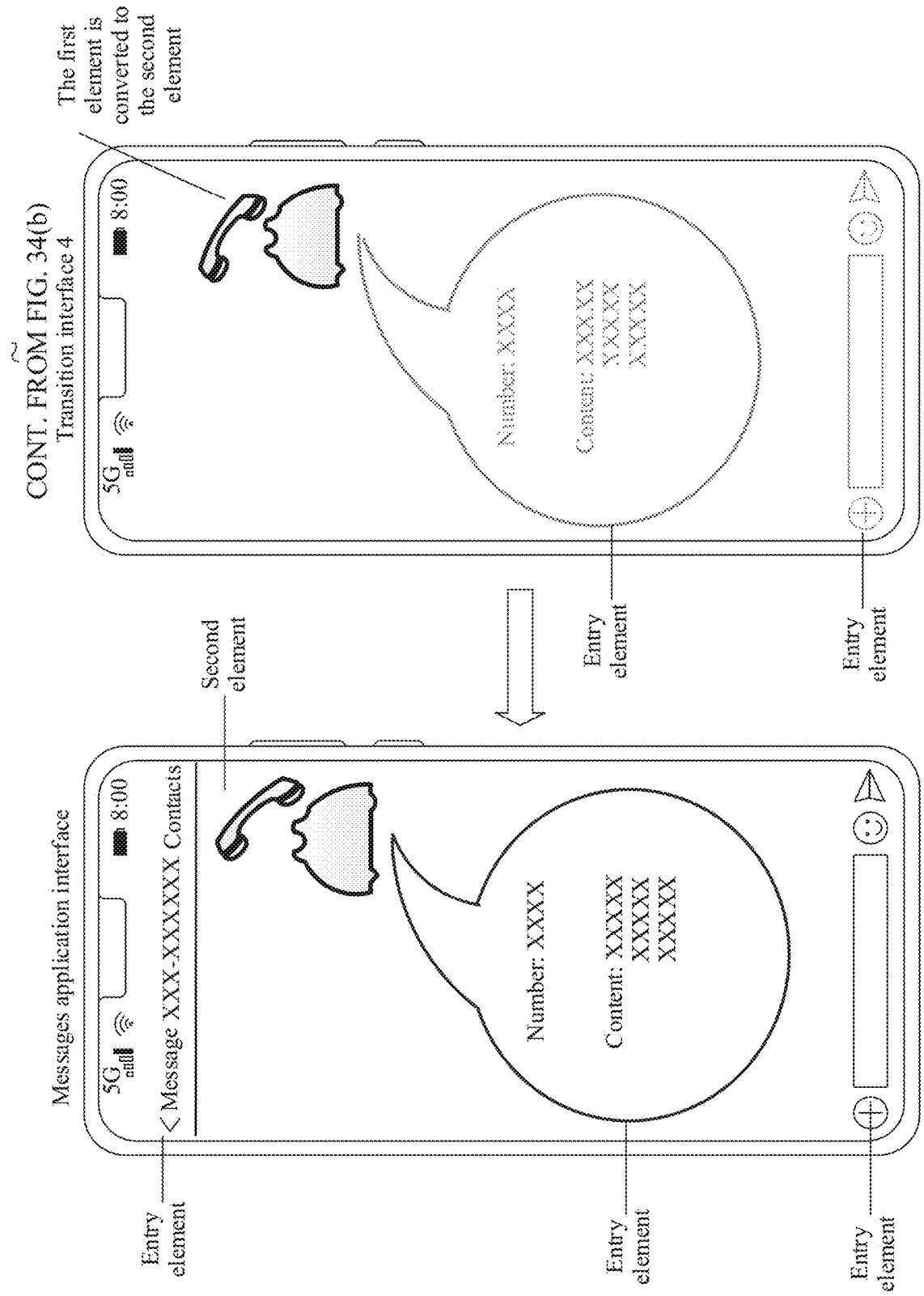
Figure 35A:
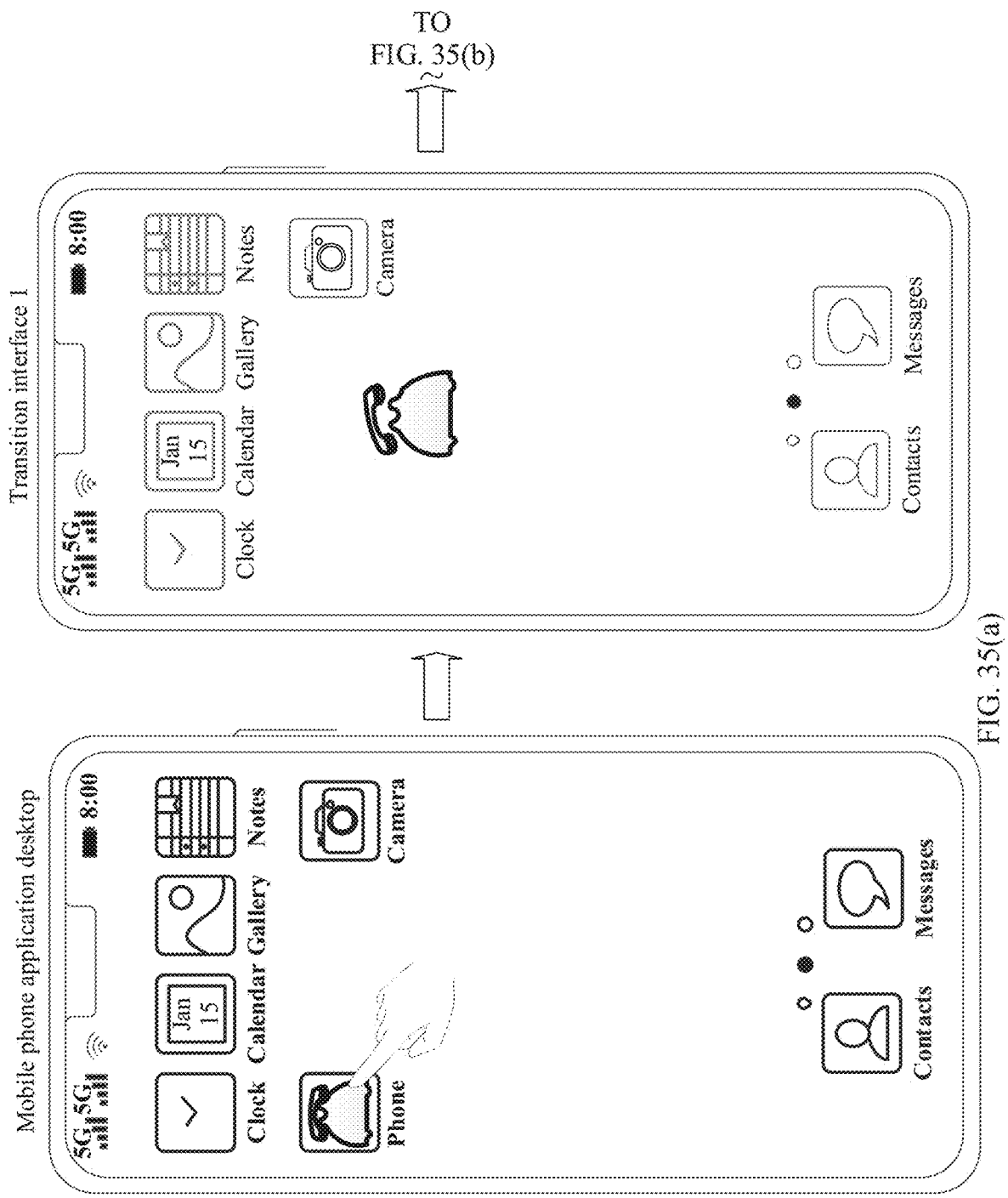
FIG. 35(a) to FIG. 35(c) are schematic diagrams of a first effect of conversion between a desktop and an application according to Embodiment 2 of this application.
Figure 35B:
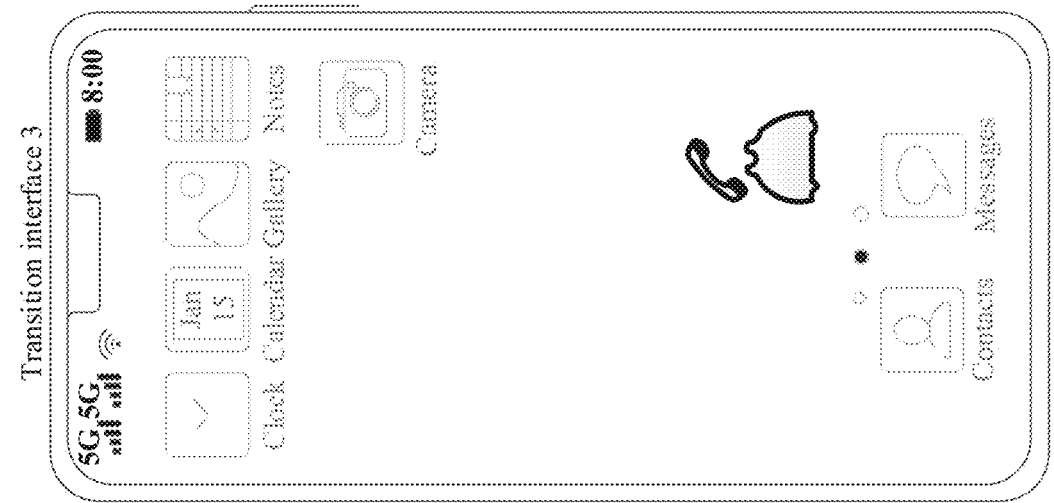
Figure 35B:
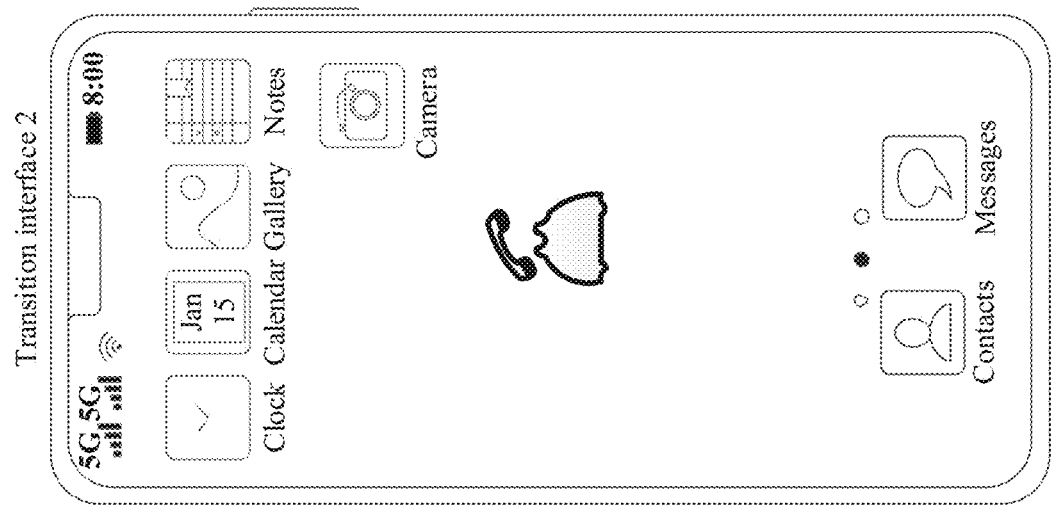
Figure 35C:
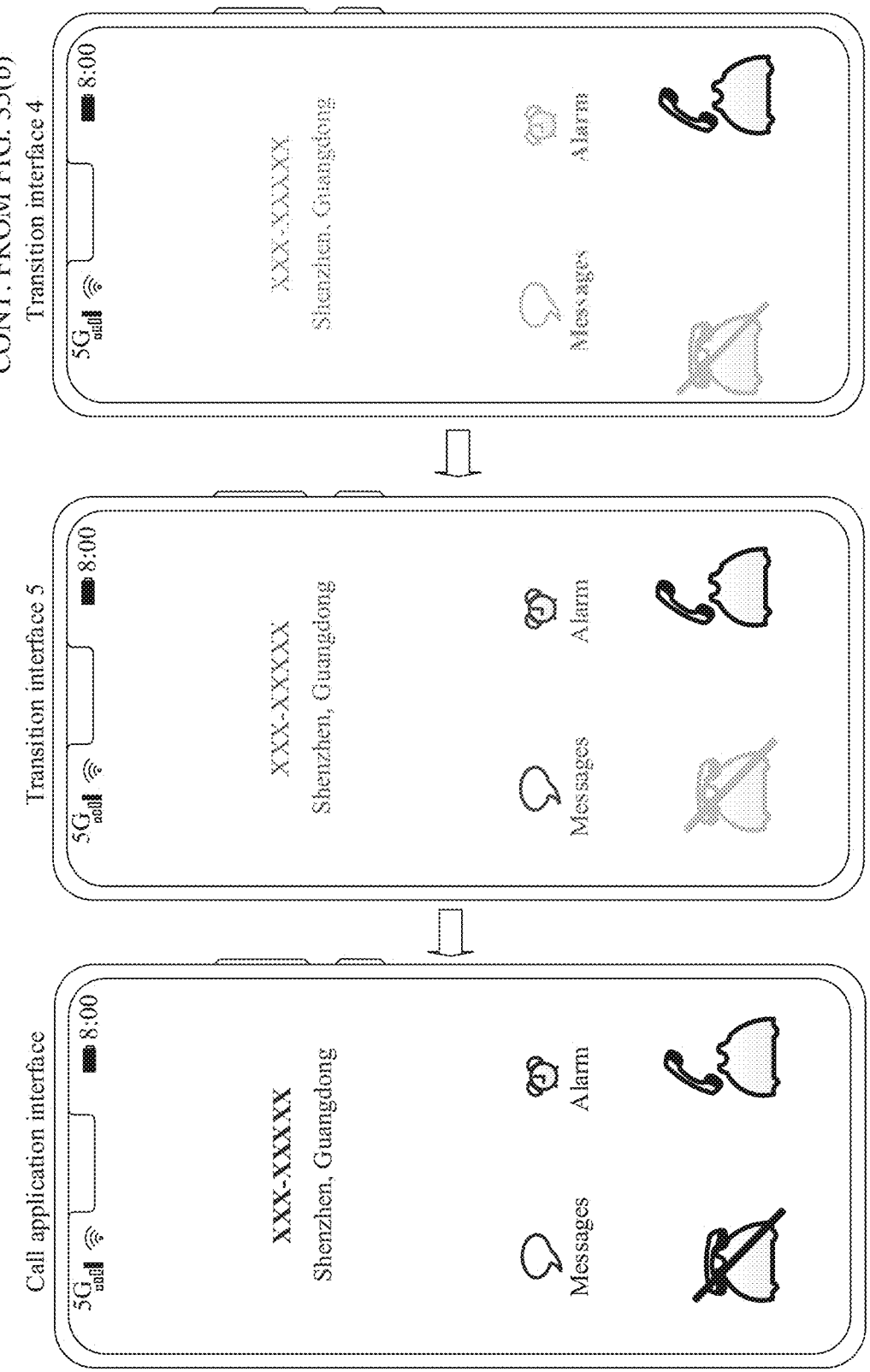
Figure 36A:
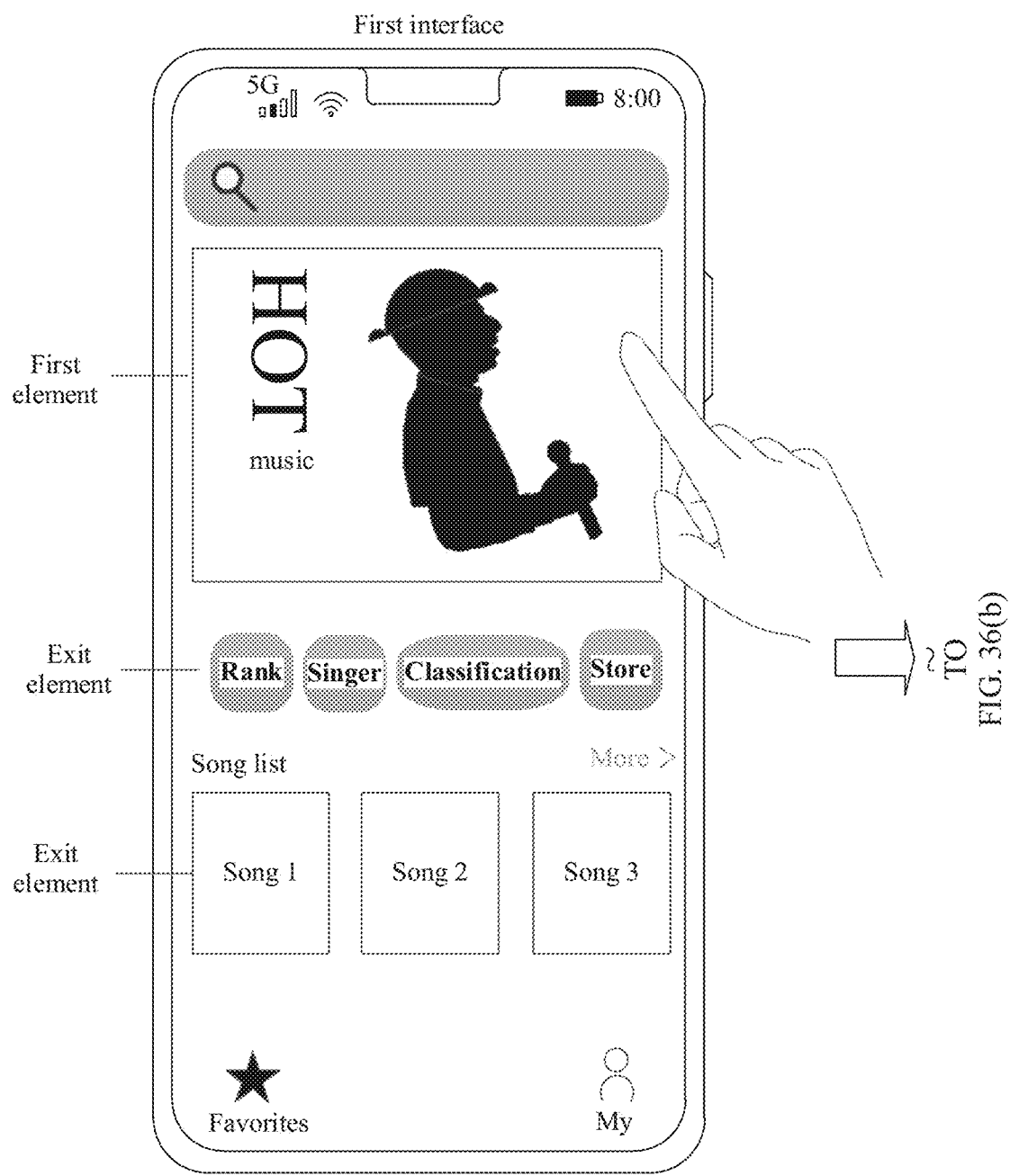
FIG. 36(a) to FIG. 36(g) are schematic diagrams of a conversion effect of a music application according to Embodiment 2 of this application.
Figure 36B:
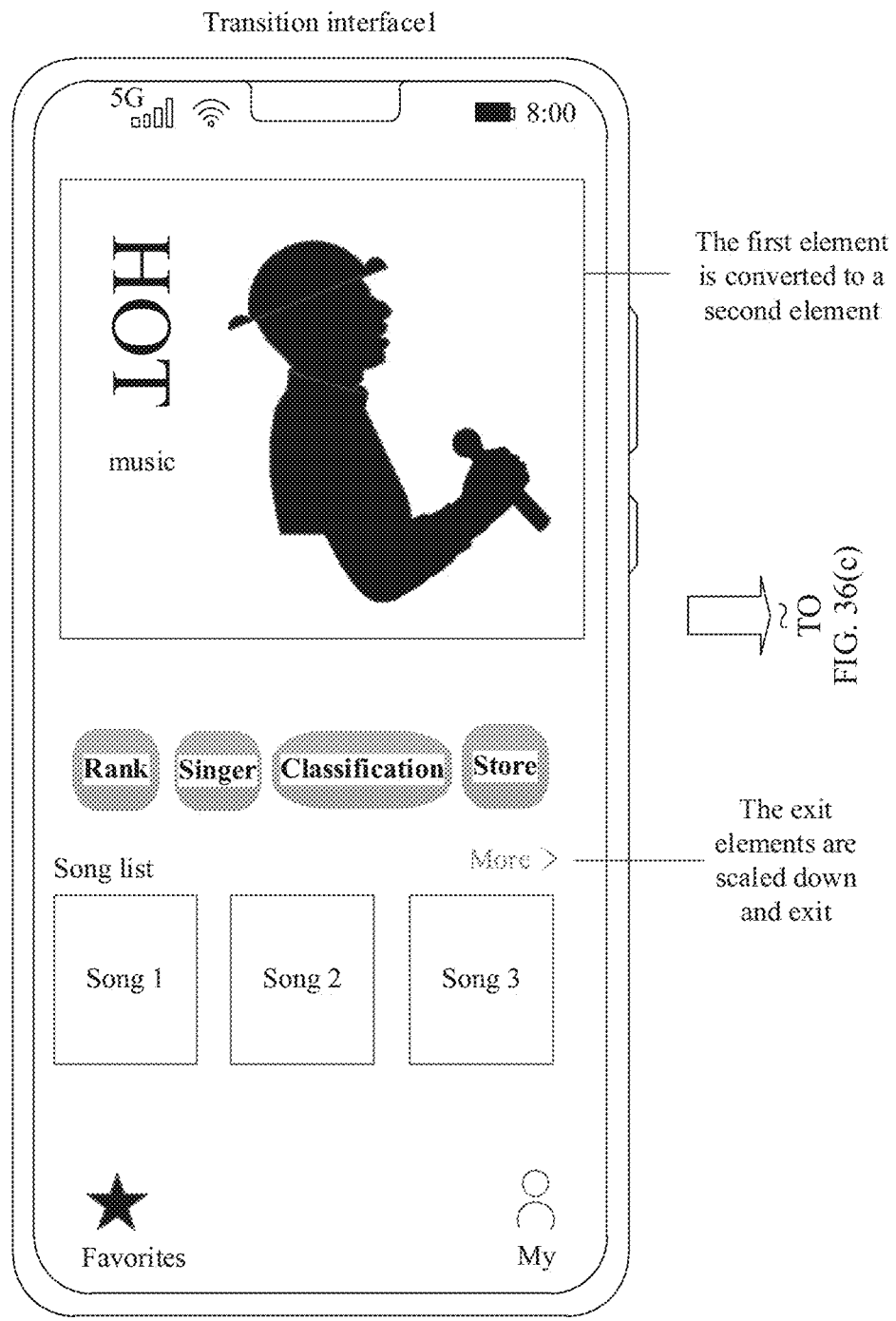
Figure 36C:
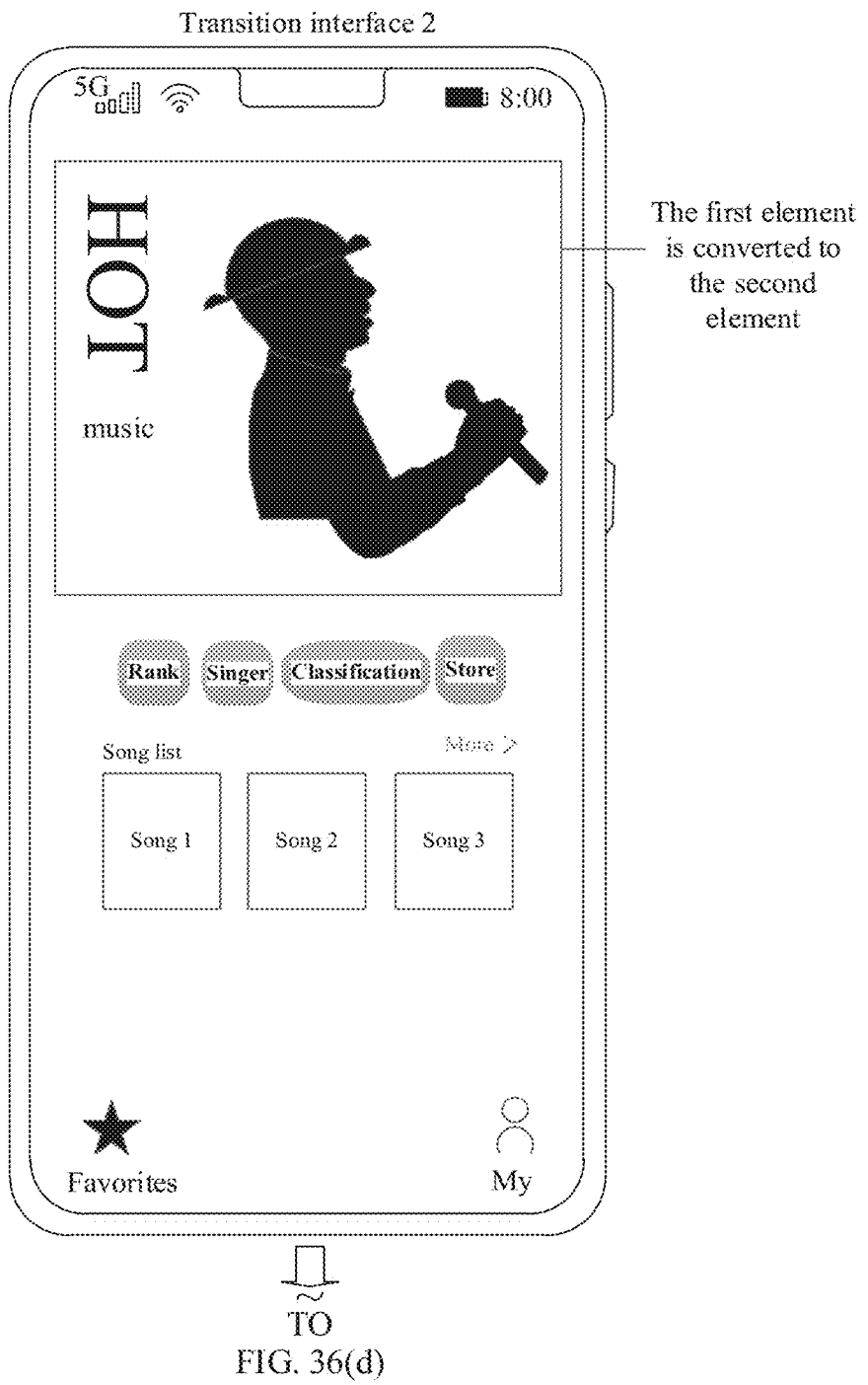
Figure 36D:
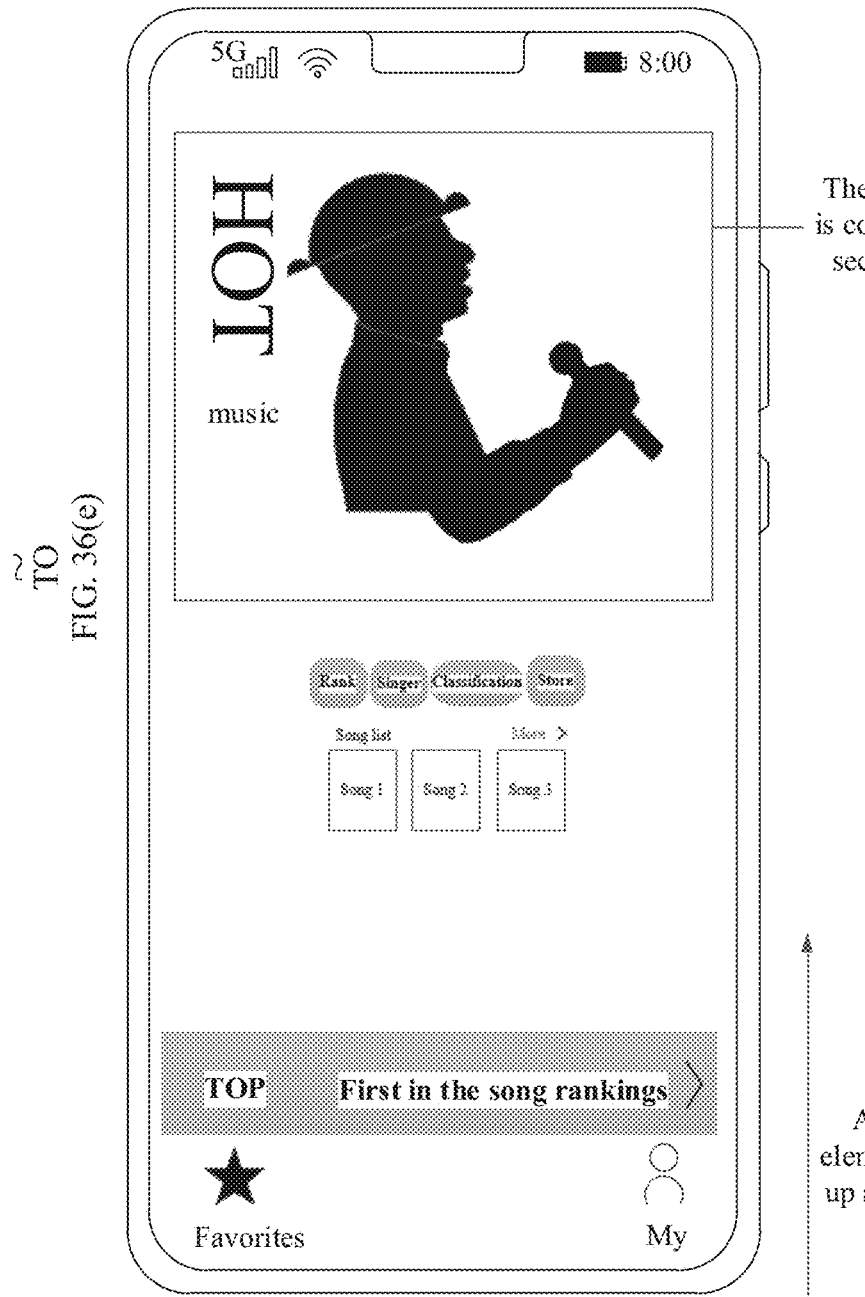
Figure 36E:
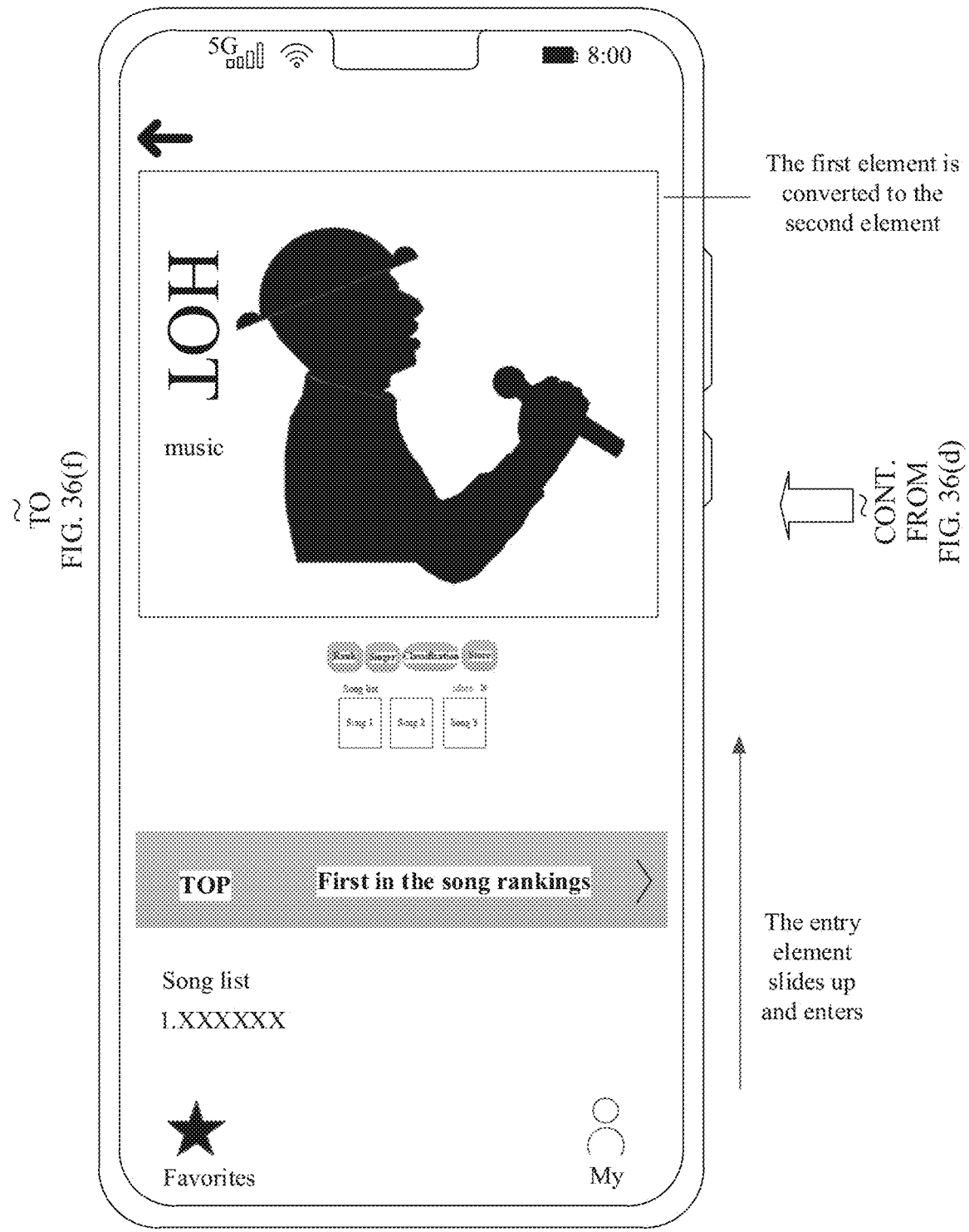
Figure 36F:
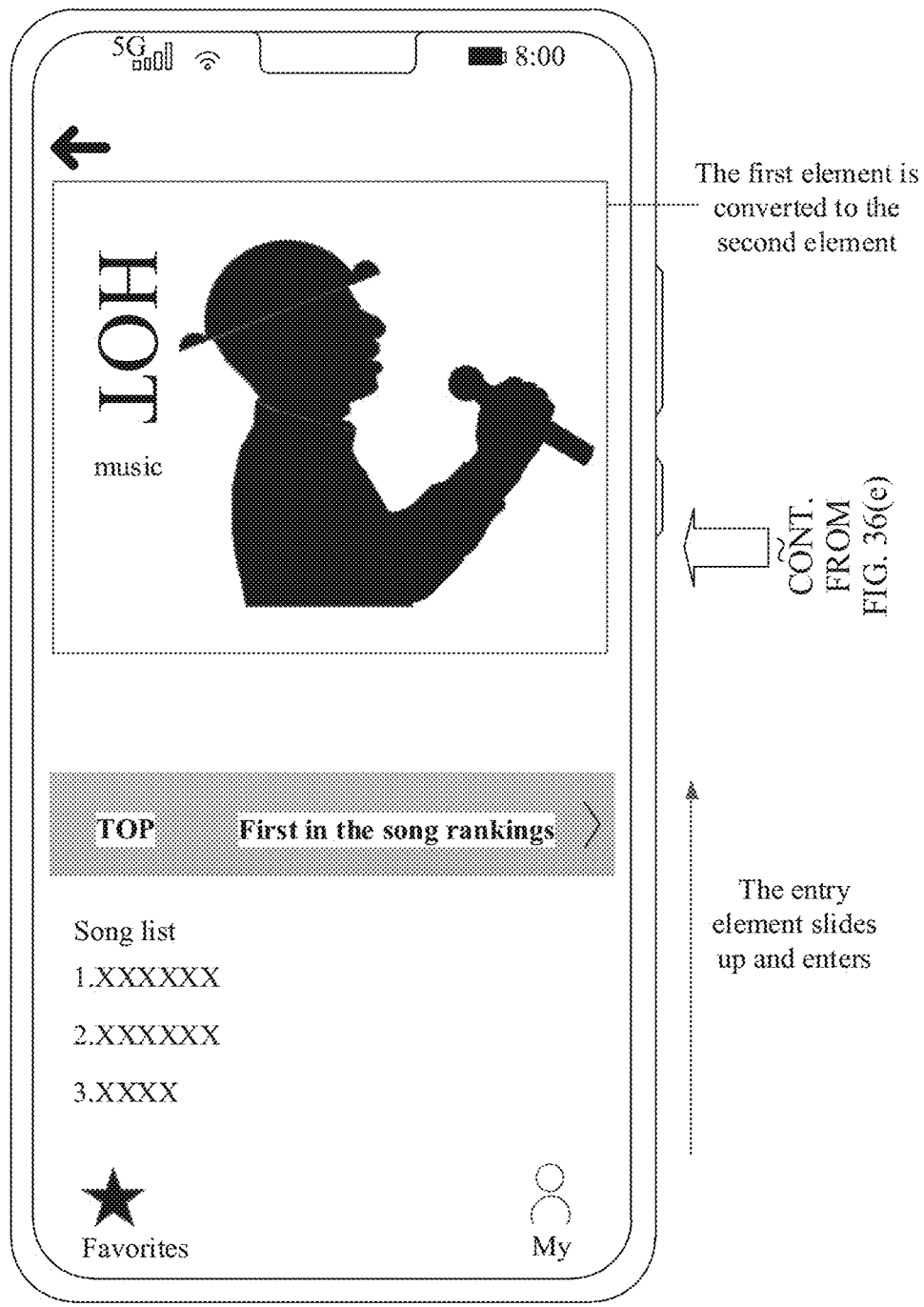
Figure 36G:
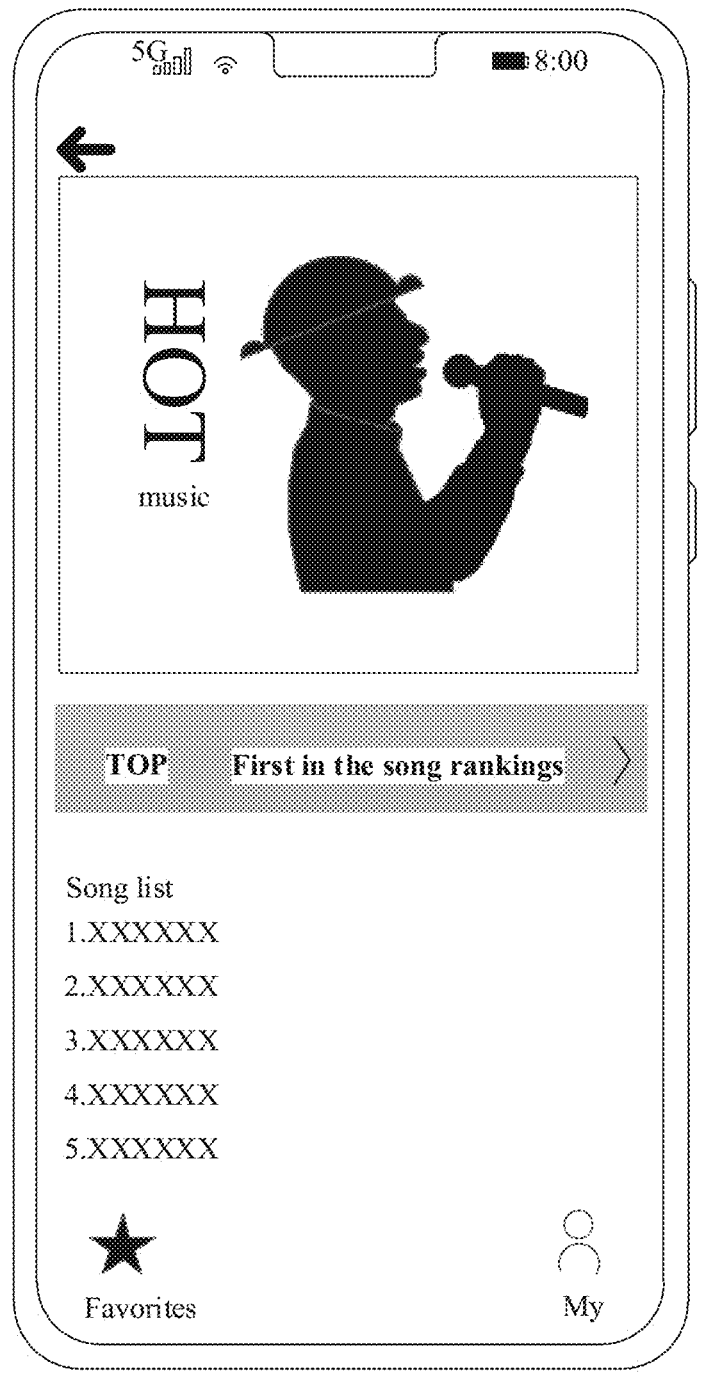
Figure 37A:
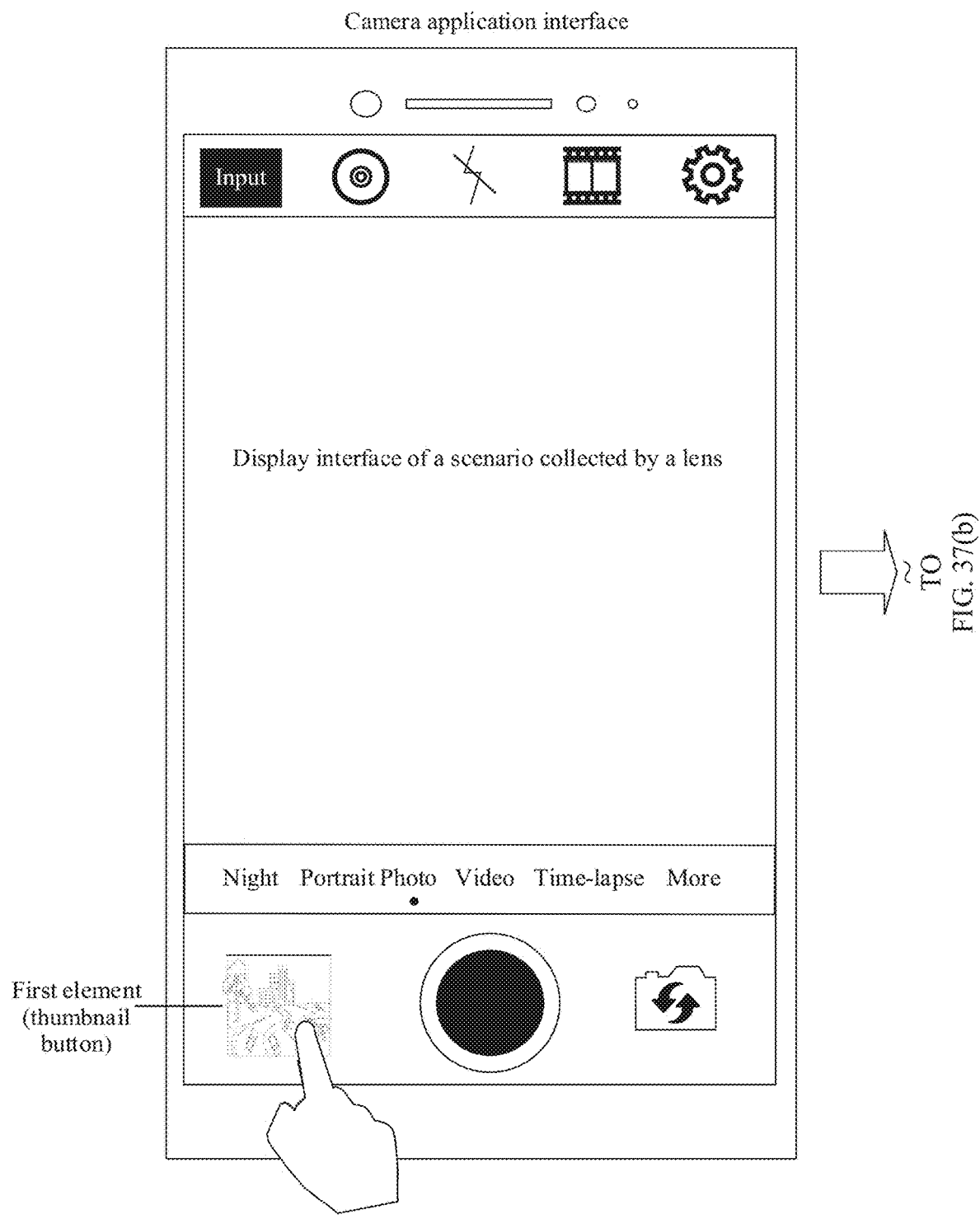
FIG. 37(a) to FIG. 37(f) are schematic diagrams of a second inter-application conversion effect according to Embodiment 2 of this application.
Figure 37B:
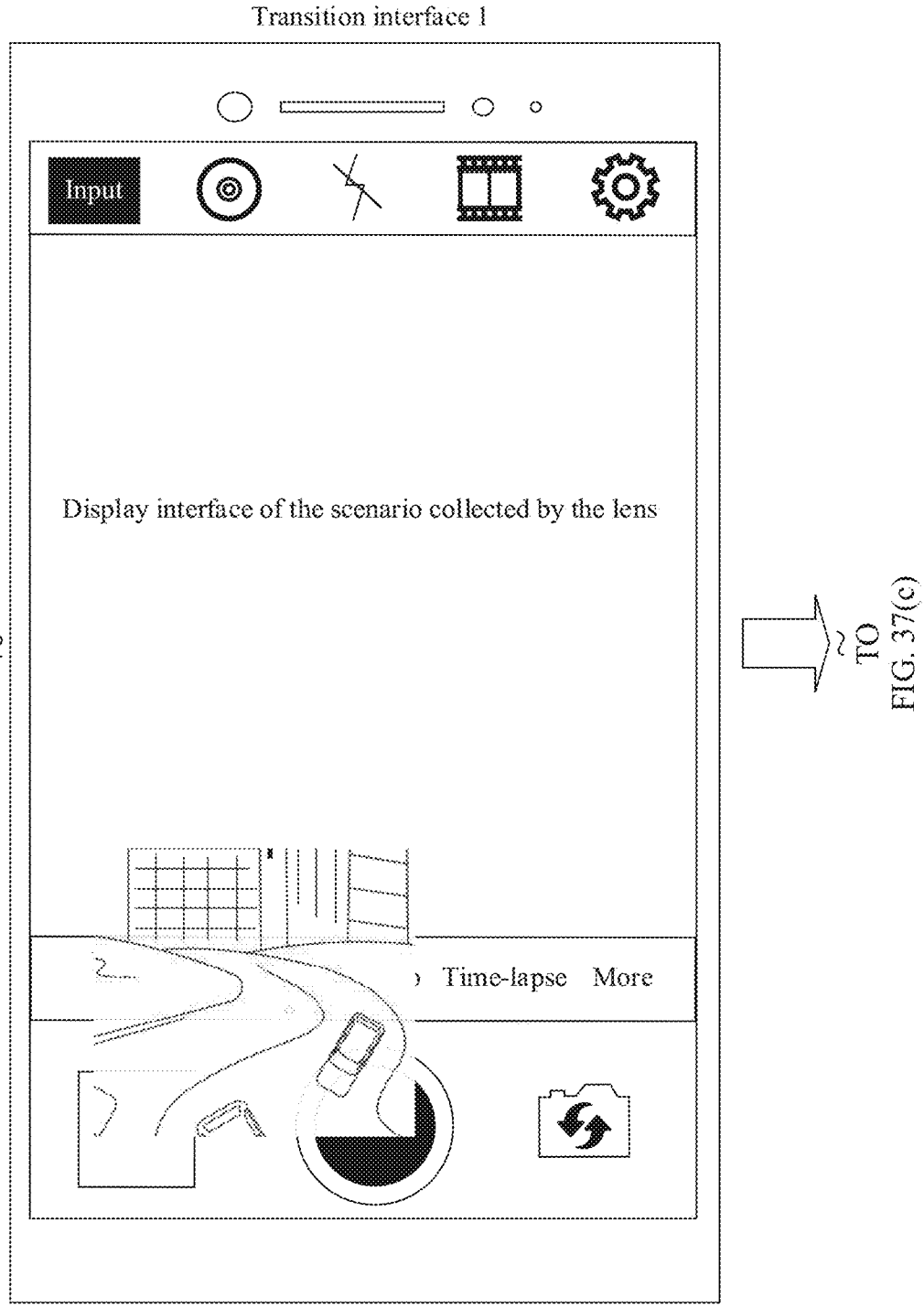
Figure 37C:
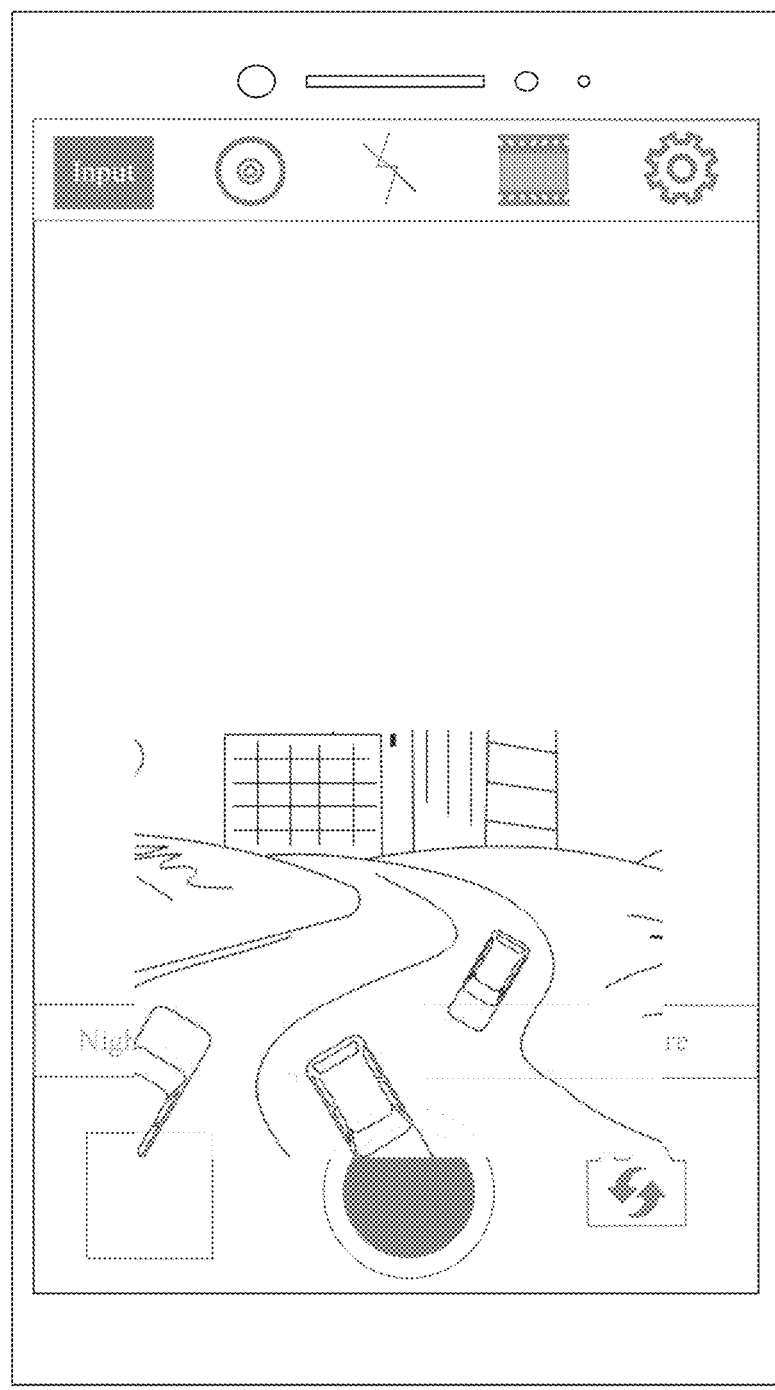
Figure 37D:
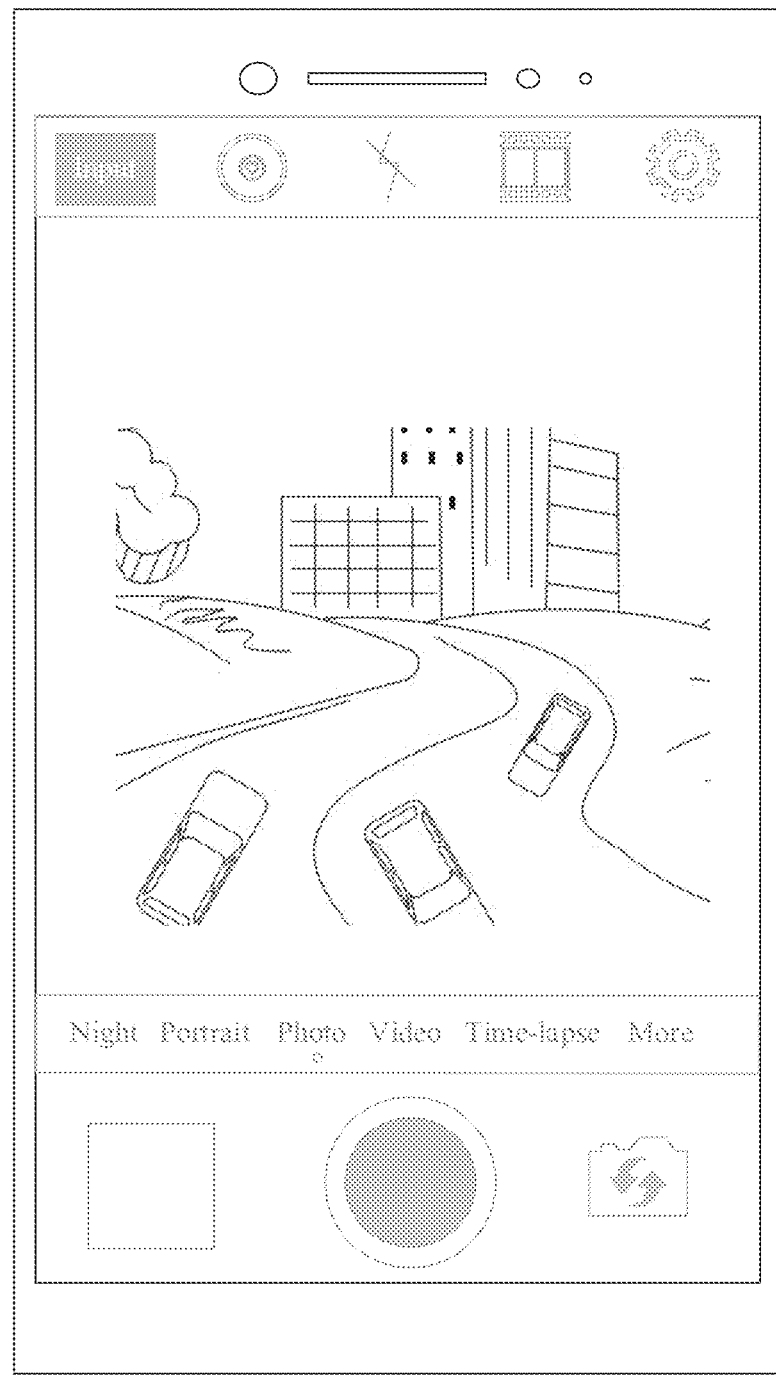
Figure 37E:
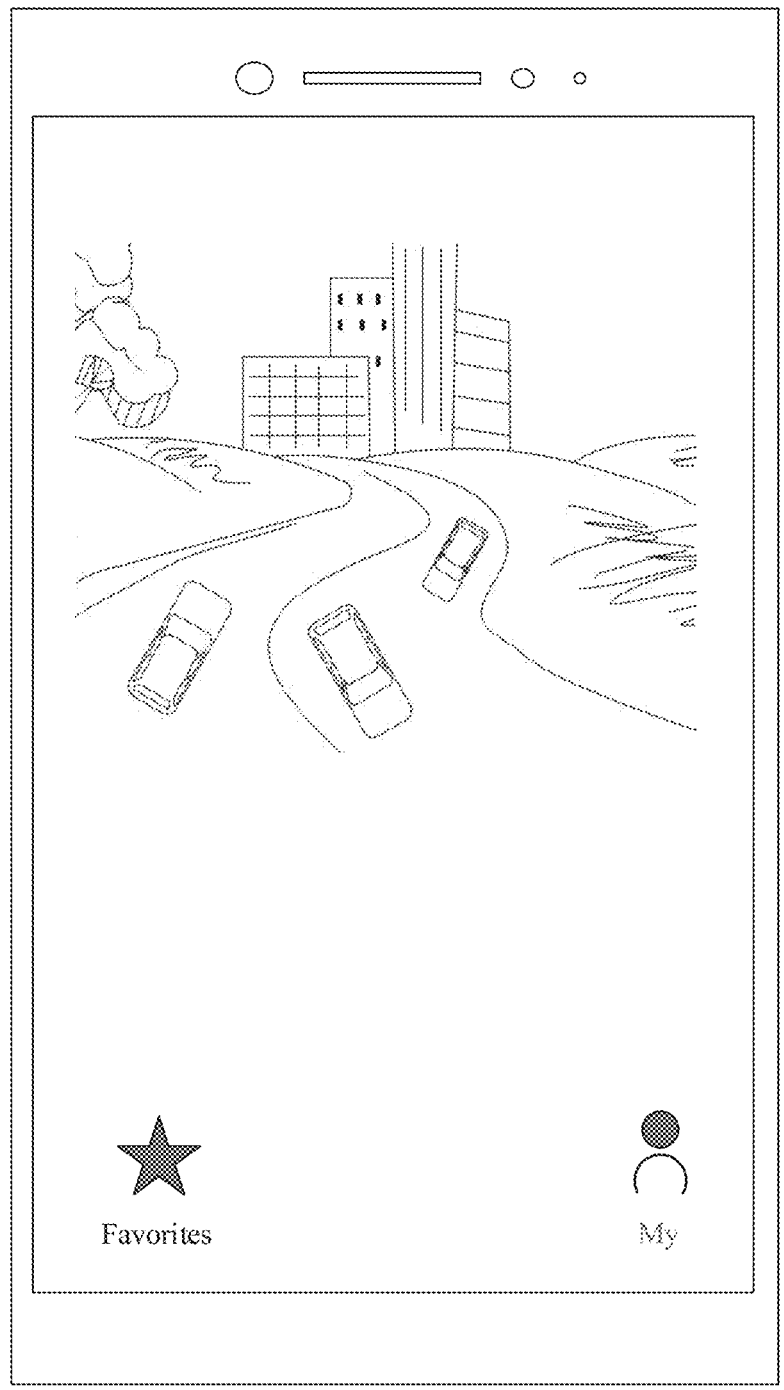
Figure 37F:
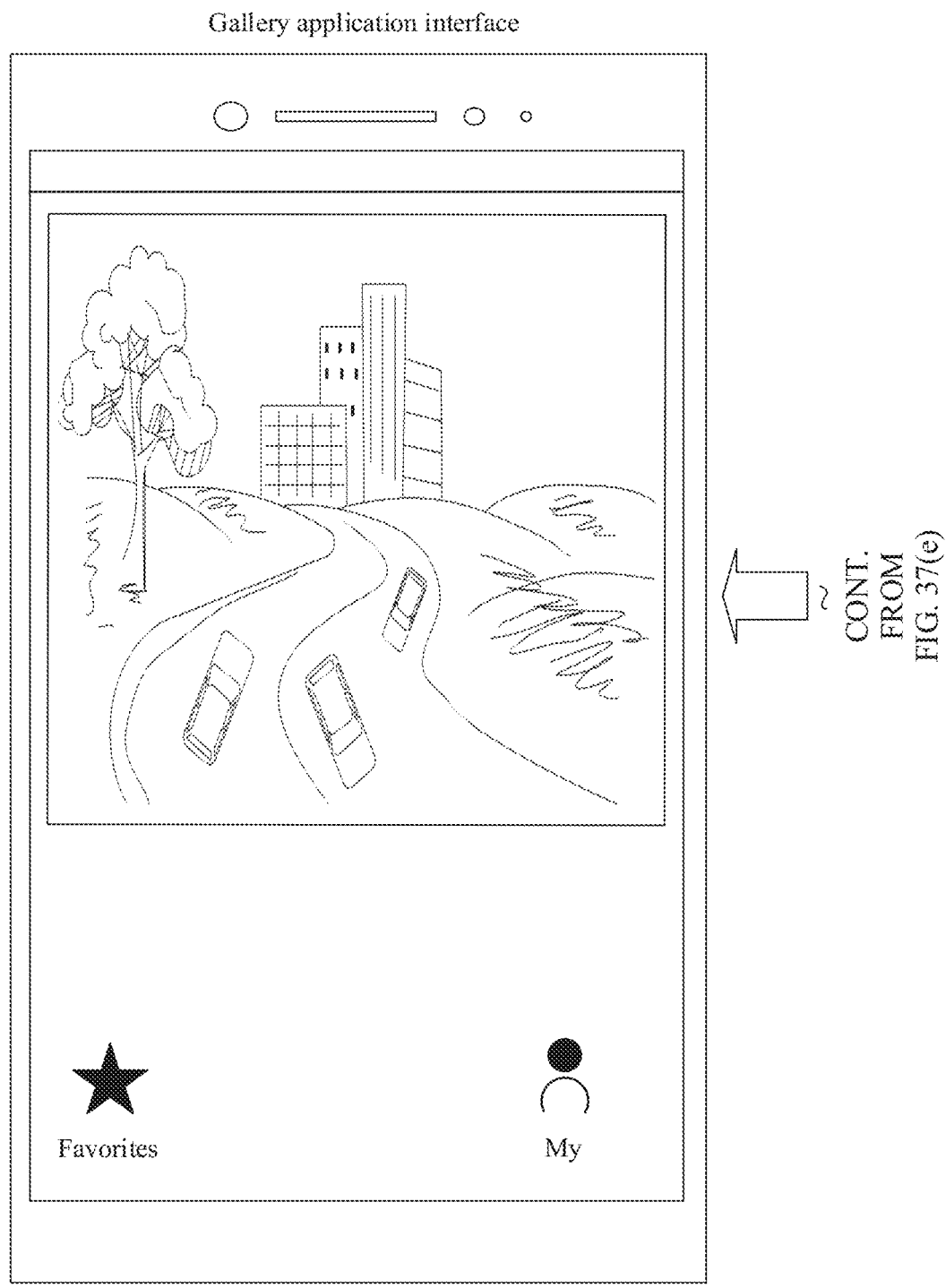
Figure 38A:
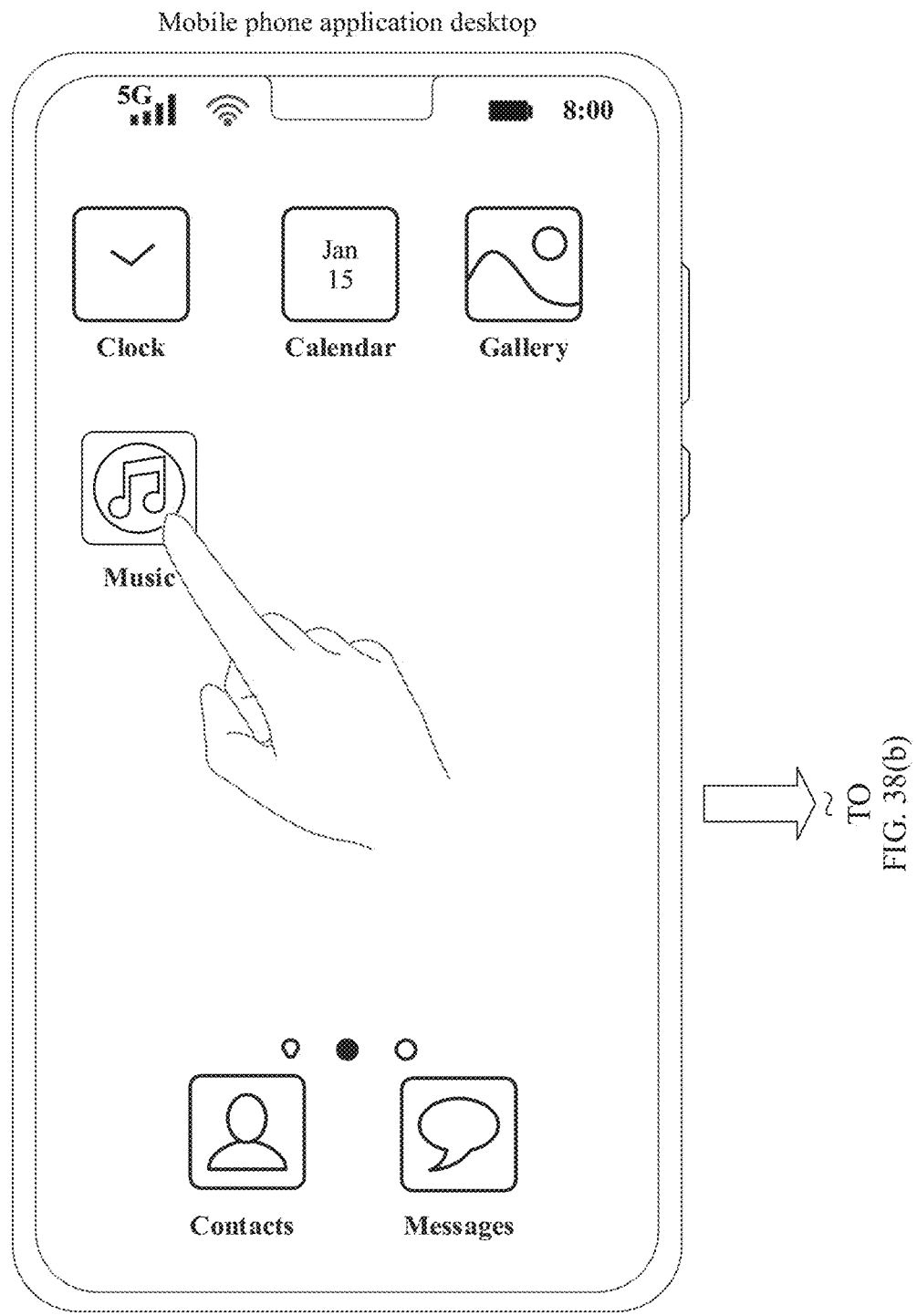
FIG. 38(a) to FIG. 38(f) are schematic diagrams of a second effect of conversion between a desktop and an application according to Embodiment 2 of this application.
Figure 38B:
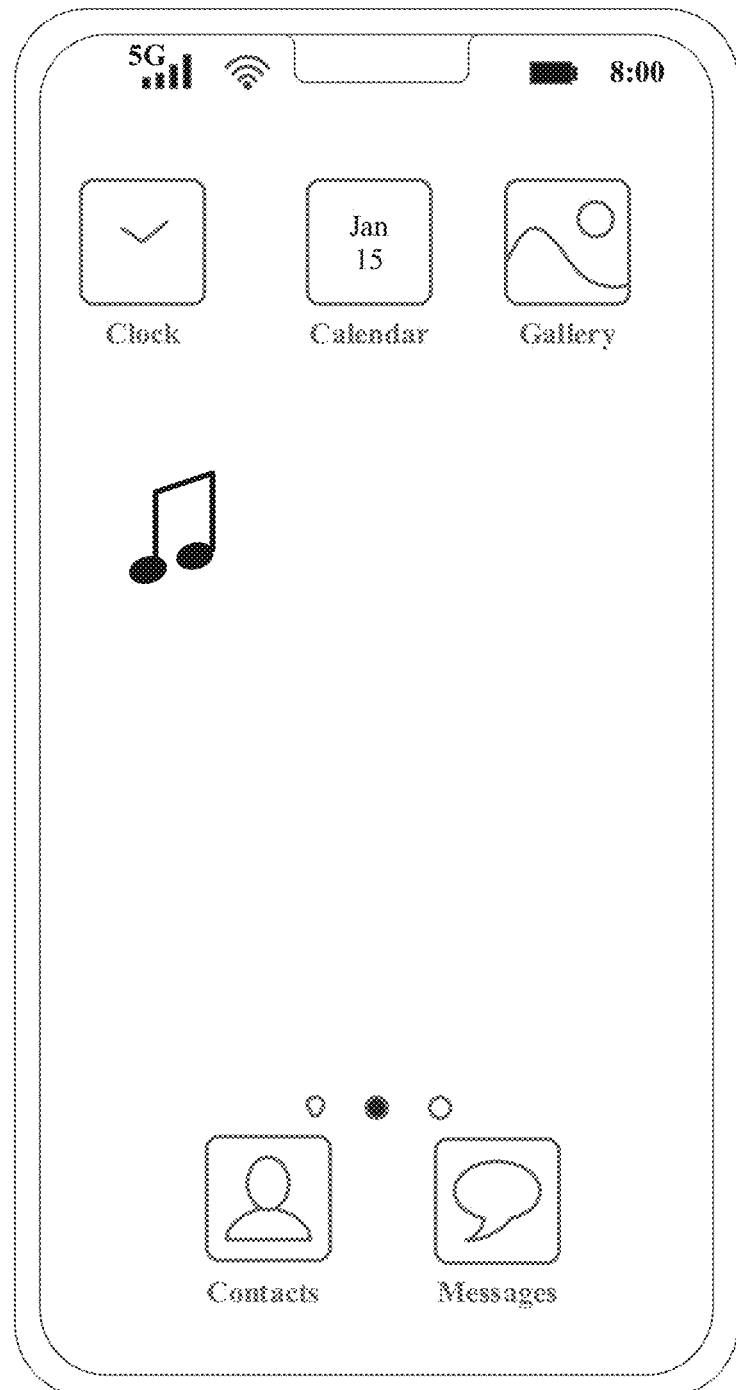
Figure 38C:
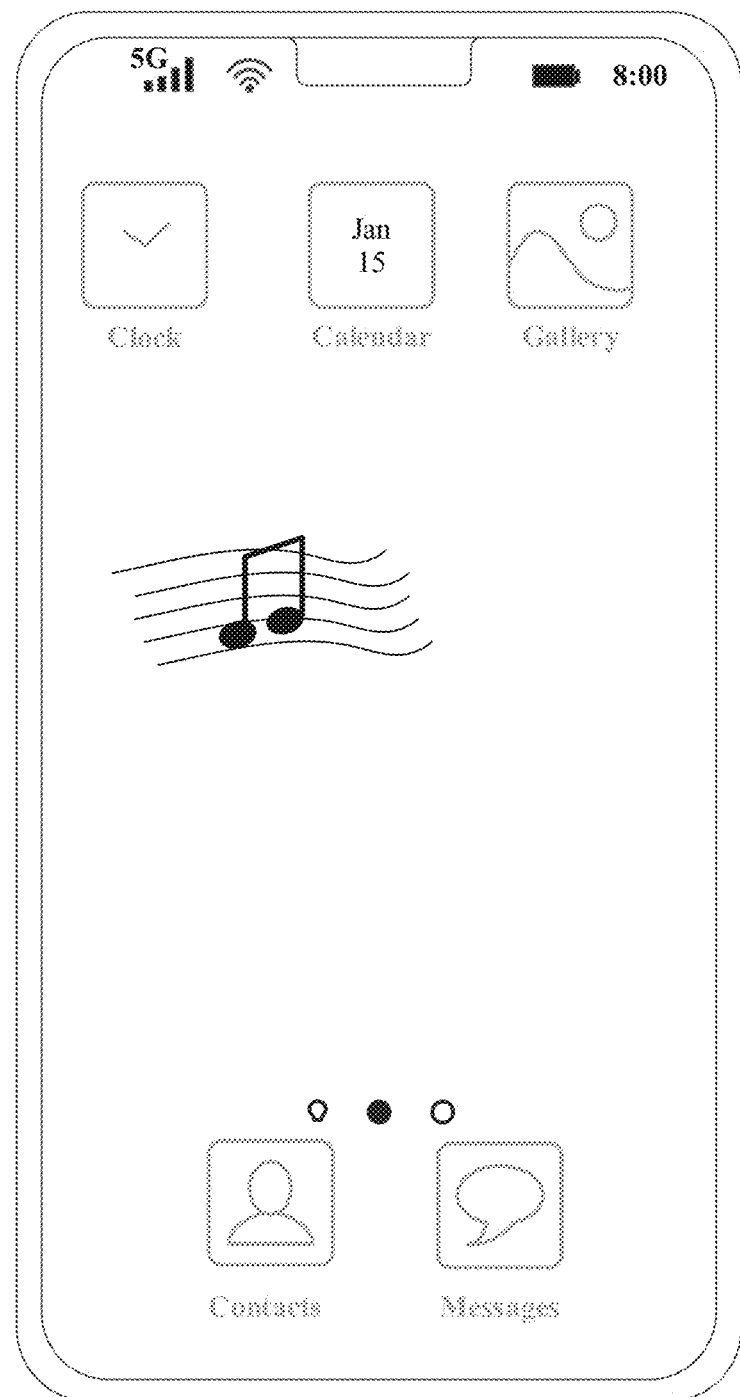
Figure 38D:
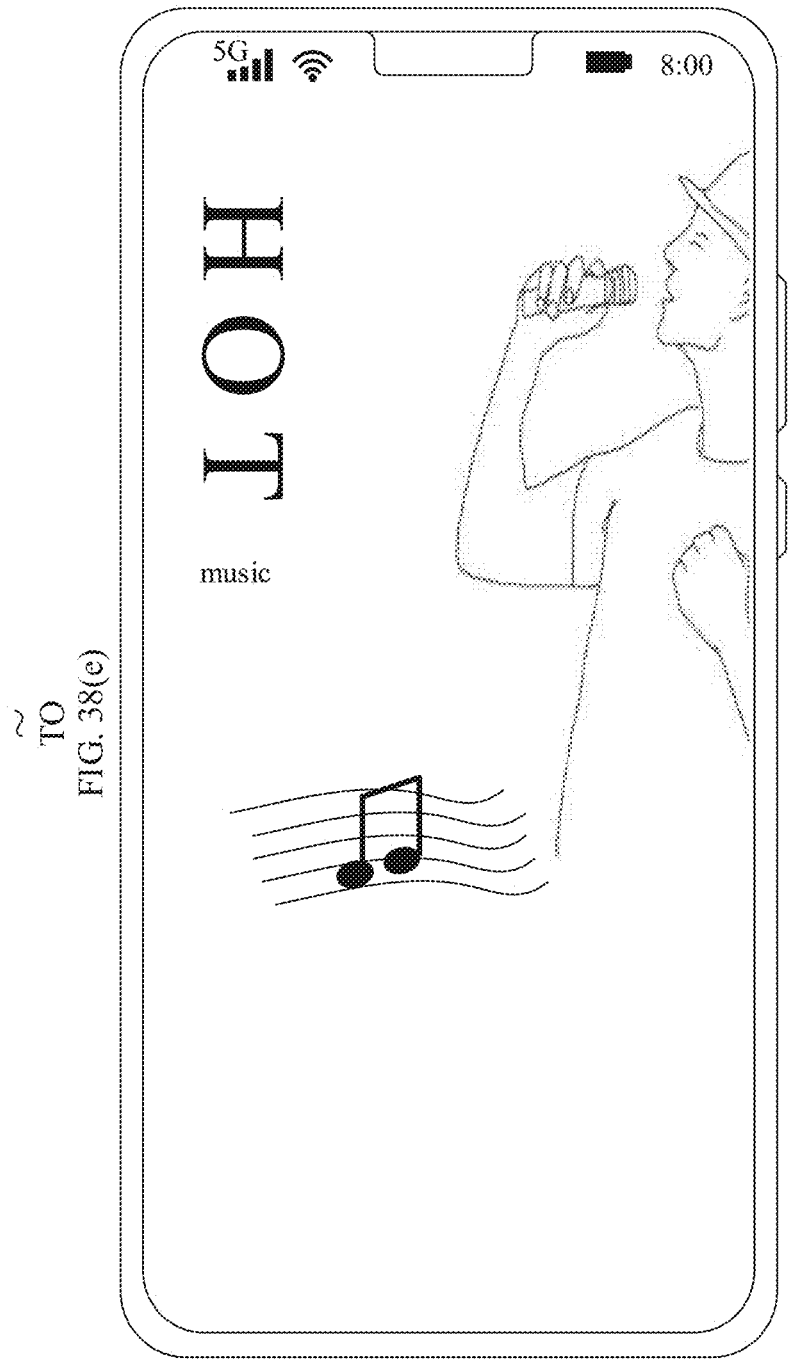
Figure 38E:
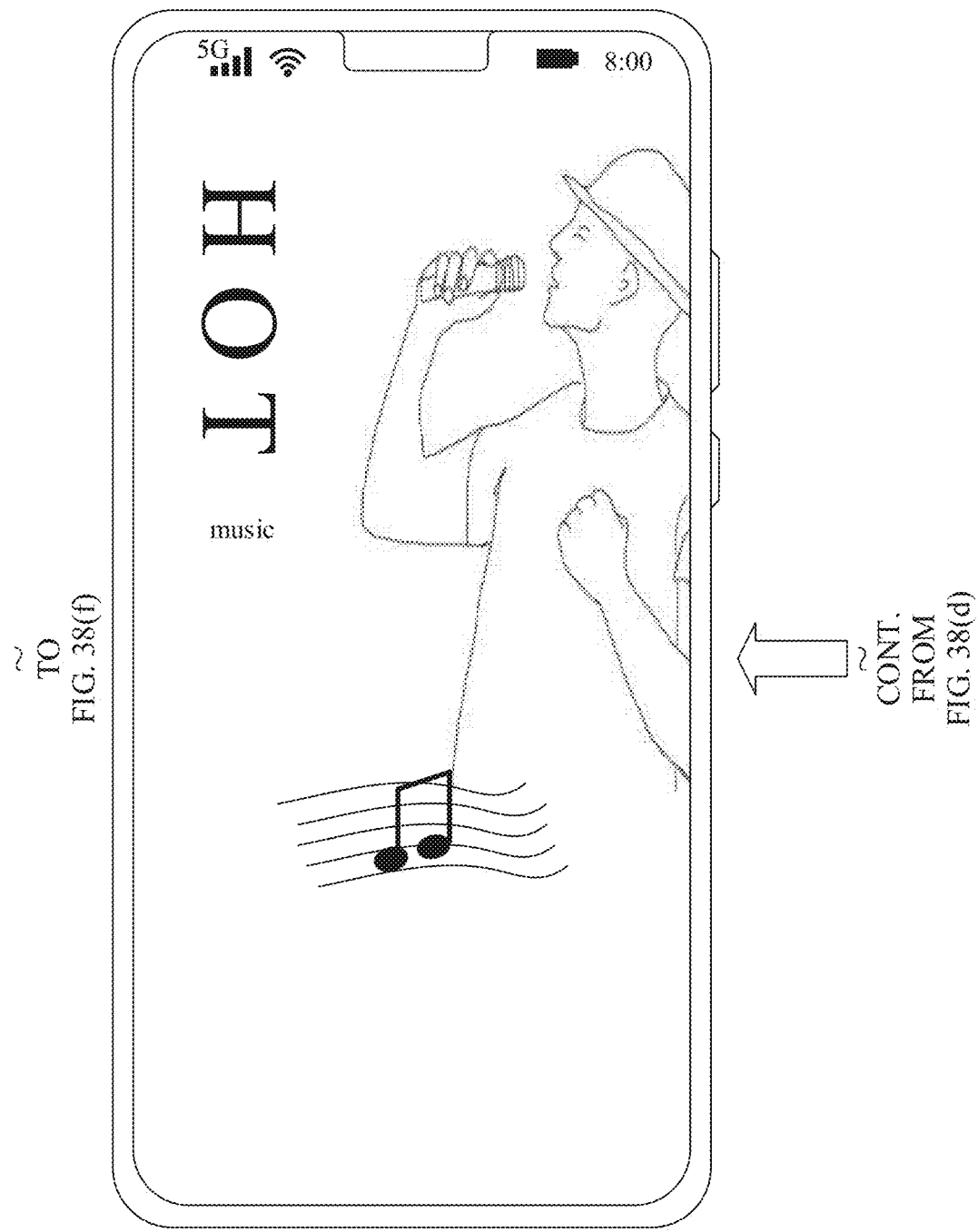
Figure 38F:
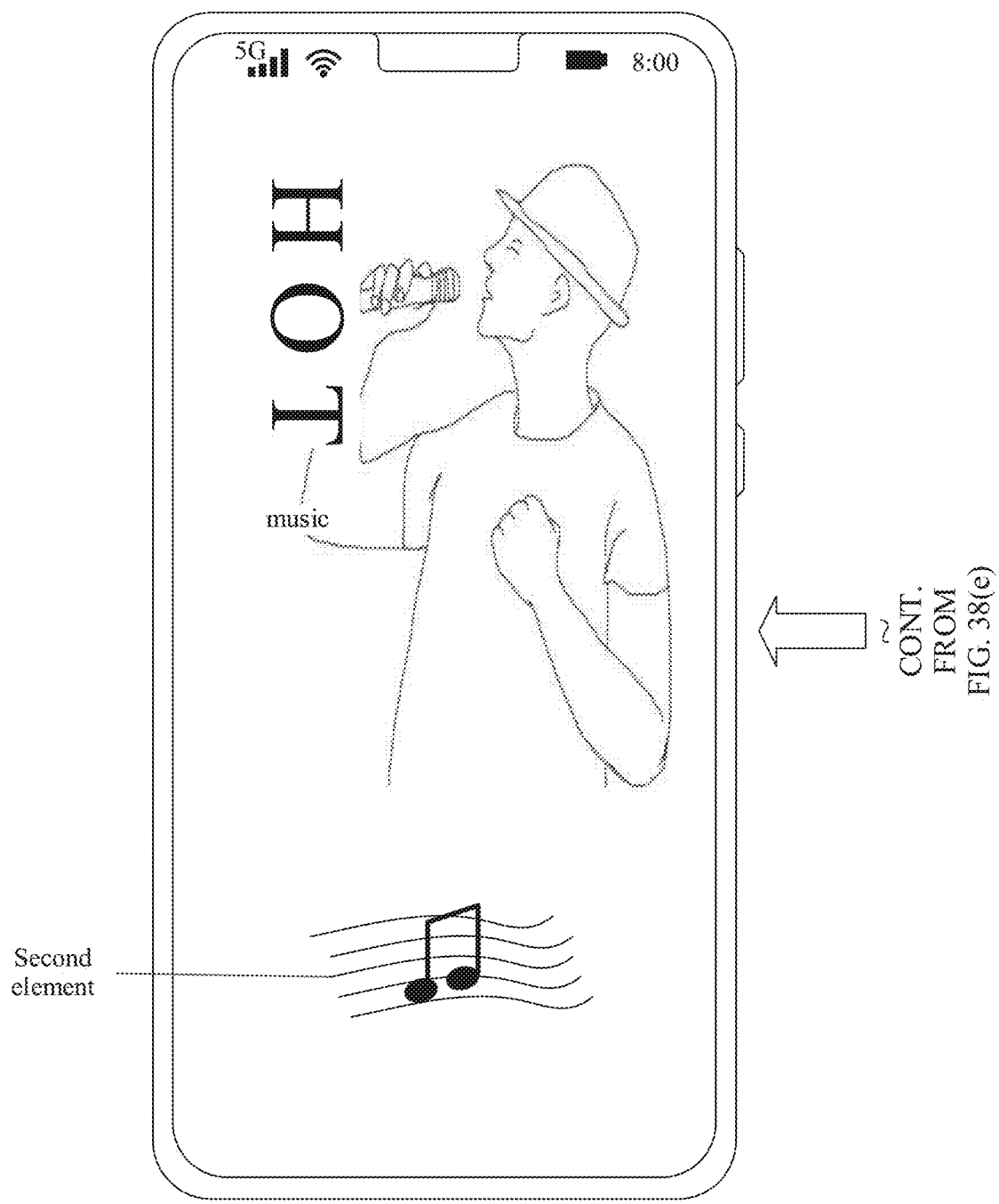
Figure 39A:
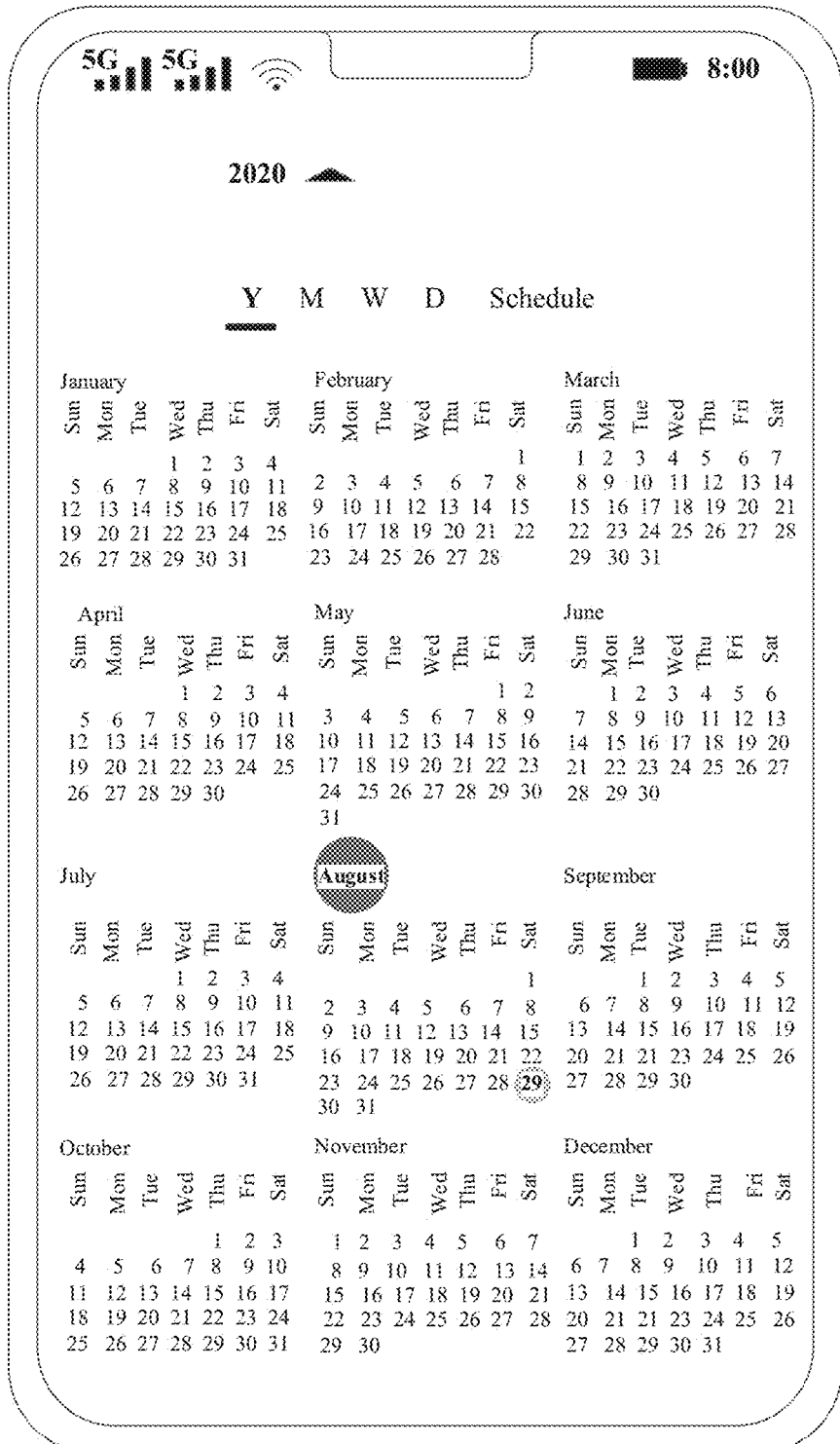
FIG. 39(a) to FIG. 39(f) are schematic diagrams of a conversion effect of a calendar application according to Embodiment 2 of this application.
Figure 39B:
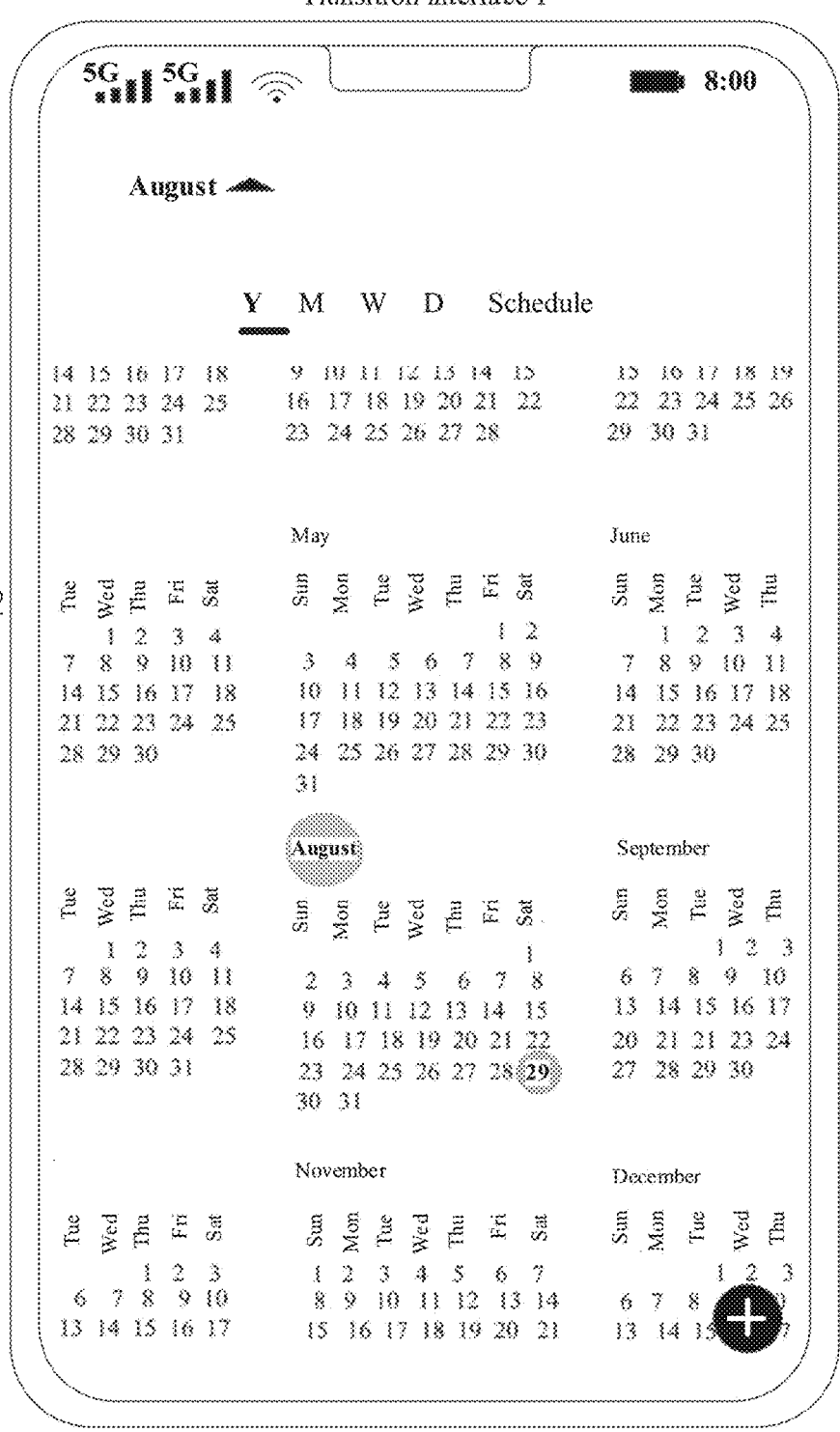
Figure 39C:
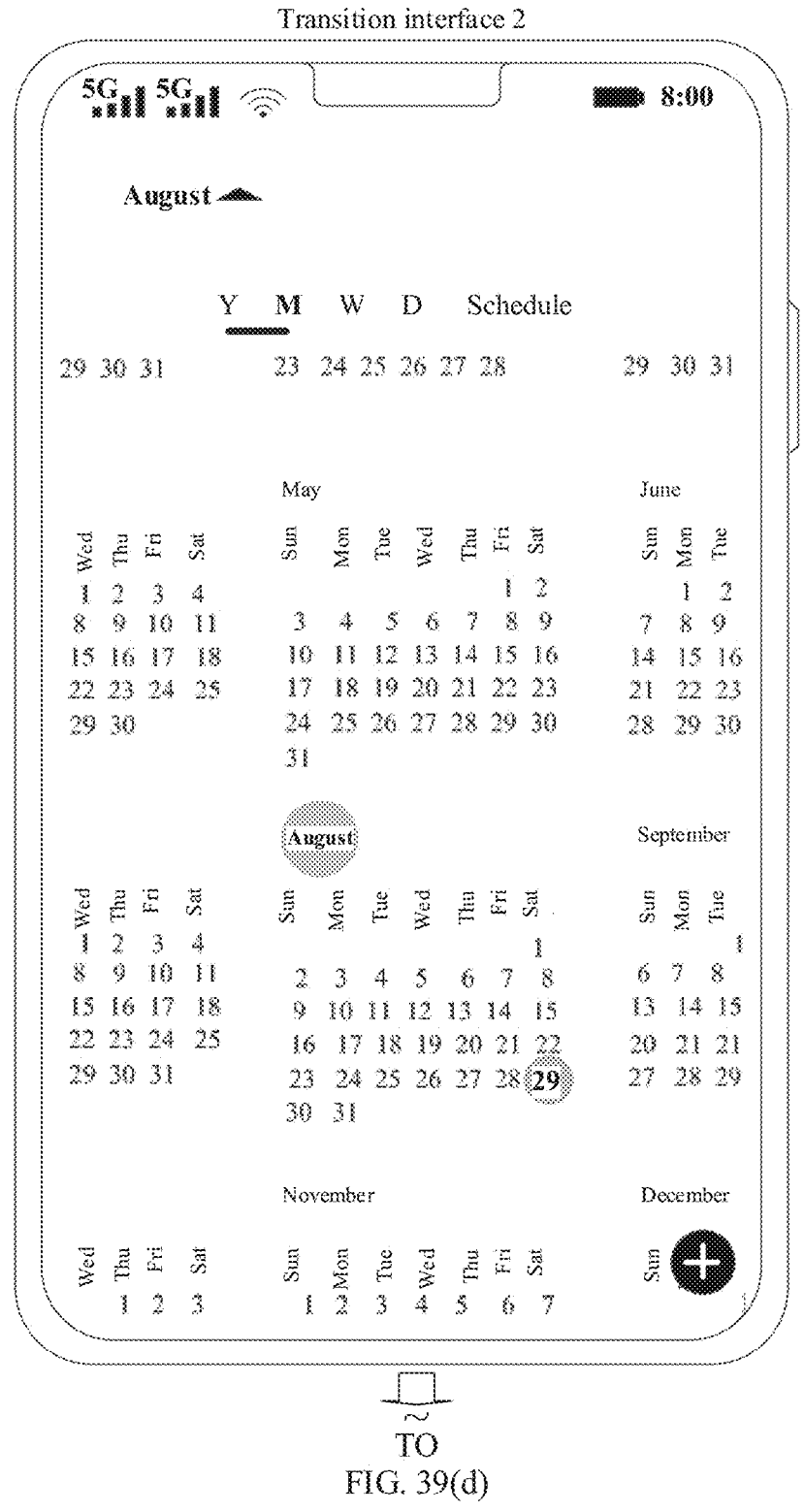
Figure 39D:
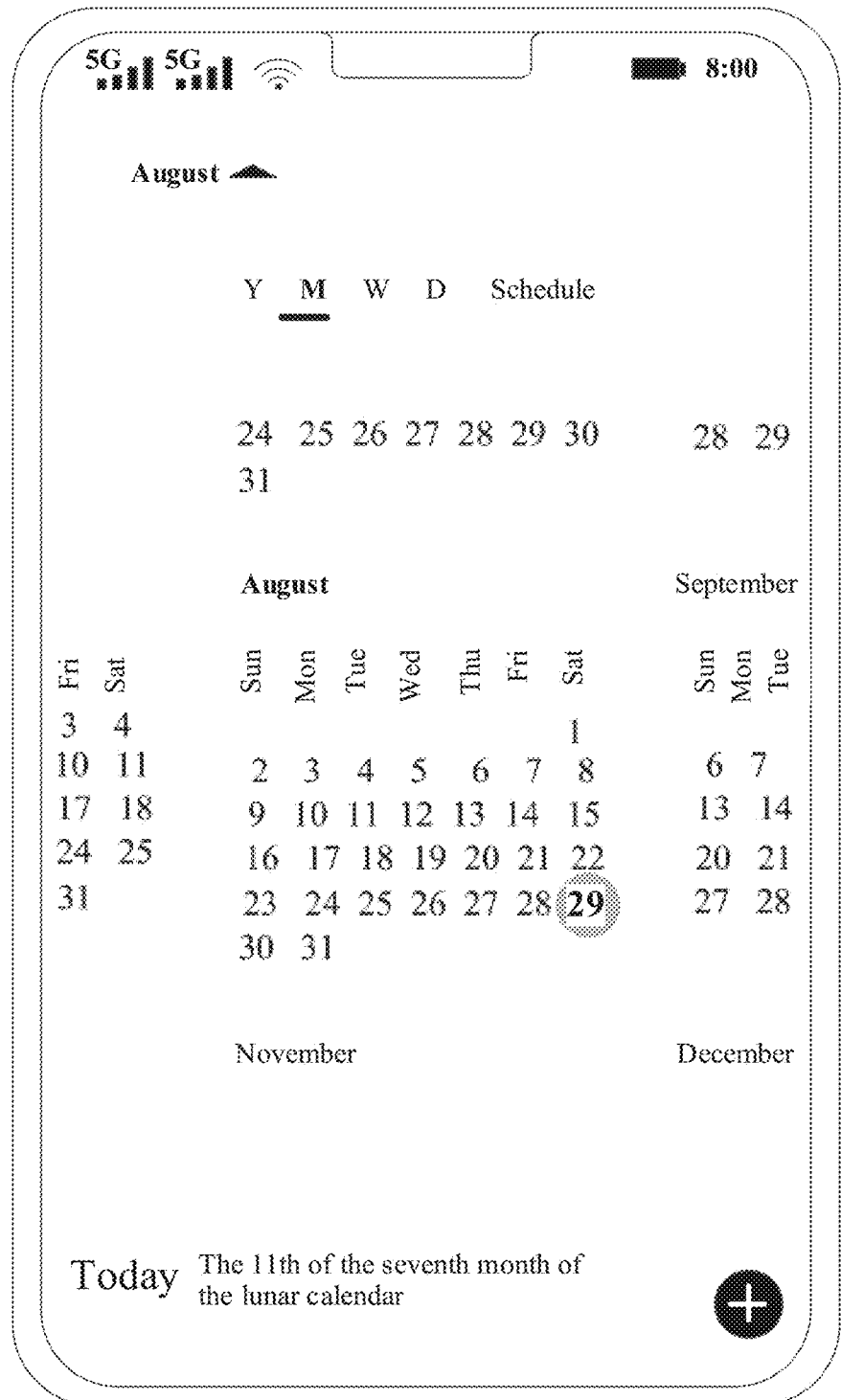
Figure 39E:
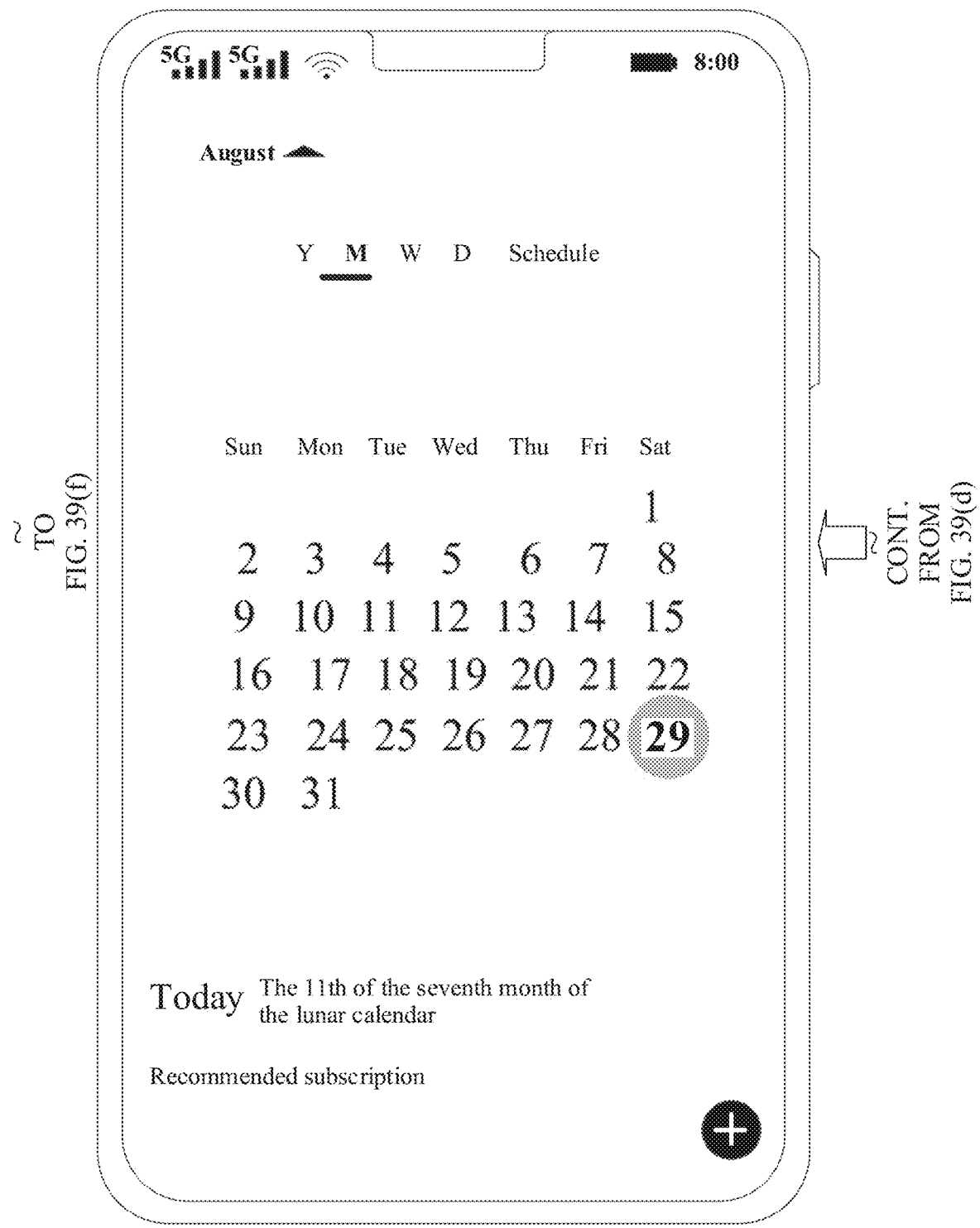
Figure 39F:
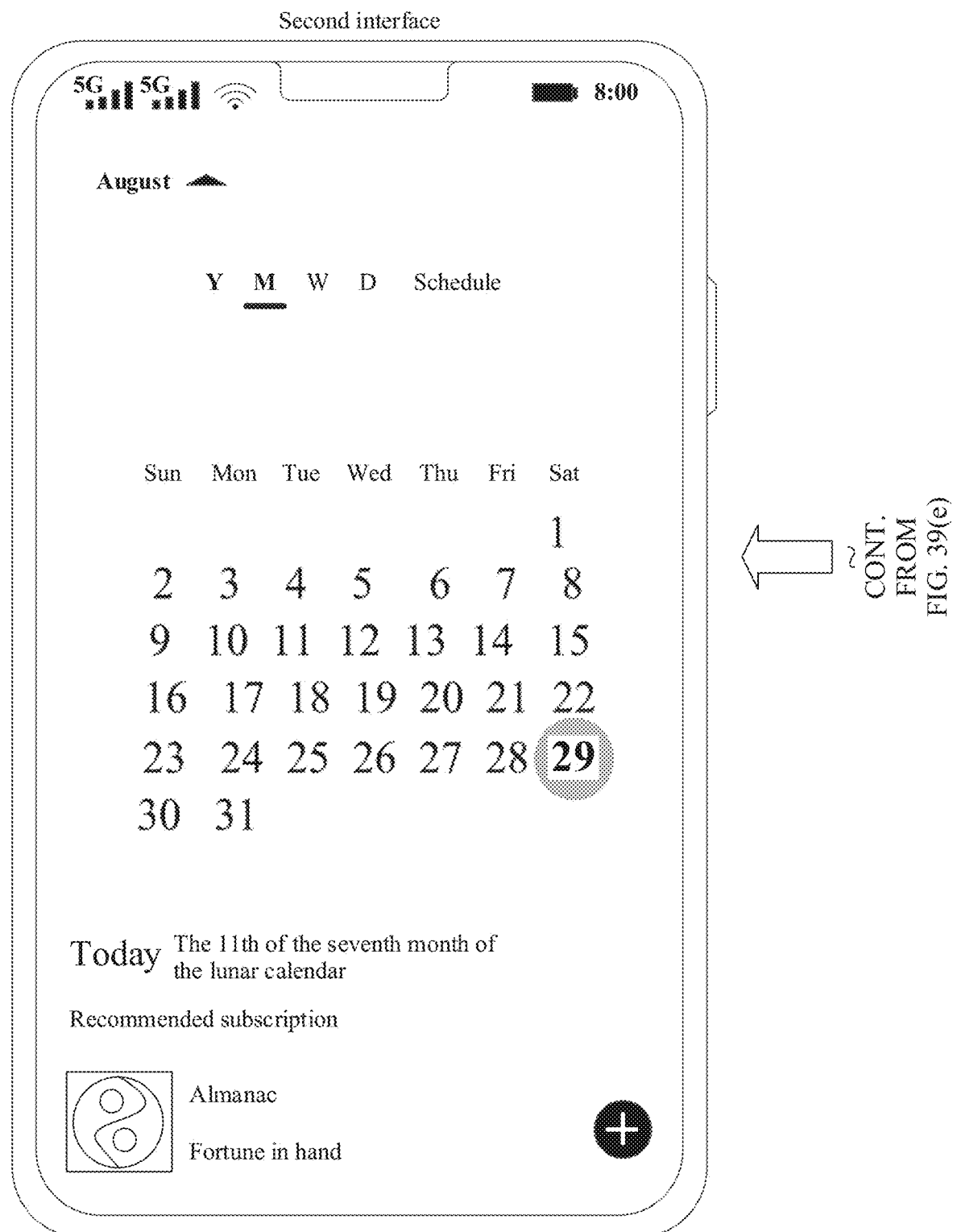
Figure 40A:
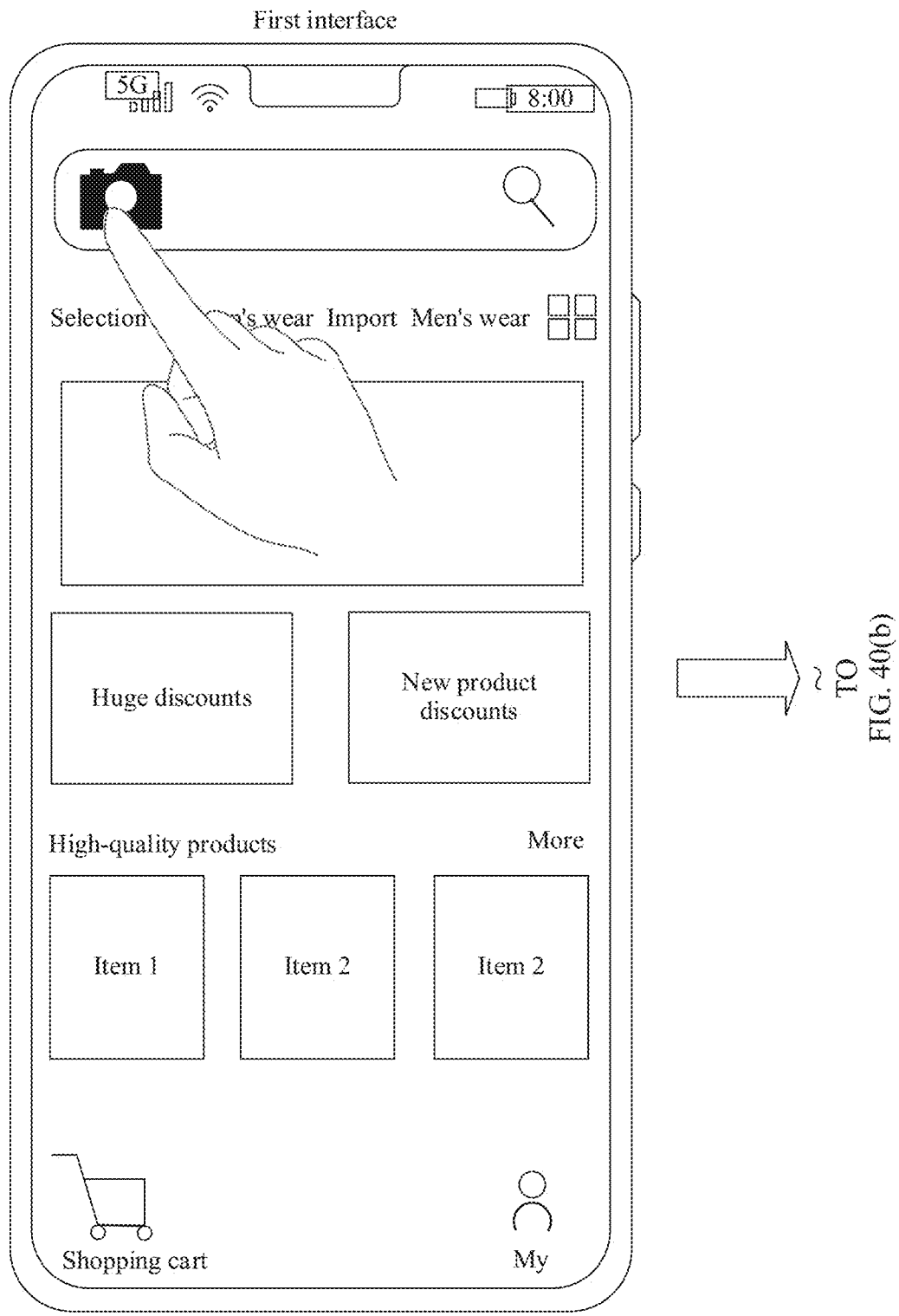
FIG. 40(a) to FIG. 40(g) are schematic diagrams of a third inter-application conversion effect according to Embodiment 2 of this application.
Figure 40B:
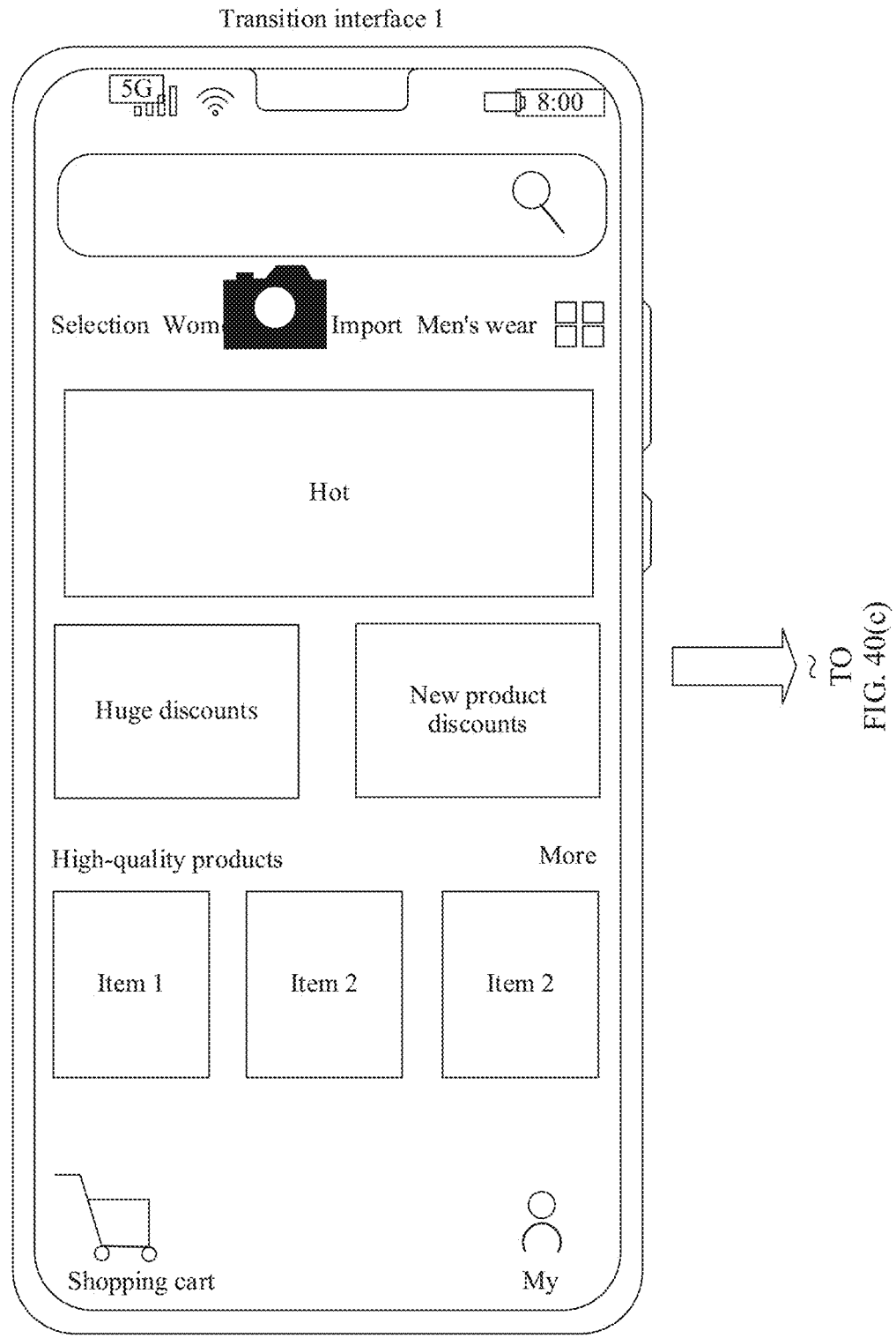
Figure 40C:
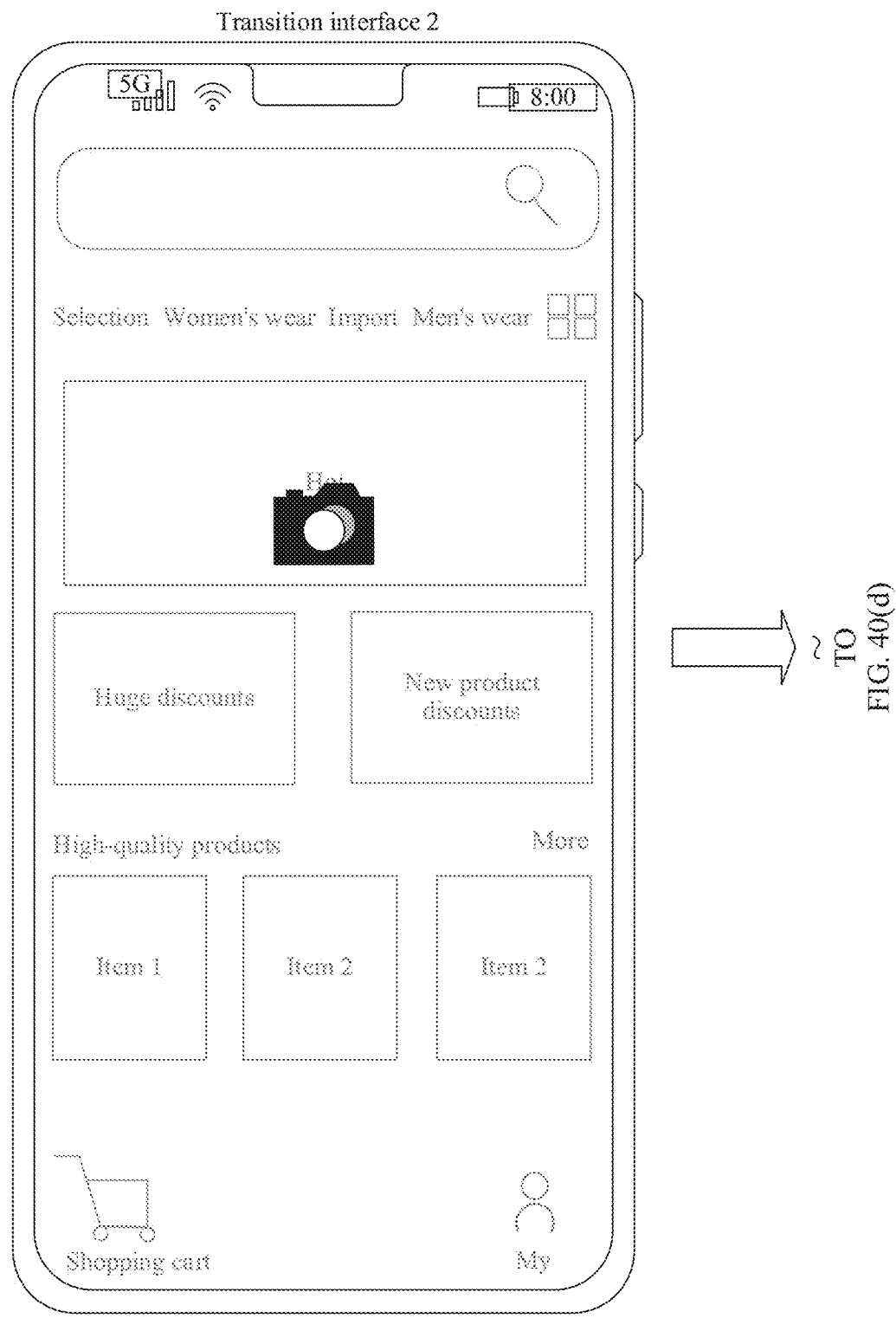
Figure 40D:
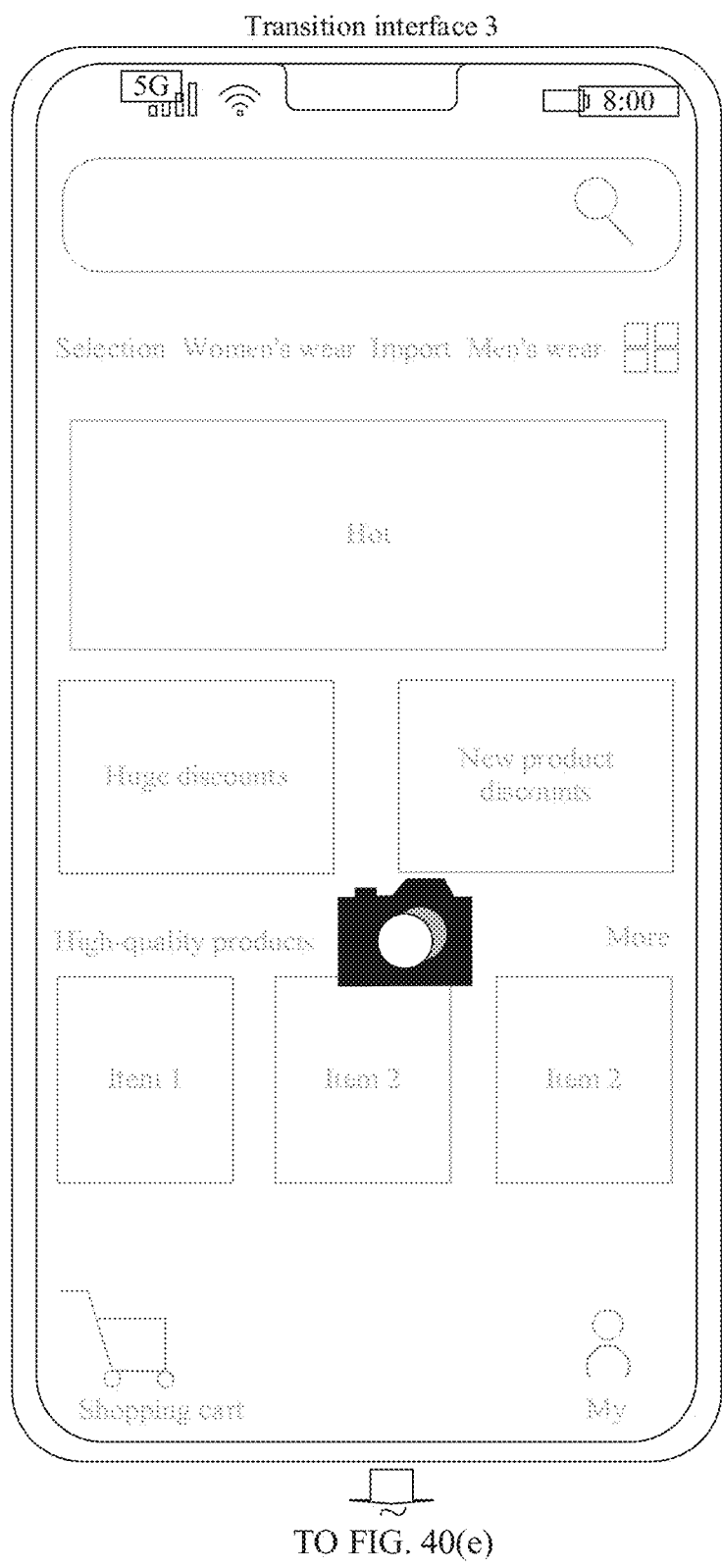
Figure 40E:
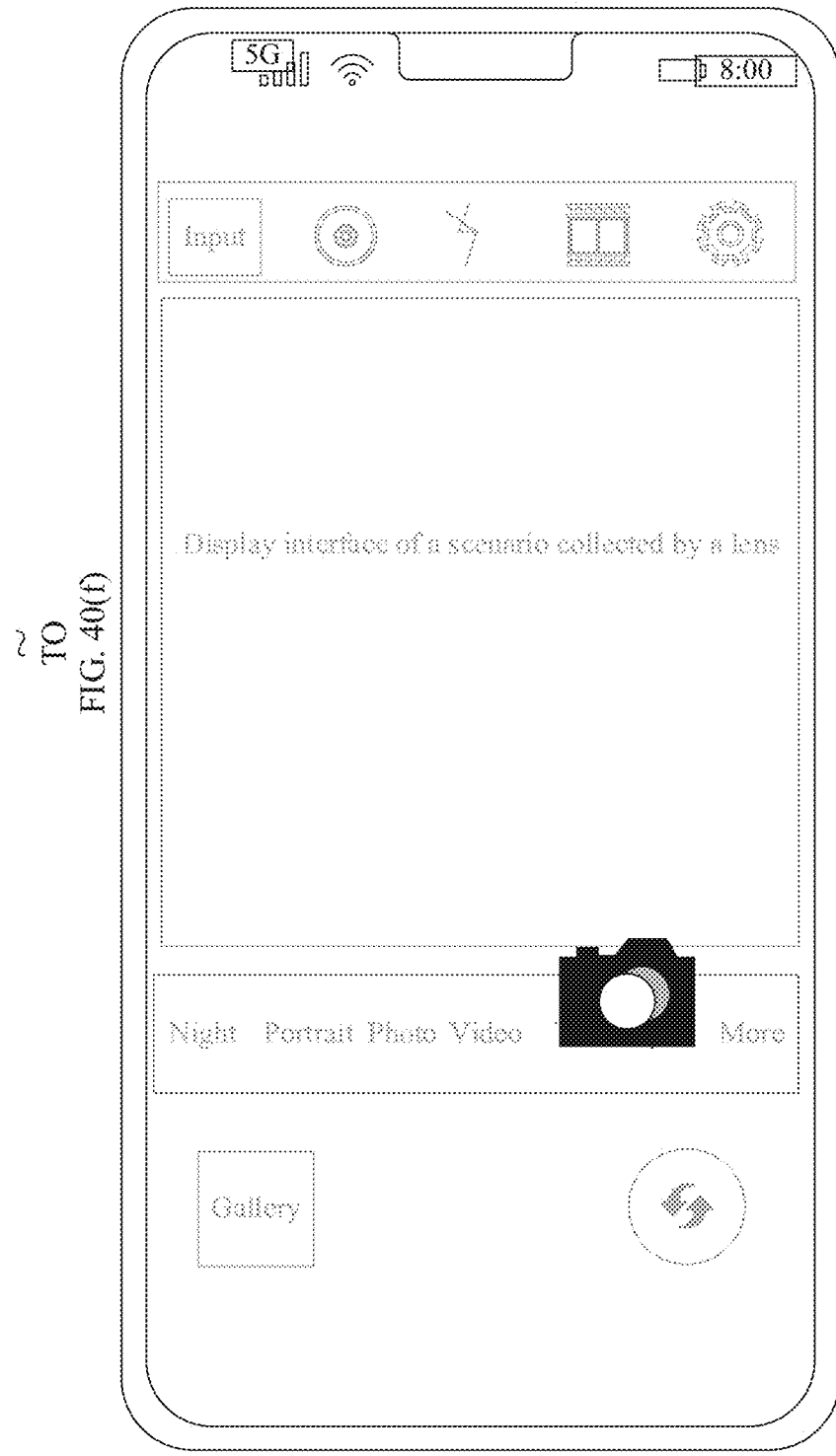
Figure 40F:
Figure 40G:
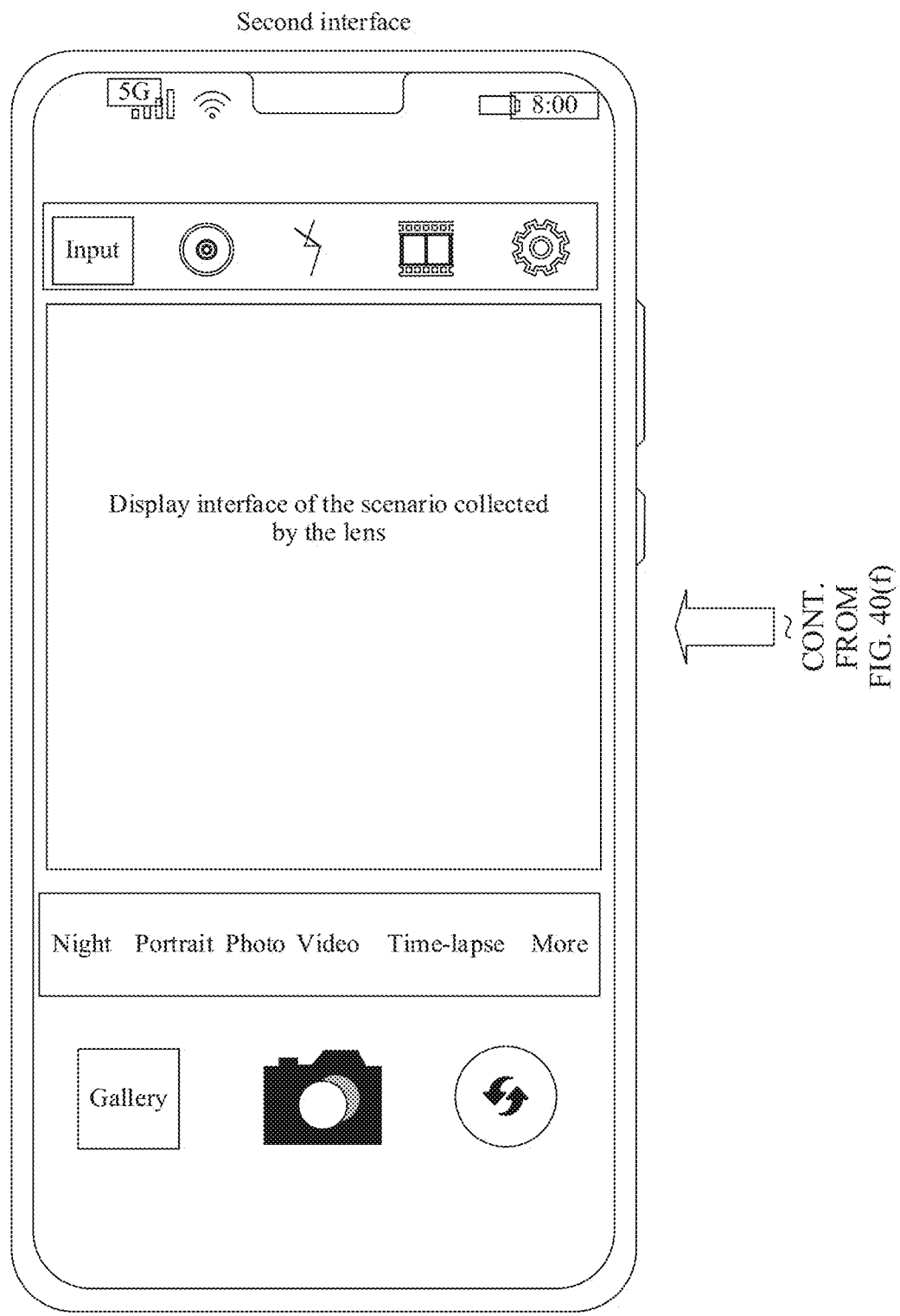
Figure 41A:
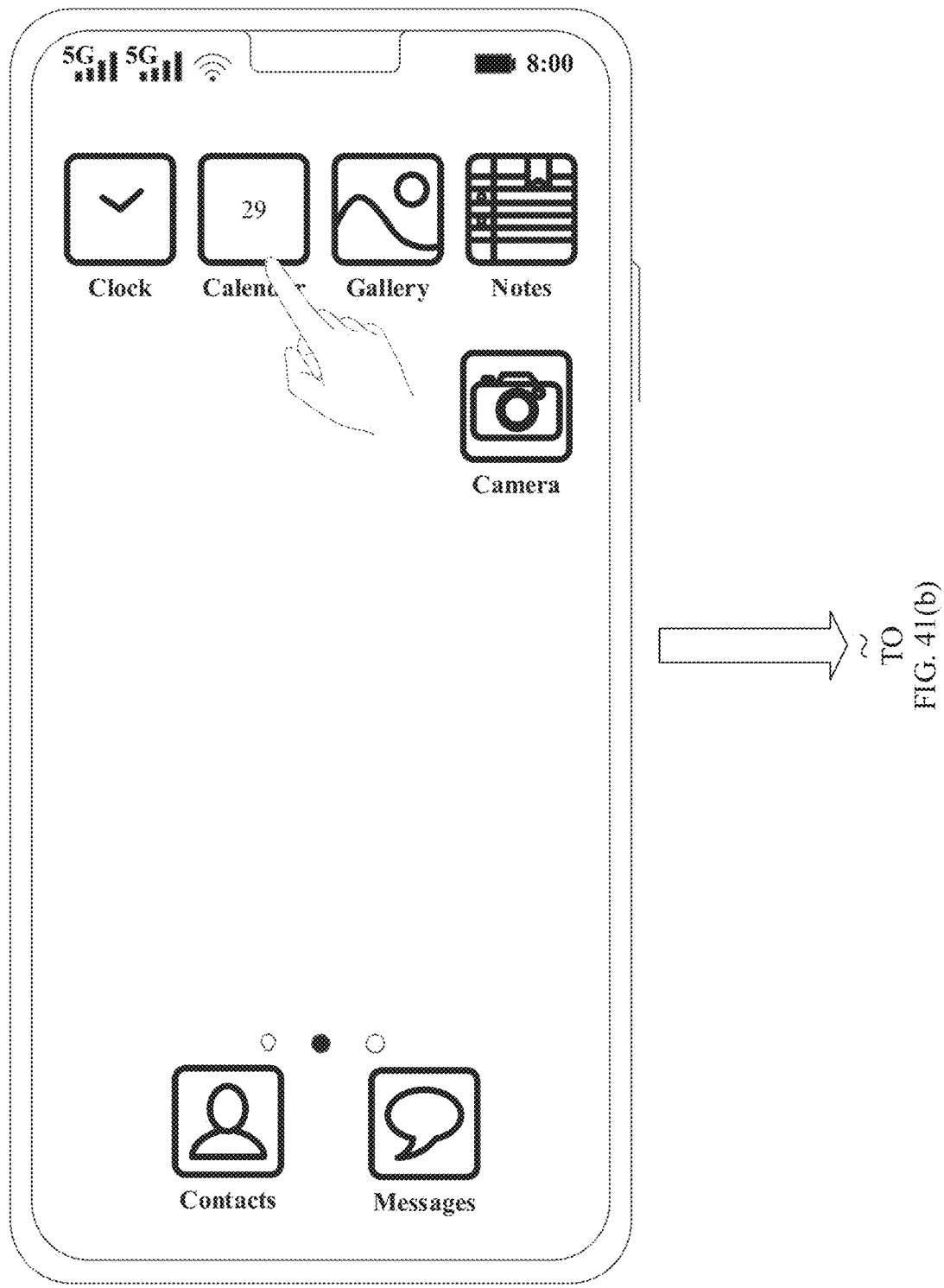
FIG. 41(a) to FIG. 41(f) are schematic diagrams of a third effect of conversion between a desktop and an application according to Embodiment 2 of this application.
Figure 41B:
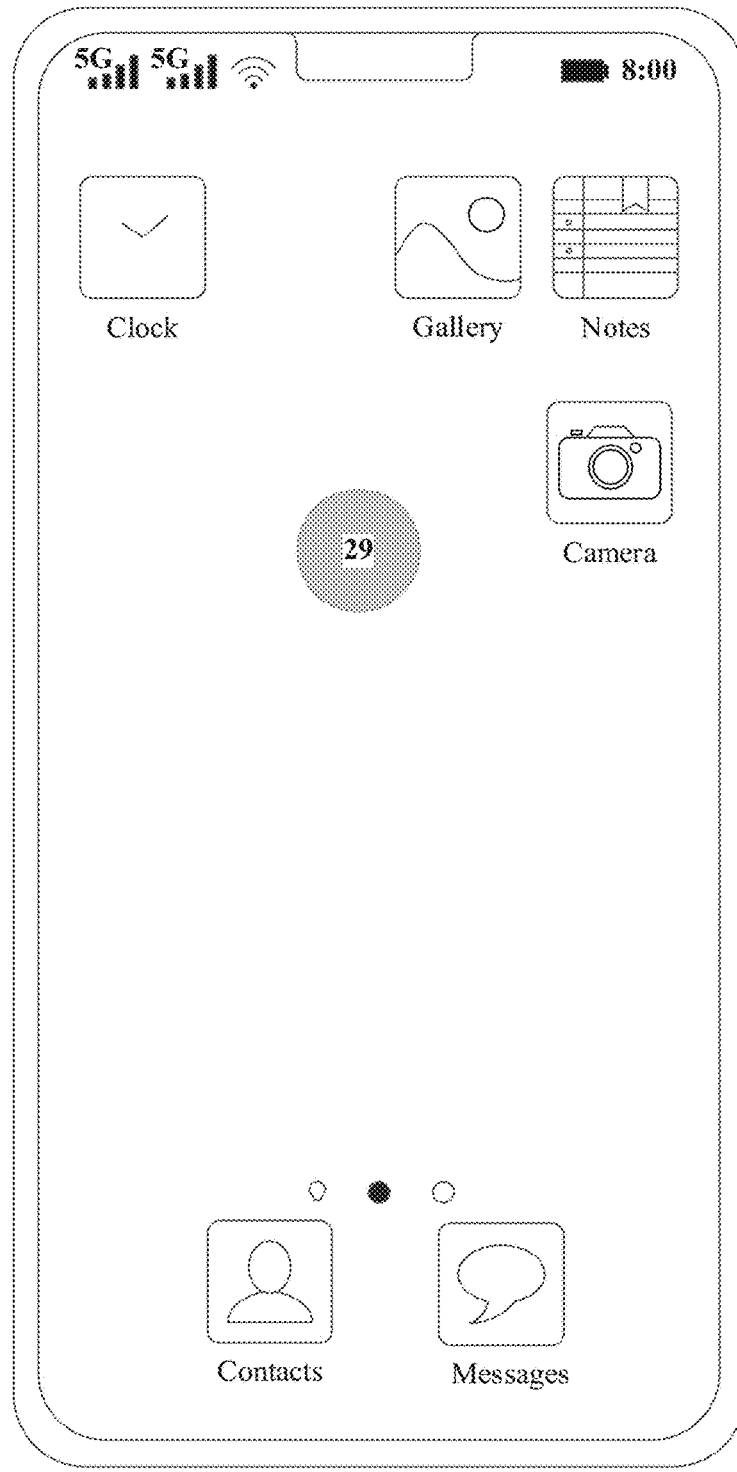
Figure 41C:
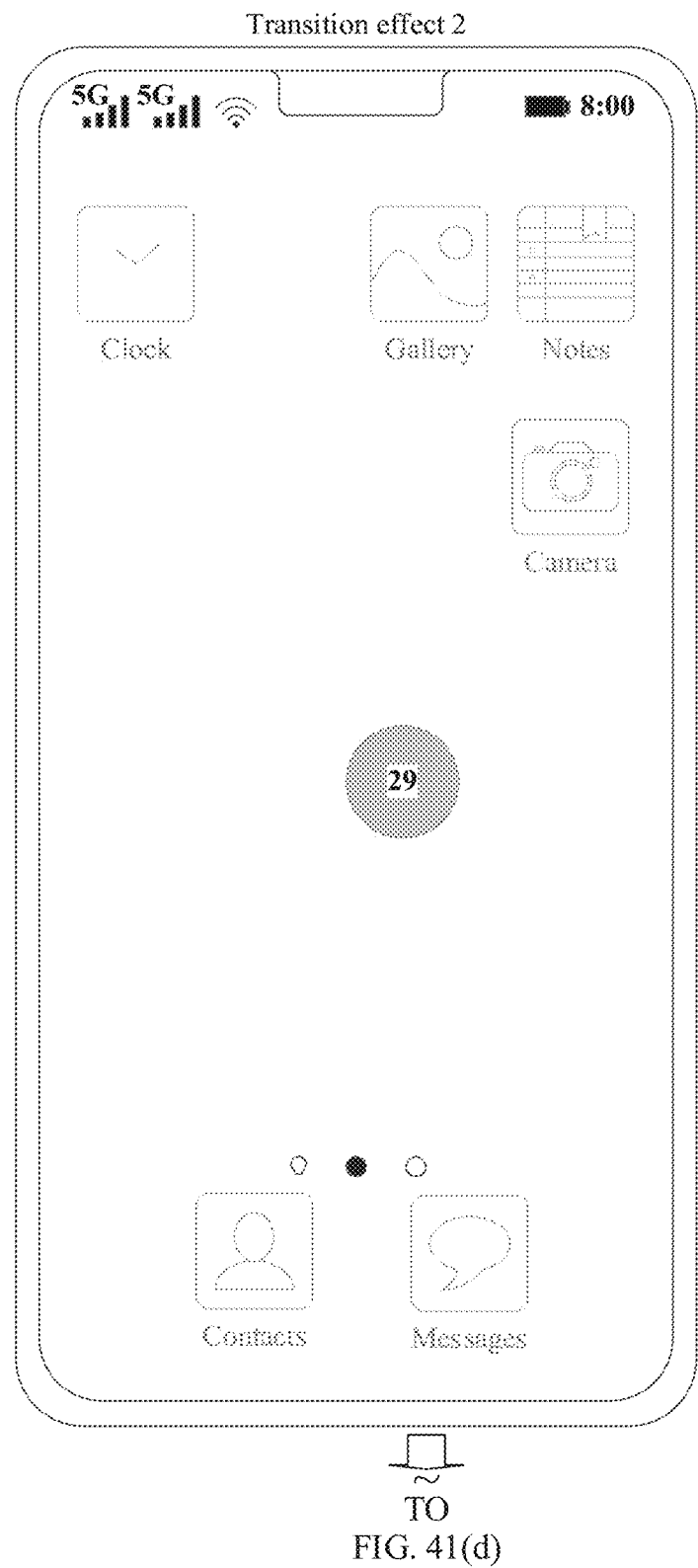
Figure 41D:
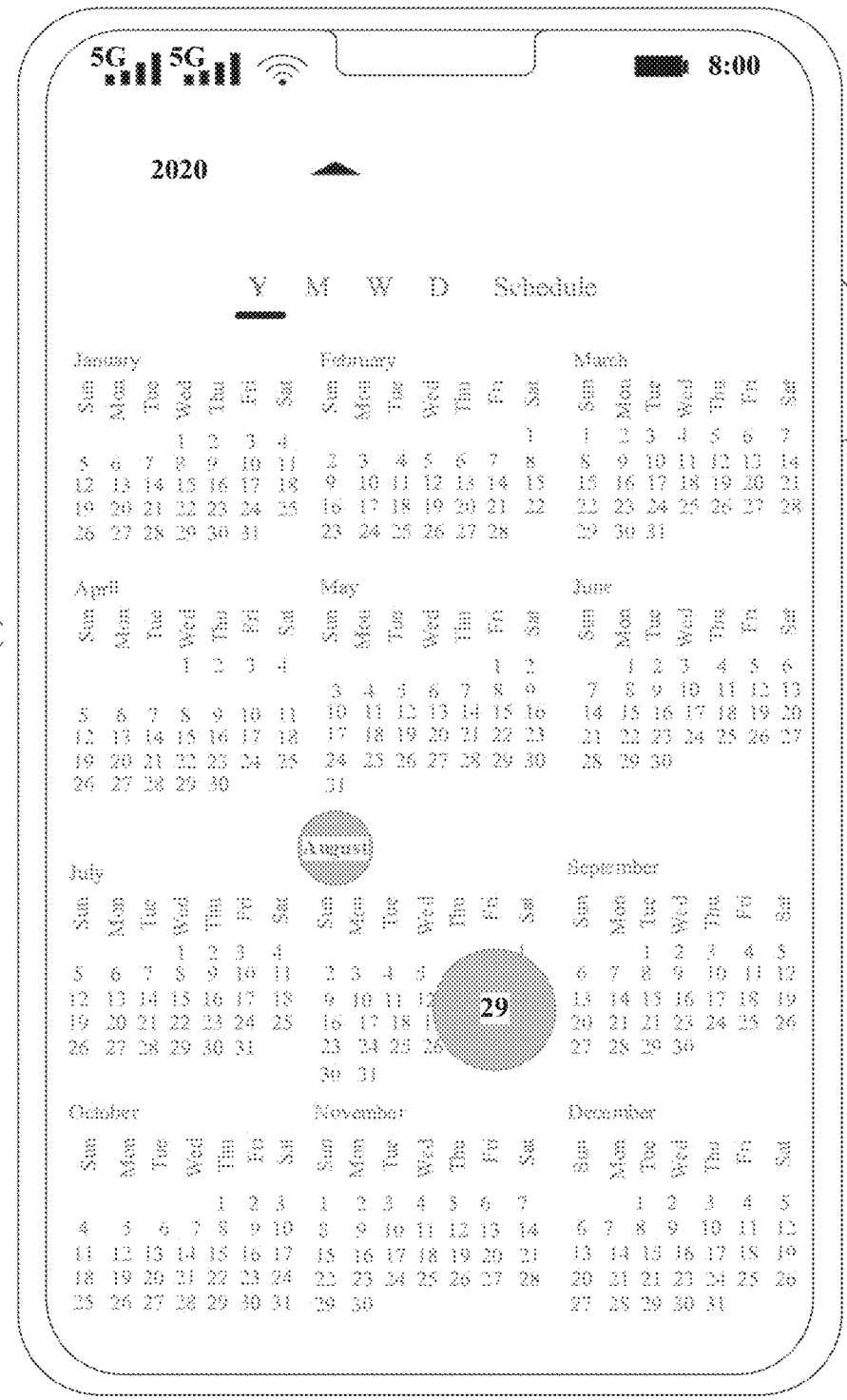
Figure 41E:
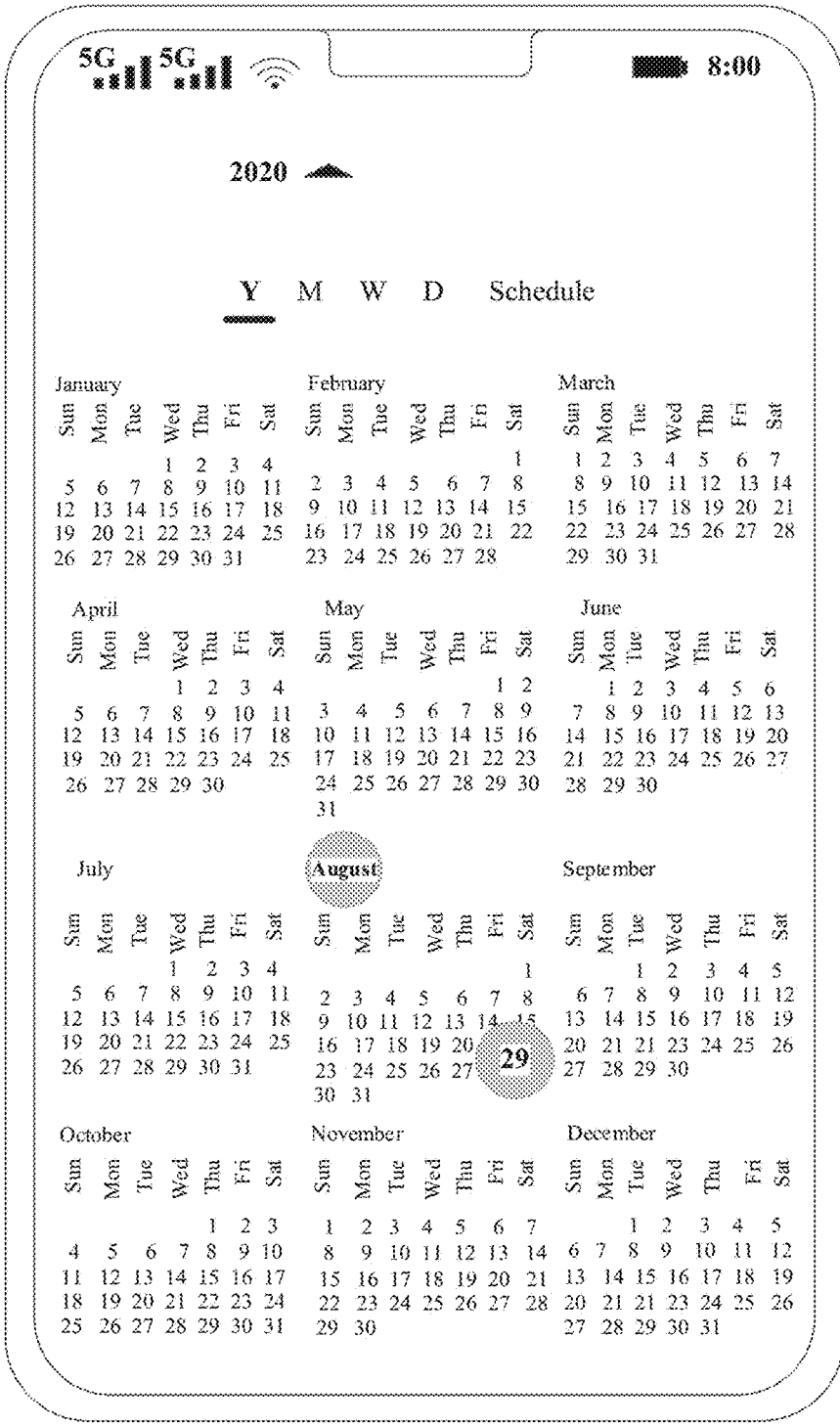
Figure 41F:
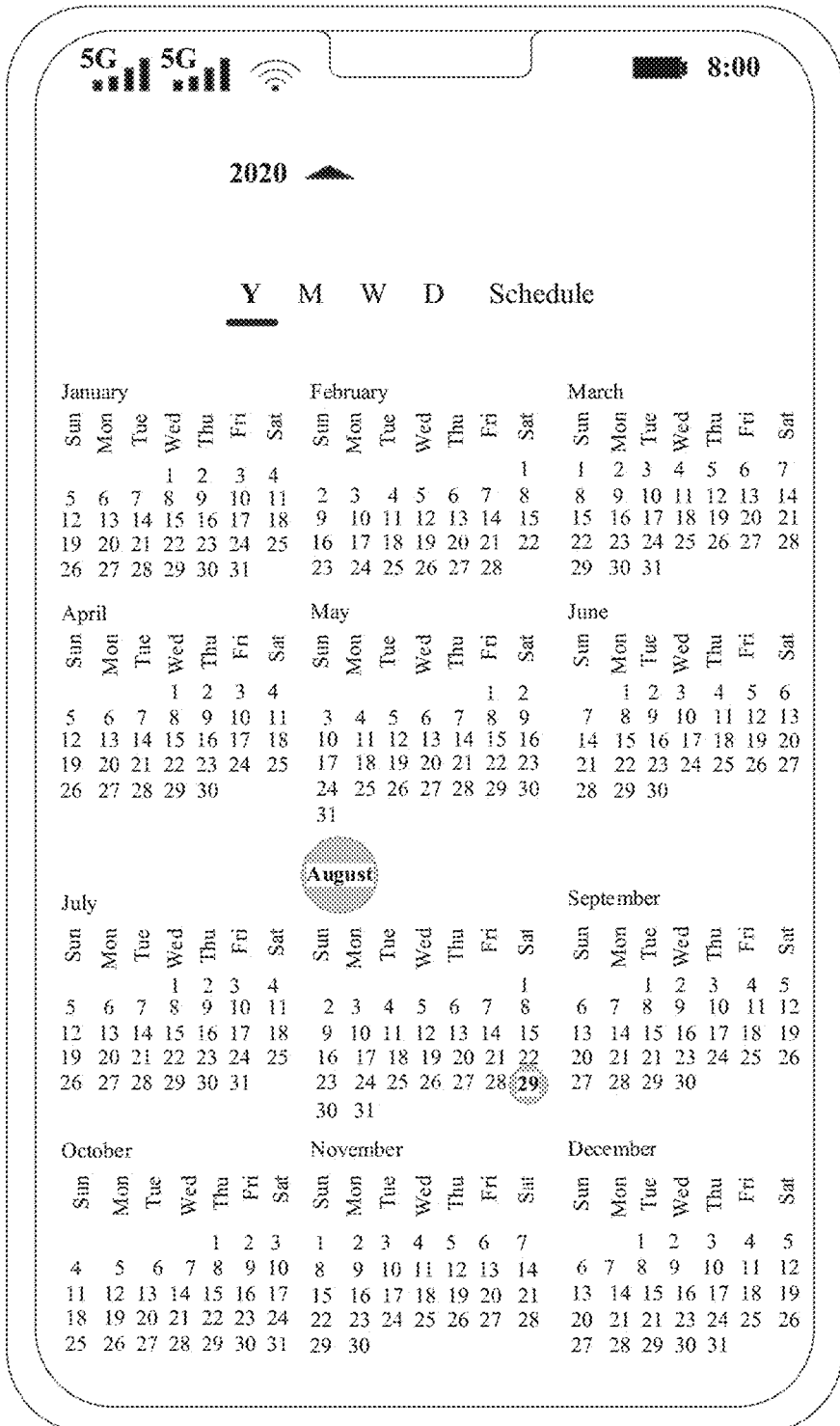

For example, as shown in FIG. 34(a) to FIG. 34(c), when the user taps a messages button on a call interface, the call application and the messages application are triggered to perform interface conversion. In other words, the call interface may be understood as the first interface, and a messages application interface may be understood as the second interface.

A presentation form of the shared element on the first interface is the element 1, a presentation form of the shared element on the second interface is the element 2, and the similarity between the element 1 and the element 2 is higher than the similarity threshold.

Further, in the process of switching from the first interface to the second interface, the element 1 gradually changes to the presentation form of the element 2. It can be learned from FIG. 34(*a*) to FIG. 34(*c*) that in the process in which the element 1 gradually changes to the element 2, presented content is that a call is gradually picked up. This enriches interestingness and brings more vivid interface switching experience to the user.

In addition, an exit element on the first interface fades out. For example, an exit element is a hang-up key icon. During interface switching, a fade-out dynamic effect is executed. An entry element on the second interface fades in. For example, the entry element is that an SMS message editing interface represented by using a bubble window fades in, and the interface is used to edit an SMS message.

Case 3: desktop-to-application conversion.

The following describes, by using an example in which the user needs to switch from an application desktop to a call application, the method for performing inter-interface conversion based on a single-shot effect provided in this embodiment of this application.

It is assumed that when the user configures the inter-interface conversion solution between the application desktop and the call application, an answer button in the call application is used as a shared element, and continuously exists in the conversion process.

For example, as shown in FIG. 35(*a*) to FIG. 35(*c*), after the user taps a call application icon on the application desktop, inter-interface conversion between the application desktop and the call application is triggered. In other words, the application desktop interface may be understood as the first interface, and a call application interface may be understood as the second interface. A presentation form of the shared element on the first interface is the element 1, a presentation form of the shared element on the second interface is the element 2, and the similarity between the element 1 and the element 2 is higher than the similarity threshold.

Further, in the process of switching from the first interface to the second interface, the element 1 gradually changes to the presentation form of the element 2. It can be learned from FIG. 35(*a*) to FIG. 35(*c*) that in the process in which the element 1 gradually changes to the element 2, presented content is that a call is gradually picked up and a smooth moving-down dynamic effect is executed. This enriches interestingness and brings more vivid interface switching experience to the user.

In addition, an exit element on the first interface fades out. For example, the exit element is an icon of another application. During interface switching, a fade-out dynamic effect is executed. An entry element on the second interface fades in, to obtain the call application interface.

Conversion Type 2: Activity Conversion Type

In this embodiment of this application, the inter-interface conversion solution based on the Activity conversion type may be further classified into a plurality of cases such as inter-application conversion, intra-application conversion, and desktop-to-application conversion. This is not specifically limited to the following content.

Case 1: Intra-Application Conversion:

As shown in FIG. 36(*a*) to FIG. 36(*g*), an embodiment of this application provides an example of an effect of interface conversion based on at least two Activities by using a book application in an application market as an example.

For example, as shown in FIG. 36(*a*) to FIG. 36(*g*), when the music application starts single-shot conversion, in a process of switching from the first interface to the second interface, a cover picture selected by the user is used as a shared element. For example, the cover selected by the user is a main cover. In other words, the transition interface in the process of switching from the first interface to the second interface includes the shared element.

A presentation form of the shared element on the first interface is the element 1, a presentation form of the shared element on the second interface is the element 2, and the similarity between the element 1 and the element 2 is higher than the similarity threshold.

Further, in the process of switching from the first interface to the second interface, the element 1 gradually changes to the presentation form of the element 2. It can be learned from FIG. 36(*a*) to FIG. 36(*g*) that in the process in which the element 1 gradually changes to the element 2, presented content is that a singer gradually lifts a microphone in a hand. This enriches interestingness and brings more vivid interface switching experience to the user.

In addition, an exit element on the first interface executes a scaling dynamic effect to exit. For example, the exit elements are a classification icon, at least one cover, a function button, and the like. During interface switching, the scaling dynamic effect is executed for exiting. An entry element on the second interface executes a slide-up dynamic effect to appear. For example, entry elements are a song list and a function icon, and fade in through sliding up during interface switching.

Case 2: Inter-Application Conversion:

As shown in FIG. 37(*a*) to FIG. 37(*f*), the following describes, by using an example in which the user needs to switch to a gallery application when using a camera application, the method for performing inter-interface conversion based on a single-shot effect provided in this embodiment of this application.

It is assumed that when the user configures the inter-interface conversion solution between the camera application and the gallery application, a thumbnail button in the camera application is used as a shared element, and continuously exists in a conversion process.

For example, as shown in FIG. 37(*a*) to FIG. 37(*f*), after the user taps a thumbnail icon in the camera application, interface conversion between the camera application and the gallery application is triggered. In other words, the camera application may be understood as the first interface, and a gallery application interface may be understood as the second interface. A presentation form of the shared element on the first interface is the element 1, a presentation form of the shared element on the second interface is the element 2, and the similarity between the element 1 and the element 2 is higher than the similarity threshold.

Further, in the process of switching from the first interface to the second interface, the element 1 gradually changes to the presentation form of the element 2. It can be learned from FIG. 37(*a*) to FIG. 37(*f*) that in the process in which the element 1 gradually changes to the element 2, presented content is that a picture is gradually displayed from partial to global. This enriches interestingness and brings more vivid interface switching experience to the user.

In addition, an exit element on the first interface fades out, and an entry element on the second interface fades in. For example, after the camera application jumps to the gallery application, a photographed picture is displayed. In this case, the thumbnail button of the camera application continuously exists, a photographing interface disappears, and a picture in the gallery appears.

Case 3: Desktop-to-Application Conversion:

The following describes, by using an example in which the user needs to switch from an application desktop to a music application, the method for performing inter-interface conversion based on a single-shot effect provided in this embodiment of this application.

It is assumed that when the user configures the inter-interface conversion solution between the application desktop and the music application, a note element in a music application icon is used as a shared element, and continuously exists in the conversion process.

For example, as shown in FIG. 38(a) to FIG. 38(f), after the user taps the music application icon on the application desktop, inter-interface conversion between the application desktop and the music application is triggered. In other words, the application desktop interface may be understood as the first interface, and a music application interface may be understood as the second interface. A presentation form of the shared element on the first interface is the element 1, a presentation form of the shared element on the second interface is the element 2, and the similarity between the element 1 and the element 2 is higher than the similarity threshold.

Further, in the process of switching from the first interface to the second interface, the element 1 gradually changes to the presentation form of the element 2. It can be learned from FIG. 38(a) to FIG. 38(f) that in the process in which the element 1 gradually changes to the element 2, presented content is gradually displaying a five-line spectrum on a music symbol and executing a smooth moving-down dynamic effect. This enriches interestingness and brings more vivid interface switching experience to the user.

In addition, an exit element on the first interface fades out. For example, the exit element is an icon of another application. During interface switching, a fade-out dynamic effect is executed. An entry element on the second interface fades in, to obtain the music application interface.

Conversion Type 3: ViewGroup Conversion Type

In this embodiment of this application, the inter-interface conversion solution based on the ViewGroup conversion type may be further classified into a plurality of cases such as inter-application conversion, intra-application conversion, and desktop-to-application conversion. This is not specifically limited to the following content.

Case 1: Intra-Application Conversion:

As shown in FIG. 39(a) to FIG. 39(f), an embodiment of this application provides a first example of an effect of inter-interface conversion based on at least two ViewGroups by using a calendar application as an example.

For example, as shown in FIG. 39(a) to FIG. 39(f), when the calendar application starts inter-interface conversion, in a process of switching from the first interface to the second interface, a month icon selected by the user is used as a shared element. For example, a month selected by the user is August. In other words, the transition interface in the process of switching from the first interface to the second interface includes the shared element.

A presentation form of the shared element on the first interface is the element 1, a presentation form of the shared element on the second interface is the element 2, and the similarity between the element 1 and the element 2 is higher than the similarity threshold.

Further, in the process of switching from the first interface to the second interface, the element 1 gradually changes to the presentation form of the element 2. It can be learned from FIG. 39(a) to FIG. 39(f) that in the process in which the element 1 gradually changes to the element 2, presented content is that a circular shading of the August icon fades out. This enriches interestingness and brings more vivid interface switching experience to the user.

In addition, an exit element on the first interface executes an amplification dynamic effect to exit. For example, the exit element is another month. During interface switching, a scaling dynamic effect is executed for exiting. An entry element on the second interface is amplified and displayed. For example, when the entry element is a calendar month corresponding to August, and the interface is scaled up and gradually displayed during interface switching.

Case 2: Inter-Application Conversion:

As shown in FIG. 40(a) to FIG. 40(g), the following describes, by using an example in which the user needs to switch to a camera application when using a shopping application, the method for performing inter-interface conversion based on a single-shot effect provided in an embodiment of this application.

It is assumed that when the user configures the inter-interface conversion solution between the shopping application and the camera application, a photographing button in the shopping application is used as a shared element, and continuously exists in a conversion process.

For example, as shown in FIG. 40(a) to FIG. 40(g), after the user taps a photographing icon in the shopping application, inter-interface conversion between the shopping application and the camera application is triggered. In other words, the shopping application may be understood as the first interface, and the camera application interface may be understood as the second interface. A presentation form of the shared element on the first interface is the element 1, a presentation form of the shared element on the second interface is the element 2, and the similarity between the element 1 and the element 2 is higher than the similarity threshold.

Further, in the process of switching from the first interface to the second interface, the element 1 gradually changes to the presentation form of the element 2. It can be learned from FIG. 40(a) to FIG. 40(g) that in the process in which the element 1 gradually changes to the element 2, presented content is that a lens of a camera gradually extends. This enriches interestingness and brings more vivid interface switching experience to the user.

In a process in which the shopping application jumps to the camera application, the photographing button of the camera application continuously exists, the shopping interface fades out, and a camera interface fades in.

Case 3: Desktop-to-Application Conversion:

The following describes, by using an example in which the user needs to switch from an application desktop to a calendar application, the method for performing inter-interface conversion based on a single-shot effect provided in this embodiment of this application.

It is assumed that when the user configures the inter-interface conversion solution between the application desktop and the calendar application, a date element in a calendar application icon is used as a shared element and continuously exists in the conversion process.

For example, as shown in FIG. 41(a) to FIG. 41(f), after the user taps the calendar application icon on the application desktop, inter-interface conversion between the application desktop and the calendar application is triggered. In other words, the application desktop interface may be understood as the first interface, and the calendar application interface may be understood as the second interface. A presentation form of the shared element on the first interface is the element 1, a presentation form of the shared element on the second interface is the element 2, and the similarity between the element 1 and the element 2 is higher than the similarity threshold.

Further, in the process of switching from the first interface to the second interface, the element 1 gradually changes to the presentation form of the element 2. It can be learned from FIG. 41(*a*) to FIG. 41(*f*) that in the process in which the element 1 gradually changes to the element 2, presented content is that the date element gradually displays a circular shading. This enriches interestingness and brings more vivid interface switching experience to the user.

In a process in which the application desktop jumps to the calendar application, the date used as a shared element always exists.

In addition, the single-shot conversion method described in embodiments of this application may be further applied to application operations such as a split-screen mode and multi-screen collaboration. This is not specifically limited to the following descriptions.

Mode 1: Split-Screen Mode

In daily life, when using a smart device, for example, a mobile phone, the user may need to perform a split-screen operation on the mobile phone for reasons such as convenience of an operation. In this embodiment of this application, in a split-screen operation scenario, an application displayed on each screen can still perform the inter-interface conversion solution provided in embodiments of this application, to reduce a visual jump amplitude of the user, increase display interestingness, and improve user experience.

Figure 42:
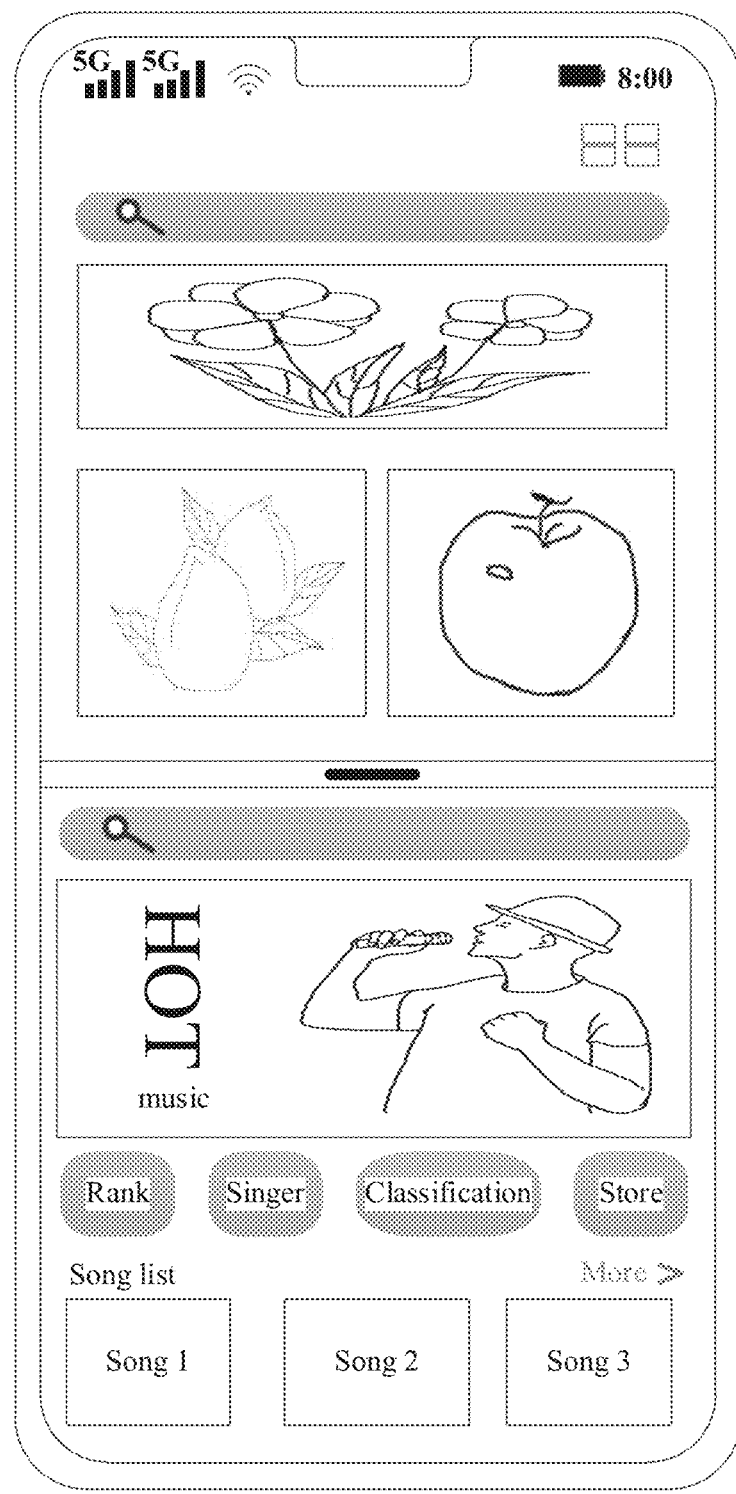
FIG. 42 is a schematic diagram of a first application conversion effect based on screen splitting according to an embodiment of this application.

For example, as shown in FIG. 42, it is assumed that a display interface of the mobile phone is divided into two parts: an upper part and a lower part. The upper interface displays a gallery application, and the lower interface displays a music application. In this case, when the user operates the gallery application on a split-screen interface 1, the gallery application performs corresponding conversion based on a preset inter-interface conversion solution. When the user operates the music application on a split-screen interface 2, the music application performs corresponding conversion based on the preset inter-interface conversion solution.

Figure 43:
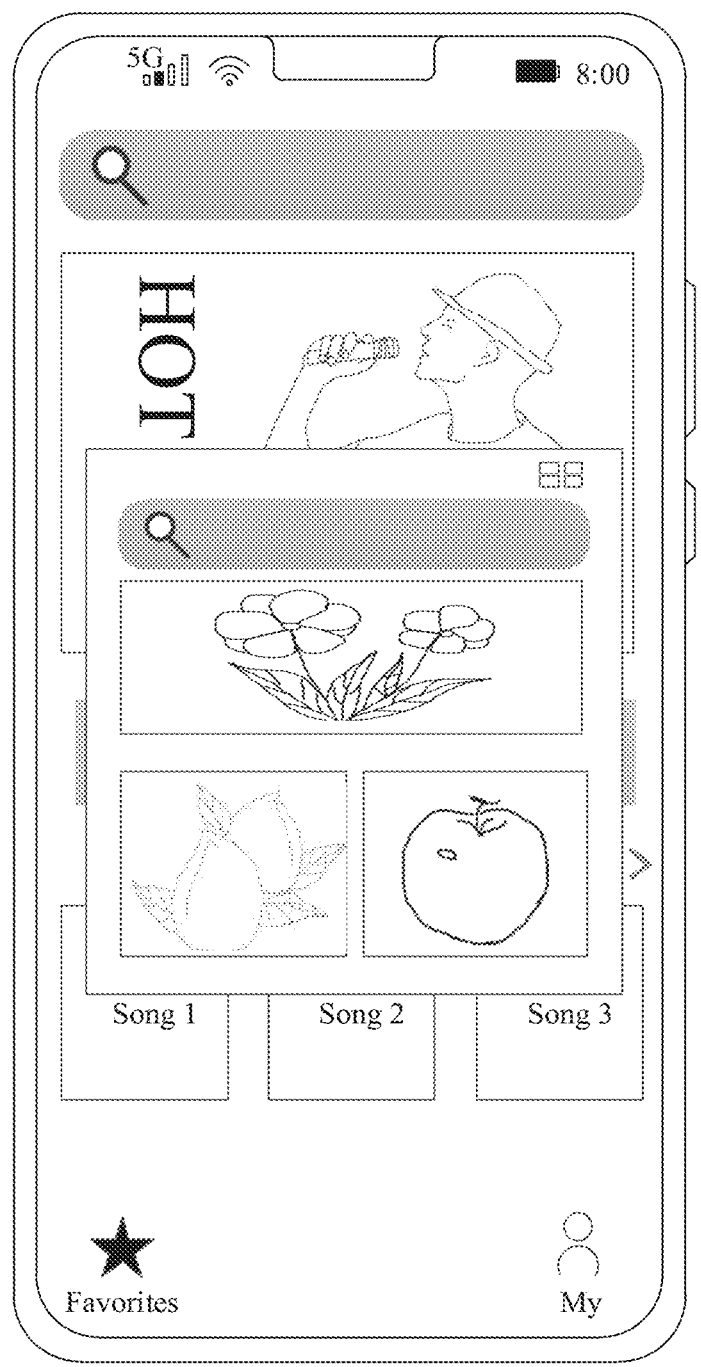
FIG. 43 is a schematic diagram of a second application conversion effect based on screen splitting according to an embodiment of this application.

For another example, as shown in FIG. 43, it is assumed that a display interface of the mobile phone is divided into an upper layer and a lower layer, and a display interface of an application is suspended above an interface of another application. The upper-layer interface displays a gallery application, and the lower-layer interface displays a music application. In this case, when the user operates the gallery application on a split-screen interface 1, the gallery application performs corresponding conversion based on a preset inter-interface conversion solution. When the user operates the music application on a split-screen interface 2, the music application performs corresponding conversion based on the preset inter-interface conversion solution.

Preferably, the suspended application interface may be used as a shared element of the bottom-layer application interface, and when the bottom-layer application interface is converted, the suspended application interface always exists.

It should be noted that in this embodiment of this application, in the split-screen mode, interface conversion may be simultaneously performed on a plurality of screens based on a corresponding inter-interface conversion solution, and is not limited by a conversion type or a usage scenario. For example, interface conversion may be performed based on different conversion types such as an Activity conversion type, a ViewGroup conversion type, and a Fragment conversion type, and may be performed inside an application, between applications, or between a system and an application. For details, refer to descriptions of FIG. 20 to FIG. 41(*f*) in embodiments of this application.

Mode 2: Multi-Screen Collaboration Mode

When the user sometimes performs an operation on an application, screen switching may need to be performed. For example, when the user performs an operation on a gallery application by using a mobile phone, to facilitate viewing, the mobile phone may be connected to a PC end, multi-screen collaboration is performed, and an application interface in the mobile phone is displayed on the PC end.

Figures 44A, 44B:
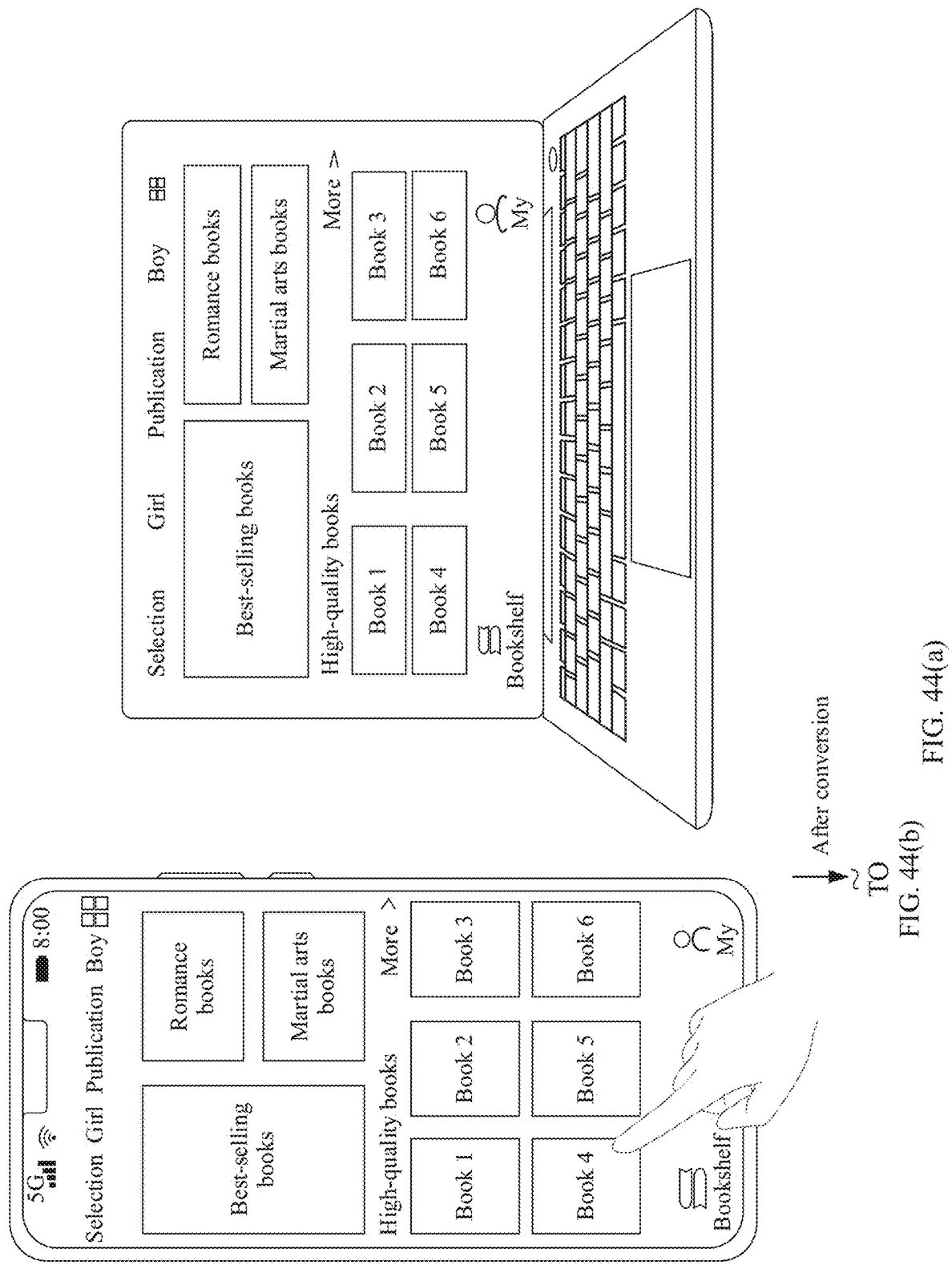
FIG. 44(a) and FIG. 44(b) are schematic diagrams of an application conversion effect based on multi-screen collaboration according to an embodiment of this application.

In an optional manner of this embodiment of this application, when the user performs a multi-screen collaboration operation, as shown in FIG. 44(*a*) and FIG. 44(*b*), content of the gallery application on a display interface of the mobile phone is switched to the PC end, and the entire PC end displays the content of the gallery application. In other words, a mobile phone operation is changed to a PC-end operation, and the display interface of the mobile phone is the same as a display interface of the PC.

In another optional manner of this embodiment of this application, when the user performs a multi-screen collaboration operation, only entered content of the gallery application on a display interface of the mobile phone is switched to the PC end.

Figures 45A, 45B:
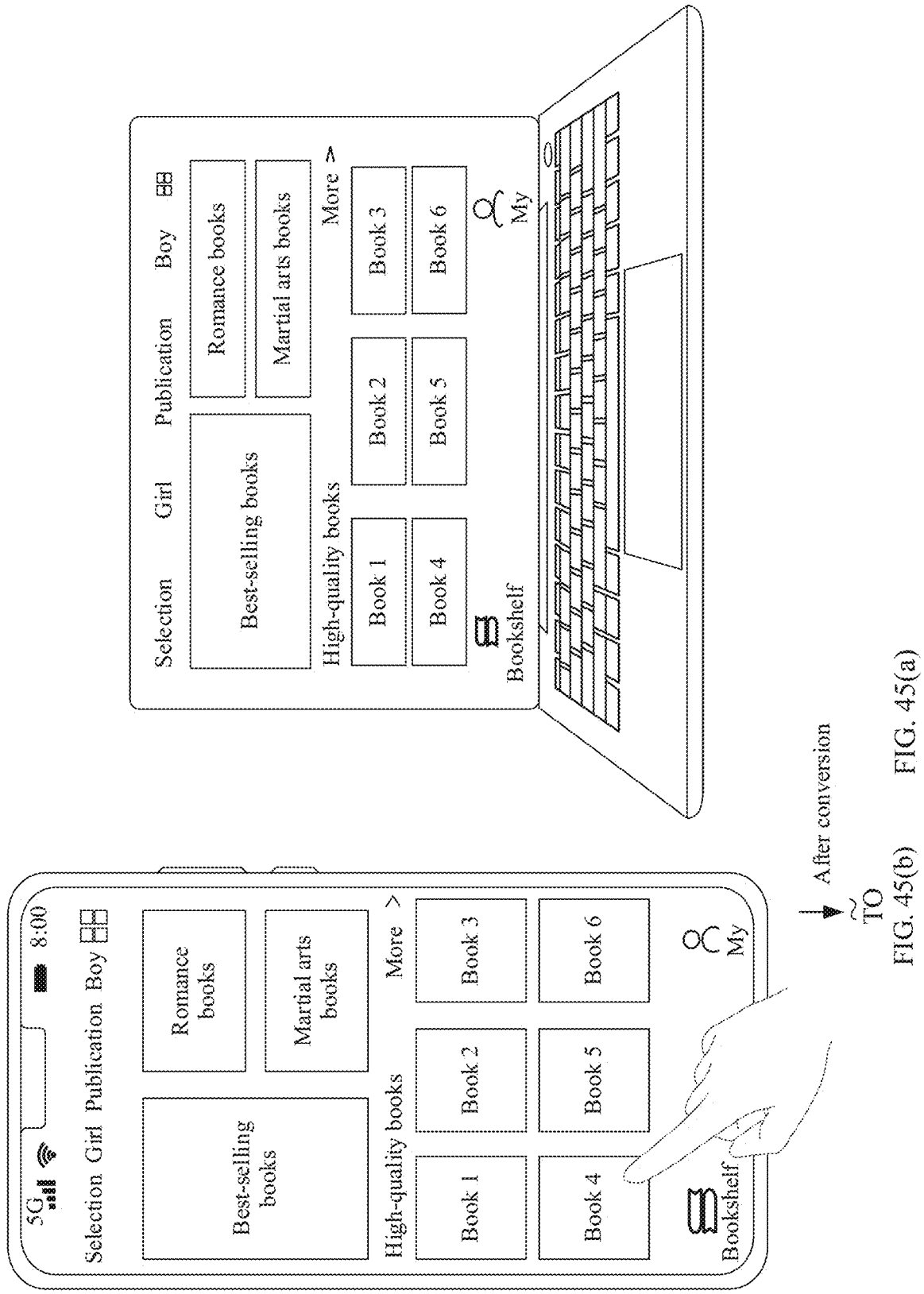
FIG. 45(a) and FIG. 45(b) are schematic diagrams of a second application conversion effect based on multi-screen collaboration according to an embodiment of this application.
Figure 45B:
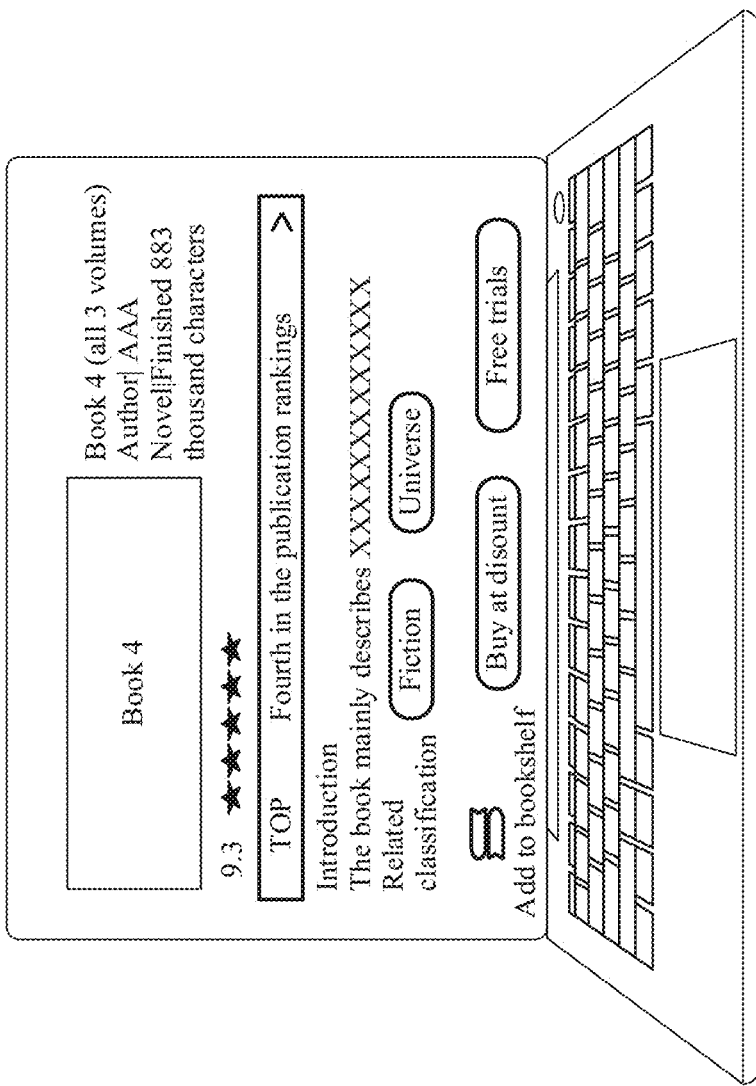
Figure 45B:
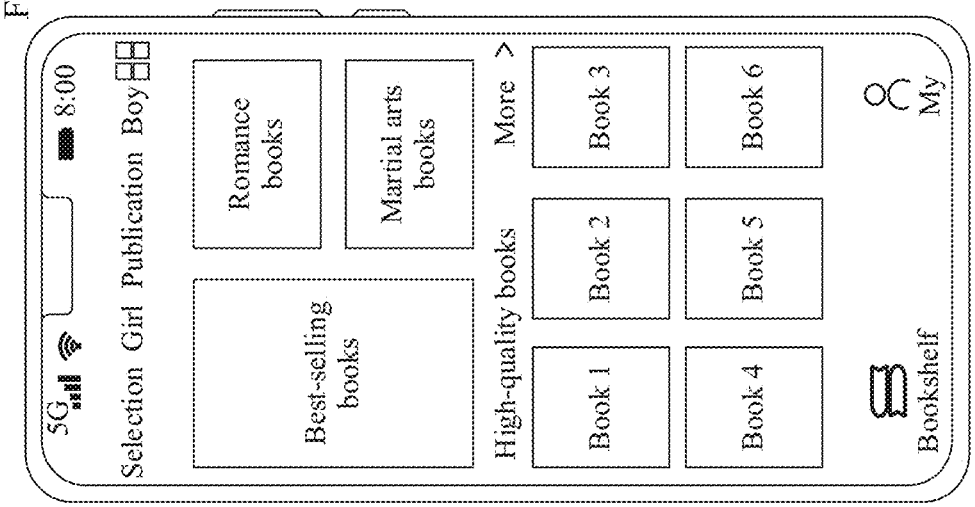

For example, as shown in FIG. 45(*a*) and FIG. 45(*b*), converted content and a shared element are displayed on the PC end, and the mobile phone end still keeps a display interface of an exit interface.

It should be noted that, in the content shown in FIG. 45(*a*) and FIG. 45(*b*), the shared element may also continue to be displayed on the display interface of the mobile phone end.

For example, as shown in FIG. 45(*a*) and FIG. 45(*b*), on the PC end, only the converted entry interface is displayed, and the shared element is not displayed; and on the mobile phone end, the shared element and the exit interface are displayed. In other words, in this case, the PC end is only used to scale up and display the entry interface, so that the user can view the entry interface more clearly and intuitively by using the PC end. The user may continue to control picture switching on the PC end by performing an operation on the mobile phone.

It should be noted that in this embodiment of this application, in the multi-screen collaboration mode, interface conversion may be simultaneously performed on a plurality of screens based on a corresponding single-shot effect, and is not limited by a conversion type or a usage scenario. For example, interface conversion may be performed based on different conversion types such as an Activity conversion type, a ViewGroup conversion type, and a Fragment conversion type, and may be performed inside an application, between applications, or between a system and an application. For details, refer to descriptions of FIG. 20 to FIG. 341 in embodiments of this application.

Based on the descriptions of the implementations, a person skilled in the art may clearly understand that for the purpose of convenient and brief descriptions, division into the foregoing functional modules is merely used as an example for descriptions. During actual application, the functions can be allocated to different functional modules for implementation based on a requirement. In other words, an inner structure of an apparatus is divided into different functional modules to implement all or some of the functions described above. For a specific working process of the foregoing system, apparatus, and unit, refer to a corresponding process in the foregoing method embodiments, and details are not described herein again.

Functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in embodiments of this application. The storage medium includes any medium that can store program code, for example, a flash memory, a removable hard disk, a read-only memory, a random access memory, a magnetic disk, or an optical disc.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A method implemented by an electronic device, the method comprising:
    displaying a first interface after detecting a first operation from a user on the electronic device, wherein the first interface comprises a first element and a second element, wherein the first interface is a desktop interface comprising an application icon of a first application, and wherein the second element is in the application icon;
    displaying a transition interface after detecting a second operation from the user on the first interface, wherein the transition interface comprises the second element, and wherein the second operation comprises tapping the application icon;
    displaying a second interface in response to detecting the second operation and after displaying the transition interface, wherein the second interface comprises the second element and a third element, wherein the second interface is a first display interface of the first application, wherein the second element is not in a status bar on the first interface, a status bar on the transition interface, or a status bar on the second interface, and wherein the first interface and the second interface are interfaces of different applications; and
    presenting, in a process of switching from the first interface to the second interface, the second element in a dynamic effect form by using the transition interface to obtain a visual effect of moving the second element from a first location of the second element in the first interface to a second location of the second element in the second interface.

2. The method according to claim 1, wherein the first interface and the second interface are different display interfaces of the first application, and wherein the first interface is a home screen, an interface adjacent to the home screen, or a leftmost interface of the electronic device and the second interface is the first display interface, or wherein the first interface is the first display interface, and the second interface is a second display interface of a second application.

3. The method according to claim 1, wherein, in a process of displaying the second element in the dynamic effect form, the method further comprises changing at least one of a presentation form of the second element or a size of the second element.

4. The method according to claim 1, further comprising executing, based on a dynamic effect configured for each interface or an element on the interface, a change in presentation form or animation as the dynamic effect corresponding to the interface or the element in the process of switching from the first interface to the second interface.

5. The method according to claim 4, wherein the first interface and the second interface are different display interfaces of the first application, and wherein the first interface is a home screen, an interface adjacent to the home screen, or a leftmost interface of the electronic device and the second interface is the first display interface, or wherein the first interface is the first display interface and the second interface is a second display interface of a second application.

6. The method according to claim 1, wherein the method further comprises:
    enabling the first element on the first interface to fade out;
    enabling the third element on the second interface to fade in; and
    continuously displaying the second element on the first interface, the transition interface, and the second interface.

7. The method according to claim 6, wherein the first interface and the second interface are different display interfaces of the first application, and wherein the first interface is a home screen, an interface adjacent to the home screen, or a leftmost interface of the electronic device and the second interface is the first display interface, or wherein the first interface is the first display interface and the second interface is a second display interface of a second application.

8. The method according to claim 6, further comprising executing, based on a dynamic effect configured for each interface or an element on the interface, a change in presentation form or animation as the dynamic effect corresponding to the interface or the element in the process of switching from the first interface to the second interface.

9. The method according to claim 8, wherein the first interface and the second interface are different display interfaces of the first application, and wherein the first interface is a home screen, an interface adjacent to the home screen, or a leftmost interface of the electronic device and the second interface is the first display interface, or wherein the first interface is the first display interface and the second interface is a second display interface of a second application.

10. An electronic device comprising:

a memory configured to store instructions; and one or more processors coupled to the memory and configured to execute the instructions to cause the electronic device to:

display a first interface after detecting a first operation from a user on the electronic device, wherein the first interface comprises a first element and a second element, wherein the first interface is a desktop interface comprising an application icon of a first application, and wherein the second element is in the application icon;

display a transition interface after detecting a second operation from the user on the first interface, and wherein the second operation comprises tapping the application icon;

display a second interface in response to detecting the second operation and after displaying the transition interface, wherein the second interface comprises the second element and a third element, wherein the second interface is a first display interface of the first application, wherein the second element is not in a status bar on the first interface, a status bar on the transition interface, or a status bar on the second interface, and wherein the first interface and the second interface are interfaces of different applications; and present, in a process of switching from the first interface to the second interface, the second element in a dynamic effect form by using the transition interface to obtain a visual effect of moving the second element from a first location of the second element in the first interface to a second location of the second element in the second interface.

11. The electronic device according to claim 10, wherein the one or more processors are further configured to execute the instructions to cause the electronic device to:

enable the first element on the first interface to fade out;

enable the third element on the second interface to fade in; and continuously display the second element on the first interface, the transition interface, and the second interface.

12. The electronic device according to claim 10, wherein the one or more processors are further configured to execute the instructions to cause the electronic device to execute based on a dynamic effect configured for each interface or based on a dynamic effect configured for an element on the interface, a change in presentation form or animation as the dynamic effect corresponding to the interface or the element in the process of switching from the first interface to the second interface.

13. The electronic device according to claim 10, wherein the one or more processors are further configured to execute the instructions to cause the electronic device to execute, based on a dynamic effect configured for each interface, a change in presentation form or animation as the dynamic effect corresponding to the interface in the process of switching from the first interface to the second interface.

14. The electronic device according to claim 10, wherein the one or more processors further cause the electronic device to execute, based on a dynamic effect configured for an element on an interface, a change in presentation form or animation as the dynamic effect corresponding to the element in the process of switching from the first interface to the second interface.

15. The electronic device according to claim 10, wherein the first interface and the second interface are different display interfaces of the first application.

16. The electronic device according to claim 10, wherein the first interface is a home screen, an interface adjacent to the home screen, or a leftmost interface of the electronic device and the second interface is the first display interface.

17. The electronic device according to claim 10, wherein the first interface is the first display interface and the second interface is a second display interface of a second application.

18. The electronic device according to claim 10, wherein, in a process of displaying the second element in the dynamic effect form, the one or more processors further cause the electronic device to change at least one of a presentation form of the second element or a size of the second element.

19. A computer program product comprising computer-executable instructions that are stored on a non-transitory computer-readable storage medium and that when executed by one or more processors cause an electronic device to:

display a first interface after detecting a first operation from a user on the electronic device, wherein the first interface comprises a first element and a second element, wherein the first interface is a desktop interface comprising an application icon of a first application, and wherein the second element is in the application icon;

display a transition interface in response to detecting a second operation from the user on the first interface, wherein the transition interface comprises the second element, and wherein the second operation comprises tapping the application icon;

display a second interface, wherein the second interface comprises the second element and a third element, wherein the second interface is a display interface of the first application, wherein the transition interface comprises the second element, wherein the second element does not comprise an element in a status bar on the first interface, a status bar on the transition interface, or a status bar on the second interface, and wherein the first interface and the second interface are interfaces of different applications; and present, in a process of switching from the first interface to the second interface, the second element in a dynamic effect form by using the transition interface to obtain a visual effect of moving the second element from a first location of the second element in the first interface to a second location of the second element in the second interface.

20. The computer program product according to claim 19, wherein the computer-executable instructions further cause the electronic device to:

enable the first element on the first interface to fade out;

enable the third element on the second interface to fade in; and continuously display the second element on the first interface, the transition interface, and the second interface.

* * * * *